(12) United States Patent
Mochizuki et al.

(10) Patent No.: US 10,448,300 B2
(45) Date of Patent: Oct. 15, 2019

(54) MOBILE COMMUNICATION SYSTEM

(71) Applicant: Mitsubishi Electric Corporation, Chiyoda-ku (JP)

(72) Inventors: Mitsuru Mochizuki, Tokyo (JP); Miho Maeda, Tokyo (JP); Shinsuke Uga, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/431,965

(22) PCT Filed: Sep. 3, 2013

(86) PCT No.: PCT/JP2013/005195
§ 371 (c)(1),
(2) Date: Mar. 27, 2015

(87) PCT Pub. No.: WO2014/049971
PCT Pub. Date: Apr. 3, 2014

(65) Prior Publication Data
US 2015/0245402 A1    Aug. 27, 2015

(30) Foreign Application Priority Data

Sep. 28, 2012 (JP) ................. 2012-217229
Feb. 15, 2013 (JP) ................. 2013-028057

(51) Int. Cl.
*H04W 36/22* (2009.01)
*H04W 76/15* (2018.01)
(Continued)

(52) U.S. Cl.
CPC ........... *H04W 36/22* (2013.01); *H04W 76/15* (2018.02); *H04W 24/02* (2013.01);
(Continued)

(58) Field of Classification Search
CPC .................................................. H04W 28/12
See application file for complete search history.

(56) References Cited

U.S. PATENT DOCUMENTS 5,828,659 A    10/1998   Teder et al.
7,664,502 B2    2/2010   Oikawa
(Continued)

FOREIGN PATENT DOCUMENTS

EP    1 879 415 A2    1/2008
JP    2008-22068 A    1/2008
(Continued)

OTHER PUBLICATIONS

Machine Translation of WO 201125278 A1.*
(Continued)

*Primary Examiner* — Kevin M Cunningham
(74) *Attorney, Agent, or Firm* — Oblon, McClelland, Maier & Neustadt, L.L.P.

(57) ABSTRACT

A mobile communication system includes a mobile station, a first base station and a second base station configured to perform radio communication with the mobile station, and a gateway station configured to perform communication with the first base station and the second base station or with the mobile station via the first base station and the second base station. One communication is performed between the mobile station and the gateway station by establishing a first communication connection between the gateway station and the first base station, a first radio communication connection between the first base station and the mobile station, and a second radio communication connection between the second base station and the mobile station. This enables a normal change of a cell during communication without any load on a network.

7 Claims, 72 Drawing Sheets

(51) Int. Cl.
  *H04W 92/12*  (2009.01)
  *H04W 24/02*  (2009.01)
  *H04W 36/10*  (2009.01)
  *H04W 36/00*  (2009.01)
(52) U.S. Cl.
  CPC ........ *H04W 36/0027* (2013.01); *H04W 36/10* (2013.01); *H04W 92/12* (2013.01)

(56) References Cited

U.S. PATENT DOCUMENTS

| | | | |
|---|---|---|---|
| 8,125,939 | B2 | 2/2012 | Murasawa et al. |
| 8,532,661 | B2 | 9/2013 | Vikberg et al. |
| 2008/0008146 | A1 | 1/2008 | Oikawa |
| 2009/0109933 | A1 | 4/2009 | Murasawa et al. |
| 2011/0041021 | A1* | 2/2011 | Khoshnevis .......... H04L 1/1819 714/748 |
| 2011/0223919 | A1 | 9/2011 | Vikberg et al. |
| 2012/0236953 | A1* | 9/2012 | Mueck ................ H04W 88/085 375/260 |
| 2013/0010702 | A1* | 1/2013 | Aminaka ............ H04W 76/025 370/328 |
| 2014/0056243 | A1* | 2/2014 | Pelletier ................ H04W 74/04 370/329 |
| 2014/0080484 | A1* | 3/2014 | Centonza ............ H04W 76/045 455/436 |
| 2014/0161056 | A1 | 6/2014 | Moulsley et al. |

FOREIGN PATENT DOCUMENTS

| | | | | |
|---|---|---|---|---|
| JP | 2009-111641 | A | 5/2009 | |
| JP | WO 2011125278 | A1 * | 10/2011 | .......... H04W 76/025 |
| JP | 2012-160854 | A | 8/2012 | |
| JP | 2014-138317 | | 7/2014 | |
| WO | WO 2010/059099 | A1 | 5/2010 | |
| WO | WO 2011/057162 | A1 | 5/2011 | |
| WO | WO 2012/103946 | A1 | 8/2012 | |

OTHER PUBLICATIONS

Extended European Search Report dated Jun. 3, 2016 in Patent Application No. 13840442.1.
International Search Report dated Nov. 26, 2013 in PCT/JP2013/005195.
International Preliminary Report on Patentability and Written Opinion dated Apr. 9, 2015 in PCT/JP2013/005195 (with English translation of Written Opinion only).
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)" 3GPP TS 36.300 V11.2.0, Jun. 2012, 202 Pages.
"3$^{rd}$ Generation Partnership Project; Technical Specification Group Radio Access Network; Evolved Universal Terrestrial Radio Access (E-UTRA); Radio Resource Control (RRC); Protocol specification (Release 11)" 3GPP TS 36.331 V11.0.0, Jun. 2012, 303 Pages.
"3$^{rd}$ Generation Partnership Project; Technical Specification Group Radio Access Network; Evolved Universal Terrestrial Radio Access (E-UTRA); User Equipment (UE) procedures in idle mode (Release 11)" 3GPP TS 36.304 V11.0.0, Jun. 2012, 34 Pages.
"3$^{rd}$ Generation Partnership Project; Technical Specification Group Services and System Aspects; Architecture aspects of Home NodeB and Home eNodeB (Release 9)" 3GPP TR 23.830 V9.0.0, Sep. 2009, 56 Pages.
"LS on HNB/HeNB Open Access Mode" 3GPP TSG-SA1 #42 S1-083461, Oct. 2008, 3 Pages.
"LS on CSG cell identification" 3GPP TSG-RAN WG 2 meeting #62 R2-082899, May 2008, 3 Pages.
"3$^{rd}$ Generation Partnership Project; Technical Specification Group Radio Access Network; Evolved Universal Terrestrial Radio Access (E-UTRA); Further advancements for E-UTRA physical layer aspects (Release 9)" 3GPP TR 36.814 V9.0.0, Mar. 2010, 105 Pages.
"3$^{rd}$ Generation Partnership Project; Technical Specification Group Radio Access Network; Feasibility study for Further Advancements for E-UTRA (LTE-Advanced) (Release 10)" 3GPP TR 36.912 V10.0.0, Mar. 2011, 259 Pages.
"3$^{rd}$ Generation Partnership Project; Technical Specification Group Radio Access Network; Evolved Universal Terrestrial Radio Access (E-UTRA); User Equipment (UE) radio transmission and reception (Release 11)" 3GPP TS 36.101 V11.0.0, 2012, 317 Pages.
"3$^{rd}$ Generation Partnership Project; Technical Specification Group Radio Access Network; Coordinated multi-point operation for LTE physical layer aspects (Release 11)" 3GPP TR 36.819 V11.1.0, Dec. 2011, 70 Pages.
"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)" 3GPP TS 23.401 V11.2.0, Jun. 2012, 286 Pages.
"Requirements, Candidate Solutions & Technology Roadmap for LTE-Rel-12 Onward" 3GPP Workshop on Release 12 and onwards RWS-120010, Jun. 2012, 28 Pages.
"Views on Rel-12 and onwards for LTE and UMTS" RAN workshop on Rel-12 and onwards RWS-120006, Jun. 2012, 22 Pages.
"3$^{rd}$ Generation Partnership Project; Technical Specification Group Radio Access Network; Evolved Universal Terrestrial Radio Access (E-UTRA); Potential solutions for energy saving for E-UTRAN (Release 10)" 3GPP TR 36.927 V10.1.0, Sep. 2011, 23 Pages.
"3$^{rd}$ Generation Partnership Project; Technical Specification Group Radio Access Network; Evolved Universal Terrestrial Radio Access (E-UTRA); Base Station (BS) conformance testing (Release 11)" 3GPP TS 36.141 V11.1.0, Jun. 2012, 225 Pages.
Office Action dated Jul. 4, 2017 in Japanese Patent Application No. 2014-538123 (with partial English translation).
Office Action dated Oct. 3, 2017 in Japanese Patent Application No. 2014-538123 (with English-language Translation).
Combined Chinese Office Action and Search Report dated Dec. 13, 2017 in Patent Application No. 201380050940.5 (with English language translation).
Office Action dated Jul. 30, 2018 in Chinese Patent Application No. 201380050940.5, with English-language translation, 16 pages. (The reference(s) cited therein was previously cited.).
Office Action dated Apr. 15, 2019 in European Patent Application No. 13 840 442.1, 4 pages. (The references cited therein were previously cited and/or filed.).
Office Action dated Aug. 6, 2019 in Japanese Patent Application No., 2018-187432, with English-language translation, 6 pages.

* cited by examiner

F I G. 1
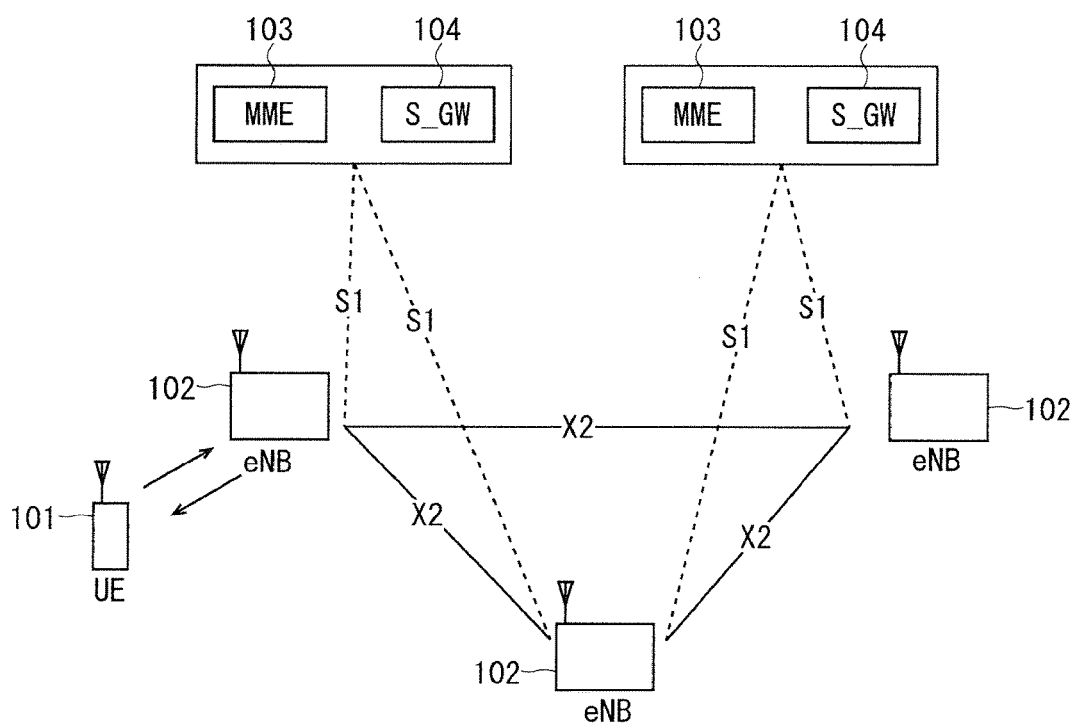

F I G. 2
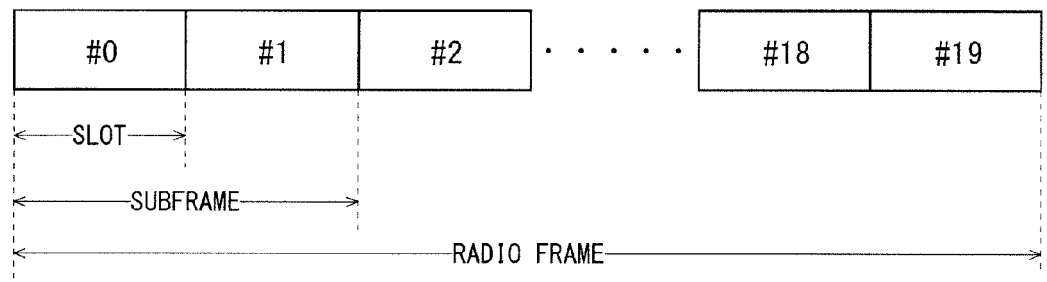

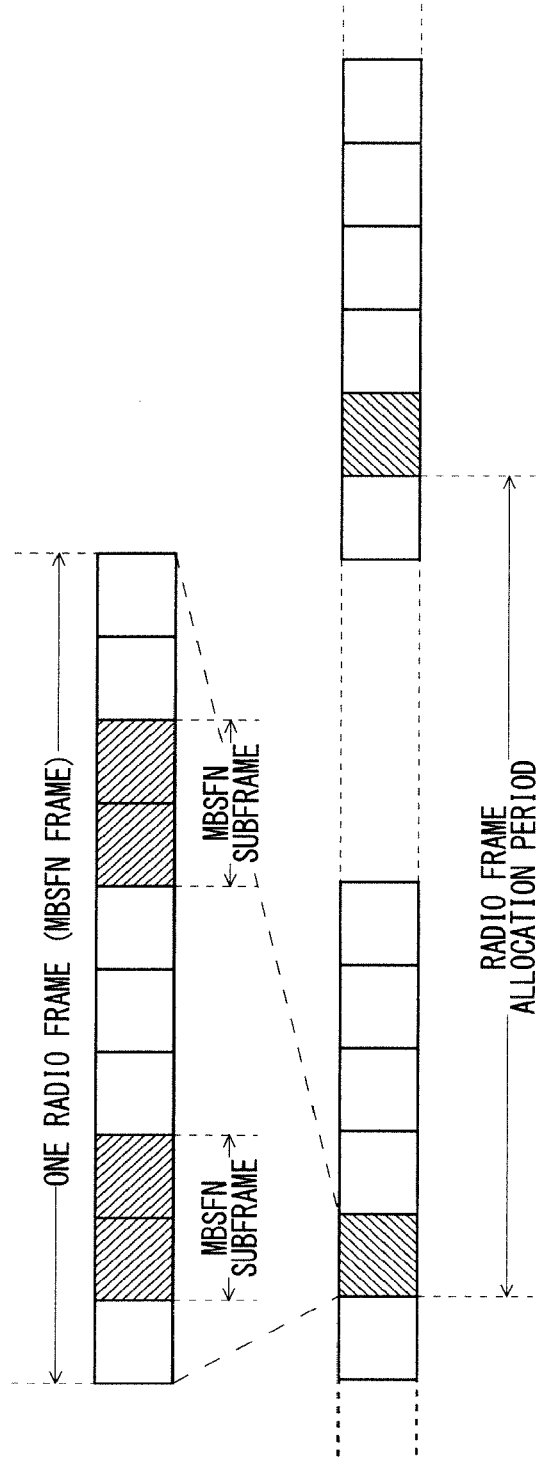
F I G. 3

F I G . 4
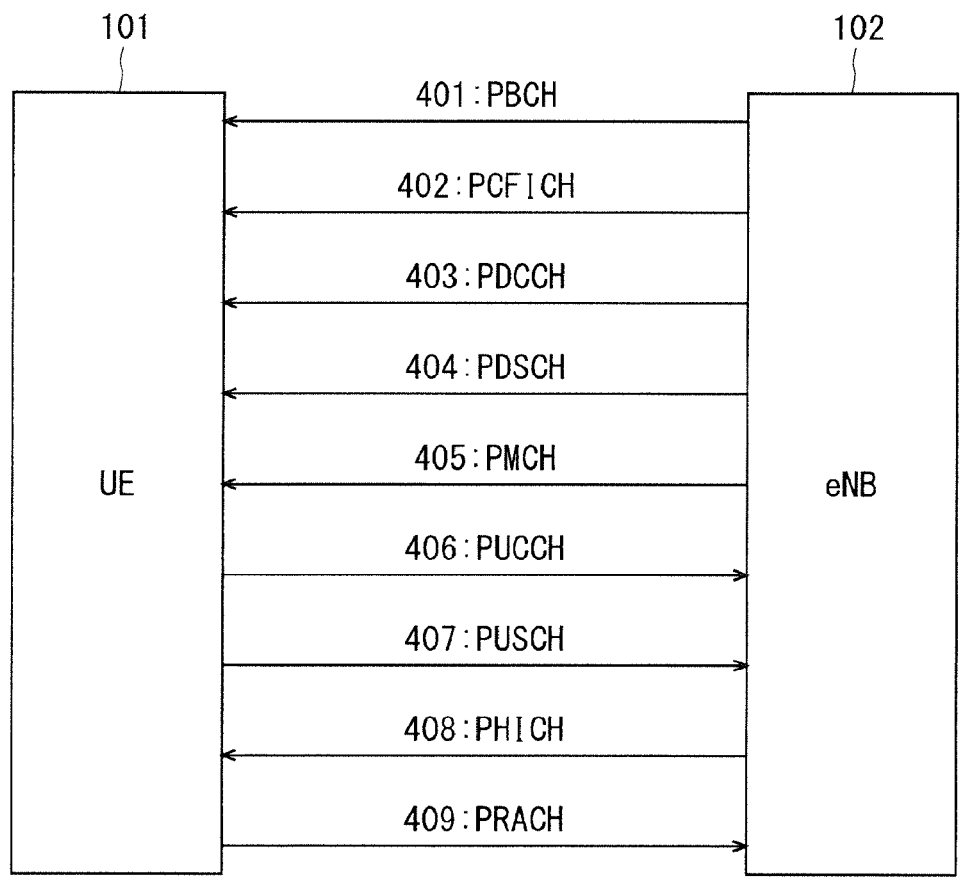

FIG. 5
(A)
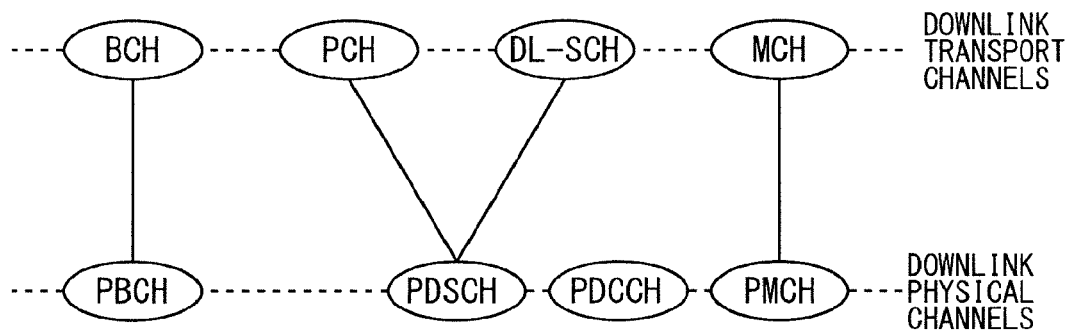
(B)
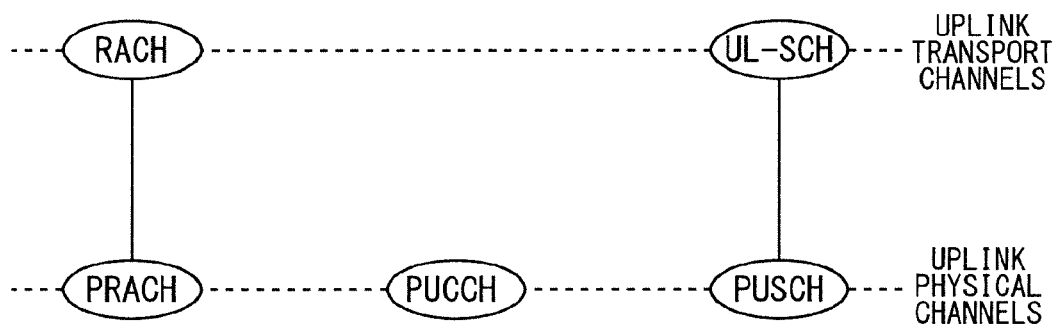

F I G. 6
(A)
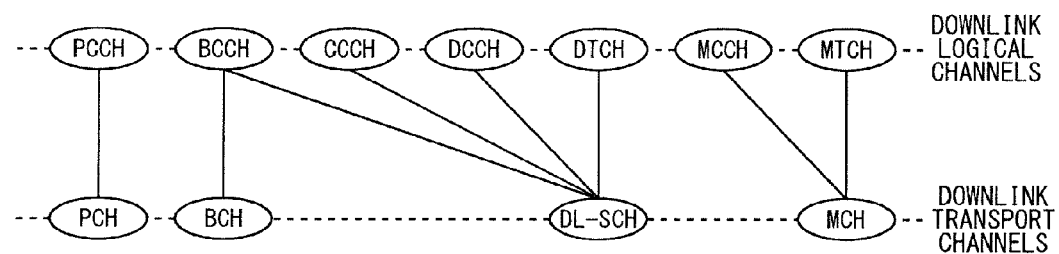
(B)
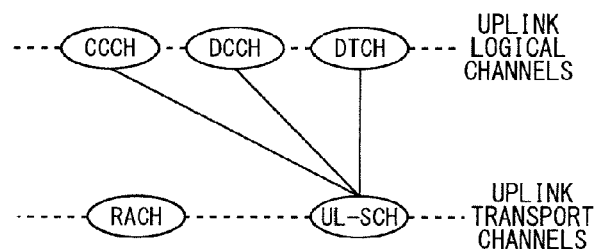

F I G. 1 0
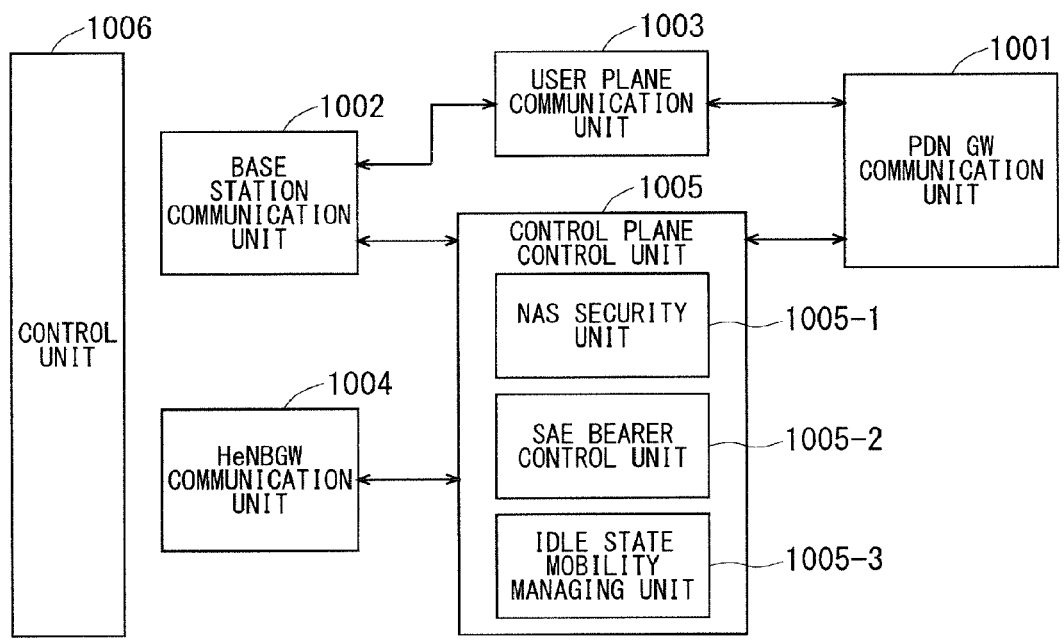

F I G. 1 1
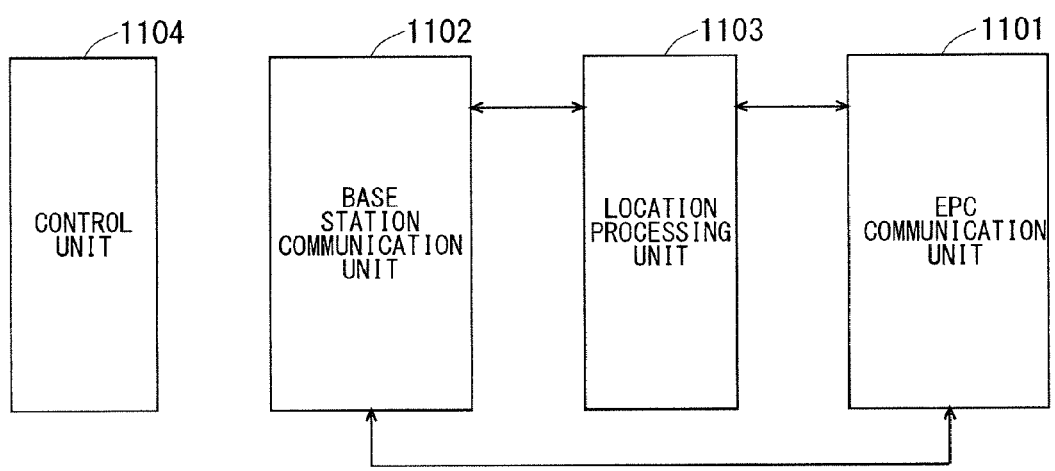

F I G . 1 2
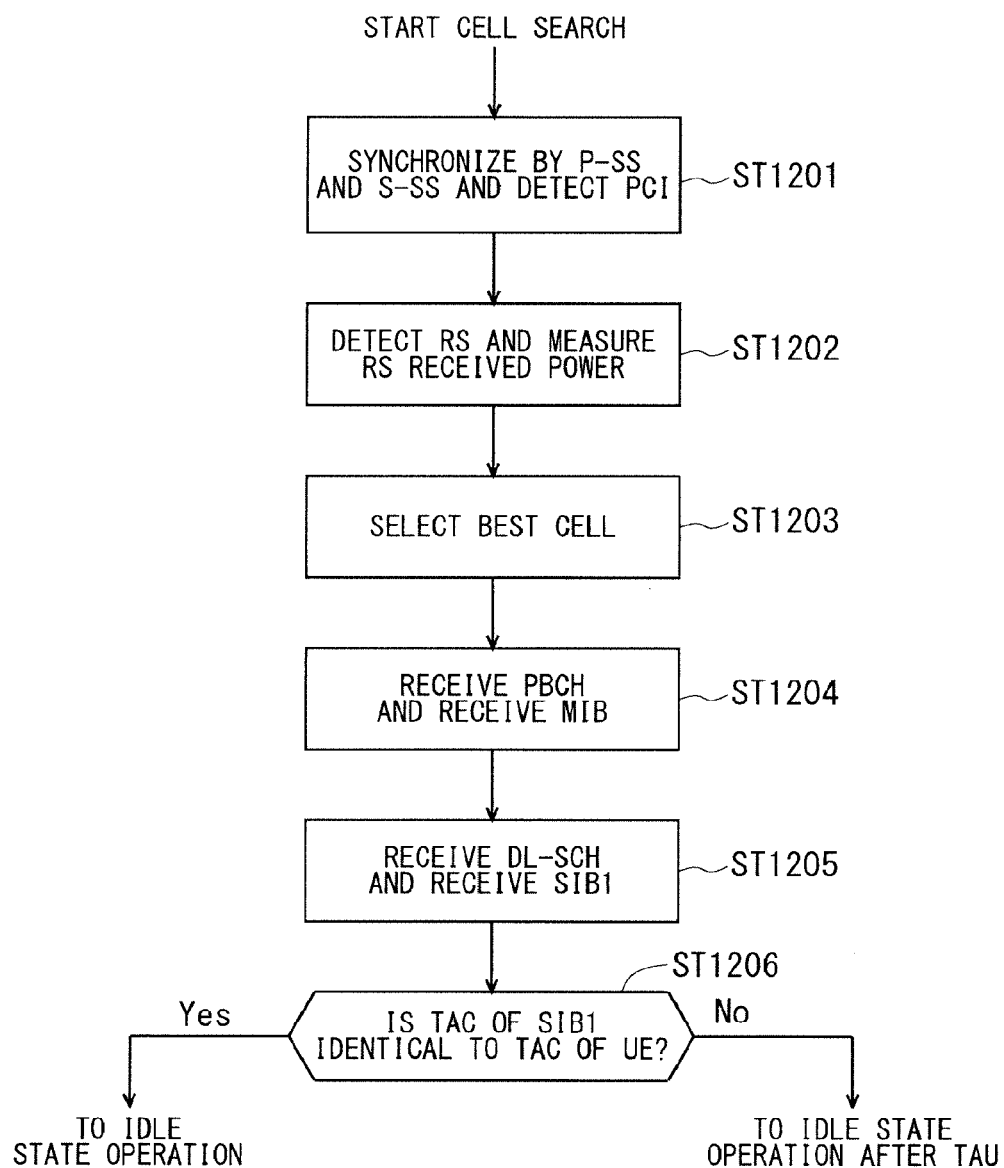

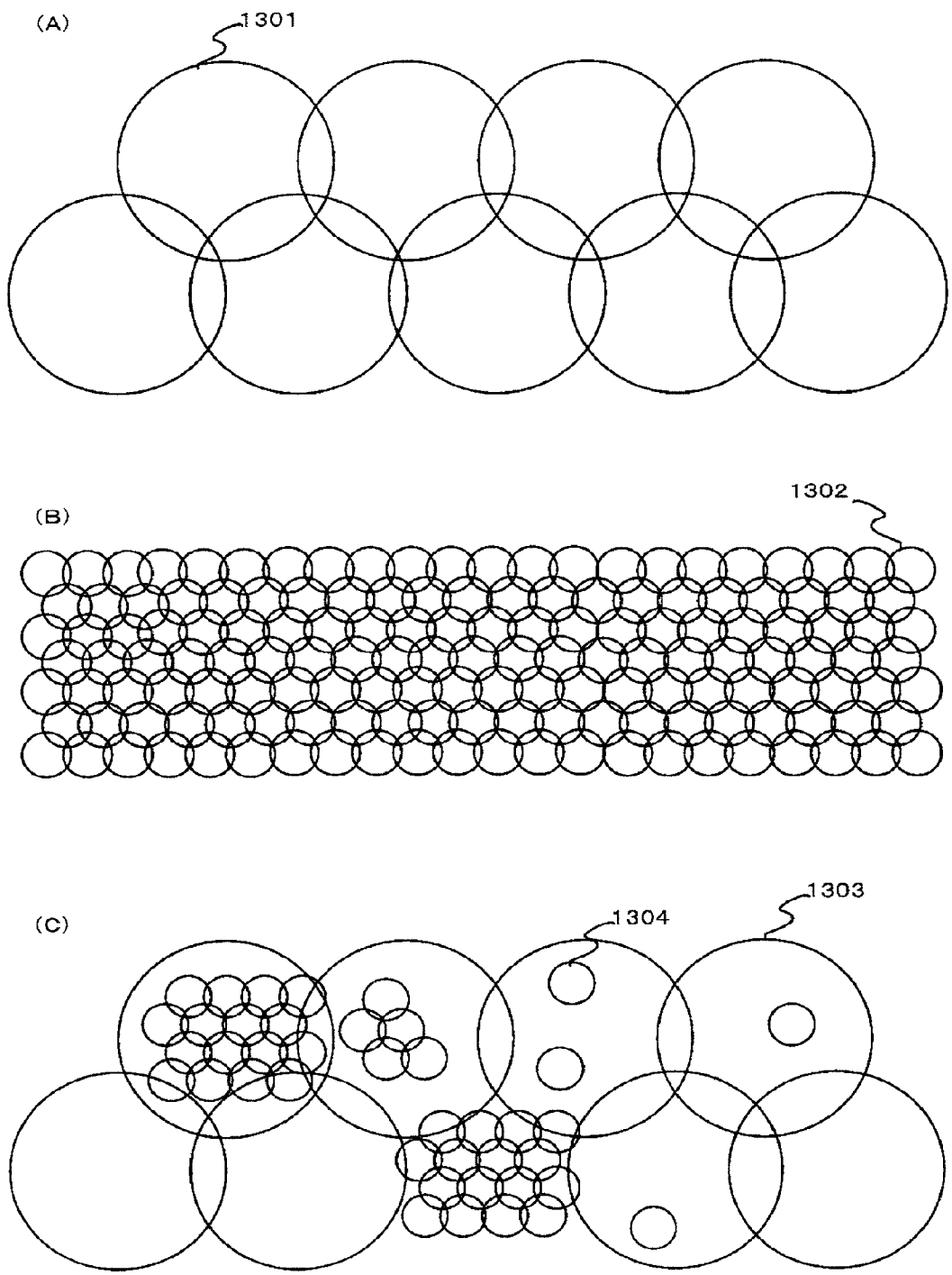

F I G . 1 4
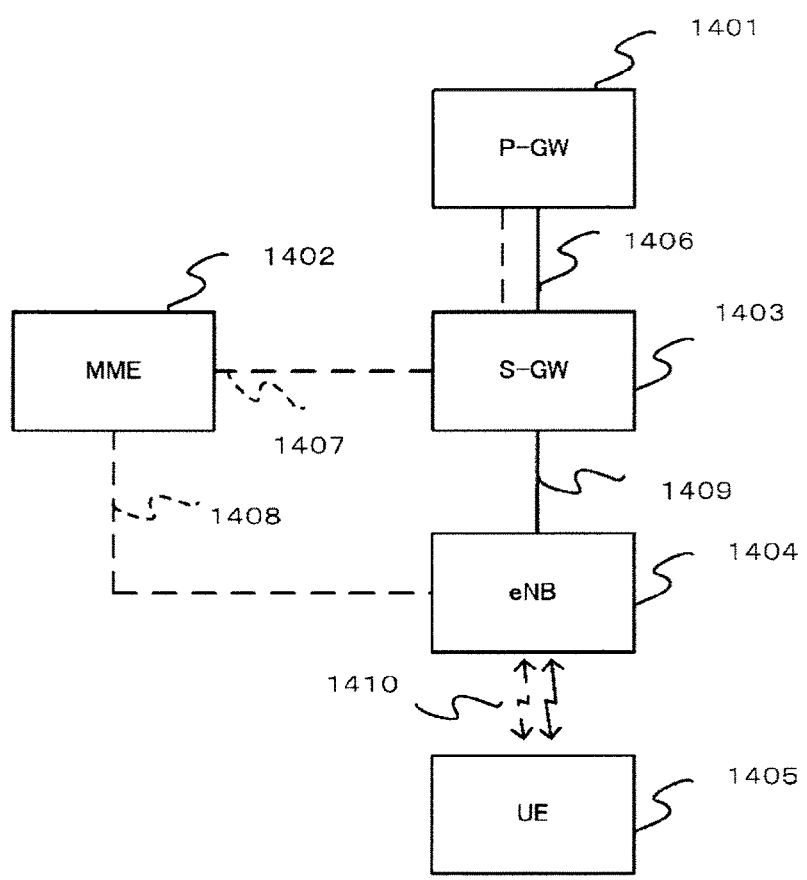

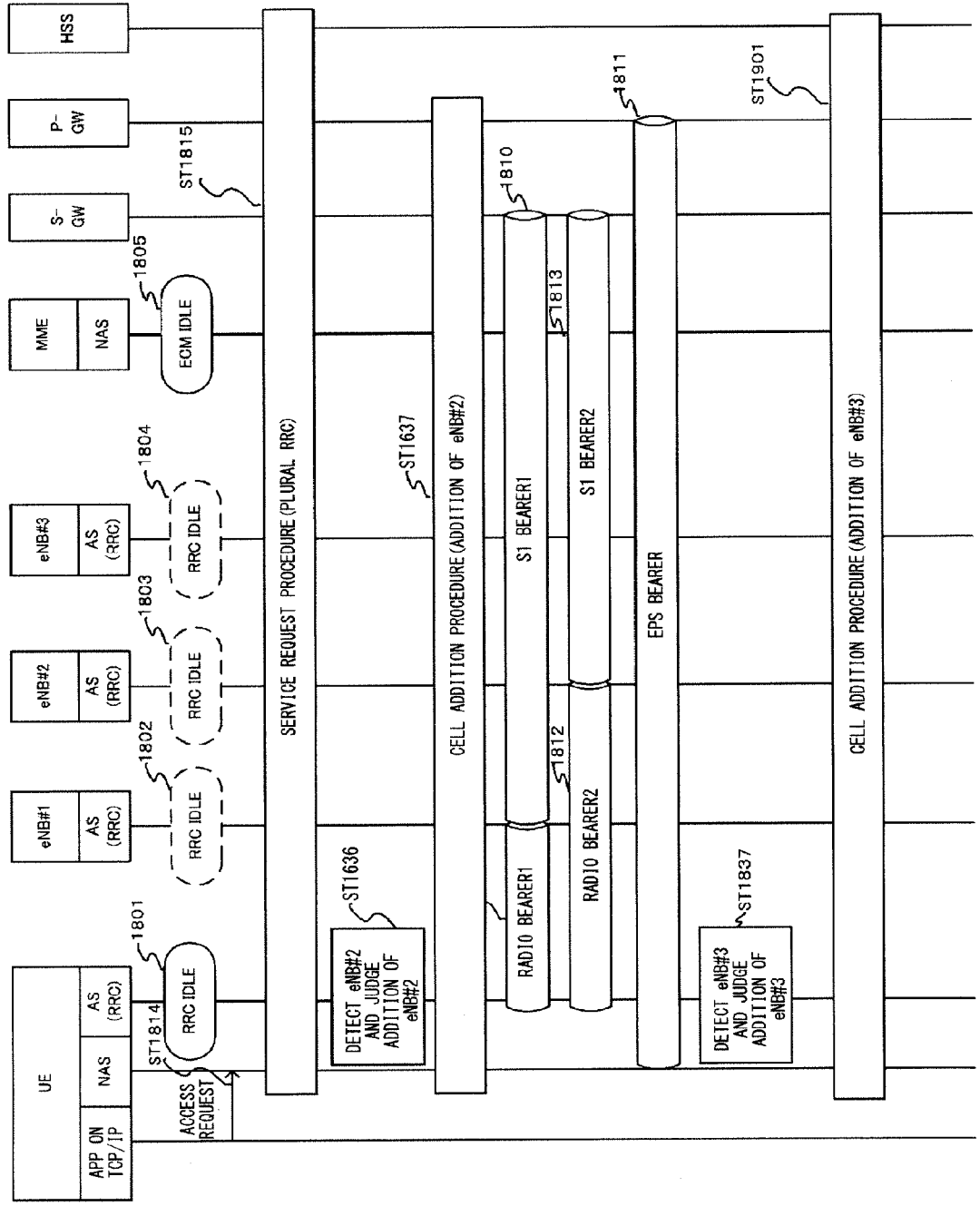

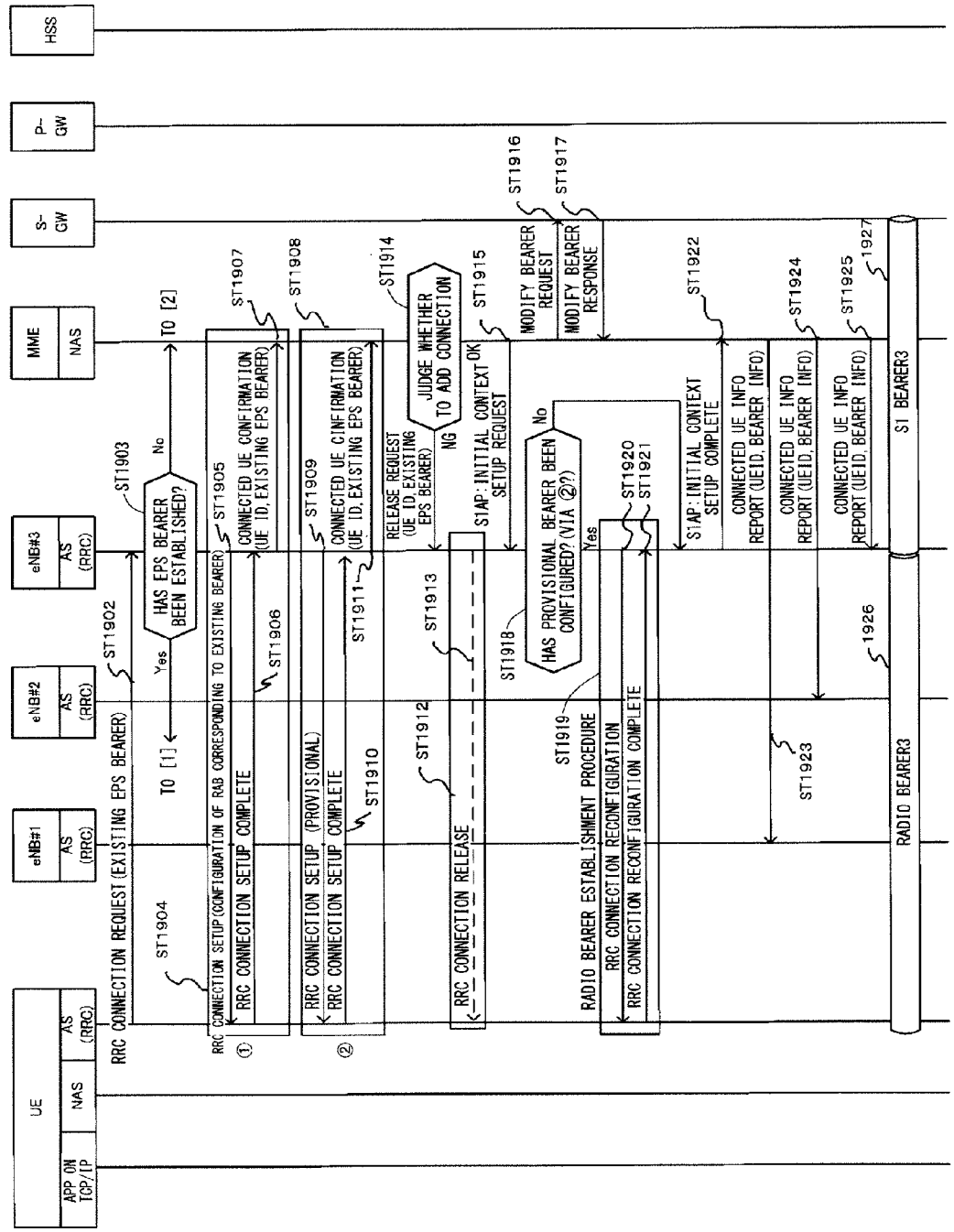

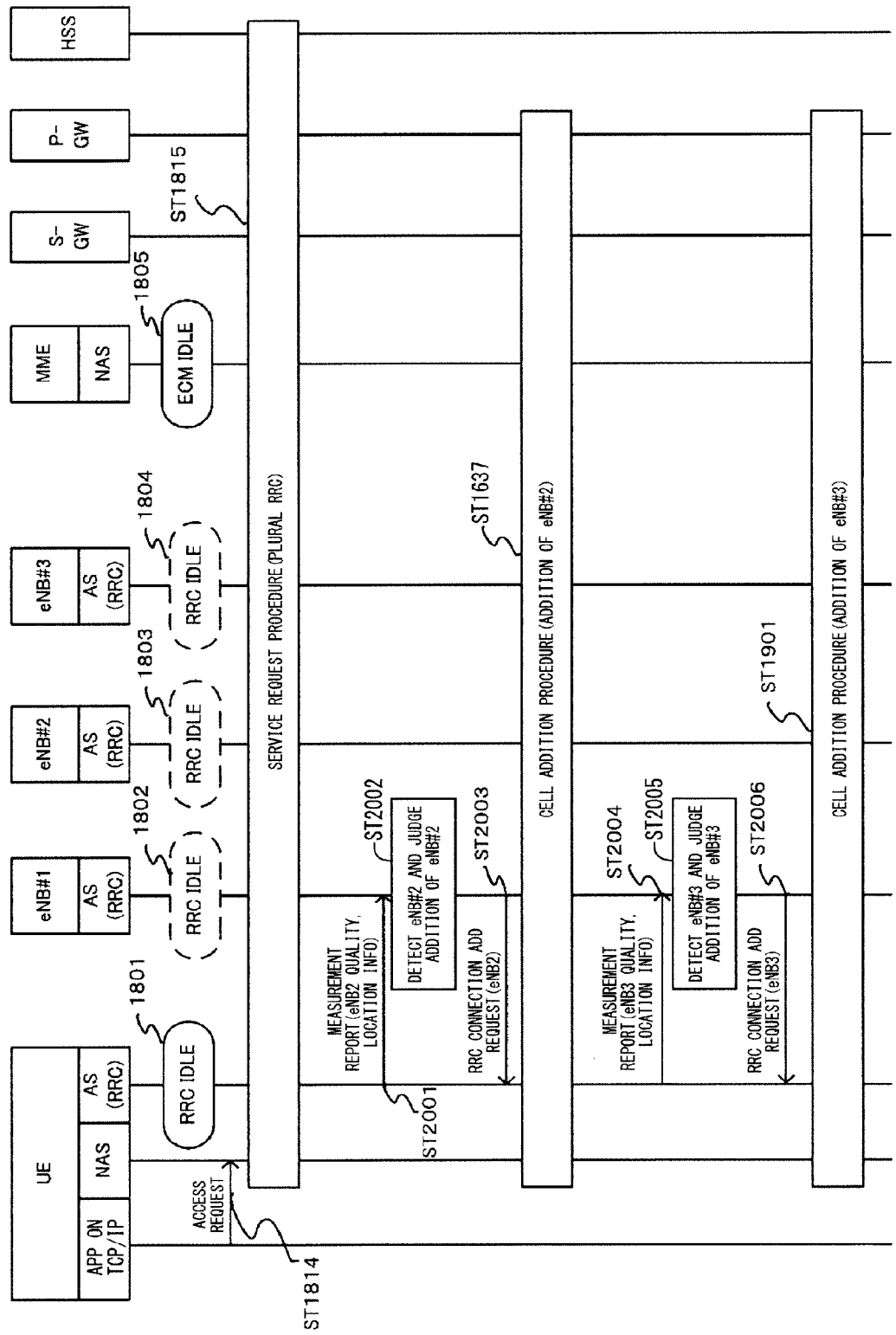

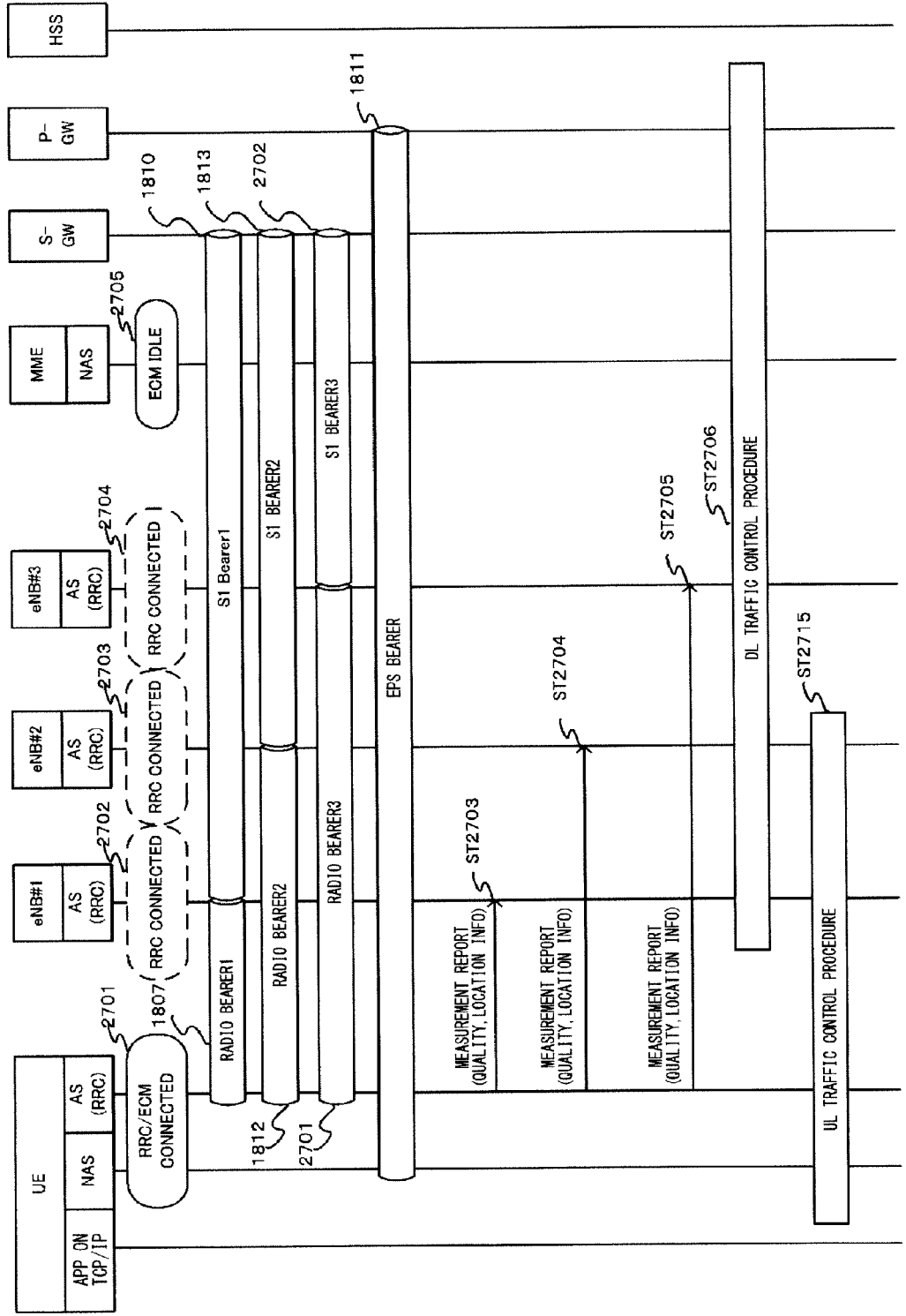

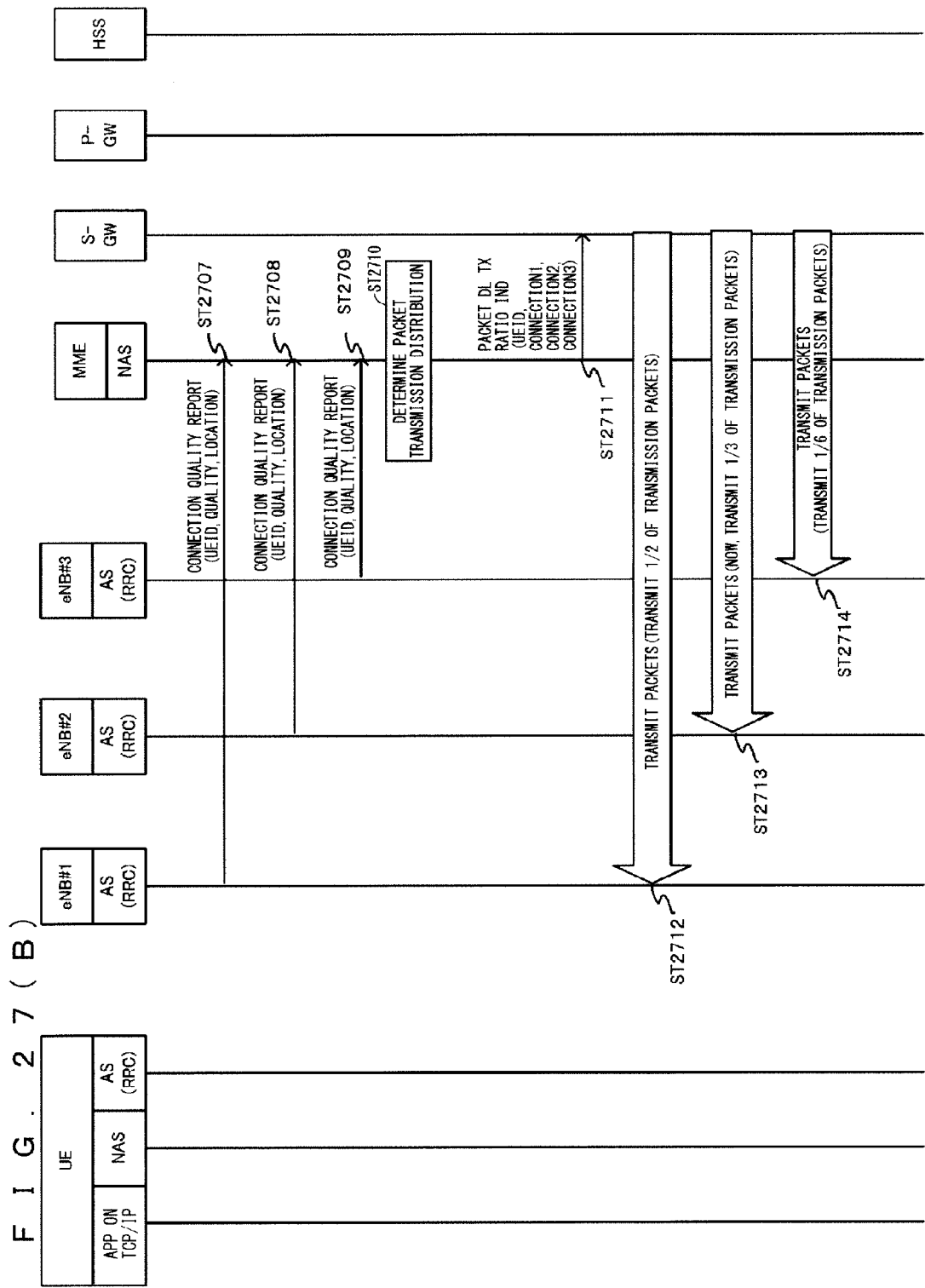

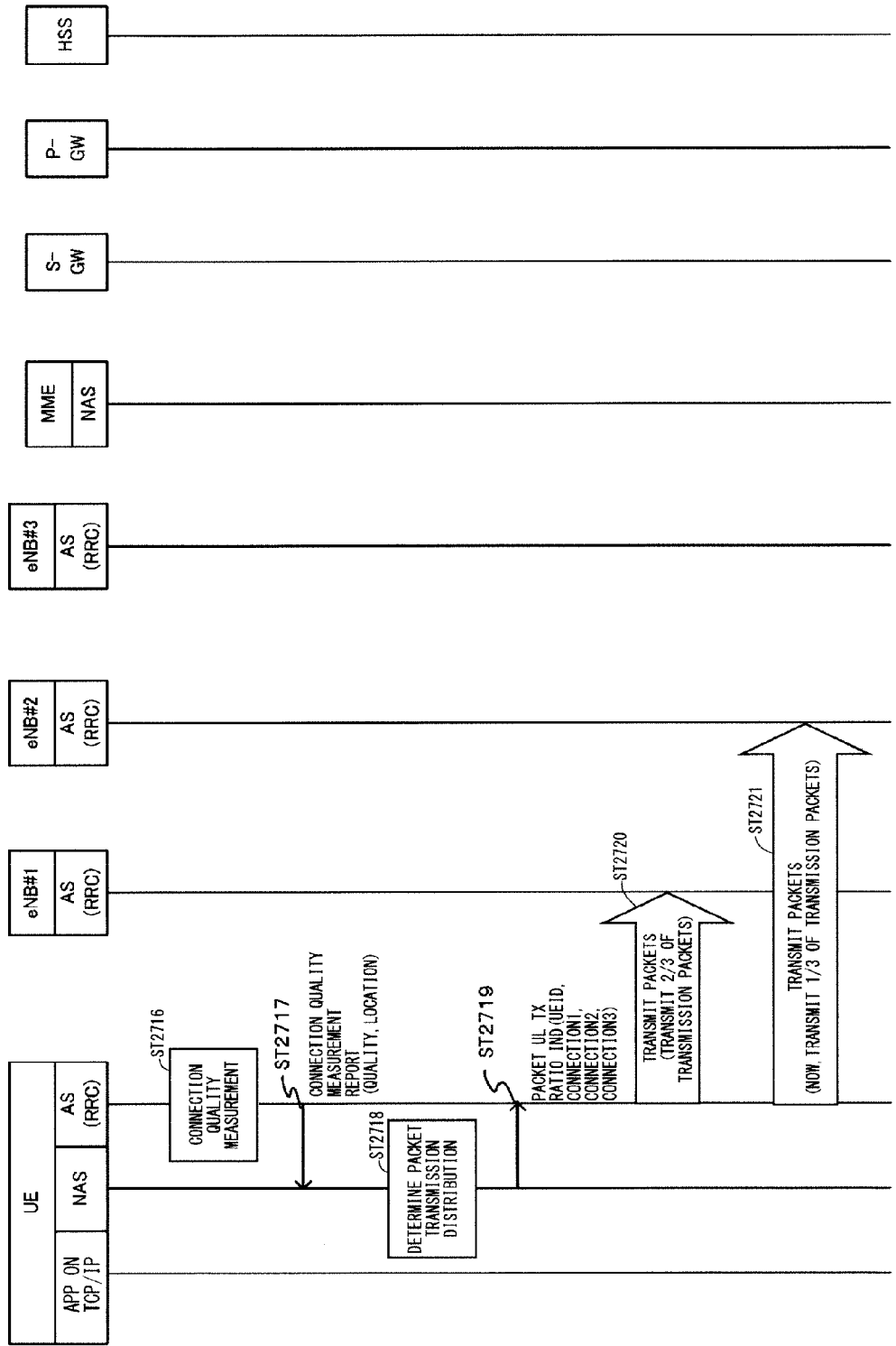

F I G . 2 8
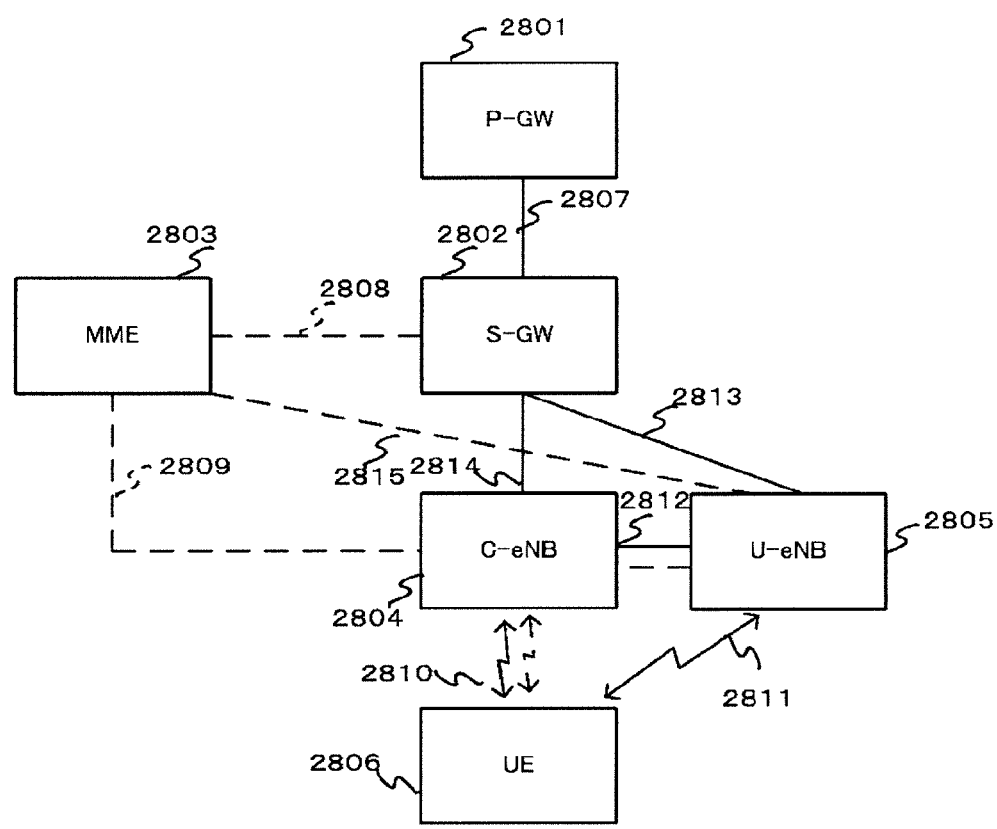

F I G . 3 4
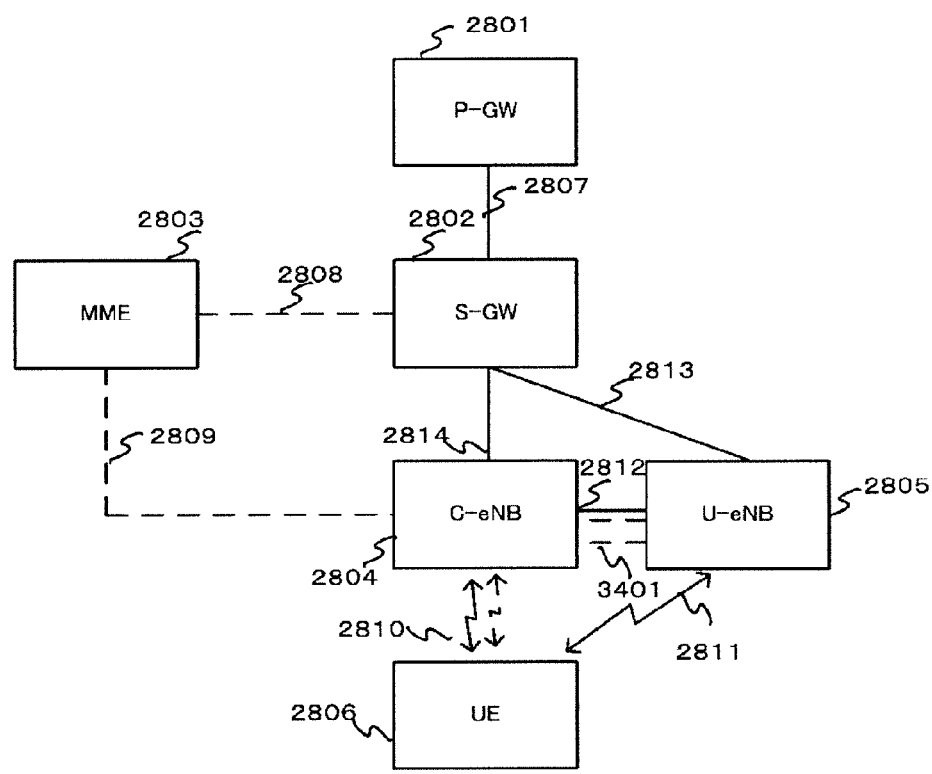

F I G. 3 8
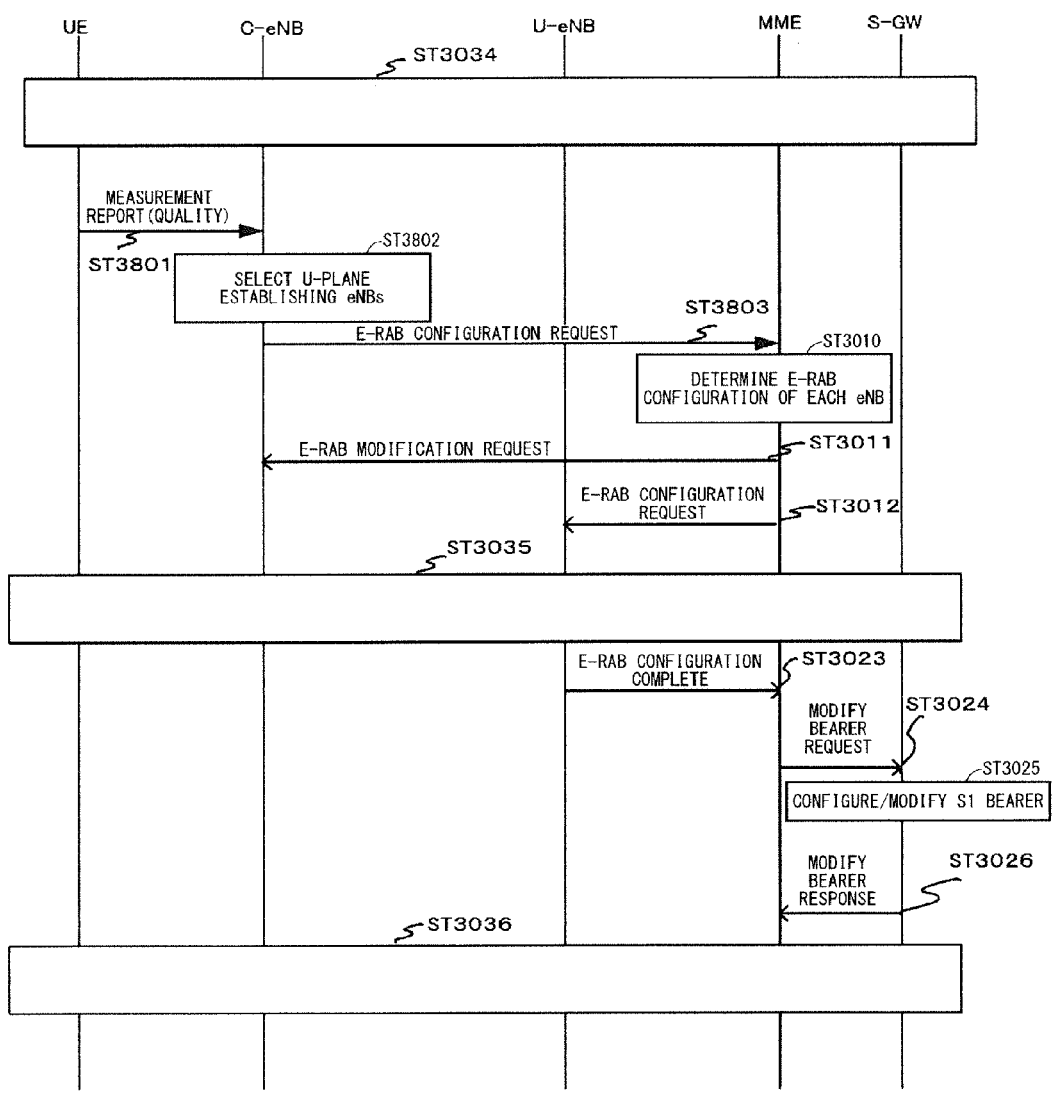

F I G . 4 0
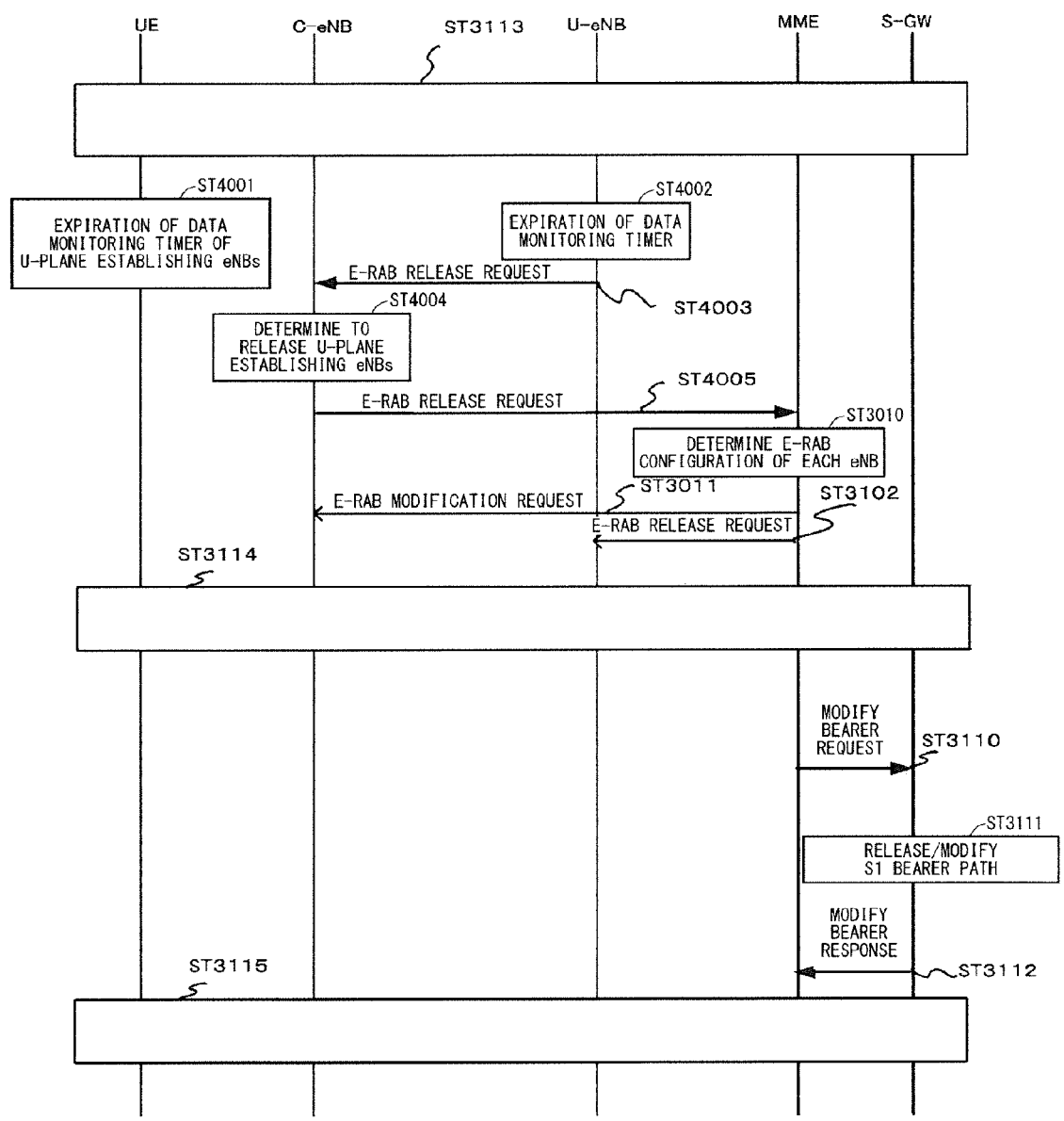

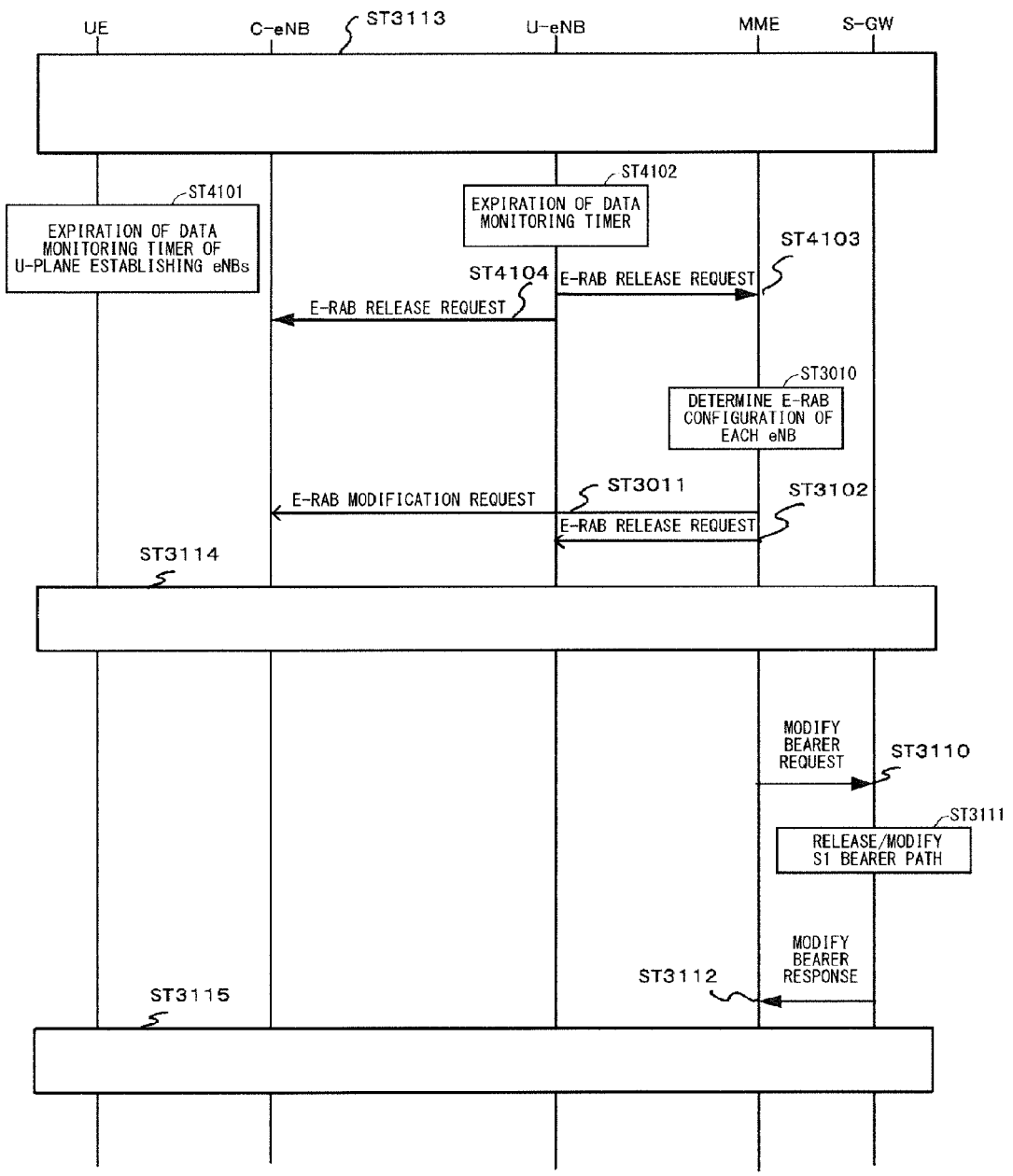
F I G. 4 1

F I G . 4 2
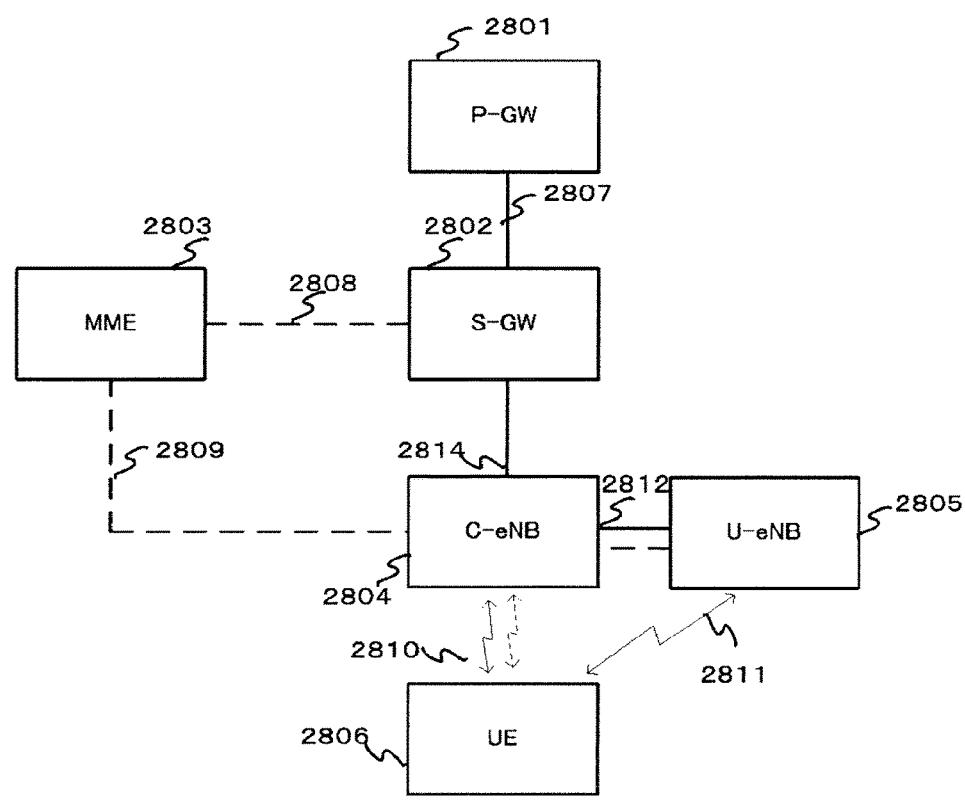

F I G . 4 3
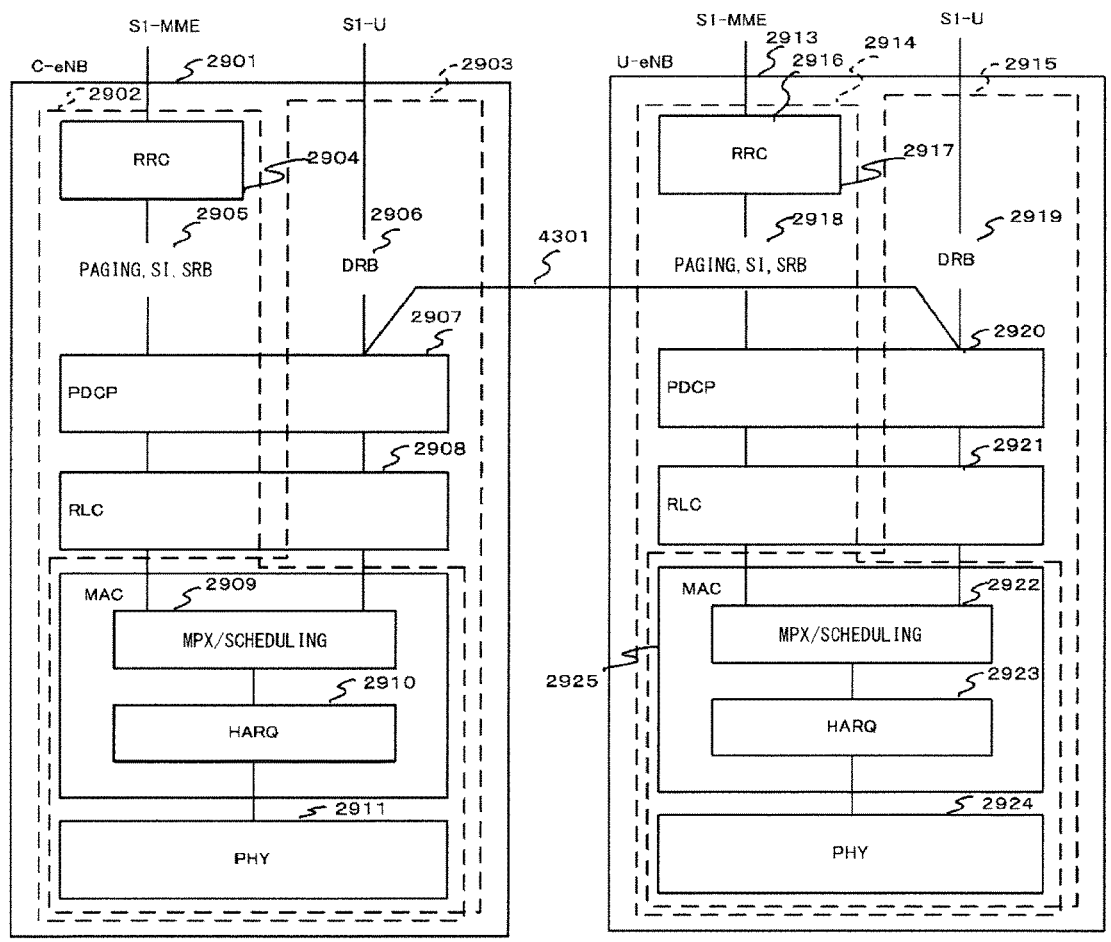

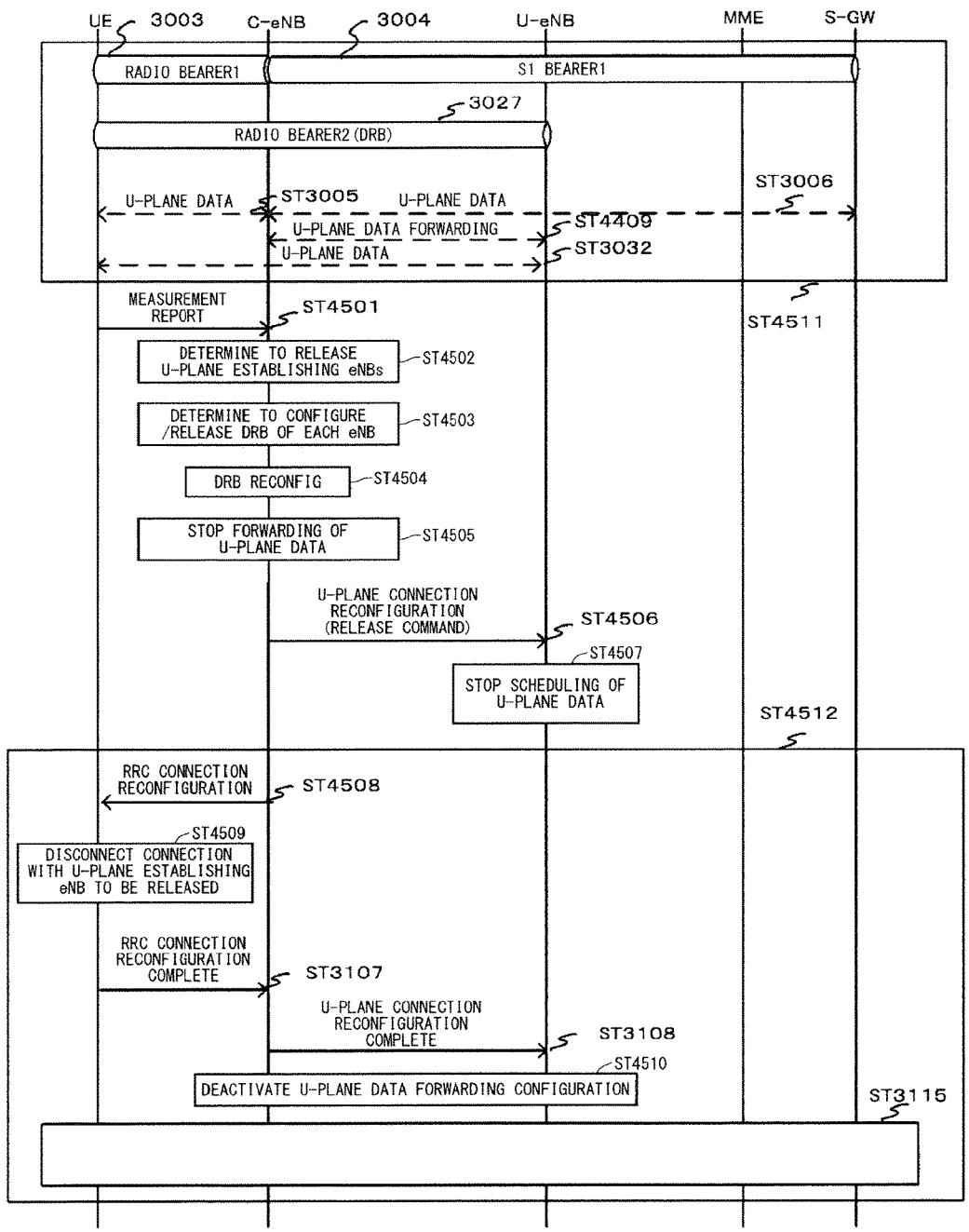
F I G . 4 5

F I G. 4 7
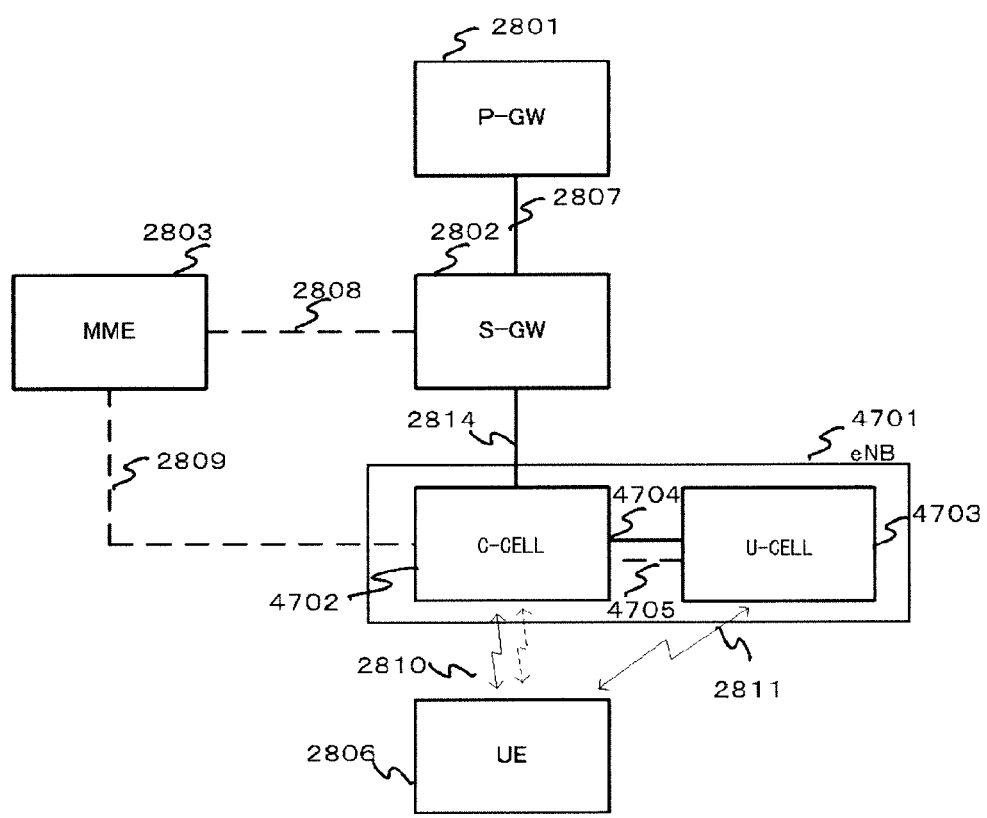

FIG. 52
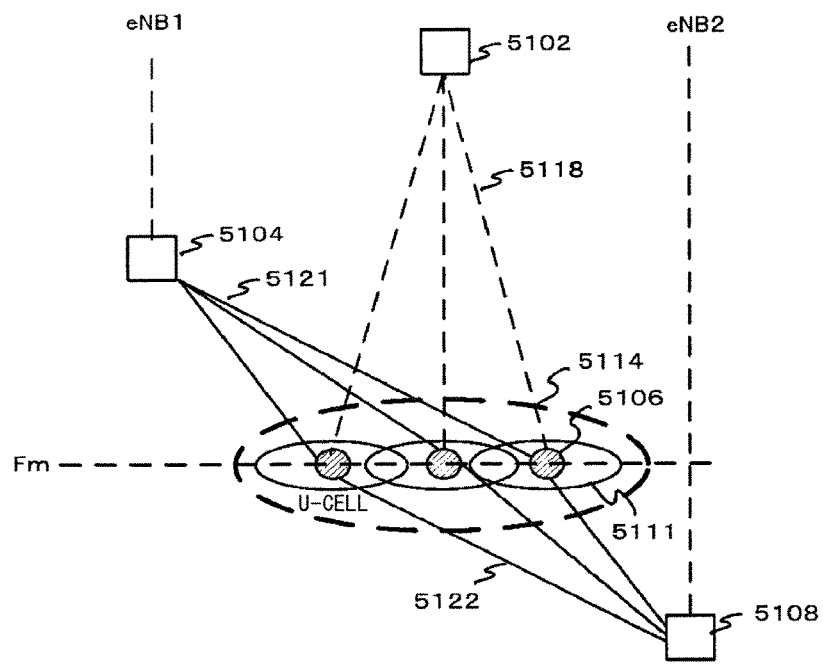
(a)
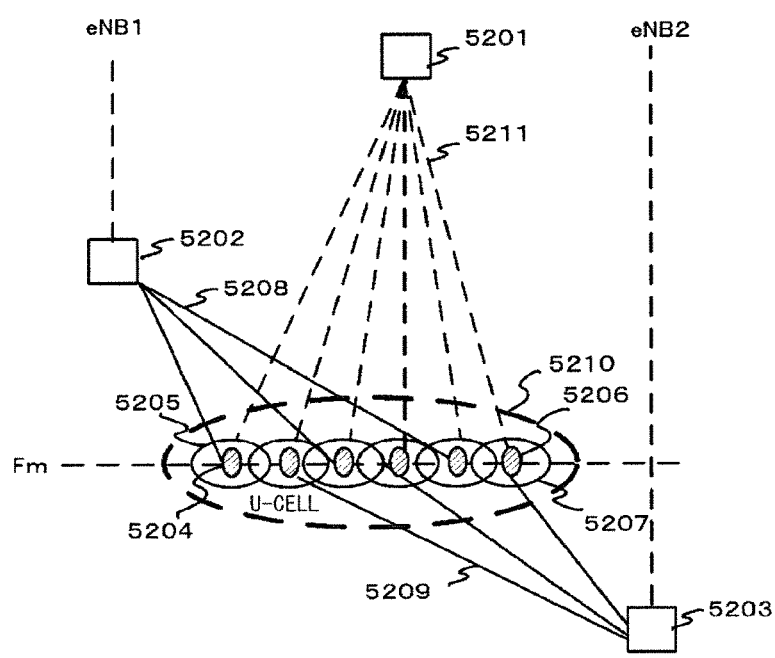
(b)

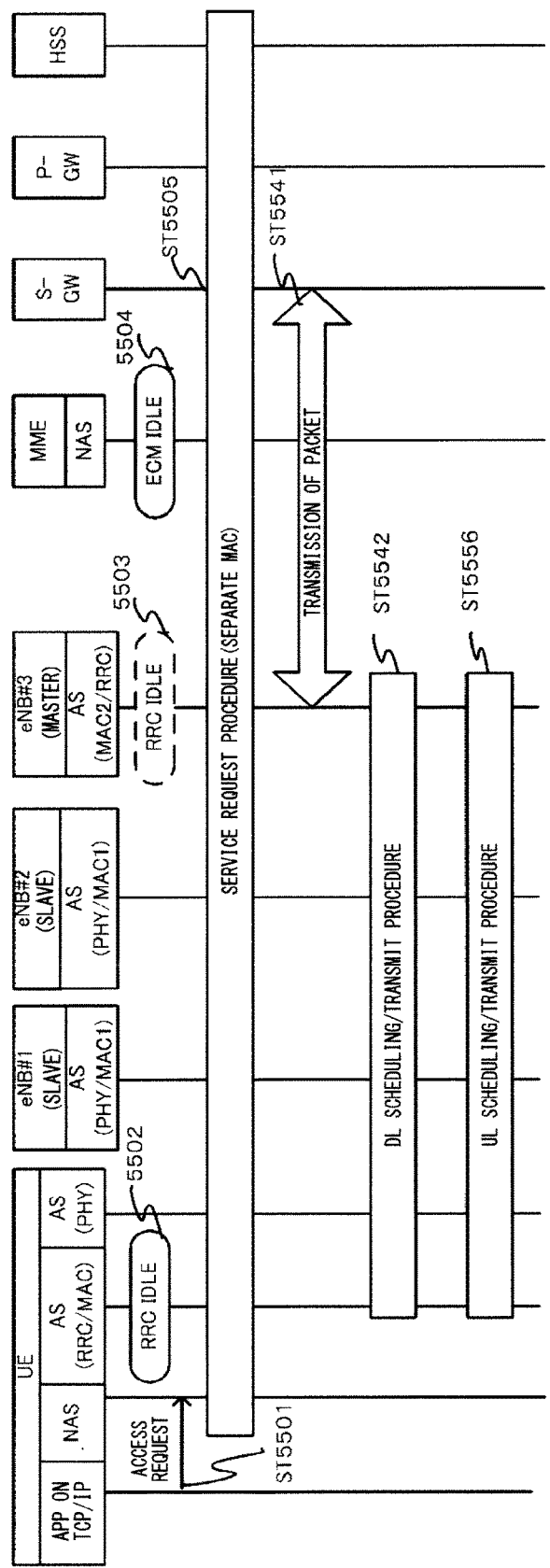
F I G. 55 (A)

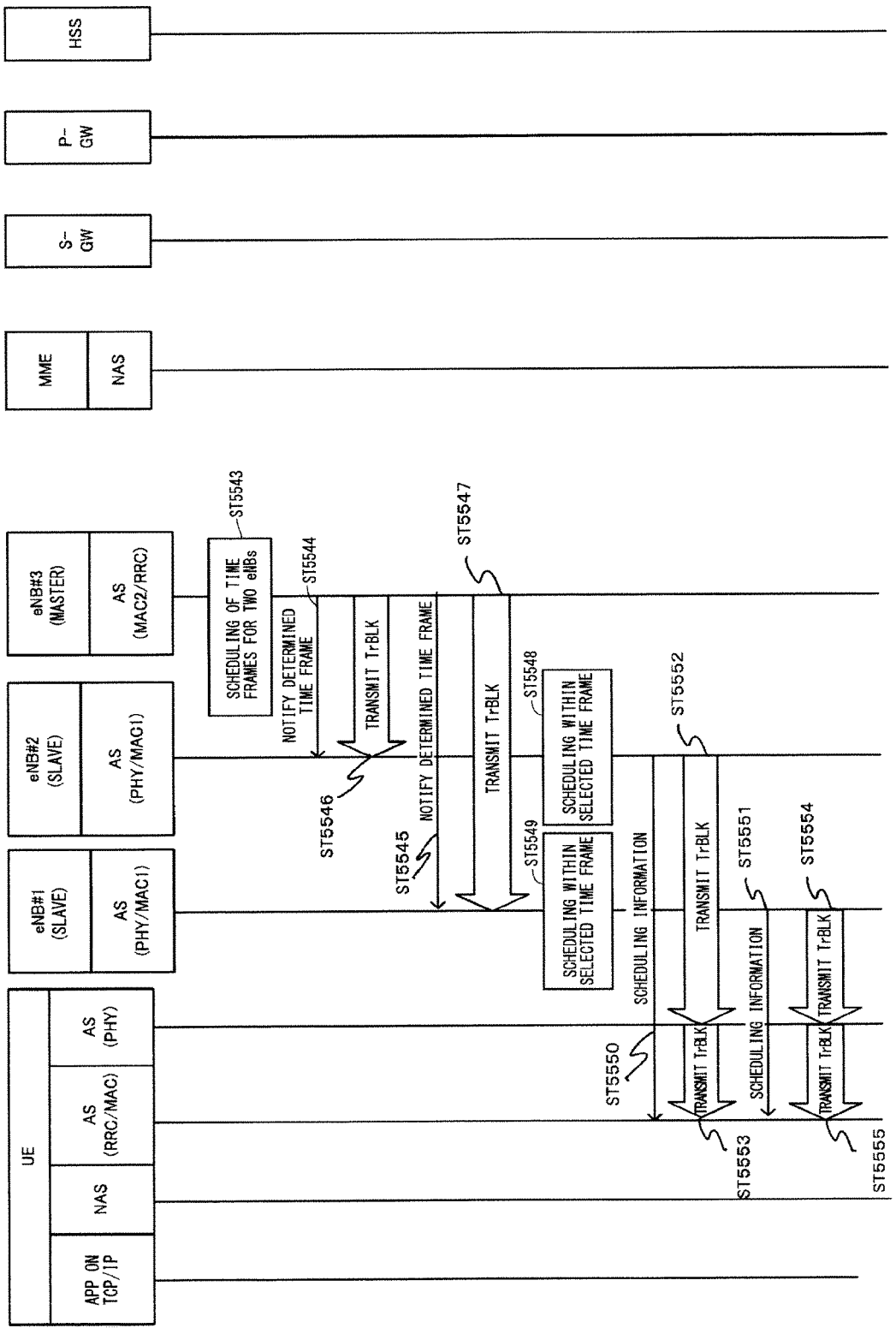

F I G. 6 3

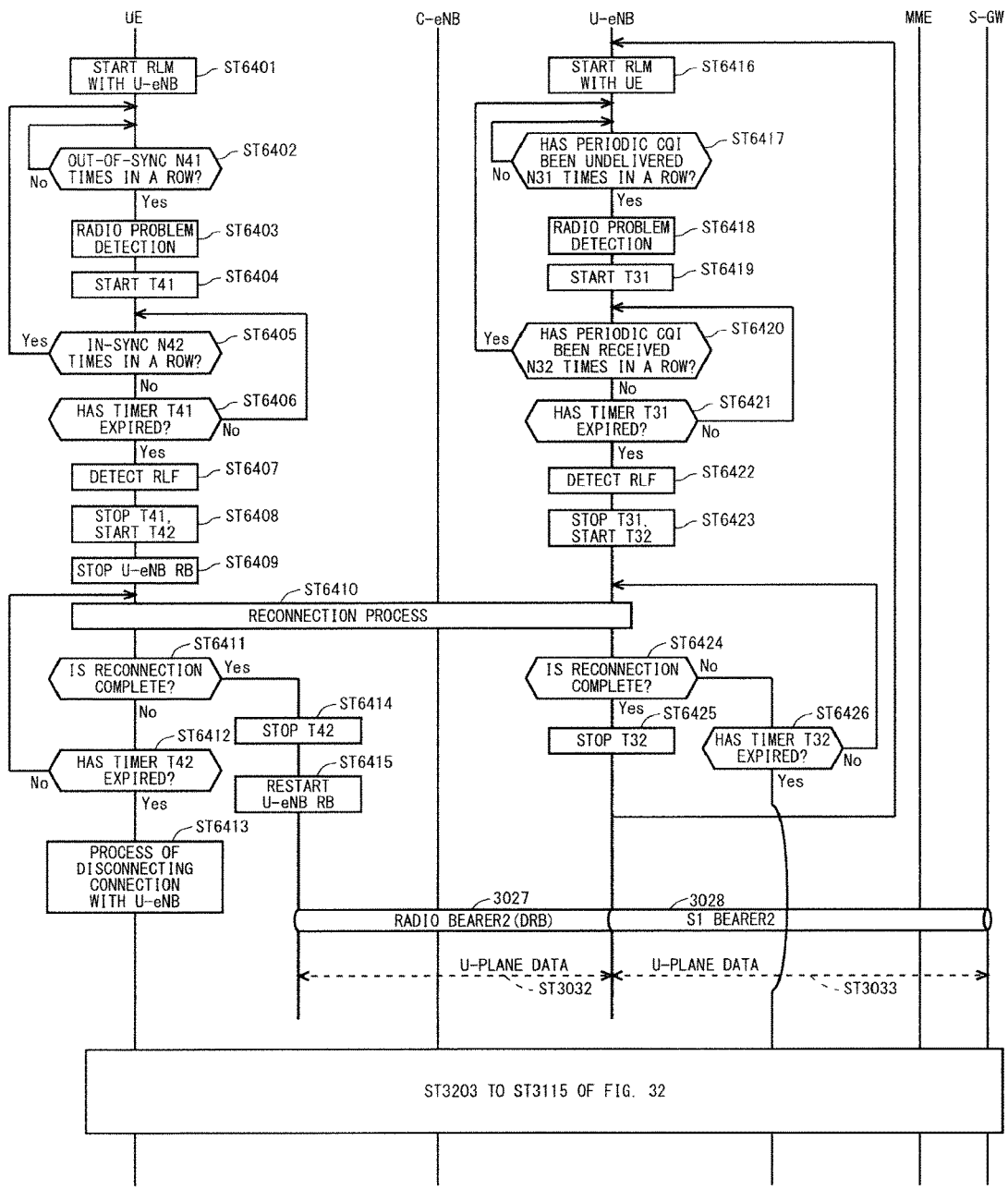
F I G . 6 4

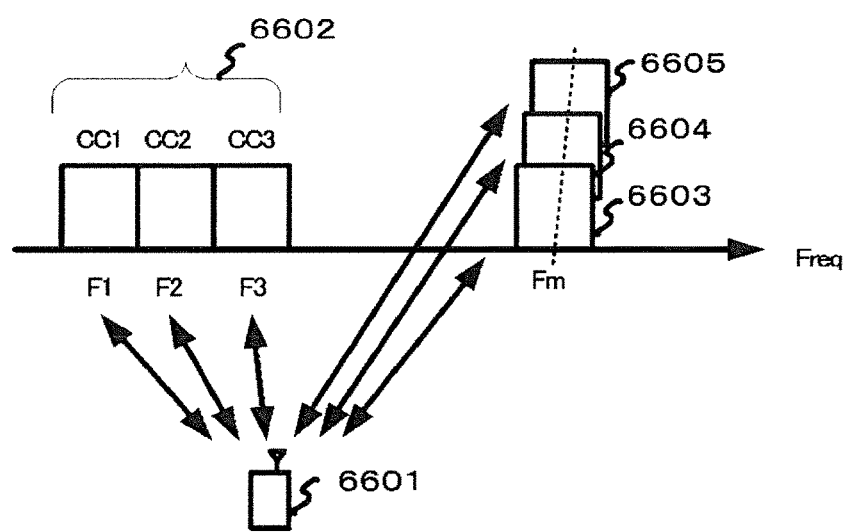
F I G . 6 6

MOBILE COMMUNICATION SYSTEM

TECHNICAL FIELD

The present invention relates to a mobile communication system including a base station device and a communication terminal device configured to perform radio communication with the base station device.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, 3GPP is studying new communication systems referred to as long term evolution (LTE) regarding radio sections and system architecture evolution (SAE) regarding the overall system configuration including a core network and a radio access network (hereinafter, also referred to as a network) as communication systems independent of W-CDMA. This communication system is also referred to as 3.9 generation (3.9 G) system.

In the LTE, an access scheme, a radio channel configuration, and a protocol are totally different from those of the W-CDMA (HSDPA/HSUPA). For example, as to the access scheme, code division multiple access is used in the W-CDMA, whereas in the LTE, orthogonal frequency division multiplexing (OFDM) is used in a downlink direction and single carrier frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz, and 20 MHz per base station. Further, differently from the W-CDMA, circuit switching is not provided but a packet communication system is only provided in the LTE.

In the LTE, a communication system is configured with a new core network different from the general packet radio service (GPRS) being the core network of the W-CDMA, and thus, the radio access network of the LTE is defined as a radio access network independent of the W-CDMA network.

Therefore, for differentiation from the W-CDMA communication system, a core network and a radio access network are referred to as an evolved packet core (EPC) and an evolved universal terrestrial radio access network (E-UTRAN), respectively, in the LTE communication system. Also in the radio access network, the base station that communicates with a mobile terminal (user equipment (UE)) being a communication terminal device is referred to as an E-UTRAN NodeB (eNB). The EPC functions as a radio network controller that exchanges control data and user data with a plurality of base stations. The EPC is also referred to as an access gateway (aGW). The system formed of the EPC and E-UTRAN is referred to as an evolved packet system (EPS).

Unicast service and evolved multimedia broadcast multicast service (E-MBMS service) are provided in the LTE communication system. The E-MBMS service is broadcast multimedia service. The E-MBMS service is merely referred to as MBMS in some cases. Bulk broadcast contents such as news, weather forecast, and mobile broadcast are transmitted to a plurality of user equipments in the E-MBMS service. This is also referred to as point to multipoint service.

Non-Patent Document 1 (Chapter 4) describes the current decisions by 3GPP regarding an overall architecture in the LTE system. The overall architecture will be described with reference to FIG. 1. FIG. 1 is a diagram illustrating the configuration of the LTE communication system. With reference to FIG. 1, the E-UTRAN is composed of one or a plurality of base stations 102, provided that a control protocol for a user equipment 101 such as a radio resource control (RRC), and user planes such as a packet data convergence protocol (PDCP), radio link control (RLC), medium access control (MAC), or physical layer (PHY) are ended in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC. The P-GW performs per-user packet filtering and UE-ID address allocation.

The control protocol RRC between the user equipment 101 and the base station 102 performs broadcast, paging, RRC connection management, and the like. The states of the base station and the user equipment in RRC are classified into RRC_IDLE and RRC_CONNECTED. In RRC_IDLE, public land mobile network (PLMN) selection, system information (SI) broadcast, paging, cell reselection, mobility, and the like are performed. In RRC_CONNECTED, the user equipment has RRC connection and is capable of transmitting/receiving data to/from a network. In RRC_CONNECTED, for example, handover (HO) and measurement of a neighbour cell are performed.

The current decisions by 3GPP regarding the frame configuration in the LTE system described in Non-Patent Document 1 (Chapter 5) will be described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is the simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. As shown in FIG. 3, the radio frames including the MBSFN subframes are allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod}=\text{radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit from the left define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group (CSG) cell as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a channel for downlink transmission from the base station 102 to the user equipment 101. A BCH transport block is mapped to four subframes within a 40 ms interval. There is no explicit signaling indicating 40 ms timing.

A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation information for downlink shared channel (DL-SCH) being one of the transport channels shown in FIG. 5 described below, resource allocation information for a paging channel (PCH) being one of the transport channels shown in FIG. 5, and hybrid automatic repeat request (HARM) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a channel for downlink transmission from the base station 102 to the user equipment 101. A downlink shared channel (DL-SCH) that is a transport channel and a PCH that is a transport channel are mapped to the PDSCH.

A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) 407 is a channel for uplink transmission from the user equipment 101 to the base station 102. An uplink shared channel (UL-SCH) that is one of the transport channels shown in FIG. 5 is mapped to the PUSCH.

A physical hybrid ARQ indicator channel (PHICH) 408 is a channel for downlink transmission from the base station 102 to the user equipment 101. The PHICH carries Ack/Nack that is a response signal to uplink transmission. A physical random access channel (PRACH) 409 is a channel for uplink transmission from the user equipment 101 to the base station 102. The PRACH carries a random access preamble.

A downlink reference signal (RS) is a known symbol in the LTE communication system. The following five types of downlink reference signals are defined: cell-specific reference signals (CRS), MBSFN reference signals, data demodulation reference signal (DM-RS) being UE-specific reference signals, positioning reference signals (PRS), and channel-state information reference signals (CSI-RS). The physical layer measurement objects of a user equipment include reference signal received power (RSRP).

The transport channels described in Non-Patent Document 1 (Chapter 5) will be described with reference to FIG. 5. FIG. 5 is a diagram illustrating transport channels used in the LTE communication system. Part (A) of FIG. 5 shows mapping between downlink transport channels and downlink physical channels. Part (B) FIG. 5 shows mapping between uplink transport channels and uplink physical channels.

A broadcast channel (BCH) among the downlink transport channels shown in part (A) of FIG. 5 is broadcast to the entire coverage of a base station (cell). The BCH is mapped to the physical broadcast channel (PBCH).

Retransmission control according to a hybrid ARQ (HARM) is applied to a downlink shared channel (DL-SCH). The DL-SCH can be broadcasted to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels shown in part (B) of FIG. 5. The UL-SCH supports dynamic or semi-static resource allocation. The UL-SCH is mapped to the physical uplink shared channel (PUSCH).

A random access channel (RACH) shown in part (B) of FIG. 5 is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. In the case where the receiver fails to successfully decode the received data, in other words, in the case where a cyclic redundancy check (CRC) error occurs (CRC=NG), the receiver transmits "Nack" to the transmitter. The transmitter that has received "Nack" retransmits the data. In the case where the receiver successfully decodes the received data, in other words, in the case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. Chase combining is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

The logical channels described in Non-Patent Document 1 (Chapter 6) will be described with reference to FIG. 6. FIG. 6 is a diagram illustrating logical channels used in an LTE communication system. Part (A) of FIG. 6 shows mapping between downlink logical channels and downlink transport channels. Part (B) of FIG. 6 shows mapping between uplink logical channels and uplink transport channels.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel that transmits dedicated control information between a user equipment and a network on a point-to-point basis. The DCCH is used if the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below. The CSG cell will be described below (see Chapter 3.1 of Non-Patent Document 3).

The closed subscriber group (CSG) cell is a cell in which subscribers who are allowed to use are specified by an operator (also referred to as a "cell for specific subscribers"). The specified subscribers are allowed to access one or more cells of a public land mobile network (PLMN). One or more cells in which the specified subscribers are allowed to access are referred to as "CSG cell(s)." Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by user equipments (UEs) for making access from CSG-related members easier.

The locations of user equipments are tracked based on an area composed of one or more cells. The locations are tracked for enabling tracking of the locations of user equipments and calling user equipments, in other words, incoming calling to user equipments even in an idle state. An area for tracking locations of user equipments is referred to as a tracking area.

The CSG whitelist is a list that may be stored in a universal subscriber identity module (USIM) in which all CSG IDs of the CSG cells to which the subscribers belong are recorded. The CSG whitelist may be merely referred to as a whiltelist or an allowed CSG list as well. As to the access of user equipments through a CSG cell, the MME performs access control (see Chapter 4.3.1.2 of Non-Patent Document 4). Specific examples of the access of user equipments include attach, combined attach, detach, service request, and a tracking area update procedure (see Chapter 4.3.1.2 of Non-Patent Document 4).

The service types of a user equipment in an idle state will be described below (see Chapter 4.3 of Non-Patent Document 3). The service types of user equipments in an idle state include a limited service, normal service, and operator service. The limited service includes emergency calls, earthquake and tsunami warning system (ETWS), and commercial mobile alert system (CMAS) on an acceptable cell described below. The normal service is a public service on a suitable cell described below. The operator service includes a service for operators only on a reserved cell described below.

A "suitable cell" will be described below. The "suitable cell" is a cell on which a UE may camp (Camp ON) to obtain normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):

(a) the cell is not a barred cell;

(b) the cell is part of a tracking area, not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE, that is, is contained in the CSG whitelist of the UE.

An "acceptable cell" will be described below. The "acceptable cell" is the cell on which a UE may camp to obtain limited service. Such a cell shall fulfill the all following requirements (1) and (2).

(1) The cell is not a prohibited cell (also referred to as a "barred cell").

(2) The cell fulfills the cell selection criteria.

"Barred cell" is indicated in the system information. "Reserved cell" is indicated in the system information.

"Camping on a cell" represents the state where a UE has completed the cell selection/cell reselection process and the UE has selected a cell for monitoring the system information and paging information. The cell on which the UE camps may be referred to as a "serving cell".

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 5 discloses three different modes of the access to the HeNB and HNB. Specifically, those are an open access mode, a closed access mode, and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. To be served by a base station means to take the base station as a serving cell.

Non-Patent Document 6 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 7 and 8).

As to the LTE-A system, it is studied that a relay and a relay node (RN) are supported for achieving a high data rate, high cell-edge throughput, new coverage area, and the like. The relay node being a relay device is wirelessly connected to the radio-access network via a cell referred to as a donor cell (hereinafter, also referred to as a "Donor eNB; DeNB"). The network (NW)-to-relay node link shares the same frequency band with the network-to-UE link within the range of the donor cell. In this case, the UE supporting Release 8 of 3GPP is also connectable to the donor cell. The link between a donor cell and a relay node is referred to as a backhaul link, and the link between the relay node and the UE is referred to as an access link.

As the method of multiplexing a backhaul link in frequency division duplex (FDD), the transmission from a DeNB to an RN is performed at a downlink (DL) frequency band, and the transmission from an RN to a DeNB is performed at an uplink (UL) frequency band. As the method of dividing resources in a relay, a link from a DeNB to an RN and a link from an RN to a UE are time-division multiplexed at one frequency band, and a link from an RN to a DeNB and a link from a UE to an RN are also time-division multiplexed at one frequency band. In a relay, accordingly, the transmission of the relay is prevented from interfering the reception of its own relay.

Not only a normal eNB (macro cell) but also so-called local nodes such as pico eNB (pico cell), HeNB (HNB, CSG cell), node for hotzone cells, relay node, remote radio head (RRH), and repeater are studied in 3GPP. The network composed of various types of cells as described above is also referred to as a heterogeneous network (HetNet) in some cases.

The frequency bands (hereinafter, also referred to as "operating bands") usable for communication have been predetermined in the LTE. Non-Patent Document 9 describes the frequency bands.

Carrier aggregation (CA) is studied in the LTE-A system, in which two or more component carriers (CCs) are aggregated to support wider transmission bandwidths up to 100 MHz.

A UE supporting Release 8 or 9 of 3GPP, which supports LTE, is capable of transmission and reception on only one CC corresponding to one serving cell. Meanwhile, it is conceivable that a UE supporting Release 10 of 3GPP may have the capability of transmission and reception, only reception, or only transmission on a plurality of CCs corresponding to a plurality of serving cells at the same time.

Each CC employs the configuration of Release 8 or 9 of 3GPP, and the CA supports contiguous CCs, non-contiguous CCs, and CCs in different frequency bandwidths. The UE cannot configure uplink CCs (UL CCs) equal to or more than the number of downlink CCs (DL CCs). The CCs configured by the same eNBs do not need to provide the same coverage. The CC is compatible with Release 8 or 9 of 3GPP.

In CA, an independent HARQ entity is provided per serving cell in uplink as well as downlink. A transport block is generated per TTI for each serving cell. Each transport block and HARQ retransmission are mapped to a single serving cell.

In the case where CA is configured, a UE has single RRC connection with a NW. In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The above-mentioned LTE Advanced (LTE-A) is studied as a further advanced communication system regarding radio sections in 3GPP (see Non-Patent Documents 7 and 8). The LTE-A is based on the LTE communication system regarding radio sections and is configured by addition of several new techniques thereto. The new techniques include the technique of supporting wider bands (wider bandwidth extension) and the coordinated multiple point transmission and reception (CoMP) technique. The CoMP studied for LTE-A in 3GPP is described in Non-Patent Document 10.

CoMP is the technique of expanding the coverage of high data rates, improving a cell-edge throughput, and increasing a communication system throughput by transmission or reception coordinated among multiple geographically separated points. The CoMPs are grouped into downlink CoMP (DL CoMP) and uplink CoMP (UL CoMP).

In DL CoMP, the PDSCH to one user equipment (UE) is transmitted in cooperation among multiple points. The PDSCH to one UE may be transmitted from one point among multiple points or may be transmitted from points among multiple points. In DL CoMP, a serving cell refers to a single cell that transmits resource allocation over the PDCCH.

Joint processing (JP) and coordinated scheduling (CS)/coordinated beamforming (CB) (hereinafter, also referred to as "CS/CB") are studied as the DL CoMP method.

For JP, data is available at each point in a CoMP cooperating set. JPs are grouped into joint transmission (JT) and dynamic point selection (DPS). DPSs include dynamic cell selection (DCS). In JT, the PDSCH is transmitted from multiple points, specifically, part of or entire CoMP cooperating set, at a time. In DPS, the PDSCH is transmitted from one point in the CoMP cooperating set at a time.

In CS/CB, data is only available in transmission from a serving cell. In CS/CB, user scheduling or beamforming decisions are made with coordination among cells corresponding to the CoMP cooperating set.

Base stations (NB, eNB, HNB, HeNB), remote radio unit (RRU), remote radio equipment (RRE), remote radio head (RRH), relay node (RN), and the like are studied as the units and cells that perform transmission and reception at multiple points. The unit and cell that perform coordinated multiple point transmission are also referred to as a multi-point unit and a multi-point cell, respectively.

3GPP is pursuing specifications standard of Release 12, where the use of small eNBs (cells) is studied to satisfy a tremendous volume of traffic in the future. Examples of the study include the technique of increasing spectral efficiency through installation of a large number of small eNBs (cells) to increase communication capacity.

PRIOR ART DOCUMENTS

Non-Patent Documents

Non-Patent Document 1: 3GPP TS 36.300 V11.2.0
Non-Patent Document 2: 3GPP TS 36.331 V11.0.0
Non-Patent Document 3: 3GPP TS 36.304 V11.0.0 Chapter 3.1, Chapter 4.3, Chapter 5.2.4
Non-Patent Document 4: 3GPP TR 23.830 V9.0.0
Non-Patent Document 5: 3GPP S1-083461
Non-Patent Document 6: 3GPP R2-082899
Non-Patent Document 7: 3GPP TR 36.814 V9.0.0
Non-Patent Document 8: 3GPP TR 36.912 V10.0.0
Non-Patent Document 9: 3GPP TS 36.819 V11.1.0
Non-Patent Document 10: 3GPP TR 36.819 V11.0.0
Non-Patent Document 11: 3GPP TR 23.401 V11.2.0
Non-Patent Document 12: 3GPP RWS-120010
Non-Patent Document 13: 3GPP RWS-120006
Non-Patent Document 14: 3GPP TR 36.927 V10.1.0
Non-Patent Document 15: 3GPP TS 36.141 V11.1.0

SUMMARY OF INVENTION

Problems to be Solved by the Invention

In the small eNB (cell, base station), a procedure similar to the typical procedure of changing a cell needs to be performed for handover. Unfortunately, this procedure needs control of both of U-plane and C-plane, resulting in many procedures. When a mobile station moves at some speed in an area in which a plurality of small eNBs (cells) are concentrated, a longer period of time for a handover procedure results in that the mobile station moves to a following cell area before the completion of the handover procedure. This leads to a problem that, for example, handover cannot be performed appropriately. Further, in such a case, the occurrence frequency of handover increases to increase the processes associated with handover, placing a load on the network.

The present invention has an object to provide a communication system enabling a normal change of a cell during communication without placing a load on a network even when high communication capacity is achieved through installation of, for example, a small eNB (cell).

Means to Solve the Problems

The present invention relates to a mobile communication system including a mobile station, a first base station and a second base station configured to perform radio communication with the mobile station, and a gateway station configured to perform communication with the first base station and the second base station or with the mobile station via the first base station and the second base station, wherein one communication is performed between the mobile station and the gateway station by establishing a first communication connection between the gateway station and the first base station, a first radio communication connection between the first base station and the mobile station, and a second radio communication connection between the second base station and the mobile station.

According to the present invention, one communication is performed between the mobile station and the gateway station by establishing the first communication connection between the gateway station and the first base station, the first radio communication connection between the first base station and the mobile station, and the second radio communication connection between the second base station and the mobile station. This enables a normal change of the base station during communication without any load on a network.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 3 is a diagram illustrating the configuration of an MBSFN frame.

FIG. 4 is a diagram illustrating physical channels used in the LTE communication system.

FIG. 5 is a diagram illustrating transport channels used in the LTE communication system.

Figure 6:
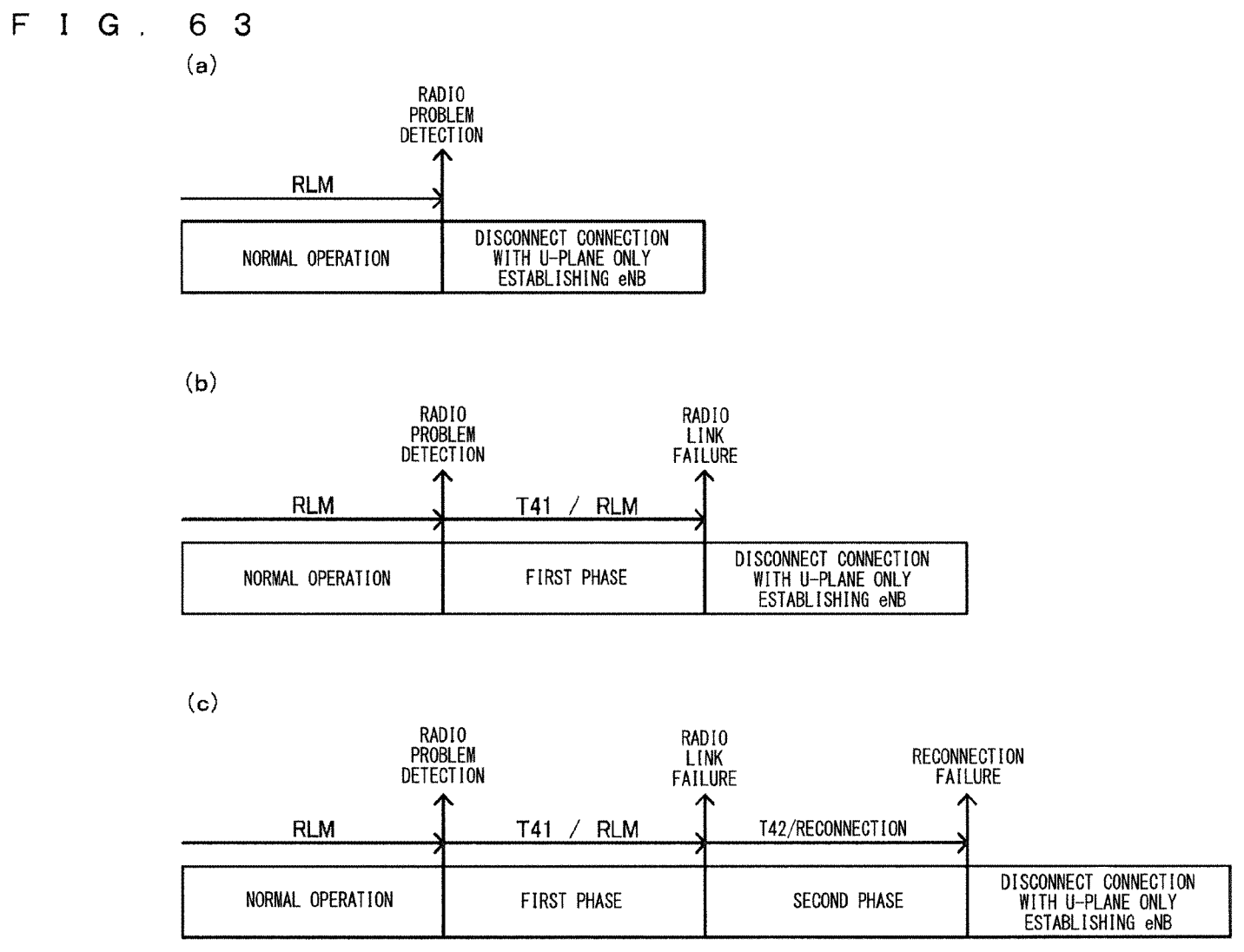

FIG. 6 is a diagram illustrating logical channels used in the LTE communication system.

FIG. 10 is a block diagram showing the configuration of an MME unit 73 of FIG. 7 being an MME according to the present invention.

FIG. 11 is a block diagram showing the configuration of a HeNBGW 74 of FIG. 7 being a HeNBGW according to the present invention.

FIG. 12 is a flowchart showing an outline from a cell search to an idle state operation performed by a user equipment (UE) in the LTE communication system.

Part (A) of FIG. 13 is an image diagram of a conventional cell configuration, part (B) of FIG. 13 is an image diagram showing downsized cells, and part (C) of FIG. 13 is an image diagram showing macro eNBs (cells) and small eNBs (cells) that coexist.

FIG. 14 shows the architecture of a conventional EPS.

Figure 15:
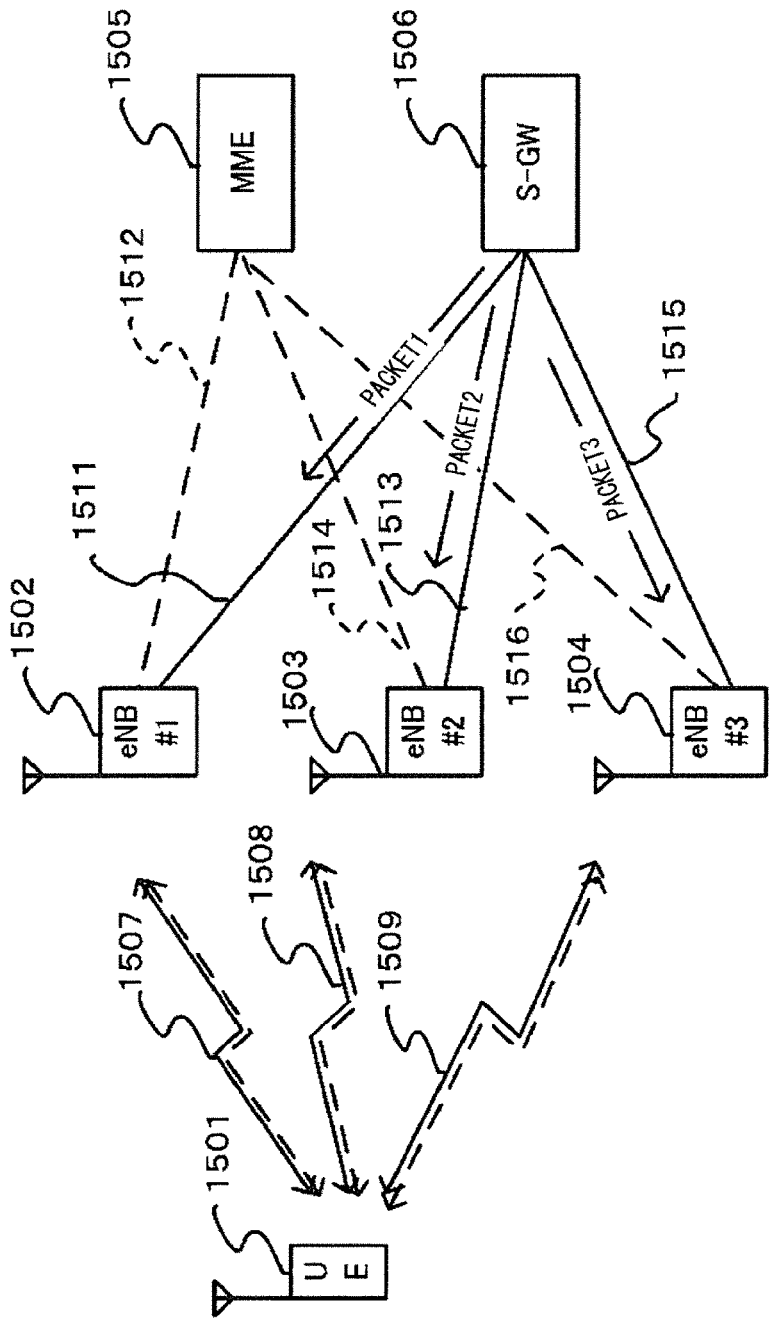

FIG. 15 shows the architecture of an EPS according to the first embodiment.

Figure 16:
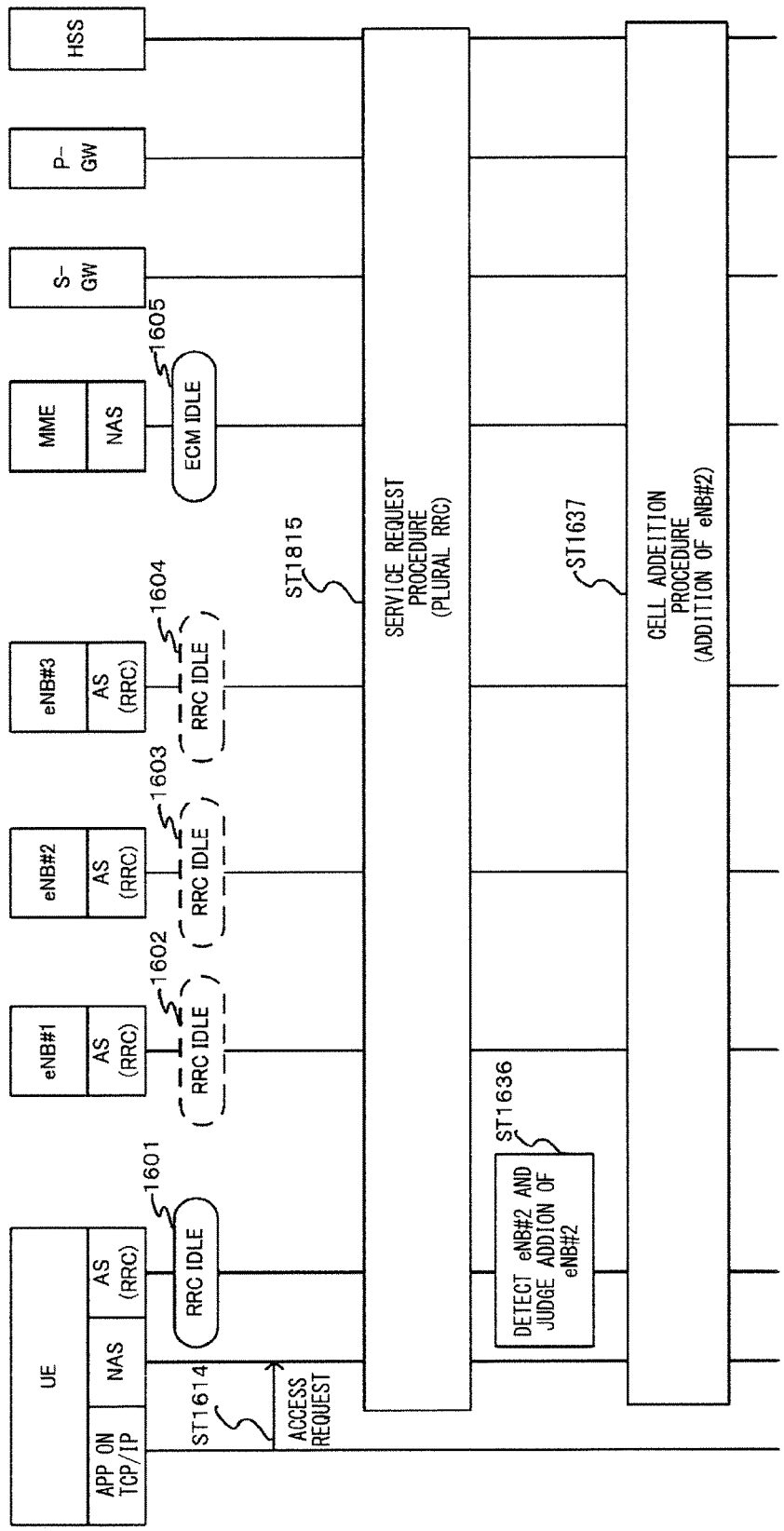

FIG. 16 shows an example sequence of establishing communication and adding a cell initiated from a UE in this architecture.

Figure 17:
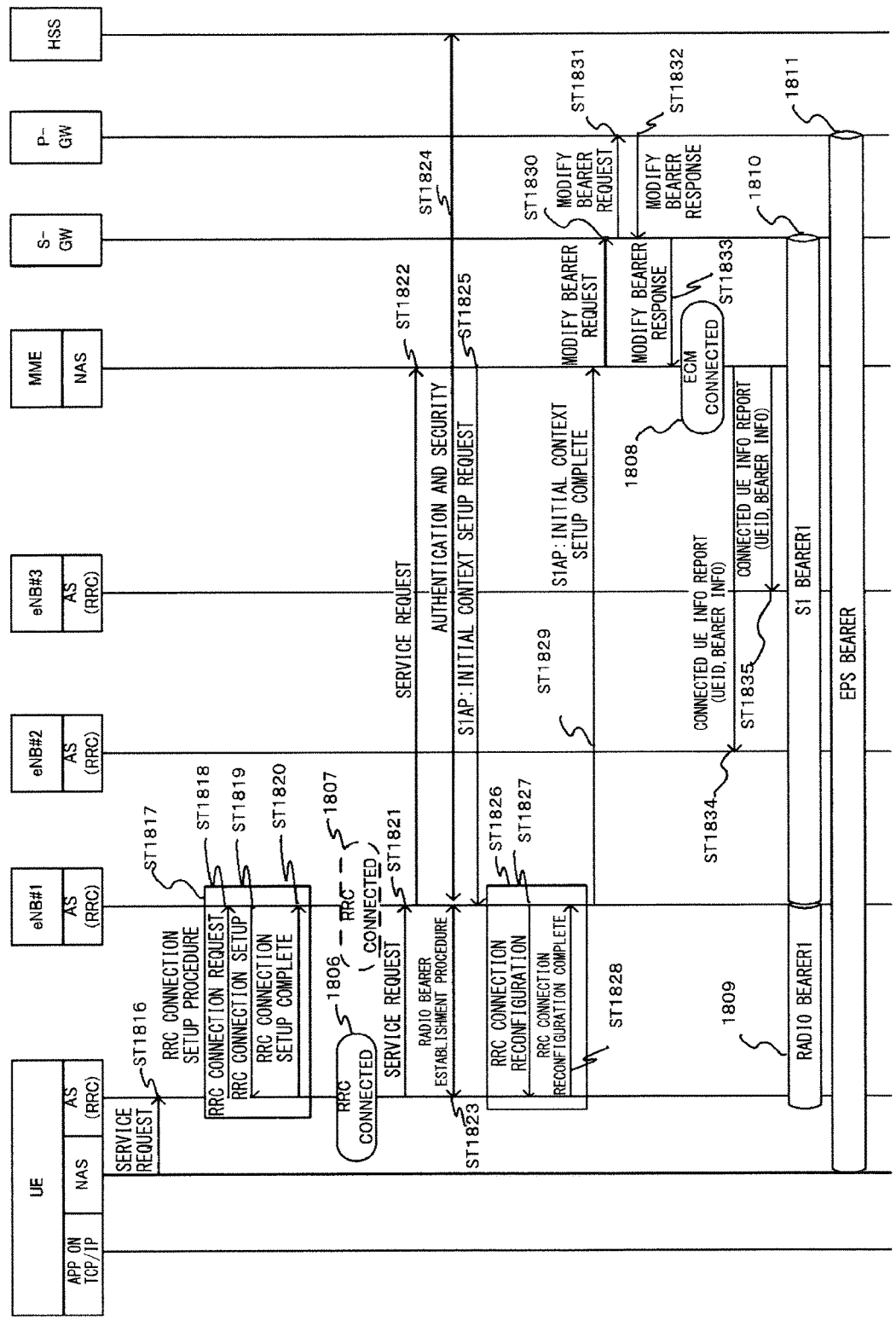

FIG. 17 is a sequence diagram showing details of a service request procedure.

Figure 18:
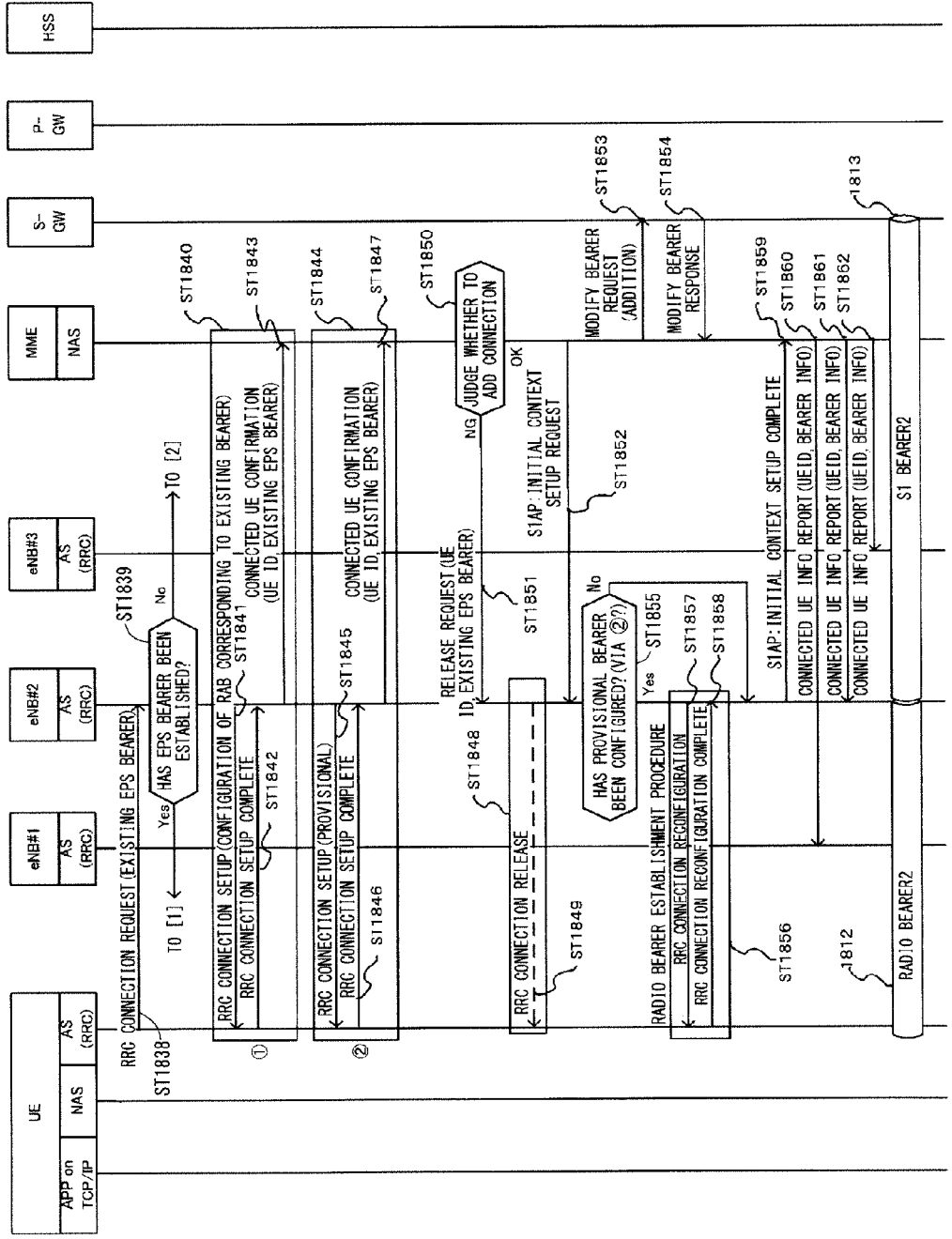

FIG. 18 is a sequence diagram showing details of a cell addition procedure.

FIG. 19(A) shows an example sequence of adding an RRC Connection/S1 bearer of an eNB#3 initiated from a UE.

FIG. 19(B) is a sequence diagram showing details of a cell addition procedure.

FIG. 20 shows an example sequence of adding an RRC Connection/S1 bearer for a target UE in accordance with the judgment by an eNB.

Figure 21:
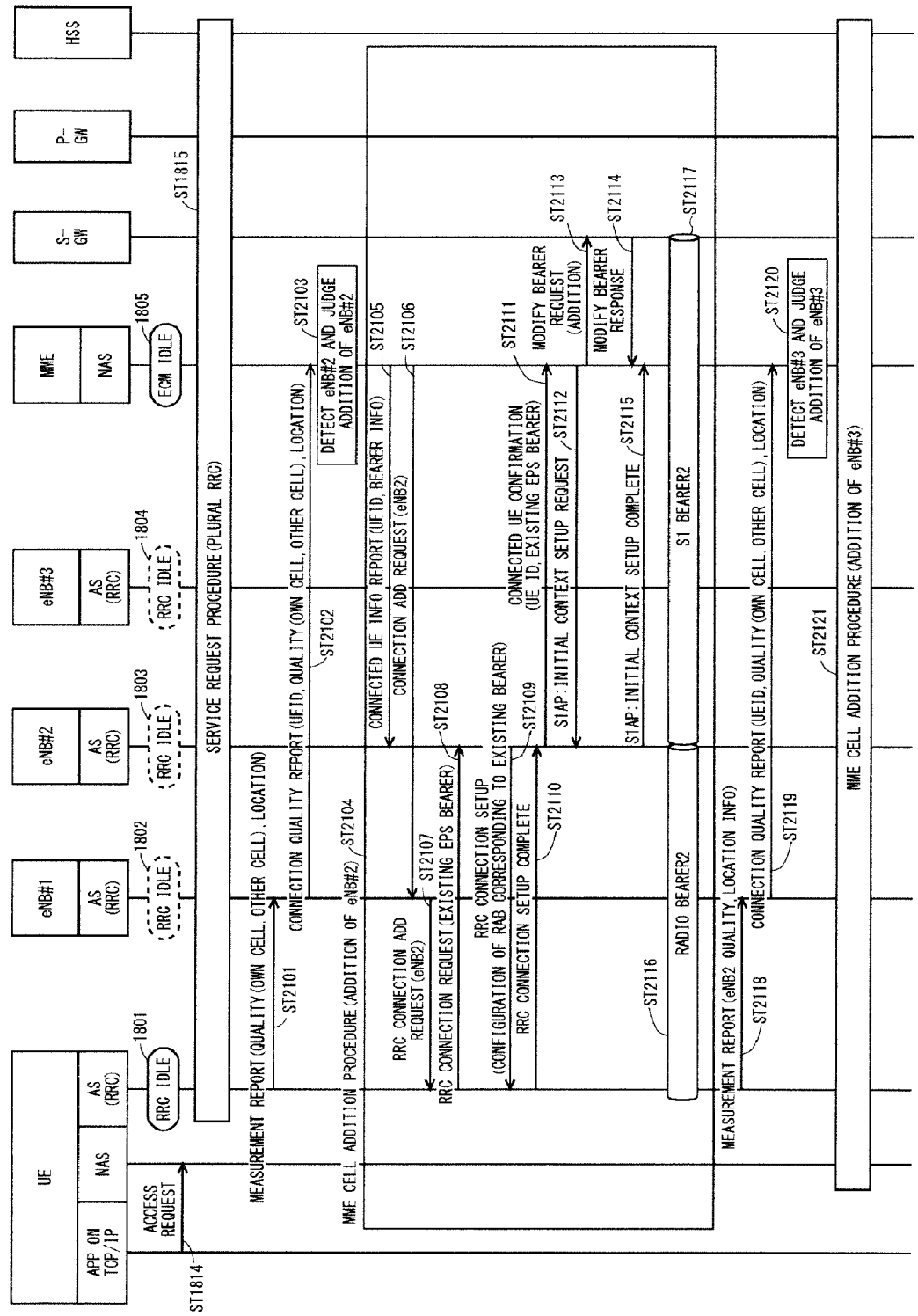

FIG. 21 shows an example sequence of adding an RRC Connection/S1 bearer for a target UE in accordance with the judgment by an MME.

Figure 22:
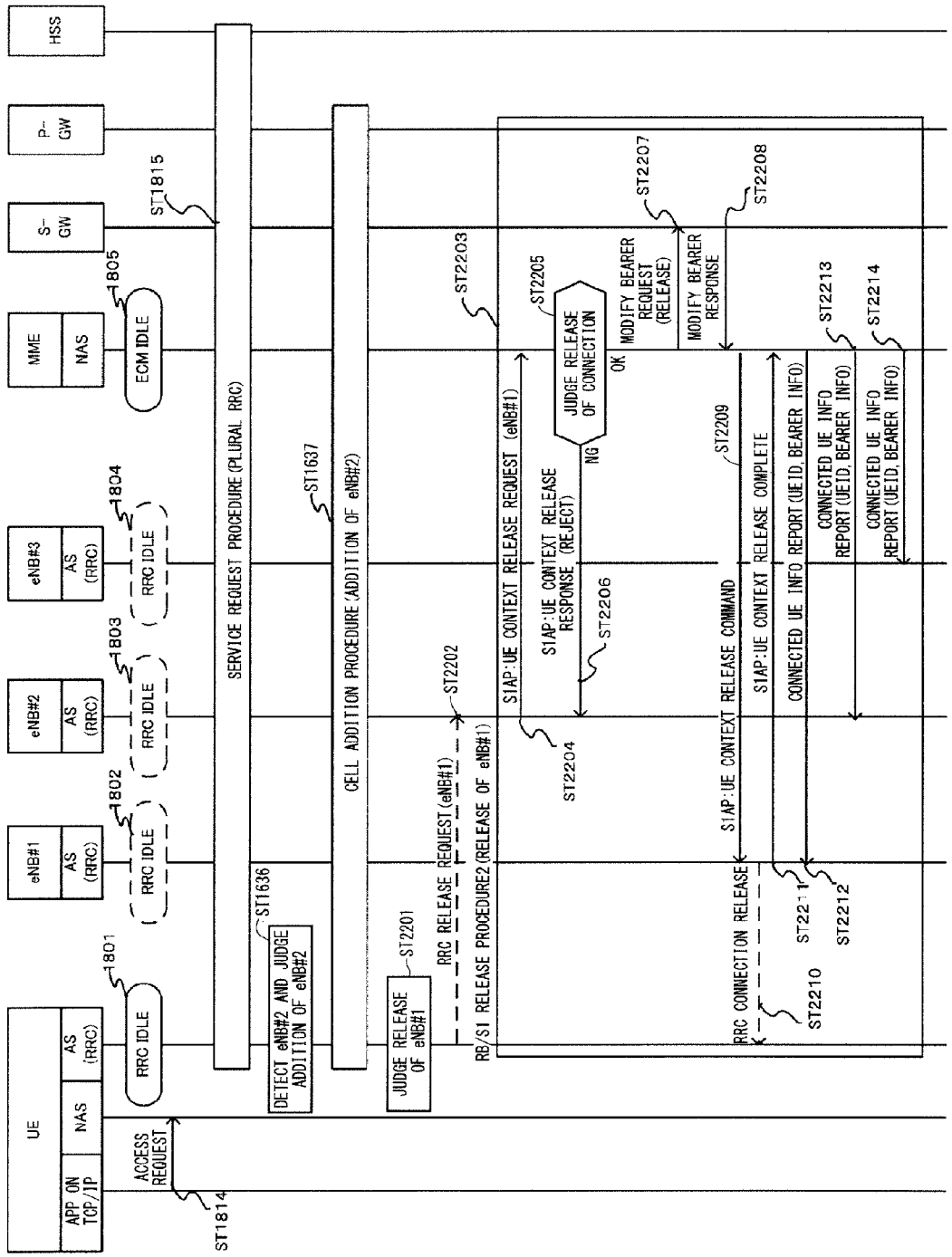

FIG. 22 shows an example sequence of releasing an RRC Connection/S1 bearer of an eNB#1 initiated from a UE.

Figure 23:
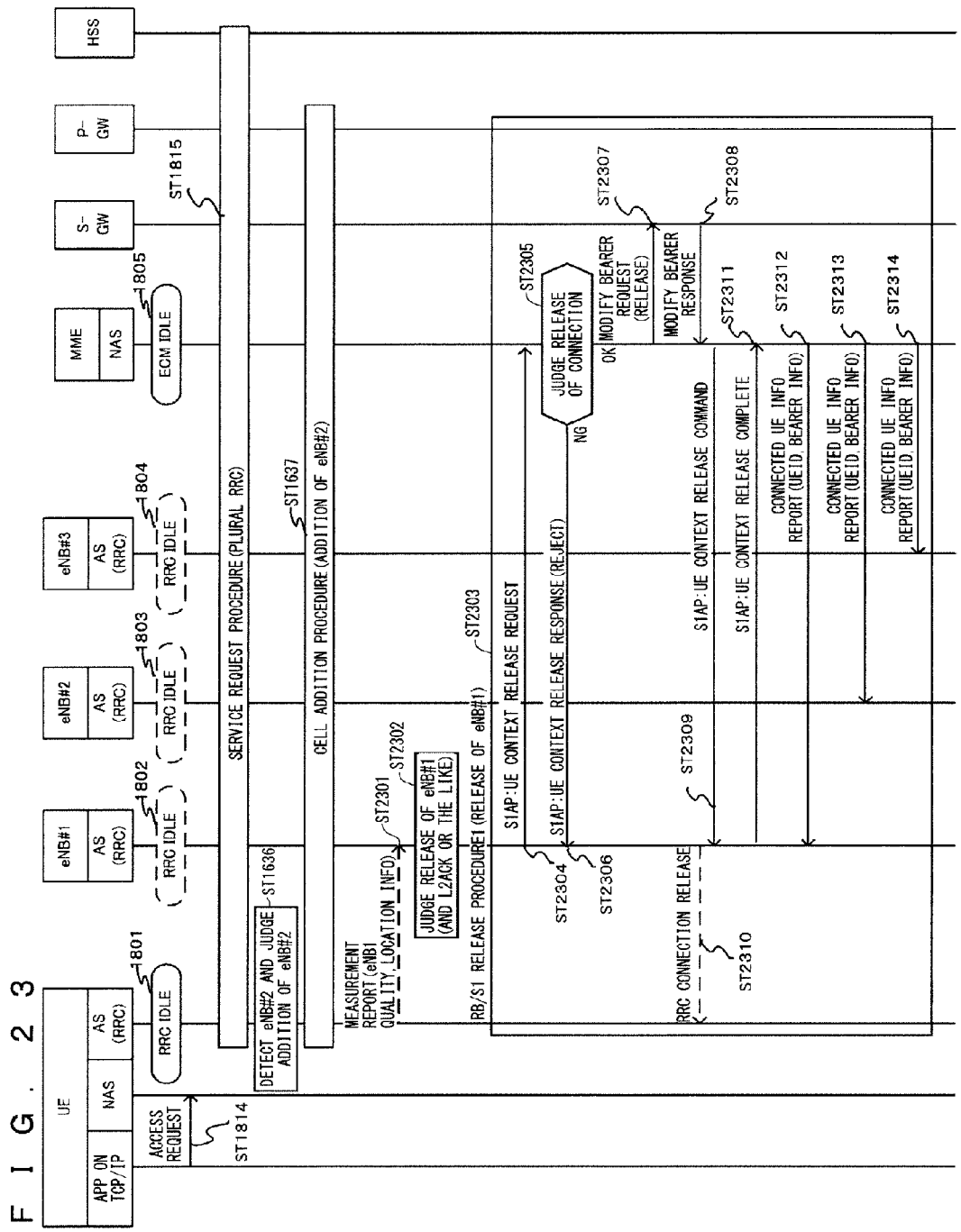

FIG. 23 shows an example sequence of releasing an RRC Connection/S1 bearer of an eNB initiated from itself.

Figure 24:
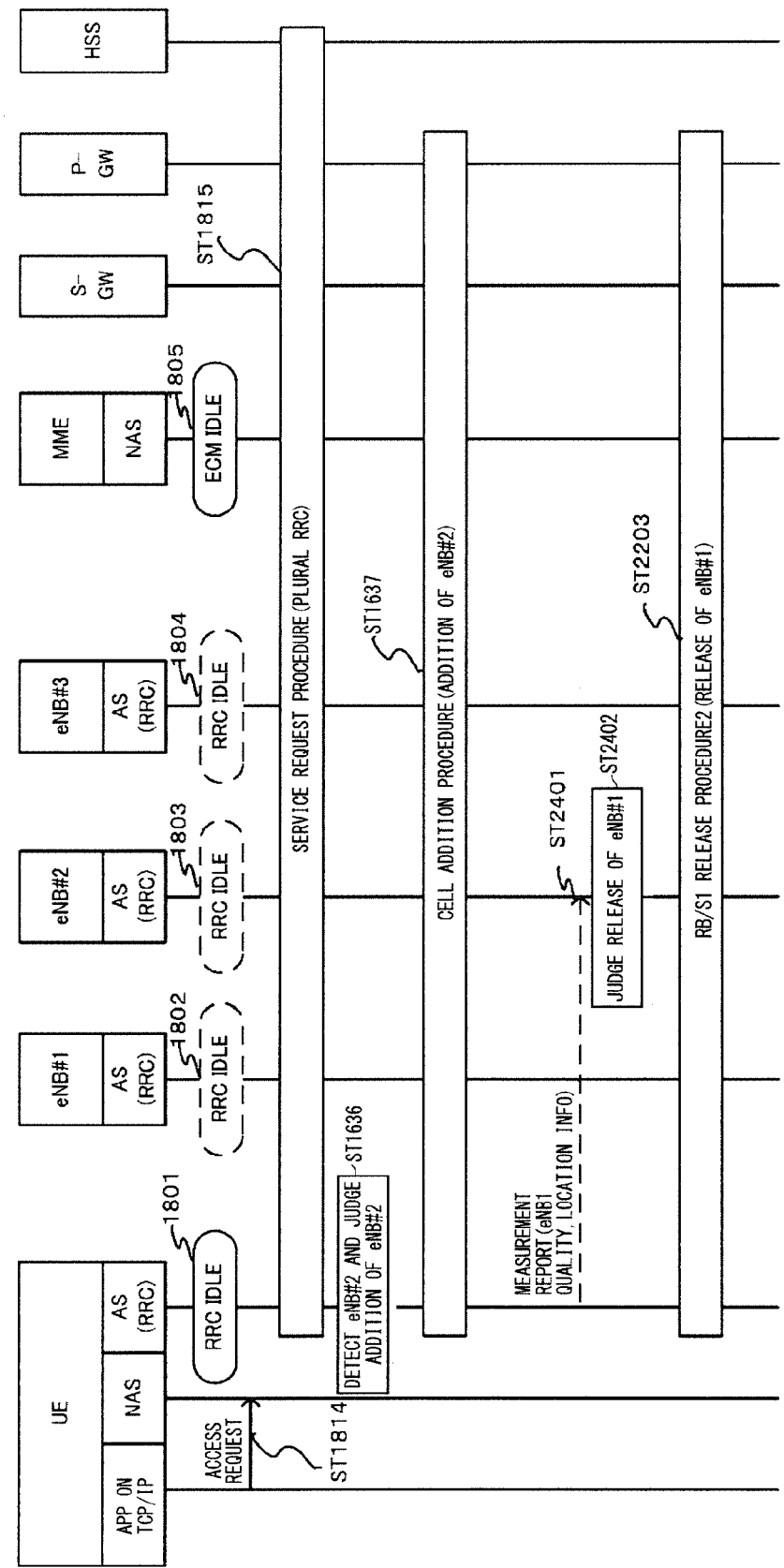

FIG. 24 shows an example sequence of releasing an RRC Connection/S1 bearer of another eNB initiated from an eNB.

Figure 25:
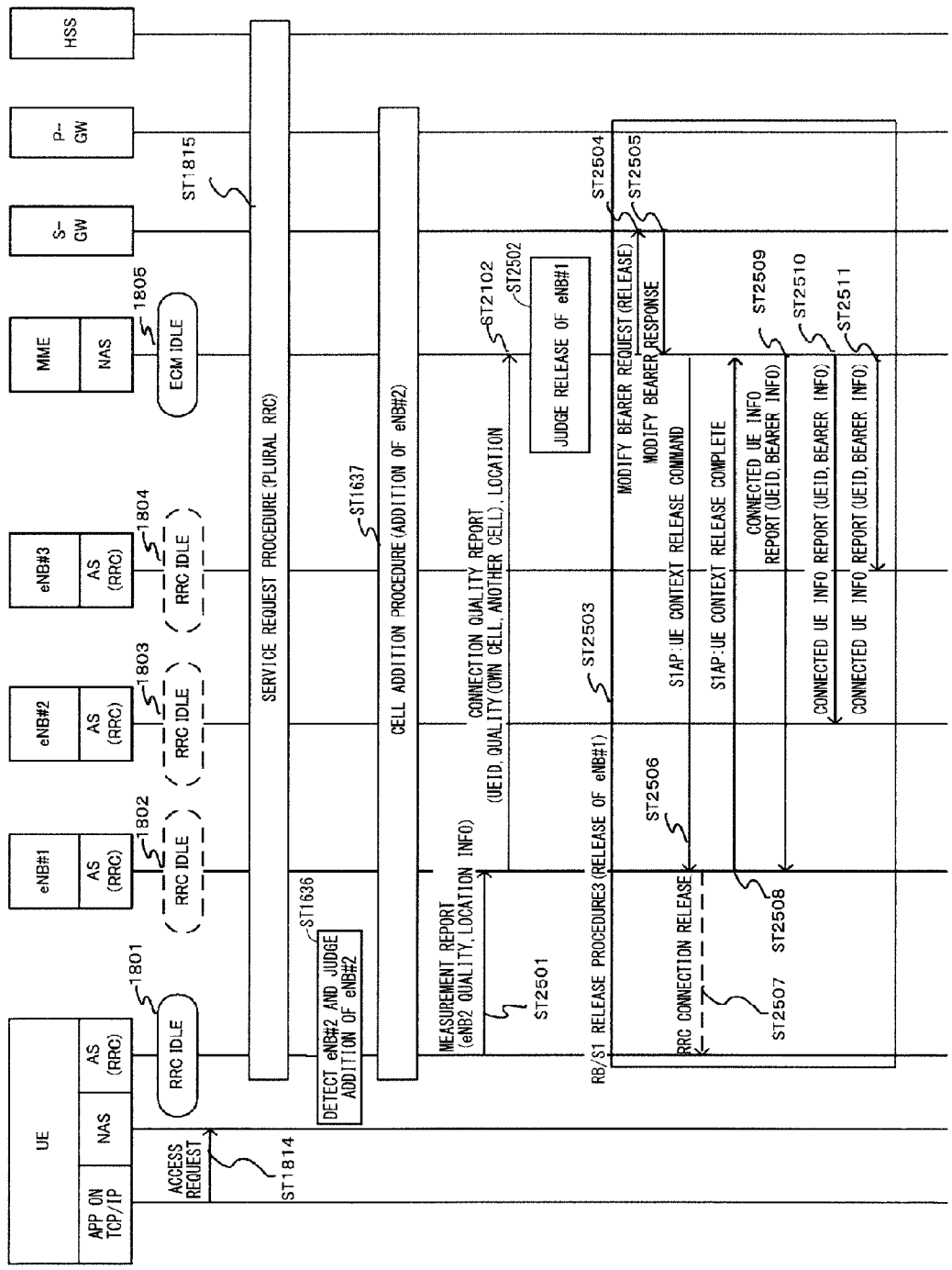

FIG. 25 shows an example sequence of releasing an RRC Connection/S1 bearer of an eNB initiated from an MME.

Figure 26:
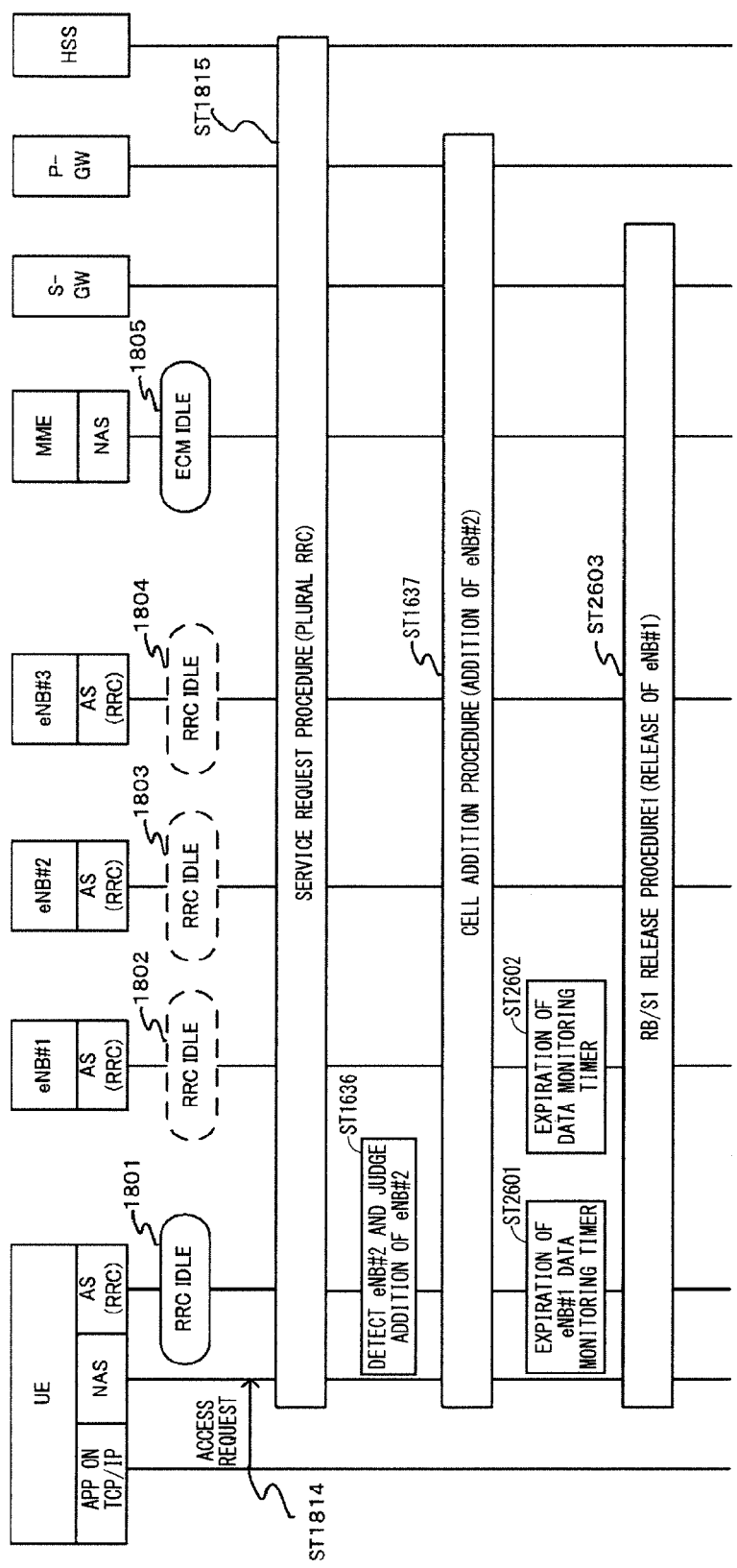

FIG. 26 shows an example sequence of releasing an RRC Connection/S1 bearer when time-out is detected.

FIG. 27(A) shows an example sequence of data forwarding in the case where a plurality of RRC Connection/S1 bearers are configured.

FIG. 27(B) is a sequence diagram showing details of a downlink traffic control procedure.

FIG. 27(C) is a sequence diagram showing details of an uplink traffic control procedure.

FIG. 28 shows the architecture of an EPS according to a second embodiment.

Figure 29:
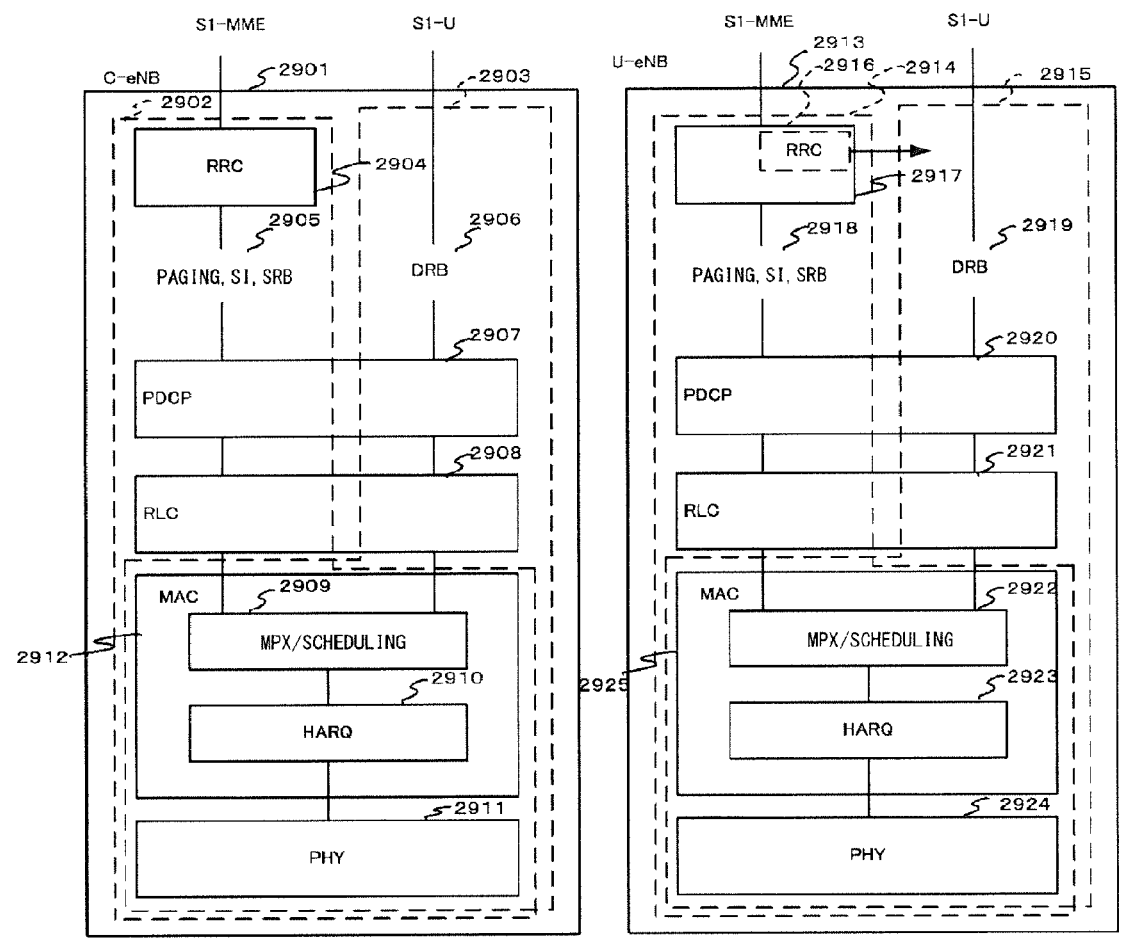

FIG. 29 shows a protocol stack of an eNB according to the second embodiment.

Figure 30:
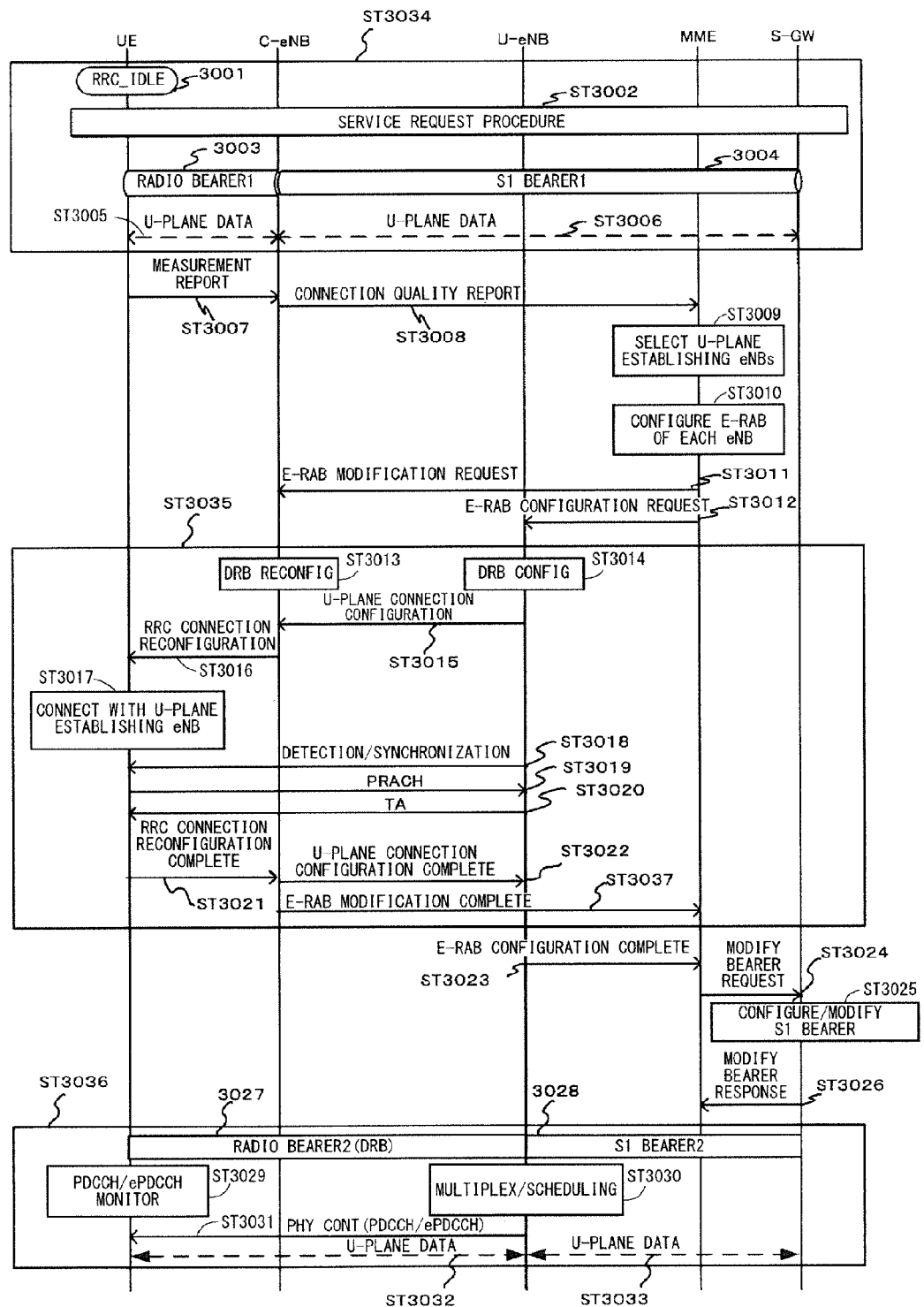

FIG. 30 shows an example sequence according to the second embodiment.

Figure 31:
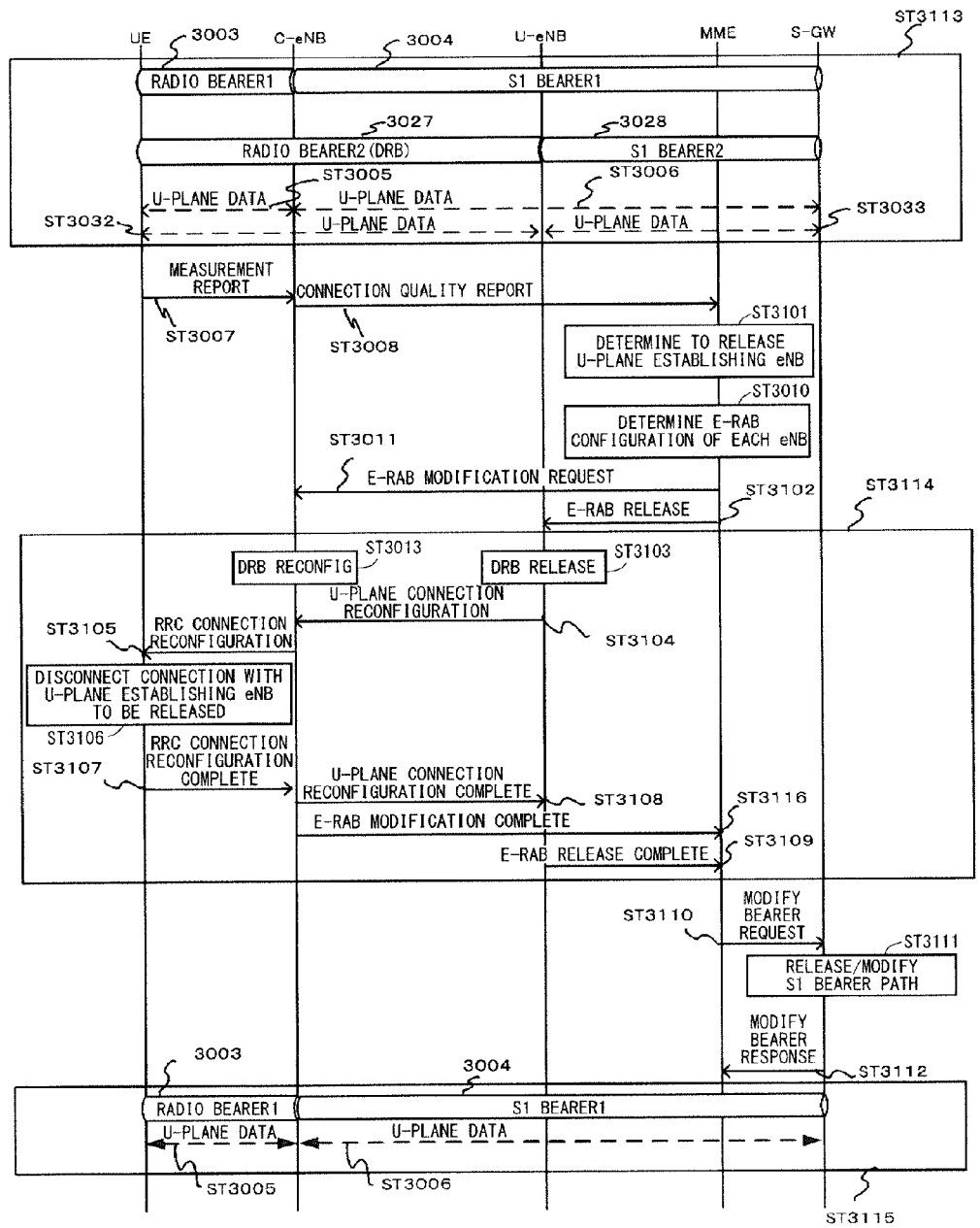

FIG. 31 shows an example sequence of releasing a U-plane establishing eNB according to the second embodiment.

Figure 32:
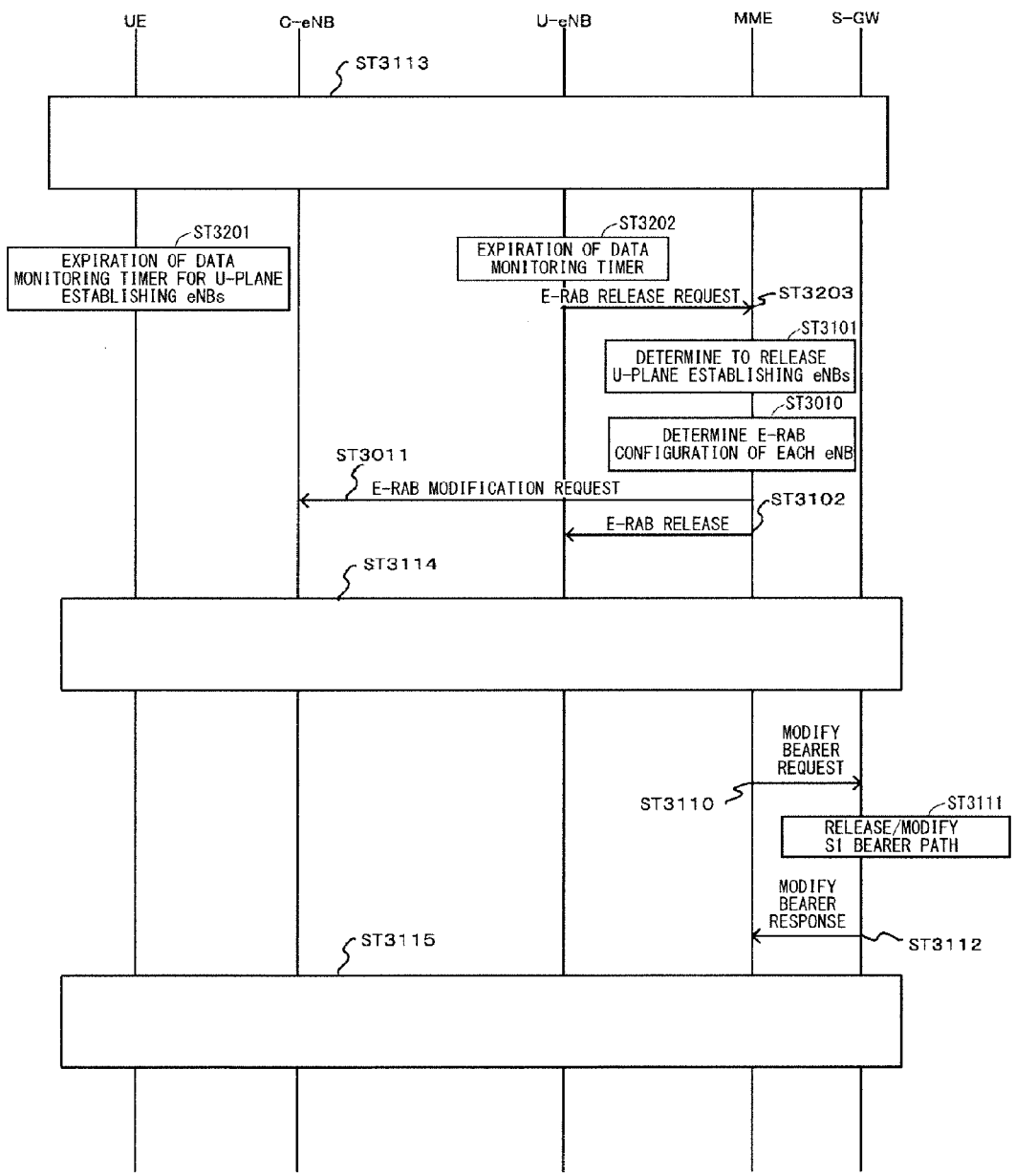

FIG. 32 shows another example sequence of releasing a U-plane establishing eNB according to the second embodiment.

Figure 33:
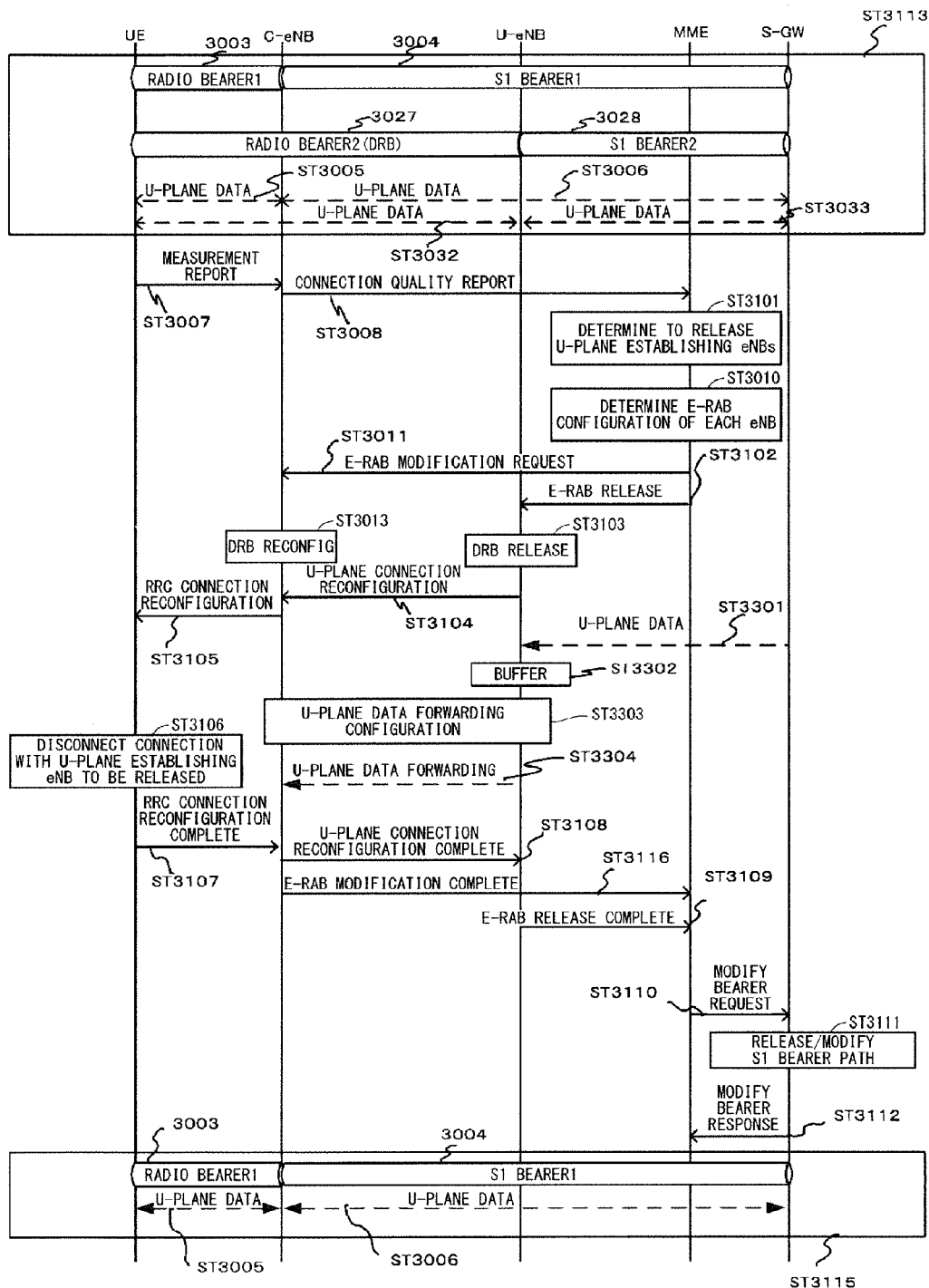

FIG. 33 shows an example sequence of performing data forwarding between U-plane establishing eNBs according to the second embodiment.

FIG. 34 shows the architecture according to a first modification of the second embodiment.

Figure 35:
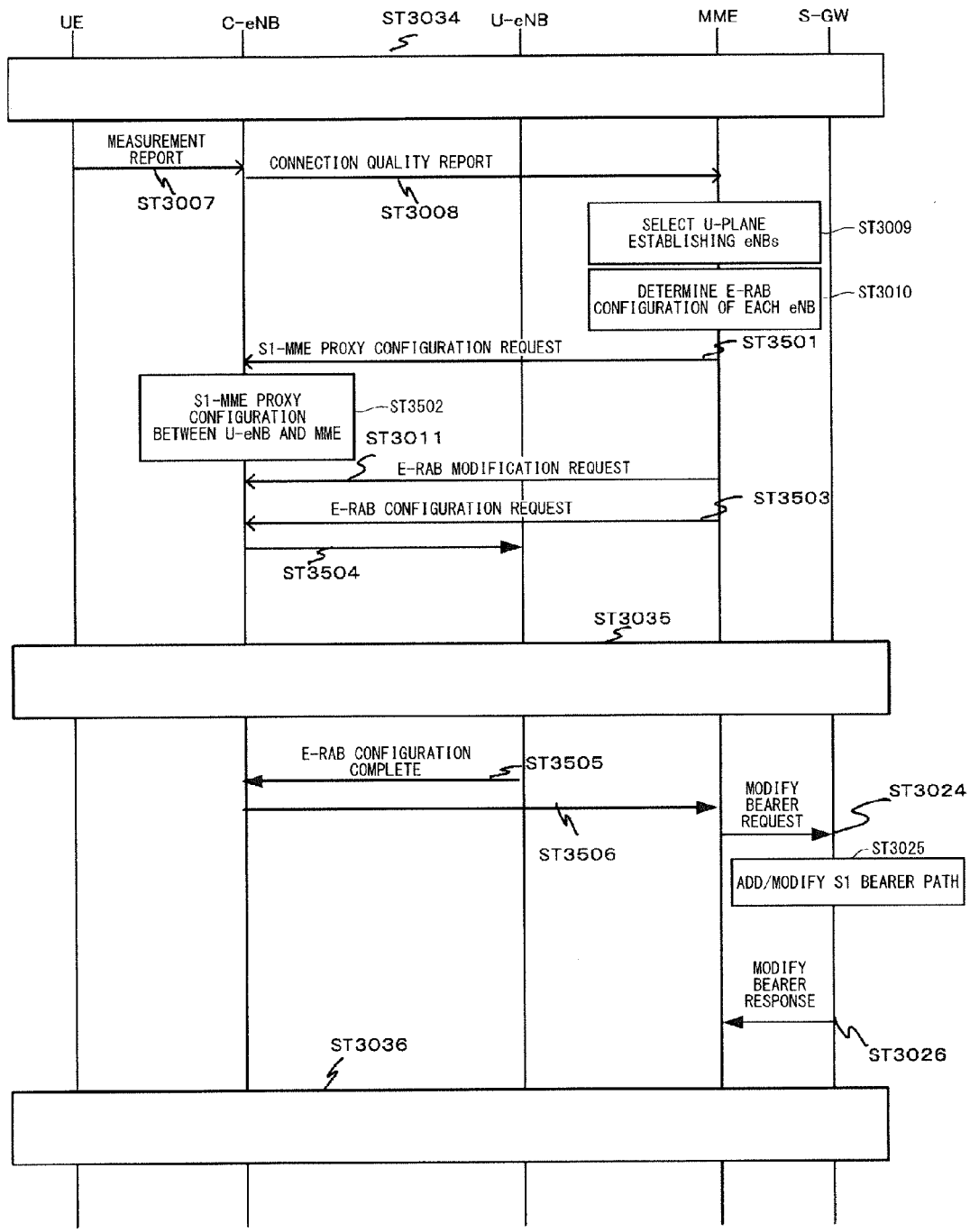

FIG. 35 shows an example sequence according to the first modification of the second embodiment.

Figure 36:
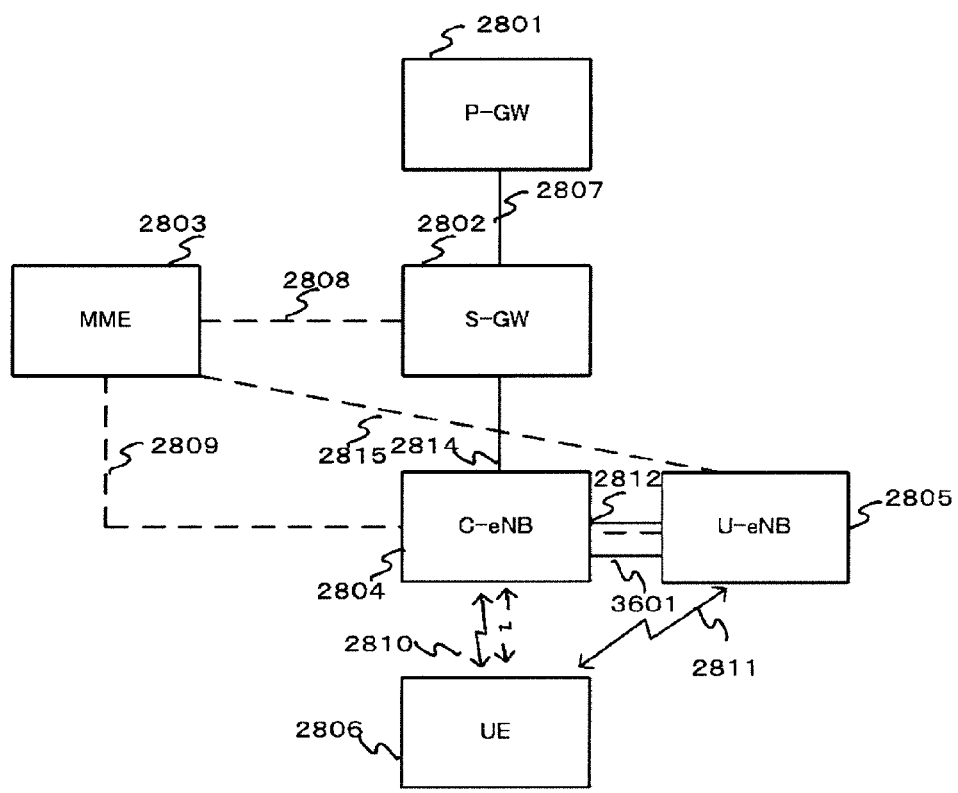

FIG. 36 shows the architecture according to a second modification of the second embodiment.

Figure 37:
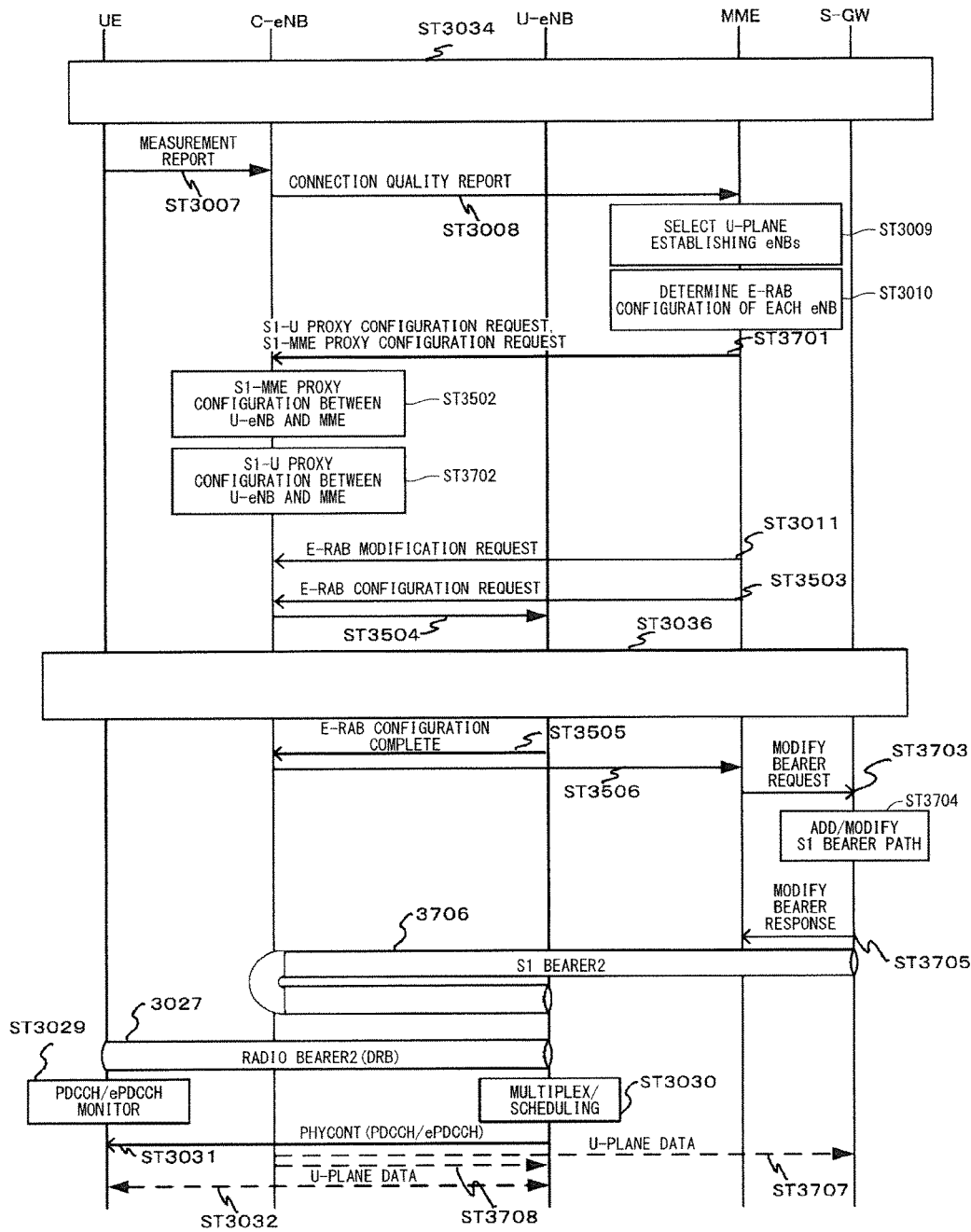

FIG. 37 shows an example sequence according to the second modification of the second embodiment.

FIG. 38 shows an example sequence of establishing/modifying a DRB/S1 bearer using a plurality of eNBs according to a third modification of the second embodiment.

Figure 39:
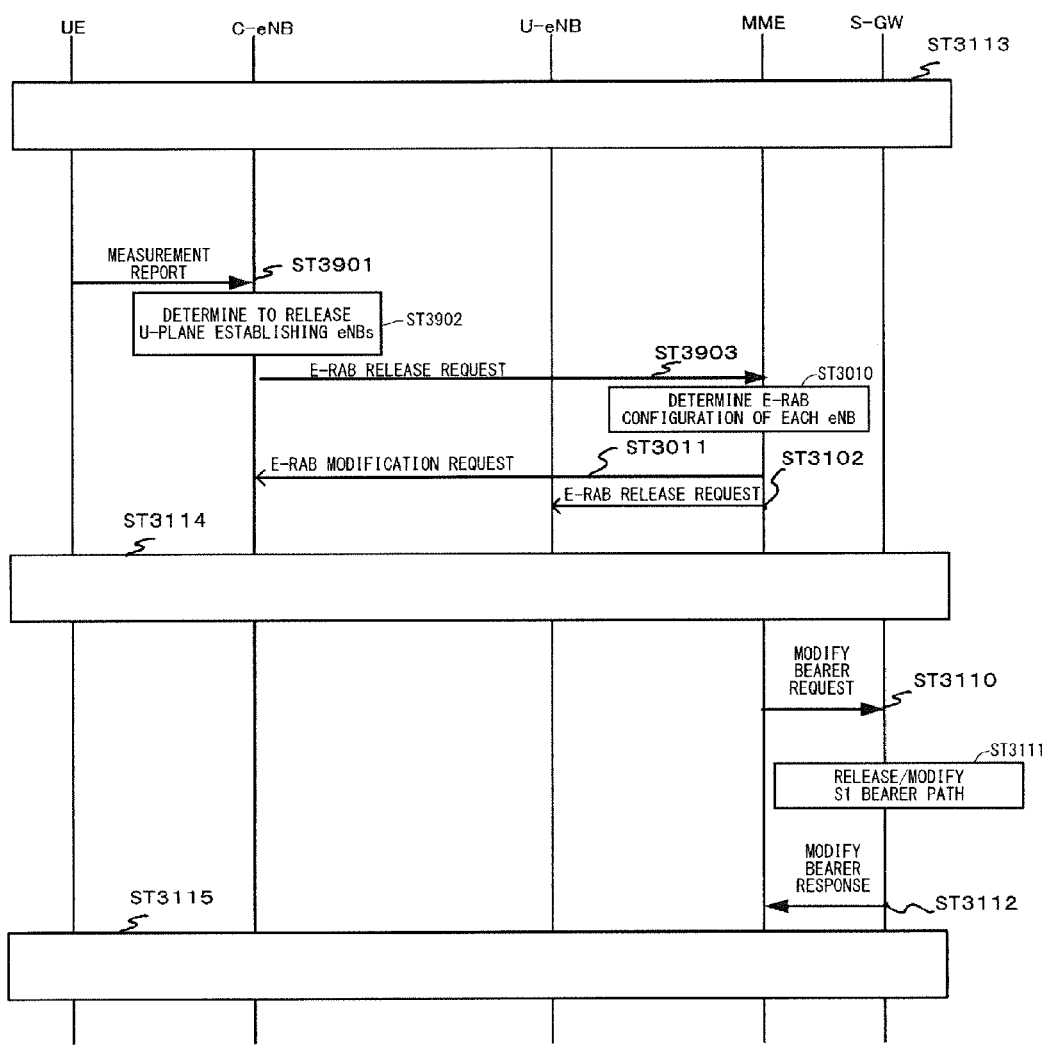

FIG. 39 shows an example sequence of releasing a U-plane establishing eNB according to the third modification of the second embodiment.

FIG. 40 shows another example sequence of releasing a U-plane establishing eNB according to the third modification of the second embodiment.

FIG. 41 shows still another example sequence of releasing a U-plane establishing eNB according to the third modification of the second embodiment.

FIG. 42 shows the architecture in the case where an eNB dedicated for establishing U-plane is configured according to a third embodiment.

FIG. 43 shows a protocol stack of an eNB according to the third embodiment.

Figure 44:
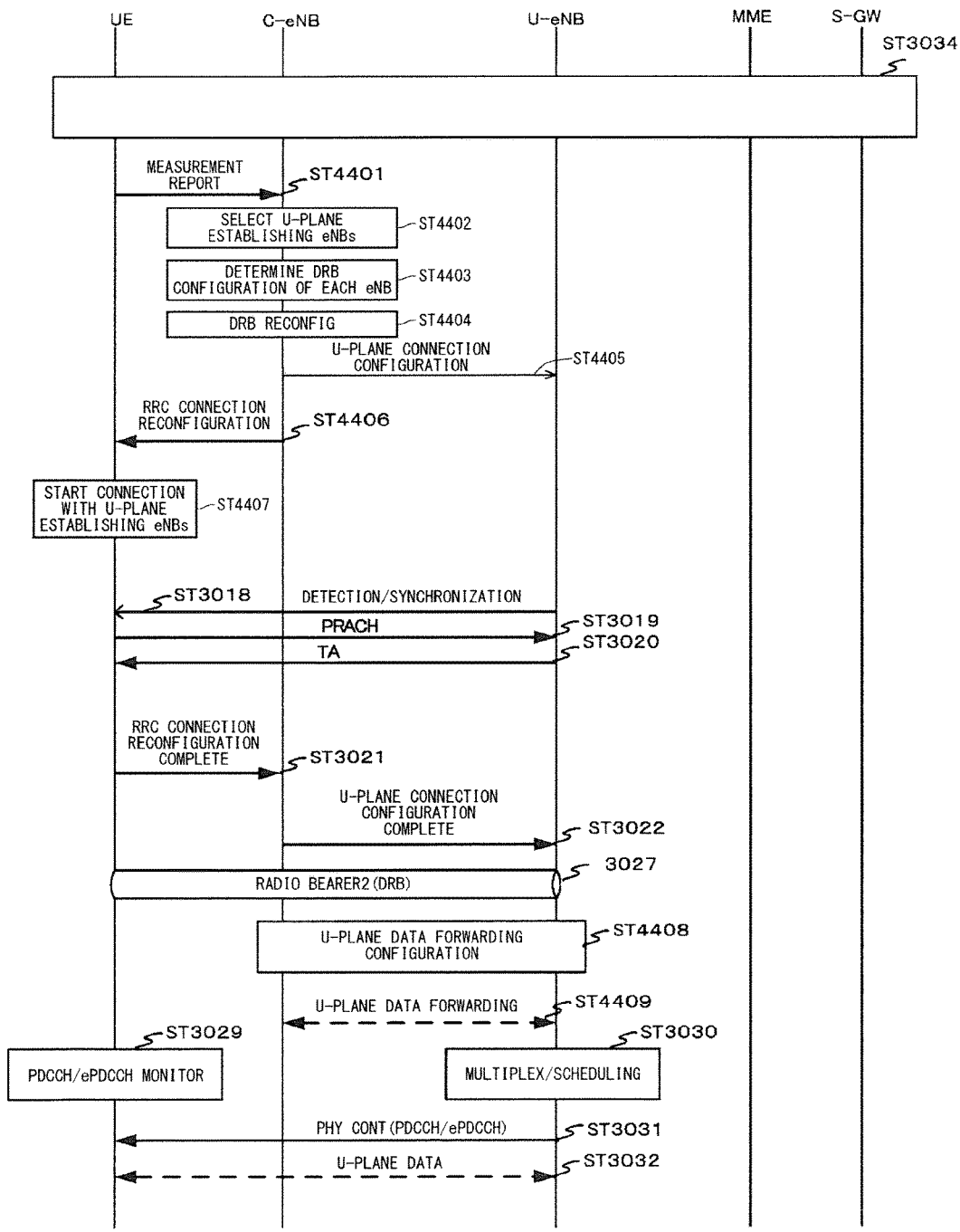

FIG. 44 shows an example sequence of establishing/modifying a DRB using a plurality of eNBs according to the third embodiment.

FIG. 45 shows an example sequence of releasing a U-plane establishing eNB according to the third embodiment.

Figure 46:
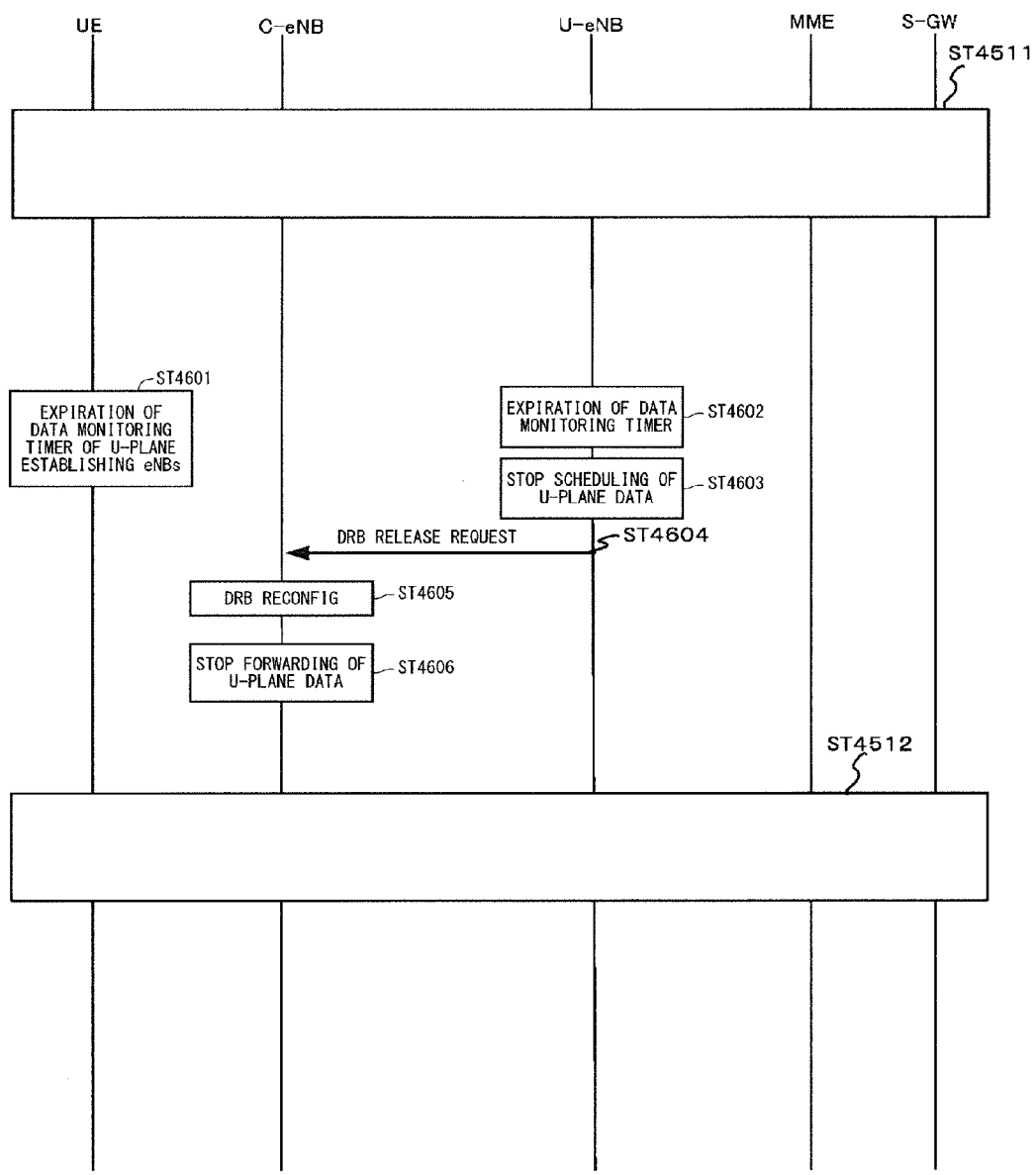

FIG. 46 shows another example sequence of releasing a U-plane establishing eNB according to the third embodiment.

FIG. 47 shows the architecture according to a first modification of the third embodiment.

Figure 48:
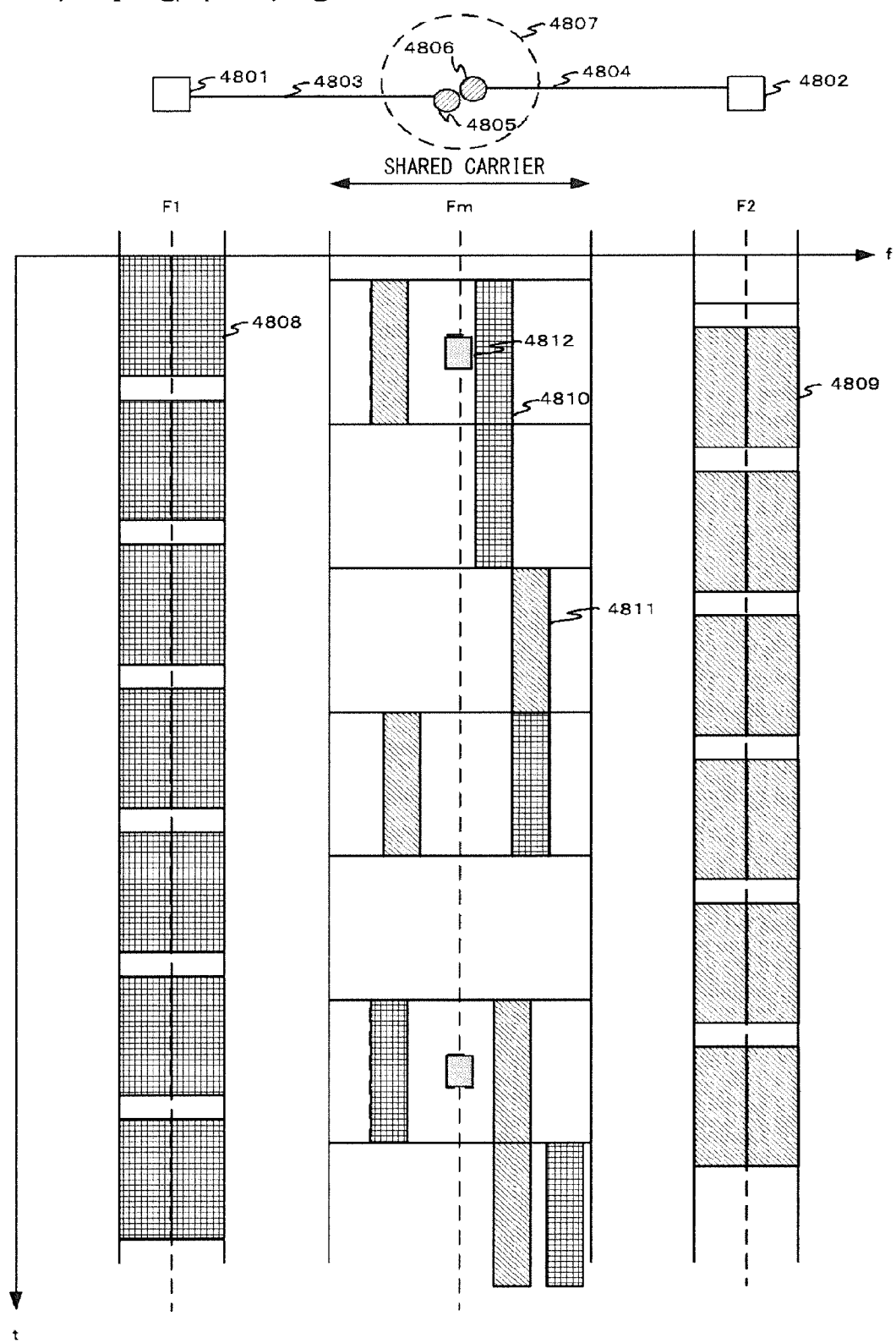

FIG. 48 is a conceptual diagram of a shared carrier according to a sixth embodiment.

Figure 49:
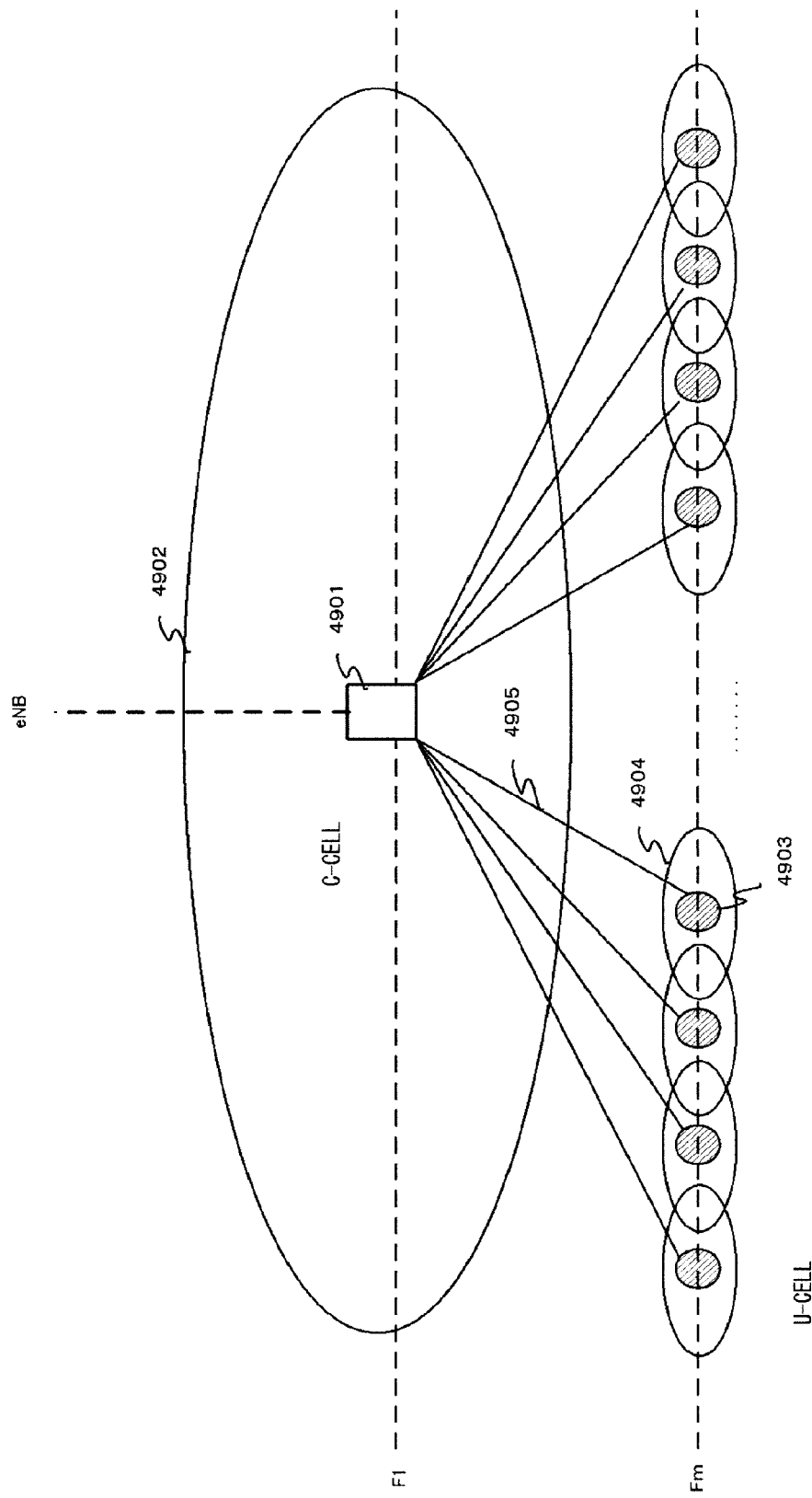

FIG. 49 shows an example configuration of a shared carrier in the same eNB.

Figure 50:
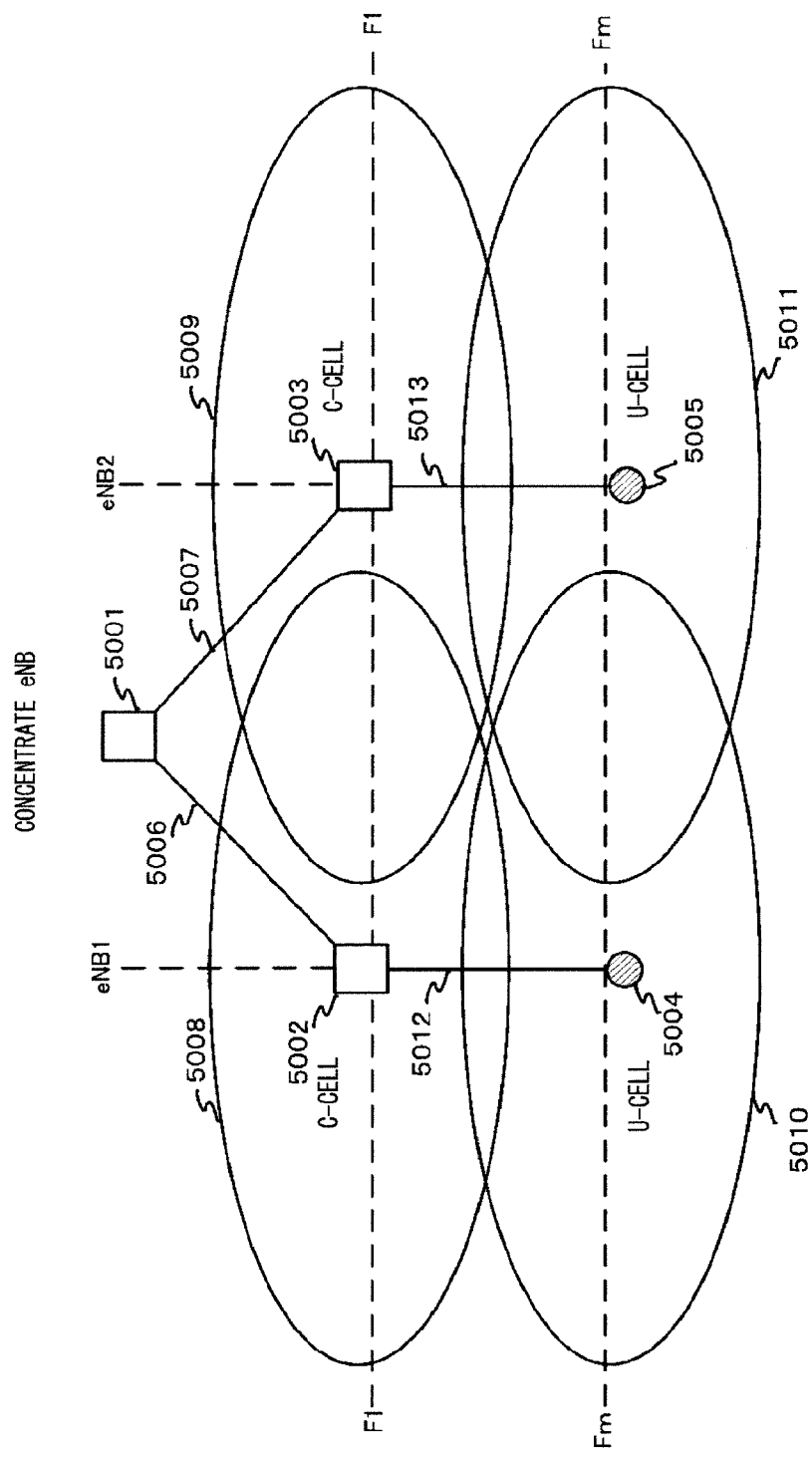

FIG. 50 shows an example configuration of a shared carrier in different eNBs.

Figure 51:
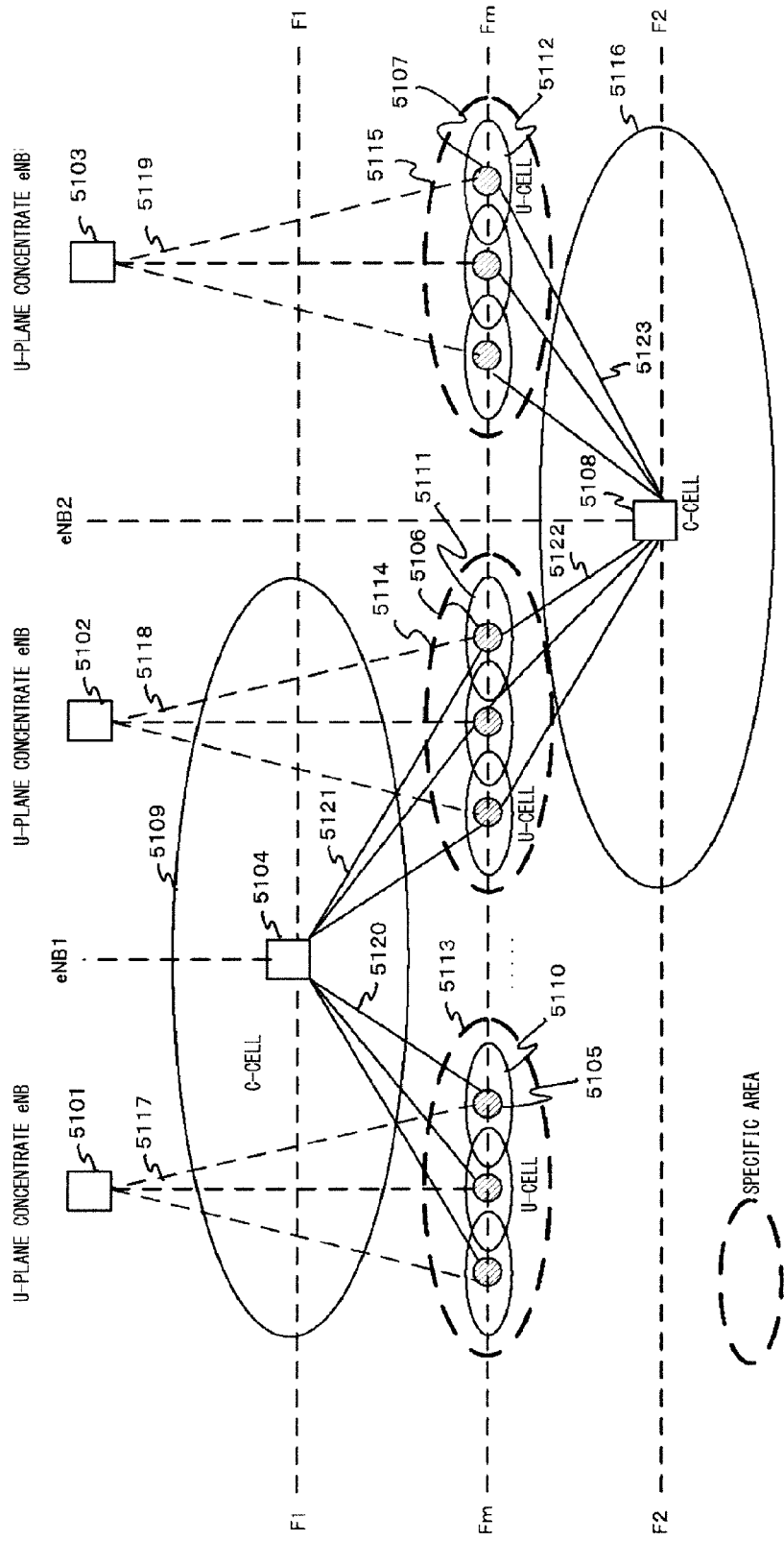

FIG. 51 shows an example configuration in the case where a shared carrier is configured in a specific area.

FIG. 52 shows another example in the case where a shared carrier is configured in a specific area.

Figure 53:
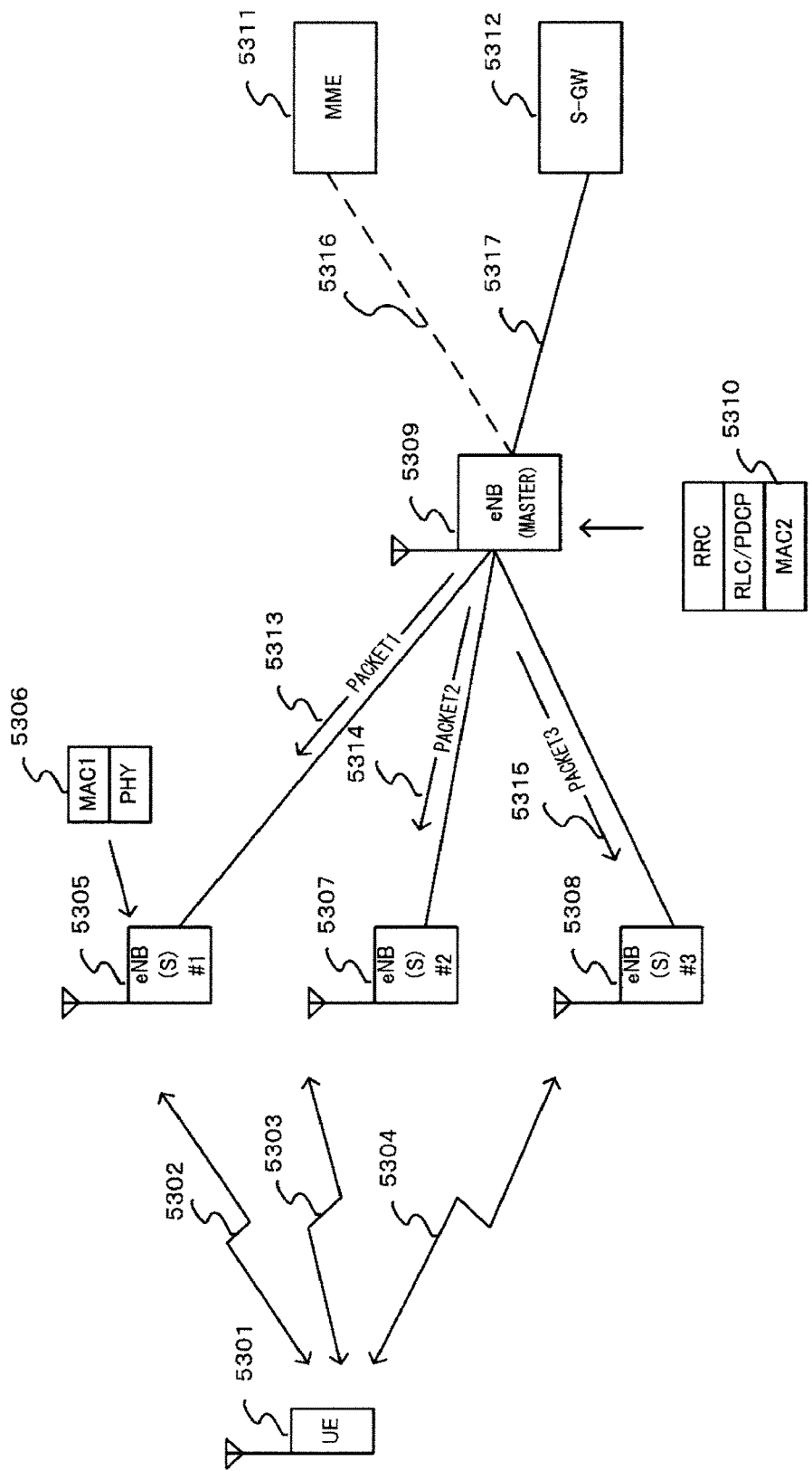

FIG. 53 shows the architecture according to a seventh embodiment.

Figure 54:
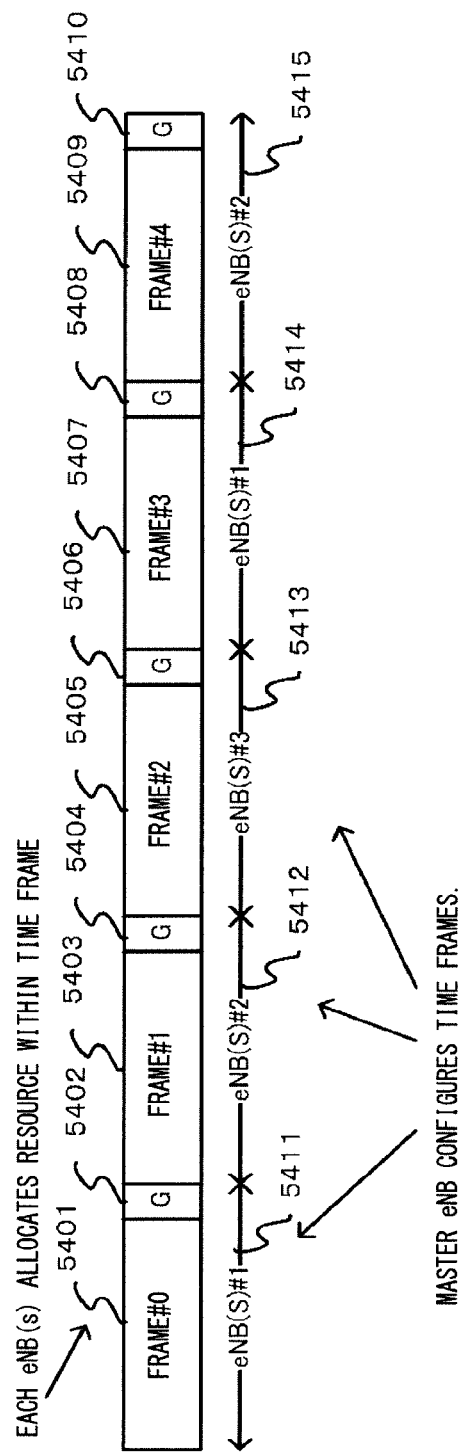

FIG. 54 shows an example configuration of frames in accordance with schedulings performed by a MAC1 and a MAC2.

FIG. 55(A) shows an example sequence of a flow of establishing communication and transmitting data.

Figure 55B:
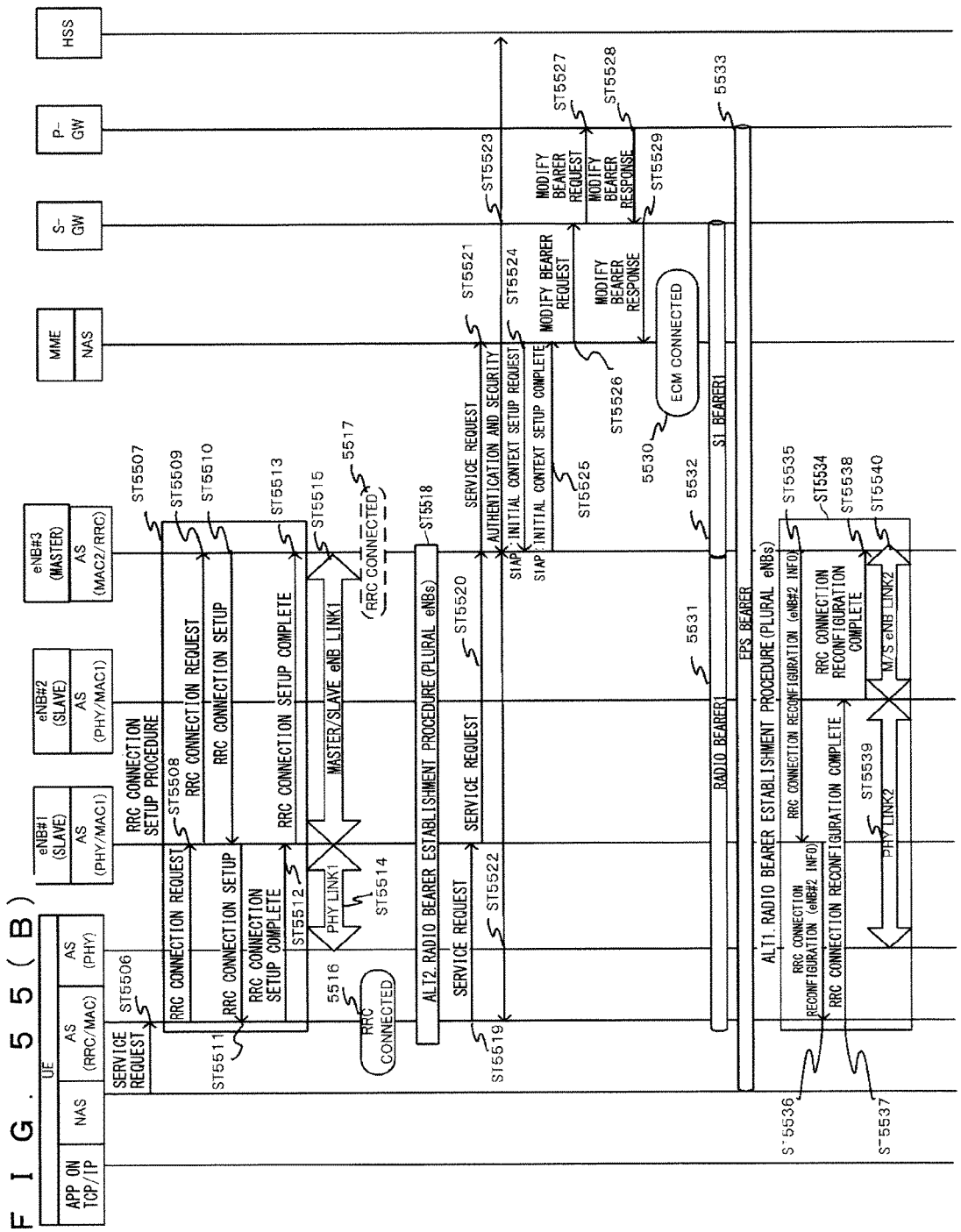

FIG. 55(B) shows details of a service request procedure.

FIG. 55(C) shows details of a DL scheduling/transmitting procedure.

Figure 55D:
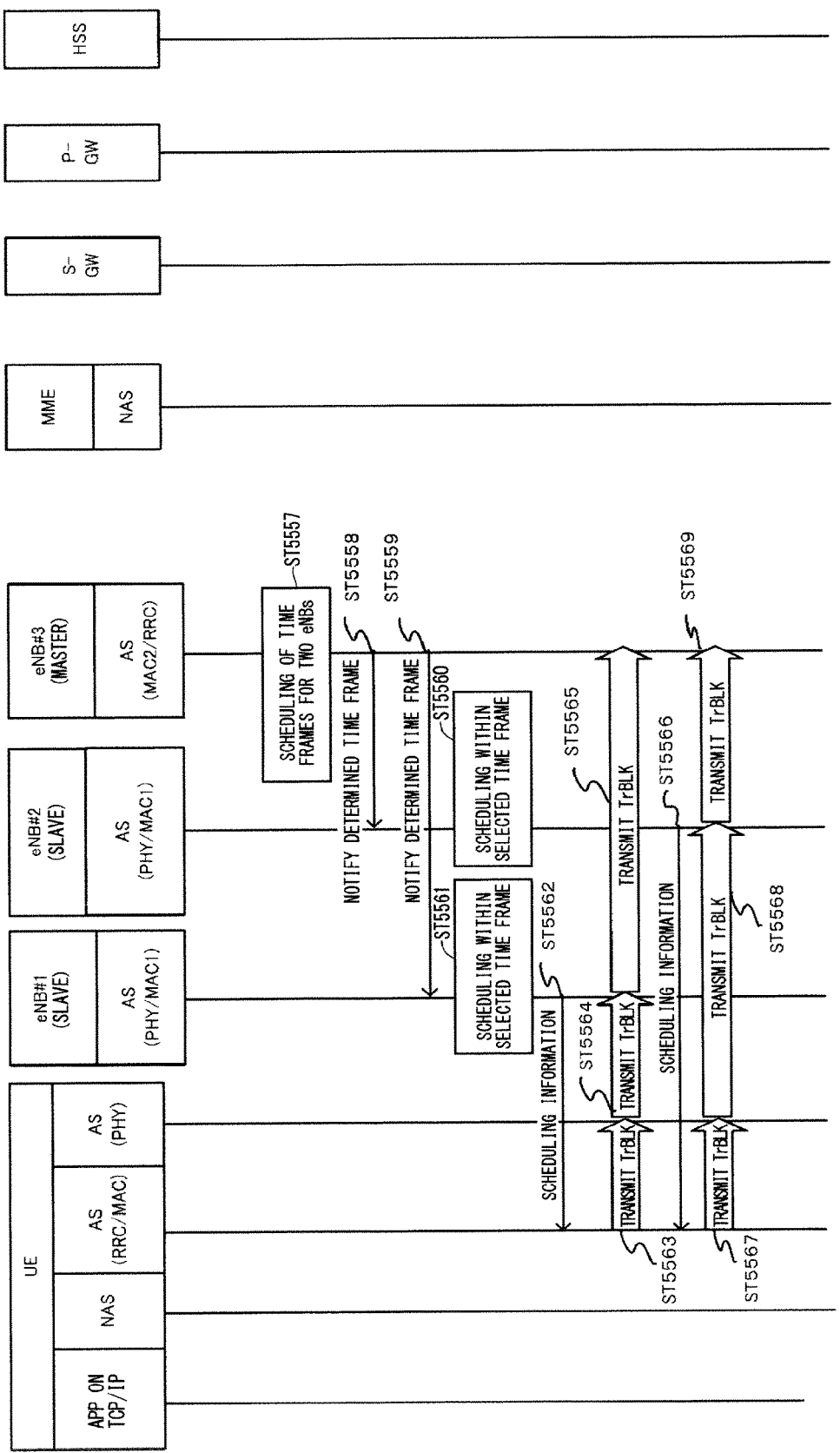

FIG. 55(D) shows details of a UL scheduling/transmitting procedure.

Figure 56:
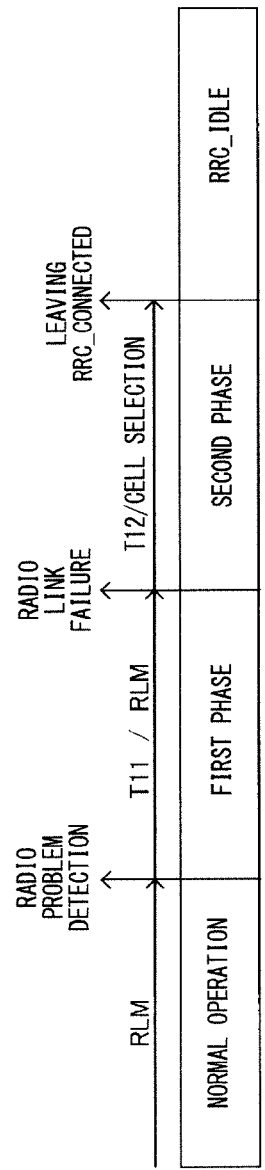

FIG. 56 is a diagram for describing a conventional RLF-related process.

Figure 57:
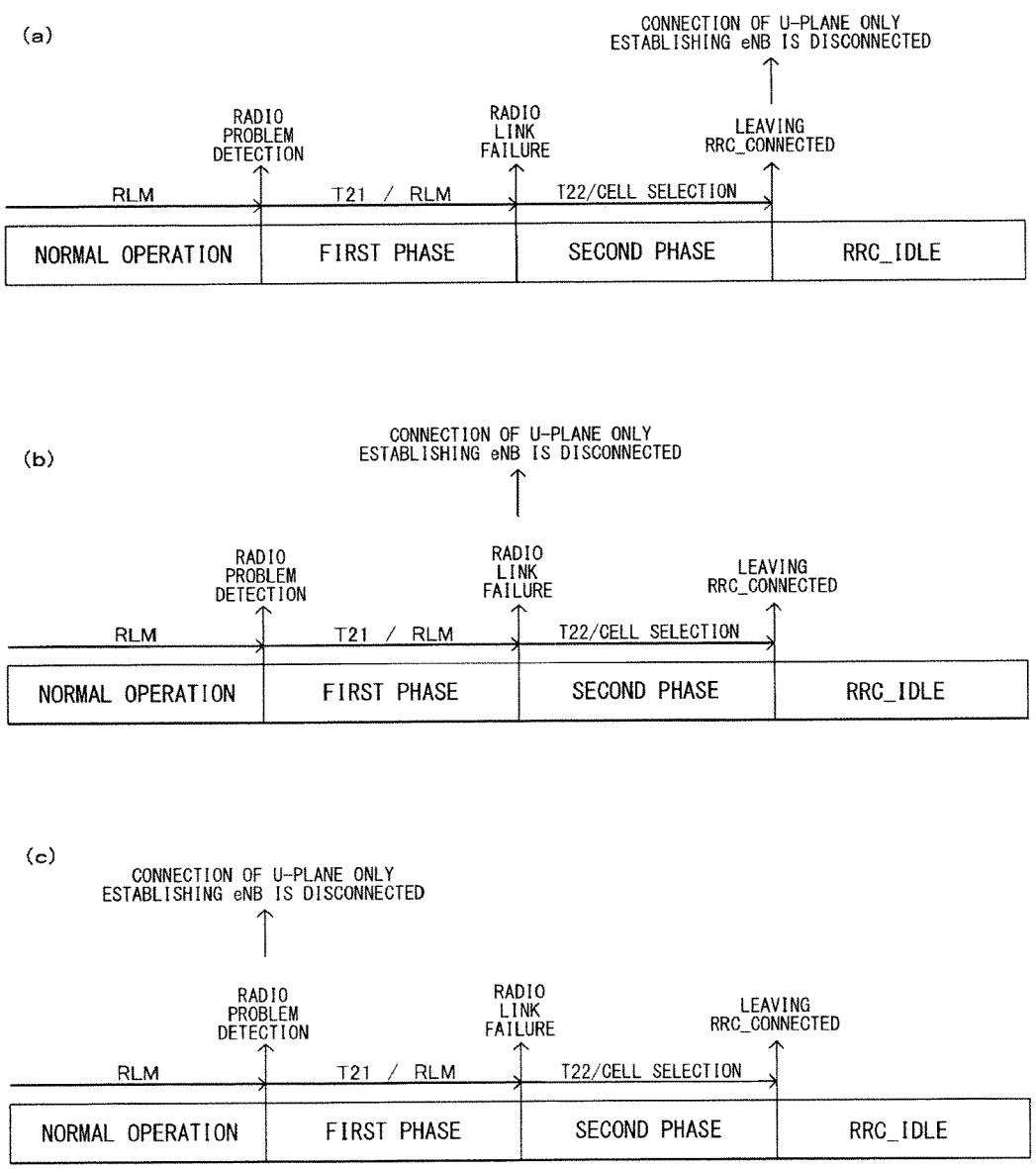

FIG. 57 is a diagram for describing an RLF-related process according to an eighth embodiment.

Figure 58:
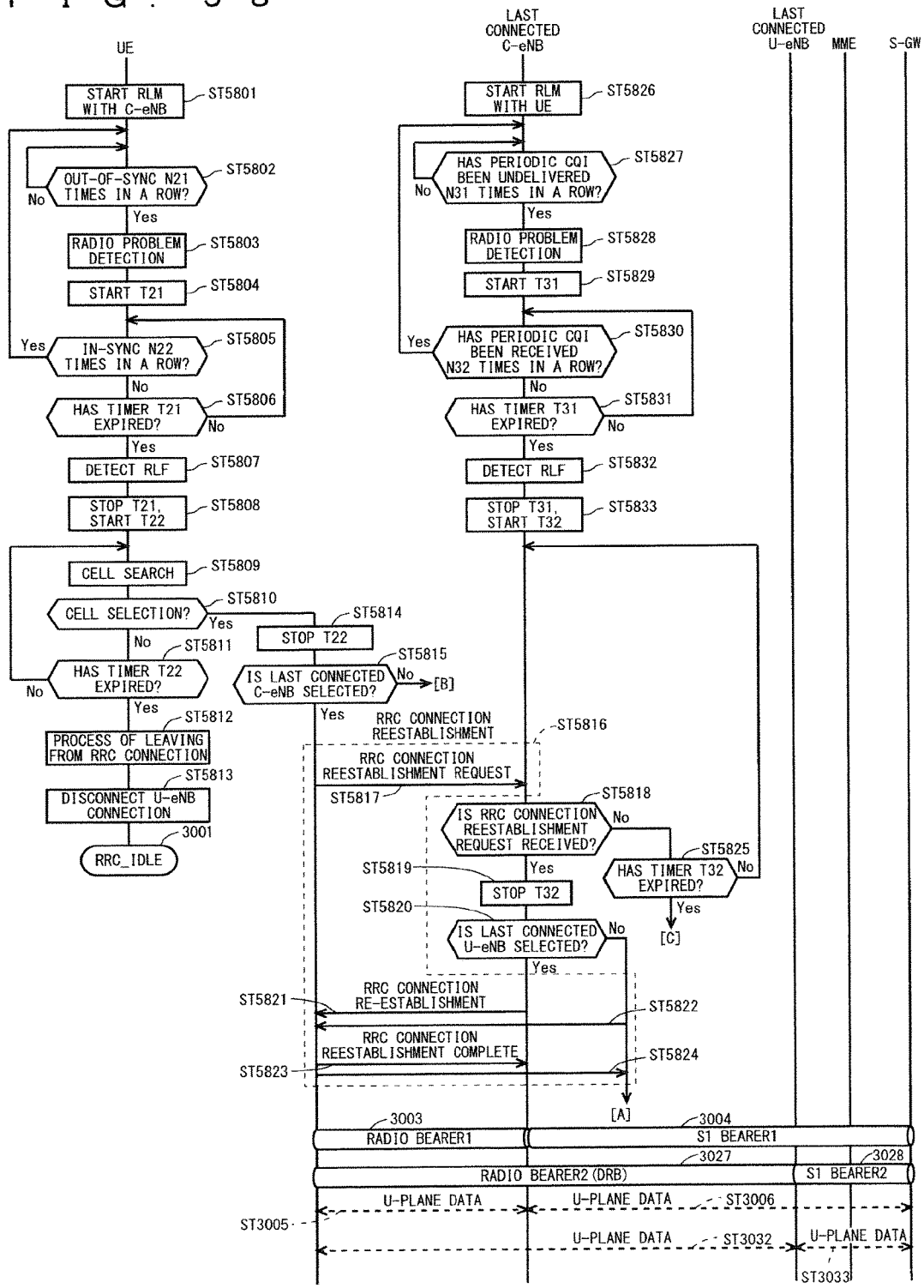

FIG. 58 shows an example sequence of the RLF-related process according to the eighth embodiment.

Figure 59:
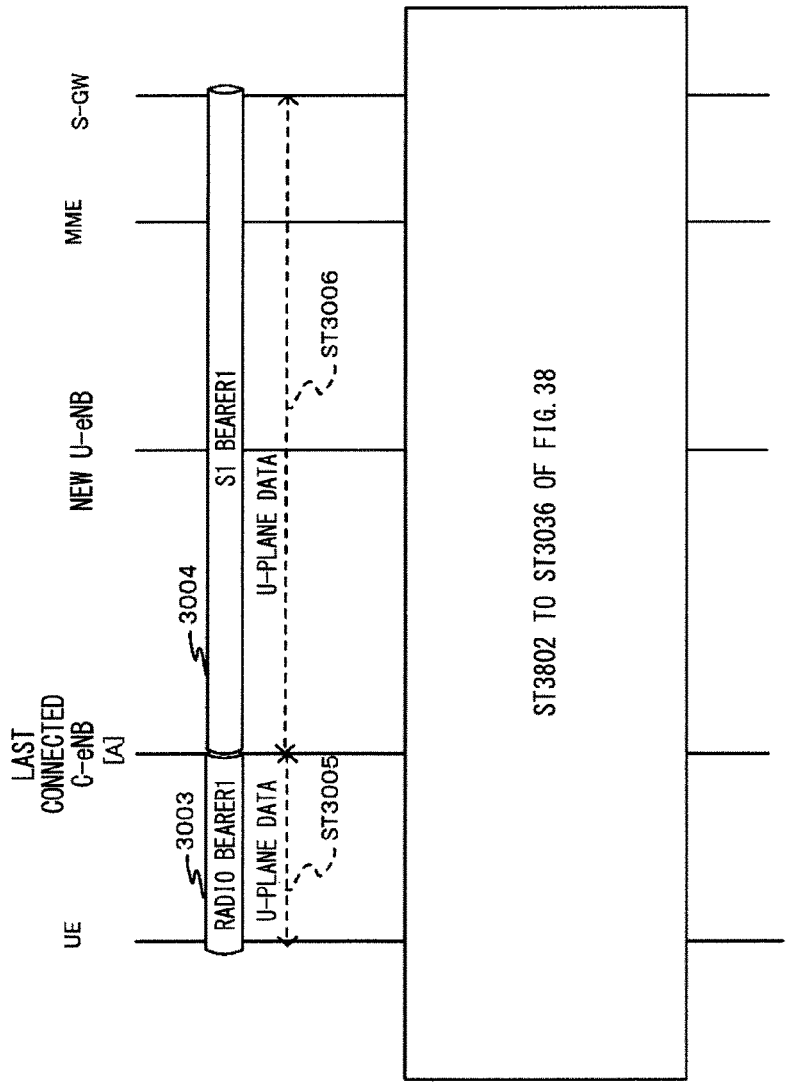

FIG. 59 shows an example sequence of a process [A] in FIG. 58.

Figure 60:
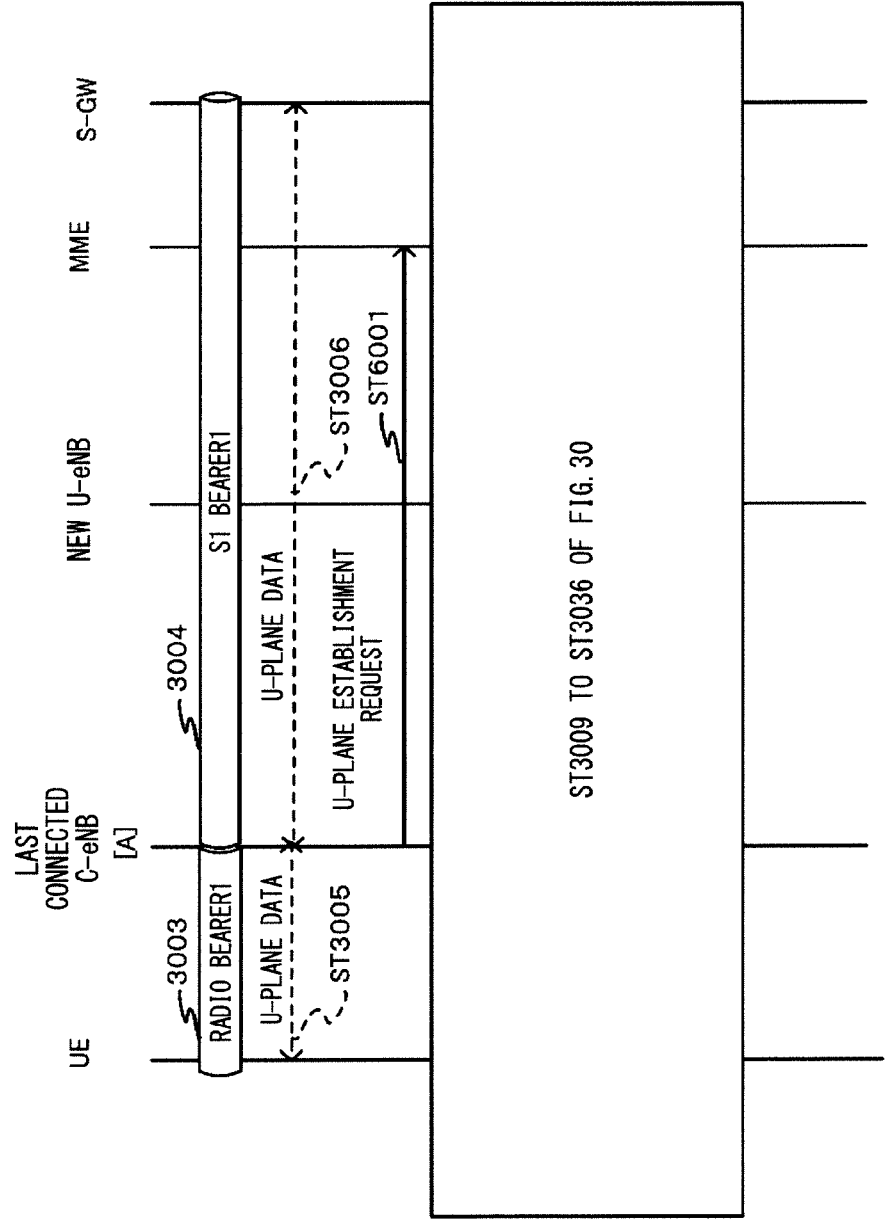

FIG. 60 shows another example sequence of the process [A] in FIG. 58.

Figure 61:
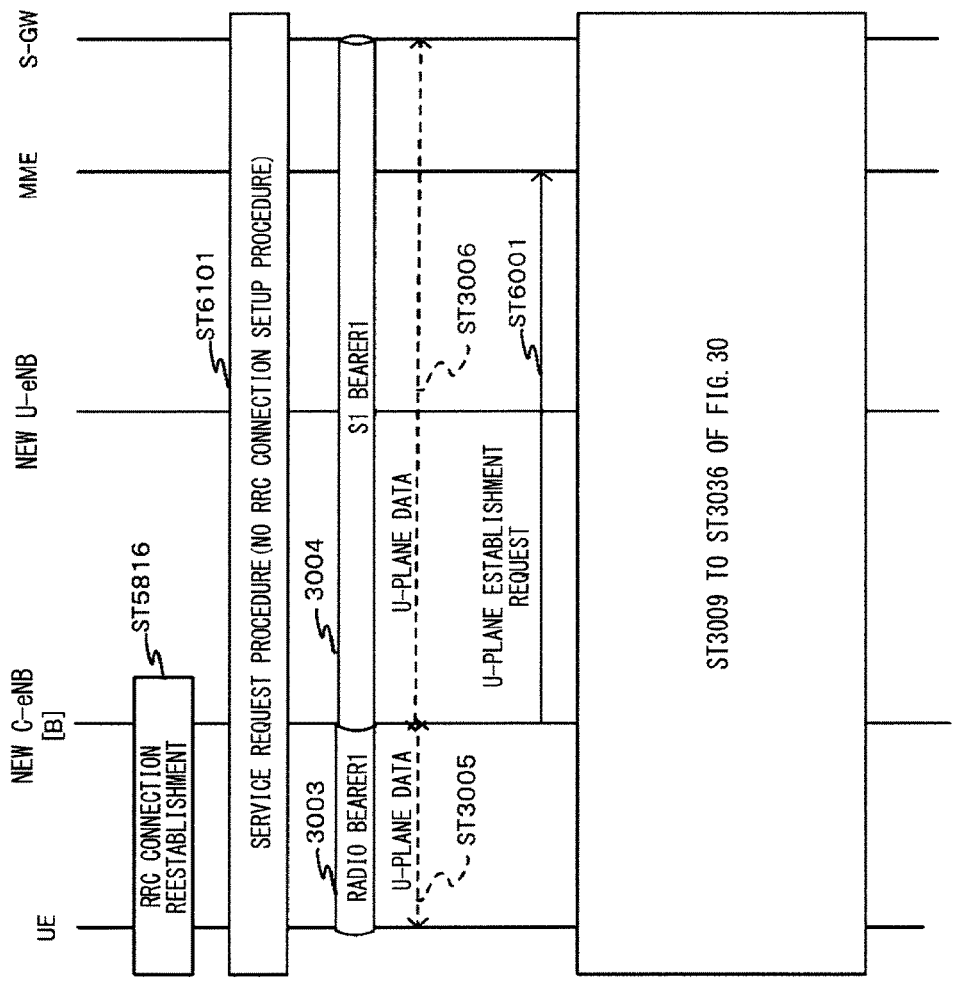

FIG. 61 shows an example sequence of a process [B] in FIG. 58.

Figure 62:
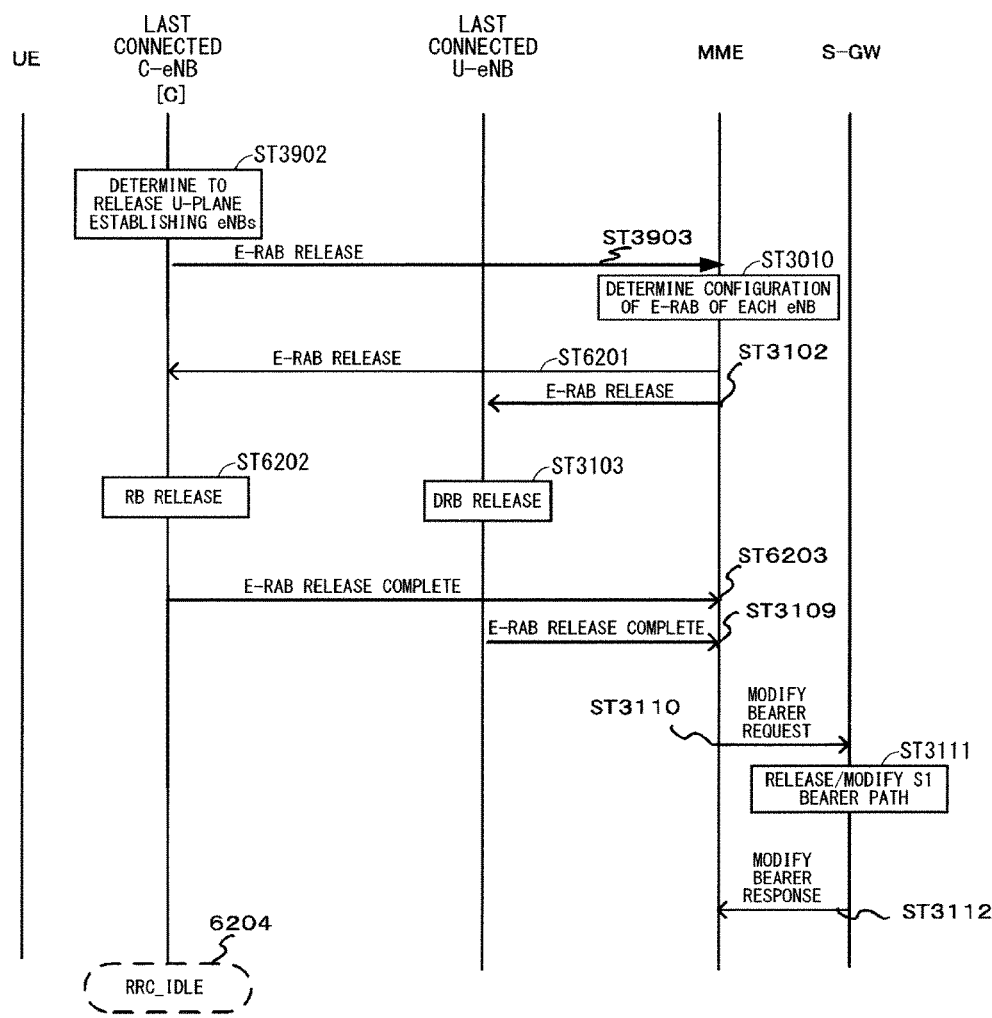

FIG. 62 shows an example sequence of a process [C] in FIG. 58.

FIG. 63 is a diagram for describing an RLF-related process according to a ninth embodiment.

FIG. 64 shows an example sequence of an RLF-related process by a U-plane only establishing cell according to the ninth embodiment.

Figure 65:
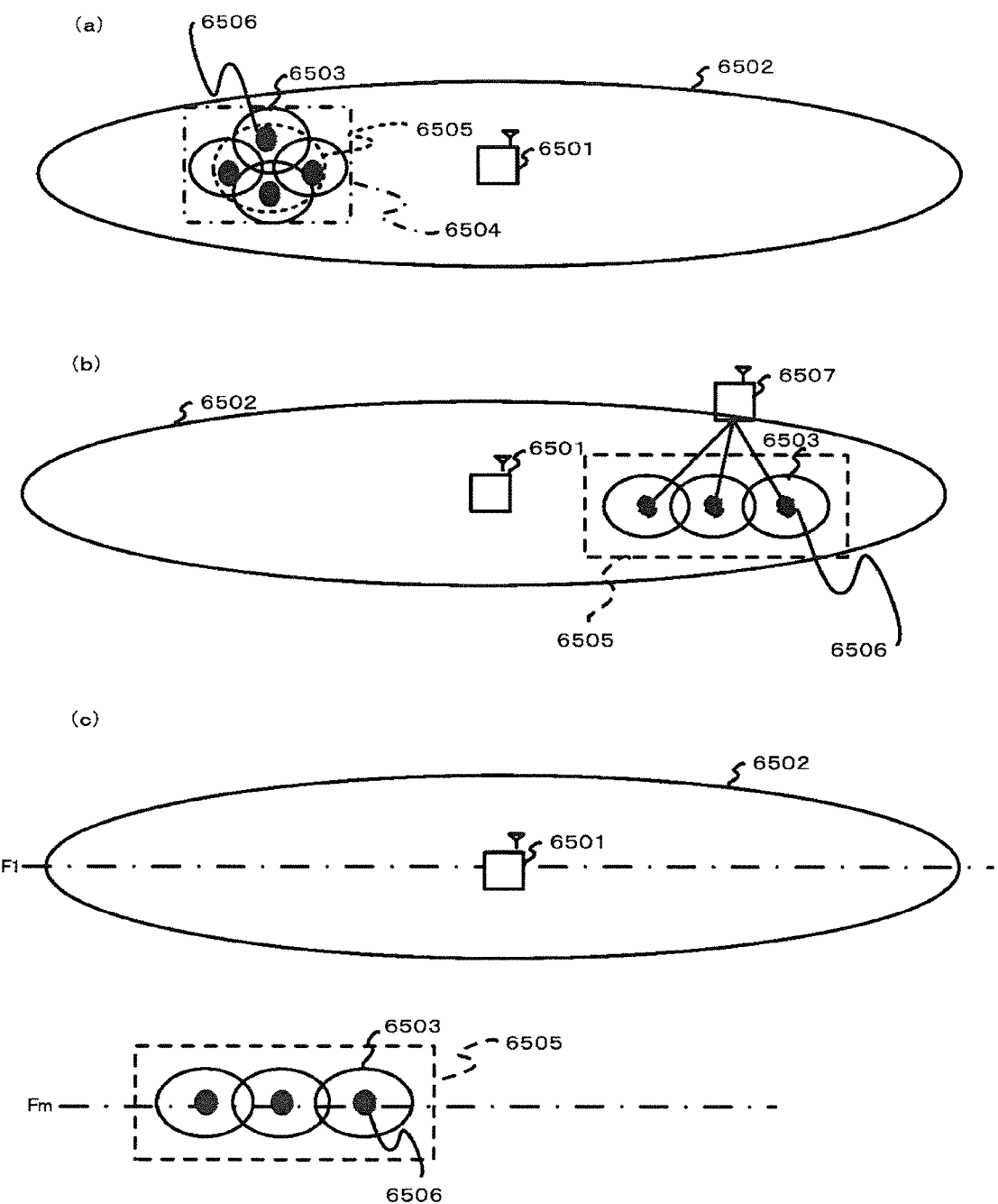

FIG. 65 is a diagram illustrating the case in which a plurality of eNBs are treated as one group.

FIG. 66 is a diagram illustrating the case in which communication is performed using a macro cell and a plurality of small cells positionally overlaid on the macro cell and CA is performed in the macro cell.

DESCRIPTION OF EMBODIMENTS

First Embodiment

Figure 7:
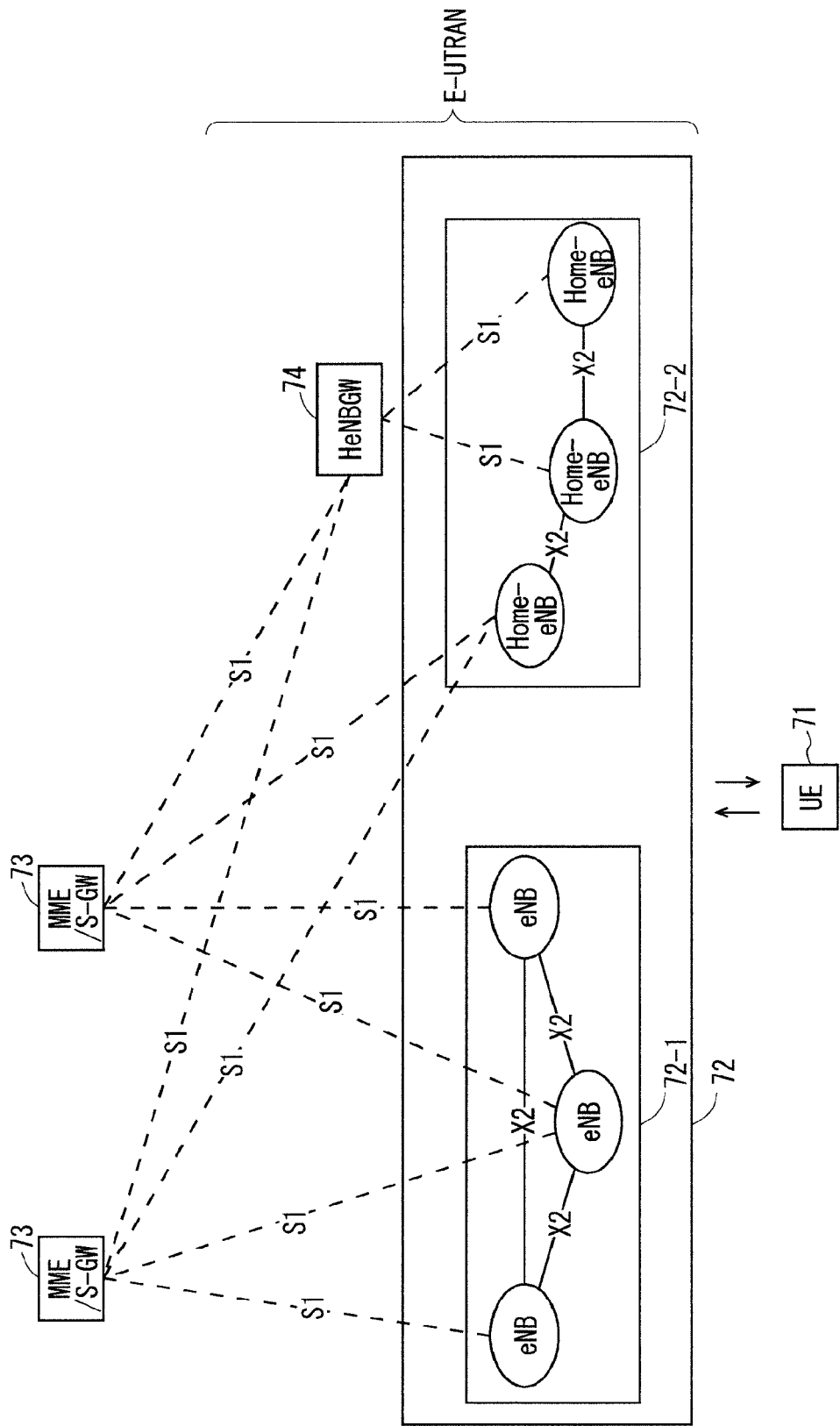
FIG. 7 is a block diagram showing the overall configuration of an LTE mobile communication system currently under discussion of 3GPP.

FIG. 7 is a block diagram showing an overall configuration of an LTE communication system, which is currently under discussion of 3GPP. 3GPP is studying an overall configuration of a system including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, proposes the configuration as shown in FIG. 7 (see Chapter 4.6.1 of Non-Patent Document 1).

FIG. 7 will be described. A mobile terminal device (hereinafter, referred to as a "user equipment" or "UE") 71 being a communication terminal device is capable of performing radio communication with a base station device (hereinafter, referred to as a "base station") 72 and transmits/receives signals through radio communication. The base stations 72 are classified into an eNB 72-1 and a Home-eNB 72-2.

The eNB 72-1 is connected to an MME/S-GW unit (hereinafter, also referred to as an "MME unit") 73 including an MME, S-GW, or MME and S-GW through an S1 interface, and control information is communicated between the eNB 72-1 and the MME unit 73. A plurality of MME units 73 may be connected to one eNB 72-1. The MME unit 73 is equivalent to management means. The MME unit 73 is included in an EPC being a core network. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Or, the Home-eNBs 72-2 are connected to the MME units 73 through a Home-eNB gateway (HeNBGW) 74. The Home-eNBs 72-2 are connected to the HeNBGW 74 by means of the S1 interface, and the HeNBGW 74 is connected to the MME units 73 through an S1 interface.

One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are devices of higher nodes and control the connection between the user equipment (UE) 71 and the eNB 72-1 or Home-eNB 72-2 being a base station. The MME units 73, specifically, the MME and S-GW constituting the MME unit 73 and the HeNBGW 74 are equivalent to management means. The MME units 73 and HeNBGW are included in the EPC being a core network.

Further, 3GPP is currently studying the configuration below. The X2 interface between the Home-eNBs 72-2 is supported. In other words, the Home-eNBs 72-2 are connected to each other by means of an X2 interface, and control information is communicated between the Home-eNBs 72-2. The HeNBGW 74 appears to the MME unit 73 as the eNB 72-1. The HeNBGW 74 appears to the Home-eNB 72-2 as the MME unit 73.

The interfaces between the Home-eNBs 72-2 and the MME units 73 are the same, which are the S1 interfaces, in both cases where the Home-eNB 72-2 is connected to the MME unit 73 through the HeNBGW 74 and it is directly connected to the MME unit 73. The HeNBGW 74 does not support the mobility to the Home-eNB 72-2 or the mobility from the Home-eNB 72-2 that spans a plurality of MME units 73. The Home-eNB 72-2 constitutes and supports a single cell.

The base station device supports a single cell alone, such as the Home-eNB 72-2, which is not limited thereto. One base station device may support a plurality of cells. In the case where one base station device supports a plurality of cells, every cell is configured to communicate with a mobile terminal.

Figure 8:
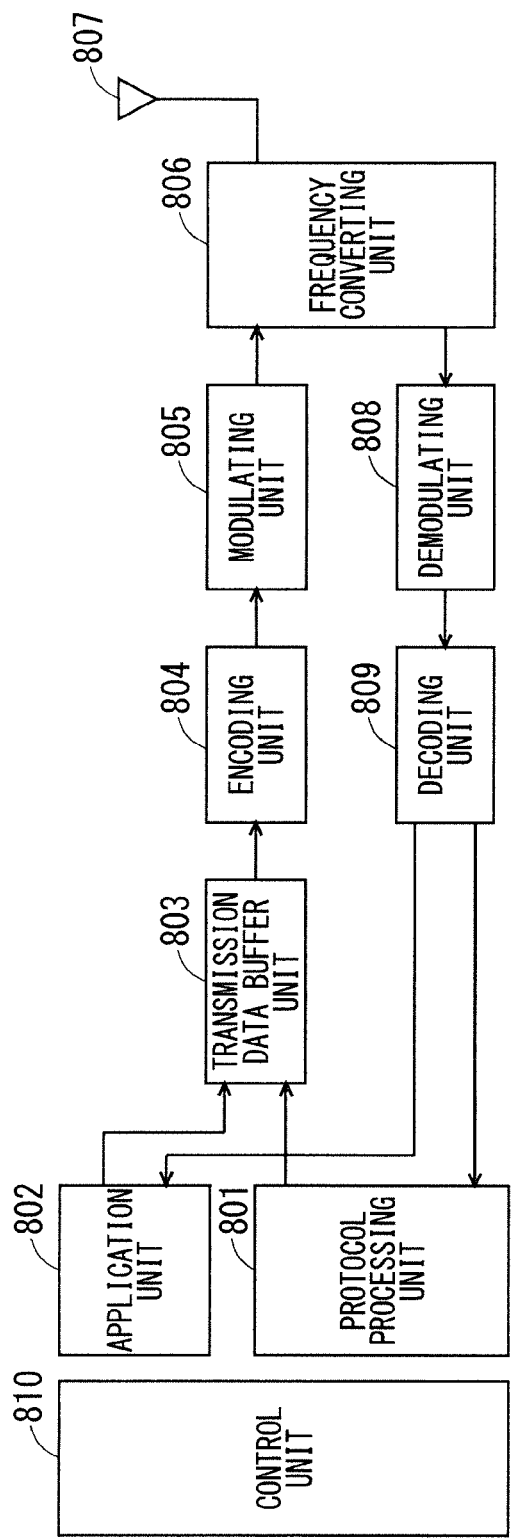
FIG. 8 is a block diagram showing the configuration of a user equipment 71 of FIG. 7 being a user equipment according to the present invention.

FIG. 8 is a block diagram showing the configuration of the user equipment 71 of FIG. 7 being a user equipment according to the present invention. The transmission process of the user equipment 71 shown in FIG. 8 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and is then converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, while the user data is passed to the application unit 802. A series of processes of the user equipment 71 is controlled by a control unit 810. This means that, though not shown in FIG. 8, the control unit 810 is connected to the respective units 801 to 809.

Figure 9:
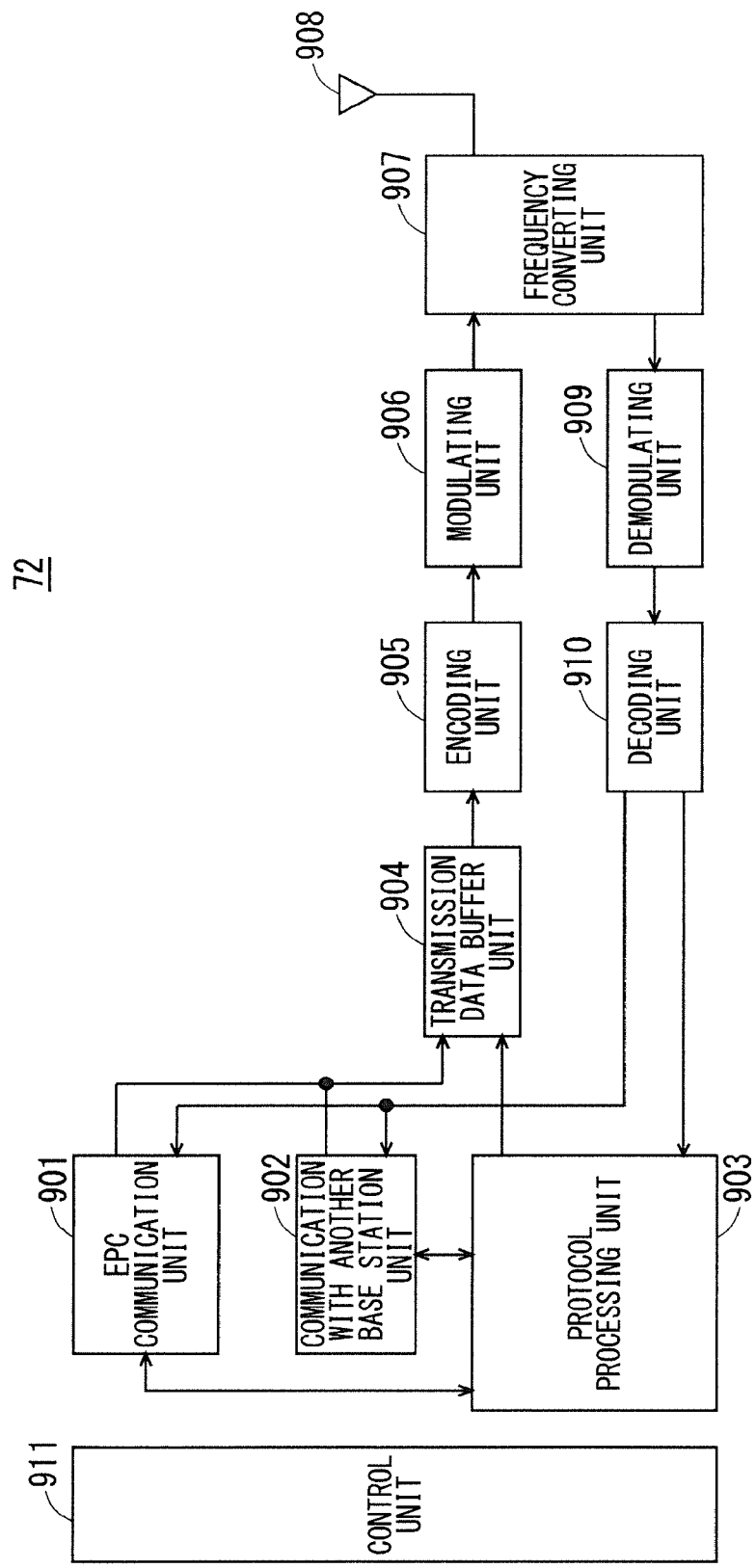
FIG. 9 is a block diagram showing the configuration of a base station 72 of FIG. 7 being a base station according to the present invention.

FIG. 9 is a block diagram showing the configuration of the base station 72 of FIG. 7 being a base station according to the present invention. The transmission process of the base station 72 shown in FIG. 9 will be described. An EPC communication unit 901 performs data transmission and reception between the base station 72 and the EPCs (such as MME unit 73 and HeNBGW 74). A communication with another base station unit 902 performs data transmission and reception to/from another base station. The EPC communication unit 901 and the communication with another base station unit 902 respectively transmit and receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, EPC communication unit 901, or communication with another base station unit 902, while the user data is passed to the EPC communication unit 901 and the communication with another base station unit 902. A series of processes by the base station 72 is controlled by a control unit 911. This means that, though not shown in FIG. 9, the control unit 911 is connected to the respective units 901 to 910.

The communication with another base station unit 902 is equivalent to a notification unit and an acquisition unit. The transmission data buffer unit 904, the encoding unit 905, the modulating unit 906, the frequency converting unit 907, the antenna 908, the demodulating unit 909, and the decoding unit 910 are equivalent to a communication unit.

The functions of the Home-eNB 72-2 currently under discussion of 3GPP will be described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in the case of connection to the HeNBGW 74. The Home-eNB 72-2 is connected only to one HeNBGW 74. That is, in the case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The tracking area code (TAC) and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of by the Home-eNB 72-2. The Home-eNB 72-2 may be deployed without network planning. In this case, the Home-eNB 72-2 is moved from one geographical area to another geographical area. The Home-eNB 72-2 in this case is accordingly required to be connected to a different HeNBGW 74 depending on its location.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission and reception between the MME 73a and a PDN GW. A base station communication unit 1002 performs data transmission and reception between the MME 73a and the base station 72 by means of the S1 interface. In the case where the data received from the PDN GW is user data, the user data is passed from the PDN GW communication unit 1001 to the base station communication unit 1002 through a user plane communication unit 1003 and is then transmitted to one or a plurality of base stations 72. In the case where the data received from the base station 72 is user data, the user data is passed from the base station communication unit 1002 to the PDN GW communication unit 1001 through the user plane communication unit 1003 and is then transmitted to the PDN GW.

In the case where the data received from the PDN GW is control data, the control data is passed from the PDN GW communication unit 1001 to a control plane control unit 1005. In the case where the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception of the interface (IF) between the MME 73a and the HeNBGW 74 according to an information type. The control data received from the HeN-BGW communication unit 1004 is passed from the HeN-BGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2, an idle state mobility managing unit 1005-3, and other unit, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in an idle state, addition, deletion, update, and search of a tracking area of one or a plurality of user equipments 71 being served thereby, and tracking area list management.

The MME 73a begins a paging protocol by transmitting a paging message to the cell belonging to a tracking area in which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (for example, added, deleted, updated, or searched). For example, the relationship may be the relationship between one or a plurality of user equipments whose user access registration has been performed with a CSG-ID and the CSG cells belonging to this CSG-ID. In the whitelist management, the relationship between the user equipment and the CSG-ID is managed (for example, added, deleted, updated, or searched). As an example, one or a plurality of CSG-IDs with which user registration has been performed by a user equipment may be stored in the whitelist. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

The function of the MME 73a currently under discussion of 3GPP will be described below (see Chapter 4.6.2 of Non-Patent Document 1). The MME 73a performs access control for one or a plurality of user equipments being members of closed subscriber groups (CSGs). The MME 73a recognizes the execution of paging optimization as an option.

FIG. 11 is a block diagram showing the configuration of the HeNBGW 74 of FIG. 7 being a HeNBGW according to the present invention. An EPC communication unit 1101 performs data transmission and reception between the HeN-BGW 74 and the MME 73a by means of the S1 interface. A base station communication unit 1102 performs data transmission and reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73a through the EPC communication unit 1101. The data processed by the location processing unit 1103 is passed to the base station communication unit 1102 and is passed to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP will be described below (see Chapter 4.6.2 of Non-Patent Document 1). The HeNBGW 74 relays an S1 application. The HeNBGW 74 ends the S1 application that is not associated with the user equipment 71 though it is a part of the procedures toward the Home-eNB 72-2 and towards the MME 73a. When the HeNBGW 74 is deployed, the procedure that is not associated with the user equipment 71 is communicated between the Home-eNB 72-2 and the HeNBGW 74 and between the HeNBGW 74 and the MME 73a. The X2 interface is not set between the HeNBGW 74 and another node. The HeNBGW 74 recognizes the execution of paging optimization as an option.

An example of a cell search method in a mobile communication system will be described next. FIG. 12 is a flowchart showing an outline from a cell search to an idle state operation performed by a user equipment (UE) in the LTE communication system. When starting a cell search, in Step ST1201, the user equipment synchronizes the slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which individually correspond to physical cell identities (PCIs) assigned per cell, are assigned to the synchronization signal (SS). The number of PCIs is currently studied in 504 ways. These 504 ways are used for synchronization, and the PCIs of the synchronized cells are detected (specified).

In Step ST1202, next, the user equipment detects a cell-specific reference signal (CRS) being a reference signal (RS) transmitted from the base station per cell and measures the reference signal received power (RSRP). The codes individually corresponding to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, cell having the highest RS received power, that is, best cell, from one or more cells that have been detected up to Step ST1202.

In Step ST1204, next, the user equipment receives the PBCH of the best cell and obtains the BCCH that is the broadcast information. A master information block (MIB)

containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), the number of transmission antennas, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information about the access to the cell, information on cell selection, and scheduling information about other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC portion of a tracking area identity (TAI) in the tracking area list that has already been possessed by the user equipment. The tracking area list is also referred to as a TAI list. TAI is a TA identity and is formed of a mobile country code (MCC), a mobile network code (MNC), and a tracking area code (TAC). MCC is a country code. MNC is a network code. TAC is a TA code number.

In the case where the TAC received in Step ST1205 is identical to the TAC included in the tracking area list as a result of the comparison of Step ST1206, the user equipment enters an idle state operation in the cell. In the case where the TAC received in Step ST1205 is not included in the tracking area list as a result of the comparison, the user equipment requires a core network (EPC) including MME and the like to change a tracking area through the cell for performing tracking area update (TAU).

The core network updates the tracking area list based on an identification number (such as a UE-ID) of the user equipment transmitted from the user equipment together with a TAU request signal. The core network transmits the updated tracking area list to the user equipment. The user equipment rewrites (updates) the TAC list of the user equipment based on the received tracking area list. After that, the user equipment enters the idle state operation in the cell.

In the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. One CSG may contain a plurality of CSG cells. After being registered with any one of the CSG cells, the user equipment can access another CSG cell of the CSG to which the registered CSG cell belongs.

Alternatively, the Home-eNB in the LTE and LTE-A and the Home-NB in the UMTS are used as the CSG cell in some cases. The user equipment registered with the CSG cell has a whitelist. Specifically, the whitelist is stored in the subscriber identity module (SIM) or USIM. The whitelist stores the CSG information of the CSG cell with which the user equipment has been registered. Specific examples of the CSG information may include CSG-ID, tracking area identity (TAI), and TAC. Any one of the CSG-ID and TAC is adequate as long as they are associated with each other. Alternatively, ECGI is adequate as long as the CSG-ID and TAC are associated with ECGI.

As can be seen from the above, the user equipment that has no whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

The HeNB and HNB are required to support various services. For example, in certain service, an operator causes the predetermined HeNB and HNB to register user equipments therein and permits only the registered user equipments to access the cells of the HeNB and HNB, which increases radio resources available for the user equipments and enables high-speed communication. The operator correspondingly sets a high charge compared with a normal service.

In order to achieve the above-mentioned service, the closed subscriber group (CSG) cell accessible only to the registered (subscribed or member) user equipments is introduced. A large number of closed subscriber group (CSG) cells are required to be installed in shopping malls, apartment buildings, schools, companies, and the like. For example, the following manner of use is required: the CSG cells are installed for each store in shopping malls, for each room in apartment buildings, for each classroom in schools, and for each section in companies such that only the users who have registered with the respective CSG cells are permitted to use those CSG cells.

The HeNB/HNB is required not only to complement the communication out of the coverage of the macro cell (area complementing HeNB/HNB) but also to support various services as described above (service providing HeNB/HNB). This also leads to a case where the HeNB/HNB is installed within the coverage of the macro cell.

Widespread use of smartphones and tablet terminals explosively increases traffic in cellular radio communications, causing a fear of insufficient radio resources all over the world. To increase spectral efficiency against this fear, it is studied to downsize cells such that the cells are spatially separated.

Part (A) of FIG. 13 is an image diagram of a conventional cell configuration. 1301 denotes the coverage configured by a macro eNB (cell). The macro eNB (cell) configures a relatively wide range coverage. Conventionally, a relatively wide range coverage configured by a plurality of macro eNBs (cells) covers an area.

Part (B) of FIG. 13 is an image diagram of downsized cells. 1302 denotes the coverage configured by a small eNB (cell). The small eNB (cell) configures a narrow range coverage compared with the macro eNB (cell). Thus, a larger number of small eNBs (cells) are required to cover a coverage than in a conventional case.

Part (C) of FIG. 13 is an image diagram of macro eNBs (cells) and small eNBs (cells) that coexist. 1303 denotes the coverage configured by the macro eNB (cell), and 1304 denotes the coverage configured by the small eNB (cell). With reference to part (C) of FIG. 13, the coverage of one eNB (cell) is included in the coverage of another eNB (cell) in some cases. As described above, the coverage of a macro eNB (cell) and the coverage of a small eNB (cell) may overlap each other in a complicated manner or may not overlap each other. Further, a large number of small eNBs (cells) may be configured in the coverage of one macro eNB (cell).

Hereinafter, description will be given of the case in which a plurality of small eNBs (cells) are configured in a system as shown in part (B) of FIG. 13 and part (C) of FIG. 13.

FIG. 14 shows the architecture of a conventional EPS. 1401 denotes a P-GW; 1402, an MME; 1403, an S-GW; 1404, an eNB; and 1405, a UE. 1406 denotes an interface (S5) between the P-GW and the S-GW; 1407, an interface (S11) between the MME and the S-GW; 1408, an interface (S1-MME) between the MME and the eNB; 1409, an interface (S1-U) between the S-GW and the eNB; and 1410, an interface (Uu) between the eNB and the UE. The solid line denotes an interface that supports user traffic (U-plane), and the dashed line denotes an interface that supports signaling (C-plane). The S5 interface 1406 and the Uu interface 1410 support both of the user traffic and the signaling. As shown in the figure, in the conventional EPS, C-plane and U-plane communications are performed using one eNB for one communication with a UE being a communication target. In other words, one eNB is used to establish one RRC connection/S1 bearer.

The problem to be solved in the first embodiment will be described below. Also in a small cell, a procedure similar to a typical procedure for a cell change described in Chapter 10.1.2 of Non-Patent Document 1 (TS36.300) needs to be performed for a change (handover) of a cell during communication. However, this needs control of both of U-plane and C-plane, leading to increased procedures, as described in Chapter 10.1.2 of Non-Patent Document 1 (TS36.300). When the UE moves at some speed in an area where a plurality of small cells are concentrated, if a handover procedure is time-consuming, the UE moves to a following cell area before the completion of the handover procedure, causing a problem that handover cannot be performed appropriately. In such a case, a change (handover) of a cell during communication occurs at high frequency to considerably increase associated processes, placing a load on the network.

The solution in the first embodiment will be described below. To solve the above-mentioned problem, it is made possible to establish a plurality of RRC connections/S1 bearers for one communication, enabling a cell change without the procedure for a cell change of Chapter 10.1.2 of Non-Patent Document 1 (TS36.300).

FIG. 15 shows the architecture of an EPS according to the first embodiment. With reference to FIG. 15, a UE (1501) establishes RRC connection with three eNBs (an eNB#1 (1502), an eNB#2 (1503), and an eNB#3 (1504)), and each eNB establishes an S1 bearer with one S-GW. Here, an MME (1505) notifies the data allocation method and associated parameters based on the delivery confirmation result at Uu, the quality information, the information on arrival of a reception wave, the UE location information, or the like. Specific examples of the delivery confirmation result include Ack/Nack of HARQ and Ack/Nack of ARQ in RLC. Specific examples of the quality information include CQI and CSI. A specific example of the information on arrival of a reception wave is an angle of arrival (AoA). A specific example of the UE location information is the UE positioning estimation result.

Here, the UE (1501) corresponds to a mobile station; the eNB#1 (1502), a first base station; the eNB#2 (1503), a second base station; and the MME (1505) and the S-GW (1506), a gateway station. For C-plane signals, the RRC connection between the UE (1501) and the eNB#1 (1502) corresponds to a first radio communication connection, and the RRC connection between the UE (1501) and the eNB#2 (1503) corresponds to a second radio communication connection. Similarly, for C-plane signals, the S1-MME signaling connection between the MME (1505) and the eNB#1 (1502) corresponds to a first communication connection, and the S1-MME signaling connection between the MME (1505) and the eNB#2 (1503) corresponds to a second communication connection. For U-plane signals, the radio bearer between the UE (1501) and the eNB#1 (1502) corresponds to a first radio communication connection, and the radio bearer between the UE (1501) and the eNB#2 (1503) corresponds to a second radio communication connection. Similarly, for U-plane signals, the S1 bearer between the S-GW (1506) and the eNB#1 (1502) corresponds to a first communication connection, and the S1 bearer between the S-GW (1506) and the eNB#2 (1503) corresponds to a second communication connection.

As described above, one communication is performed between the mobile station and the gateway station by establishing the first communication connection between the gateway station and the first base station, the second communication connection between the gateway station and the second base station, the first radio communication connection between the first base station and the mobile station, and the second radio communication connection between the second base station and the mobile station. A cell change is accordingly enabled through addition or release of the communication connection or the radio communication connection.

The U-plane signals are transmitted while being distributed to a first path including the first communication connection and the first radio communication connection and a second path including the second communication connection and the second radio communication connection. The C-plane signals are transmitted while being distributed to the first path including the first communication connection and the first radio communication connection and a second path including the second communication connection and the second radio communication connection.

The S-GW (1506) transmits data while dividing the data on a per-packet basis to a plurality of eNBs whose RRC Connection/S1 bearer has been established. The packet is, for example, an internet protocol (IP) packet. The above-mentioned basis is made to coincide with the communication basis in terminals that perform IP communication to eliminate the need for dividing packets, improving transmission efficiency. 1507 to 1509 denote U-plane/C-plane channels for the eNB#1 to the eNB#3 at Uu. 1511, 1513, and 1515 denote U-plane channels between the S-GW and the eNB#1, between the S-GW and the eNB#2, and between the S-GW and the eNB#3. 1512, 1514, and 1516 denote C-plane channels between the MME and the eNB#1 to eNB#3.

The RRC connection/S1 bearer with a plurality of eNBs can be established for one communication in a specific area, the specific area being, for example, the area in the same TA, the same MME, or the same S-GW. Setting a specific area as the area in the same MME or the same TA allows for concentrated control in communication control, simplifying communication control. Setting a specific area as the area in the same S-GW allows U-plane data to be allocated at a place close to the E-UTRAN, simplifying path control.

A change of a cell during communication in the specific area does not involve a handover procedure and is performed through the addition and release of an RRC Connection/S1 bearer.

FIG. 16 shows an example sequence of establishing communication and adding a cell initiated from a UE in the architecture. The sequence includes Step ST1815 that is Service Request Procedure (plural RRC) for first establishing a bearer and Step ST1637 that is Cell Addition Procedure (addition of eNB#2) that is a cell addition procedure (addition of eNB#2) of adding an RRC Connection/S1 bearer of the eNB#2 to the established bearer.

In Step ST1815 that is the Service Request Procedure (plural RRC), the UE that has established a bearer detects and monitors neighbor cells as in a normal communication operation. In Step ST1636, the UE judges whether to add a target eNB using the detection and monitoring results.

As the method for the judgment, for example, judgment is made in accordance with whether the quality of a reference signal of a monitored cell exceeds a set threshold with respect to the current level of a cell or whether a calculated distance between the location information measured by the UE and the location information of the eNB obtained in advance by any method falls within a set threshold. Specific examples of the reference signal include a tracking RS, a demodulation RS, a CRS, and a UE-specific RS. As the method of obtaining the location information of an eNB in advance, the eNB may include the location information of the own eNB in system information and then broadcast the system information or may notify the UE of the location information through RRC signaling.

If it is judged that addition is required in the judgment for addition, Step ST1637 that is Cell Addition Procedure (addition of eNB#2) is performed.

FIG. 17 is a sequence diagram showing details of the service request procedure. Service Request Procedure (plural RRC) is based on the UE triggered Service Request procedure described in Chapter 5.3.4.1 of Non-Patent Document 11 (TS23.401). After the S-GW transmits Modify Bearer Response (UEID, bearer info) to the MME in Step ST1833, in Step ST1834, the MME notifies the associated eNB in the specific area of the information for specifying a target UE and the established bearer information using a message indicating Connected UE infor Report (UEID, bearer info). This measure is taken to increase the speed of a process procedure when the UE establishes an RRC Connection/S1 bearer for another eNB. This procedure may be skipped if higher speed is not required. In that case, Step ST1856 that is a Radio Bearer Establishment procedure, described below, needs to be performed.

As to the judgment to perform Service Request Procedure (plural RRC) or perform a normal UE triggered Service Request procedure, for example, a target eNB transmits, in the system information or the like, the information for enabling the judgment as to whether its area is an area in which the establishment of a plurality of RRC connections is permitted, and the UE receives the information to judge which of the procedures to be performed. The UE may use, in its judgment, UE capability such as the capability regarding whether a plurality of RRC connections/S1 bearers can be established with a plurality of eNBs or the moving speed of the UE.

FIG. 18 is a sequence diagram showing details of a cell addition procedure. In Step ST1838, the UE that has activated Cell Addition Procedure (eNB#2) issues a request for RRC connection including the information for specifying the established EPS bearer being an addition target (transmits RRC connection Request (existing EPS bearer)) to the eNB#2.

In Step ST1839, the eNB#2 that has received RRC connection Request (existing EPS bearer) searches for the information notified in advance from the MME in Connected UE info Report (UEID, bearer info) or the like to confirm whether there is the bearer information of a target UE. This process has an object to take a measure against a case where RRC connection Request (existing EPS bearer) is inadvertently received before the notification of Connected UE info Report (UEID, bearer info) due to, for example, a delay in the process between the MME and the eNBs#1, or a case where Connected UE info Report (UEID, bearer info) is not transmitted in the first place.

If having succeeded in confirming the bearer information of the target UE in the judgment above, in Step ST1841, the eNB#2 transmits, to the UE, the information of RRC connection corresponding to the bearer in RRC connection setup (the configuration of an RAB corresponding to an existing bearer). The UE that has received RRC connection setup (the configuration of an RAB corresponding to an existing bearer) performs the configuration and, in Step ST1842, transmits RRC connection Setup complete to the eNB. In Step ST1843, the eNB#2 that has received RRC connection Setup complete transmits Connected UE Confirmation (UE ID, existing EPS bearer) to the MME.

If having failed to confirm the bearer information of the target UE in the judgment above, in Step ST1845, the eNB#2 transmits RRC connection setup (provisional) as in the RRC Connection setup procedure in Service Request Procedure (plural RRC). The UE that has received RRC connection setup (provisional) performs the configuration and, in Step ST1846, transmits RRC connection Setup complete to the eNB. To confirm the establishment status of a bearer for a target UE, in Step ST1847, the eNB#2 that has received RRC connection Setup complete transmits the information for specifying a UE and the information of EPS bearer of which RRC connection has been requested to the MME, using Connected UE Confirmation (UE ID, existing EPS bearer).

In Step ST1850, the MME, which has received Initial Context Setup Complete or Connected UE Confirmation (UE ID, existing EPS bearer), judges whether to add this connection. For [1], in Step ST1840, the location information of the target eNB, a traffic status, or the like is taken into account to judge the addition of the connection. For [2], in Step ST1844, the presence of the existing bearer established is confirmed and, if the such a bearer is present, the addition of the connection is further made using criteria for judging similar to those of [1].

If it is judged that addition cannot be made in this judgment, in Step ST1851, the MME notifies the target eNB of Release Request (UE ID, existing EPS bearer), and the eNB that has received this notification releases target RRC connection in Step ST1848. If it is judged that addition is allowed in this judgment, the MME transmits Initial Context Setup Request to the target eNB in Step ST1852 and also transmits Modify Bearer Request to a target S-GW in Step ST1853, requesting to the configuration of adding an S1 bearer.

The eNB that has received Initial Context Setup Request performs the configuration and, in Step ST1859, transmits Initial Context Setup Complete to the MME. The S-GW that has received Modify Bearer Request performs the configuration and, in Step ST1854, transmits Modify Bearer Response to the MME. In Steps ST1860 to 1862, the MME that has confirmed the addition of each bearer notifies an associated eNB of an update of the bearer information, using Connected UE info Report (UEID, bearer info).

Consequently, the addition of an RRC Connection/S1 bearer is enabled.

FIG. 19(A) shows an example sequence of adding an RRC Connection/S1 bearer of an eNB#3 initiated from a UE. The procedure of FIG. 19(A) is obtained by adding an RRC Connection/S1 bearer of the eNB#3 initiated from a UE after the procedure of FIG. 18.

FIG. 19(B) is a sequence diagram showing details of a cell addition procedure. For the procedure added, the eNB#2 of FIG. 18 may be replaced with an eNB#3, which will not be described here.

FIG. 20 shows an example sequence of adding an RRC Connection/S1 bearer to a target UE in accordance with the judgment by the eNB. Illustrated here is an example in which the eNB#1 makes judgment. First, in Step ST1815 that is Service Request Procedure (plural RRC), the UE completes the connection with the eNB#1. In Step ST2001, the UE that is connected with the eNB#1 notifies the eNB#1 of neighbor cell information in Measurement Report as usual. The UE may add and notify not only the normal quality information but also the UE location information of In Step ST2002, the eNB that has received Measurement Report judges whether to add a target eNB from the received quality information of a neighbor cell or the received UE location information. Although this judgment may be similar to the existing judgment regarding handover, it is desirable to take into account the establishment of a plurality of connections.

In this example sequence, the addition of an eNB#2 is judged in Step ST2002. In Step ST2003, the eNB#1 that has judged the addition requests the UE to add the eNB#2 in RRC Connection add Request (eNB 2). The UE that has received RRC Connection add Request (eNB 2) performs Step ST1637 that is Cell Addition Procedure (addition of eNB#2) described with reference to FIG. 18 to establish the connection with the eNB#2.

After that, the addition of the eNB#3 is judged in Step ST2005. After that, a process similar to the addition of the eNB#2 is performed. This addition may be judged by the eNB#2 or may be performed any one the eNBs. The judgment by any one of the eNBs needs the process of handing over a judgment authorization between eNBs using, for example, an X2 interface. When the judgment is performed by both of the eNBs, the UE discards the same request for addition.

FIG. 21 shows an example sequence of adding an RRC Connection/S1 bearer to a target UE in accordance with the judgment by the MME. First, in Step ST1815 that is Service Request Procedure (plural RRC), the UE completes the connection with the eNB#1. Notifying each eNB of Connected UE info Report (UEID, bearer info) may be omitted here. In Step ST2101, the UE that is connected with the eNB#1 notifies the eNB#1 of neighbor cell information in Measurement Report as usual. Here, not only the normal quality information but also the UE location information may be added to be notified. In Step ST2102, the eNB#1 that has received Measurement Report notifies the MME of the received information in Connection Quality Report (UEID, Quality (own cell, other cell), Location).

In Step ST2103, the MME that has received Connection Quality Report (UEID, Quality (own cell, other cell), Location) judges whether to add a target eNB from the received quality information of a neighbor cell and the received UE location information. This example sequence shows the case where the addition of the eNB#2 is judged in Step ST2103.

In Step ST2105, the MME that has judged the addition of the eNB#2 notifies the eNB#2 of the existing bearer in Connected UE info Report (UEID, bearer info). If notification is made in Service Request Procedure (plural RRC), the transmission of this message is not required.

The MME that has judged the addition of the eNB#2 notifies the eNB#1 of a request to add the eNB#2 in Connection add Request (eNB 2) in Step ST2106, and the eNB#1 notifies the UE of a request to add the eNB#2 in RRC Connection add Request (eNB 2) in Step ST2107. The UE that has received RRC Connection add Request (eNB 2) transmits RRC Connection request (existing EPS bearer) to the eNB#2 in Step ST2108, and the eNB#2 that has received the request transmits RRC connection setup (the configuration of a RAB corresponding to an existing bearer) to the UE in Step ST2109. The UE that has completed the configuration transmits RRC connection Setup complete to the eNB#2 in Step ST2110, and the eNB#2 that has received RRC connection Setup complete transmits Connected UE Confirmation (UE ID, existing EPS bearer) to the MME in Step ST2111.

Hereinafter, the configuration of a bearer is changed using Step ST2112 that is Initial Context Setup Request, Step ST2113 that is Modify Bearer Request, Step ST2114 that is Modify Bearer Response, and Step ST2115 that is Initial Context Setup Complete among the eNB#2, the MME, and the S-GW, completing the addition of an RRC Connection/S1 bearer. After that, Connected UE info Report (UEID, bearer info) may be notified each eNB.

Hereinafter, the eNB#3 is added in the same manner as with the eNB#2.

Consequently, the RRC Connection/S1 bearer initiated from the MME can be added.

FIG. 22 shows an example sequence of releasing the RRC Connection/S1 bearer of the eNB#1 initiated from the UE. The UE first completes the connection with the eNB#1 in Step ST1815 that is Service Request Procedure (plural RRC), and then, adds the eNB#2 in Step ST1637 that is Cell Addition Procedure (addition of eNB#2).

The UE that has established the bearer detects and monitors another neighbor cell as in a normal communication operation. Based on the detection and monitoring results, the UE judges the release of a target eNB in Step ST2201. As the method for judgment, for example, the UE makes judgment based on whether the quality of a reference signal of a monitoring cell falls below a set threshold with respect to the current level of a cell or when the distance, which has been calculated between the location information measured by the UE and the location information of the eNB obtained in advance by any method, falls outside a set threshold.

If it is judged that release is required in this judgment for release, in Step ST2202, the UE transmits a release request (RRC Release Request (eNB#1)) to the eNB (here, eNB#2) having a good communication environment for connection. The eNB#2, which has received the release request, requests the MME to release the bearer in UE Context Release Request (eNB#1) in Step ST2204. The MME, which has received UE Context Release Request (eNB#1), judges for connection release in Step ST2205. This judgment is performed, for example, as a measure to prevent such a situation that the addition process and the release process are switched due to a process delay or the like, and thus, all the bearers are released, or to reduce an excessive volume of traffic of the remaining bearers.

If the MME judges that release is not allowed in the connection release judgment, the MME notifies the eNB#2 that release is not allowed in UE Context Release Response (reject) in Step ST2206. If the MME judges that release is allowed in the connection release judgment, the MME requests the eNB#1 to release the bearer in UE Context Release Command in Step ST2209, and the eNB#1 that has completed the release notifies UE Context Release Complete in Step ST2211. On this occasion, in Step ST2210, the eNB#1 may transmit RRC Connection Release to the UE. In Step ST2207, the MME requests the S-GW to release a target bearer in Modify Bearer Request (release). After the completion of the configuration, in Step ST2208, the S-GW transmits Modify Bearer Response. The MME that has confirmed the release of the bearer notifies each eNB of the update of the bearer in Connected UE info Report (UEID, bearer info) in Steps ST2212 to 2214.

Consequently, the UE-initiated RRC Connection/S1 bearer can be released.

FIG. 23 shows an example sequence of releasing the RRC Connection/S1 bearer of the eNB initiated by itself. As in FIG. 20, the UE first completes the connection with the eNB#1 in Step ST1815 that is Service Request Procedure (plural RRC), and adds the eNB#2 in Step ST1637 that is Cell Addition Procedure (addition of eNB#2). In Step ST2301, the UE that is connected with the eNB#1 and the eNB#2 notifies the eNB#1 (and eNB#2) of the neighbor cell information in Measurement Report as usual. Here, not only the normal quality information but also the UE location information may be added to be notified.

In Step ST2302, the eNB that has received Measurement Report judges whether to release its link in accordance with the received quality information of a neighbor cell, the UE location information, and the uplink quality information (such as the quality of a reception signal, the number of L2 retransmissions, and an angle of arrival) of a target UE measured by the eNB.

If it is judged that release is necessary in the judgment for release, in Step ST2304, the eNB#1 requests the MME to release the bearer in UE Context Release Request. The subsequent procedures are similar to RB/S1 Release Procedure 2 (release of eNB#1) of FIG. 20.

FIG. 24 shows an example sequence of releasing the RRC Connection/S1 bearer of another eNB, which is initiated by the eNB. As in FIG. 20, the UE first completes the connection with the eNB#1 in Step ST1815 that is Service Request Procedure (plural RRC), and then adds the eNB#2 in Step ST1637 that is Cell Addition Procedure (addition of eNB#2). In Step ST2401, the UE that is connected with the eNB#1 and the eNB#2 notifies the eNB#2 (and the eNB#1) of the neighbor cell information in Measurement Report as usual. Here, not only the normal quality information but also the UE location information may be added to be notified.

In Step ST2402, the eNB#2 that has received Measurement Report judges whether to release another eNB (here, eNB#1) in accordance with the received quality information of a neighbor cell and the UE location information.

If it is judged that release is necessary in the judgment for release, Step ST2203 that is RB/S1 Release Procedure 2 (release of eNB#1) of FIG. 22 is activated to release the bearer.

FIG. 25 shows an example sequence of releasing the RRC Connection/S1 bearer of the eNB initiated from the MME. As in FIG. 20, the UE first completes the connection with the eNB#1 in Step ST1815 that is Service Request Procedure (plural RRC), and then adds the eNB#2 in Step ST1637 that is Cell Addition Procedure (addition of eNB#2). In Step ST2501, the UE that is connected with the eNB#1 and the eNB#2 notifies the eNB#2 (and eNB#1) of the neighbor cell information in Measurement Report as usual. Here, not only the normal quality information but also the UE location information may be added to be notified. In Step ST2102, the eNB#2 that has received Measurement Report notifies the MME of the received information in Connection Quality Report (UEID, Quality (own cell, another cell), Location).

In Step ST2502, the MME that has received Connection Quality Report (UEID, Quality (own cell, another cell), Location) judges the release of a target eNB from the received quality information of a neighbor cell and the UE location information.

If judging that release is necessary in the judgment for release, in Step ST2504, the MME requests the S-GW to release a target bearer in Modify Bearer Request (release). The subsequent procedures are similar to RB/S1 Release Procedure 2 (release of eNB#1) of FIG. 20.

FIG. 26 shows an example sequence of releasing an RRC Connection/S1 bearer when time-out of which is detected. As in FIG. 20, the UE first completes the connection with the eNB#1 in Step ST1815 that is Service Request Procedure (plural RRC), and then, adds the eNB#2 in Step ST1637 that is Cell Addition Procedure (addition of eNB#2). After that, if the eNB has not performed data transmission in the radio section of a target UE for a long period and the eNB#1 detects data time-out (expiration of data monitoring timer) in Step ST2602, the procedure of Step ST2603 that is RB/S1 Release Procedure 1 (release of eNB#1) of FIG. 26 is performed, releasing a target bearer. Also for the UE, a target bearer is released in the case where the UE detects data time-out of the eNB#1 (expiration of data monitoring timer) is detected in Step ST2601.

FIG. 27(A) shows an example sequence of data transmission in the case where a plurality of RRC connections/S1 bearers are configured. In this example, an RRC Connection/S1 bearer has been configured between the UE and each of the eNB#1, the eNB#2, and the eNB#3. Here, downlink data transmission and uplink data transmission are described separately. Uplink and downlink are not relevant to each other though downlink is described first. Uplink and downlink data transmissions are both performed constantly.

The downlink data transmission is described first. In Steps ST2703 to 2705, the UE that is connected the eNB#1, the eNB#2, and the eNB#3 notifies the eNB#1, the eNB#2, and the eNB#3 of the neighbor cell information in Measurement Report as usual. The UE may notify any one of the eNBs. Not only the normal quality information but also the UE location information may be added to be notified.

The following three will be disclosed as specific examples of notifying any one of the eNBs.

(1) All the measurement results of the eNBs are notified any one of the eNBs.

(2) Although measurement is performed in accordance with the measurement configuration of each eNB, reporting is performed to only any of the eNBs in accordance with the configuration.

(3) Measurement is performed in accordance with the measurement configuration of any one of the eNBs, and reporting is performed to only this one eNB in accordance with the configuration.

In every example, the UE notifies only one eNB, simplifying control to reduce power consumption as a result of reduced transmission time. In (2), further reduced number of transmissions, further simplified control, and further reduced power consumption can be achieved because an event for a measurement report is limited to the measurement configuration of any one eNB. In (3), further reduced measurement processes, further simplified control, and further reduced power consumption can be achieved because measurements are merely performed in accordance with the configuration of any one eNB.

In Step ST2706, subsequently, a downlink traffic control procedure (DL Traffic Control Procedure) is performed. Subsequent to this, in Step ST2715, an uplink traffic control procedure (UL Traffic Control Procedure) is performed.

FIG. 27(B) is a sequence diagram showing details of the downlink traffic control procedure. In Steps ST2707 to 2709, each eNB that has received Measurement Report notifies the MME of the information in Connection Quality Report (UEID, Quality, Location).

The MME that has received Connection Quality Report (UEID, Quality, Location) calculates a ratio of the quality of each link from the received quality information of a neighbor cell and the received UE location information. The MME determines, in Step ST2710, the final packet distribution ratio to each eNB in consideration of the ratio of quality and the traffic situation of each cell, and in Step ST2711, notifies the S-GW of the ratio in Packet DL TX Ratio IND (UEID, Connection1, Connection2, Connection3). The S-GW distributes the received packets to each eNB in accordance with the ratio (Steps ST2712 to 2714). Here, the packets received by the S-GW are not, for example, separated or combined, and the received packets and the packets transmitted to each eNB have one-to-one correspondence. The distribution ratio is determined constantly in accordance with an update of the quality of each link and traffic data.

Uplink data transmission will now be described.

FIG. 27(C) is a sequence diagram showing details of the uplink traffic control procedure. The UE (AS) that is connected with the eNB#1, the eNB#2, and the eNB#3 measures the quality of the links of the eNB#1, the eNB#2, and the eNB#3 as usual in Step ST2716, notifies the NAS of the UE of the information in Step ST2717, and then calculates the ratio of the quality of each link in Step ST2718. Then, the NAS notifies the AS of the ratio in Step ST2719 and distributes the transmission packets to the link of each eNB in Steps ST2720 and 2721 for transmission. The UE notifies the amount of transmission data for each eNB in a buffer status report (BSR) for each eNB, and performs transmission in accordance with the scheduling performed by each eNB using the BSR. The distribution ratio is performed constantly in accordance with an update of the quality of each link.

All or part of the example sequences of the figures described above may be applied.

The first embodiment allows a plurality of RRC Connections/S1 bearers to be configured for one connection, enabling a change of a cell during communication through addition/release of the RRC Connection/S1 bearer. This eliminates the HO procedure as described in Chapter 10.1.2 of Non-Patent Document 1 (TS36.300), enabling an appropriate cell change also in the case where the UE moves at some speed in an area where a plurality of small cells are concentrated. In addition, U-plane control is not required, reducing a load on a network.

Second Embodiment

As described in the first embodiment, an increase in communication capacity is required as a system. Downsizing cells to increase spectral efficiency is studied to increase communication capacity. The first embodiment has disclosed the method of enabling an appropriate cell change even in a situation where a plurality of small cells, which have been downsized, are concentrated.

However, the method disclosed in the first embodiment requires the control process for establishing RRC connection with a plurality of eNBs (cells), causing signaling and a control delay.

The second embodiment therefore discloses the method of performing communication using a plurality of eNBs (cells) without establishing RRC connection with the plurality of eNBs (cells).

3GPP proposes C/U plane split and multi-stream as the method of performing communication using a plurality of cells without establishing a plurality of RRC connections (see Non-Patent Document 12 (RWS-120010) and Non-Patent Document 13 (RWS-120006)). Unlike the method of establishing RRC connection and a U-plane side bearer using one eNB (cell), which is performed in a conventional communication system, the architecture including an MME or an S-GW, the method of establishing a bearer, and the like are required to perform communication using a plurality of eNBs (cells) without establishing RRC connection with the plurality of eNBs (cells). There is, however, no disclosure about the architecture including an MME or an S-GW, the method of establishing a bearer, or the like.

Disclosed here is a method of performing communication using a plurality of eNBs (cells) without establishing RRC connection with the plurality of eNBs (cells).

C-plane connection is established using one eNB (cell) for one communication, and U-plane connection is established using a plurality of eNBs (cells). Hereinafter, the eNB (cell) that establishes (should establish or has established) C-plane connection may be referred to as a C-plane establishing eNB (cell), and the eNB (cell) that establishes (should establish or has established) U-plane connection may be referred to as a U-plane establishing eNB (cell). The eNB (cell) that establishes only U-plane connection may be referred to as a U-plane only establishing eNB (cell).

RRC connection is established as C-plane connection, and a bearer is established as U-plane connection. The bearer may be a data radio bearer (DRB)/S1 bearer. The DRB is a radio bearer for user data.

The eNB whose bearer alone is established has at least a function related to bearer control.

An example of the function related to bearer control is the function of establishing/controlling/releasing E-RAB being the bearer between the S-GW and the UE. Specific examples thereof include the function of establishing, configuring, maintaining, and releasing point to point radio bearers and the E-RAB service management function.

As the method of deploying cells, a coverage cell for providing fundamental coverage and a capacity cell (capacity booster cell) for increasing communication capacity are studied (see Non-Patent Document 14 (TR36.927)). The eNB (cell) that establishes C-plane connection may be a coverage cell, and the eNB (cell) that establishes only U-plane connection may be a capacity cell.

The eNB (cell) that establishes C-plane connection may be a macro eNB (cell), and the eNB (cell) that establishes only U-plane connection may be a small eNB (cell).

The macro eNB is an eNB that configures a macro cell with a relatively wide coverage area. The macro eNB may be a wide area base station (see Non-Patent Document 15 (TS36.141)).

The small eNB is an eNB that configures a small cell with a relatively narrow coverage area. The small eNB may be a low power node, local area node, hotspot, or the like. Alternatively, the small eNB may be a pico eNB (cell), femto eNB (cell), HeNB, RRH, RRM, or RN. Still alternatively, the small eNB may be a local area base station or home base station (see Non-Patent Document 15 (TS36.141)).

The eNB (cell) that establishes U-plane connection may be merely referred to as a node because it needs not to have all the functions of the eNB or cell.

If the eNB that establishes only U-plane connection is an RN, the DeNB may be a C-plane establishing eNB. The method disclosed in a second modification of the second embodiment, described below, may be applied. A backhaul link established between the DeNB and the RN may be used as the interface between a C-plane establishing eNB and a U-plane establishing eNB. In this case, a configuration may be made such that the frequency layer of the link between the DeNB and the UE differs from the frequency layer of the link between the RN and the UE. For the RN, the interface between the C-plane establishing eNB and the U-plane establishing eNB is a radio, enabling a number of U-plane establishing eNBs to be installed flexibly.

FIG. 28 shows the architecture of an EPS according to the second embodiment. 2801, 2802, 2803, 2804, 2805, and 2806 denote P-GW, S-GW, MME, C-eNB, U-eNB, and UE, respectively. The eNB that establishes C-plane connection is denoted as a C-eNB, and the eNB that establishes only U-plane connection is established is denoted as a U-eNB. The C-eNB may establish C-plane connection as well as U-plane connection.

2807 denotes an interface (S5) between the P-GW and the S-GW; 2808, an interface (S11) between the MME and the S-GW; 2809 and 2815, an interface (S1-MME) between the MME and the eNB (C-eNB, U-eNB); 2813 and 2814, an interface (S1-U) between the S-GW and the eNB (C-eNB, U-eNB); 2810 and 2811, an interface (Uu) between the eNB (C-eNB, U-eNB) and the UE; and 2812, an interface between the eNBs. The interface 2812 may be X2 or a new interface may be provided. As in FIG. 14, the solid line represents an interface that supports user traffic (U-plane), and the dashed line represents an interface that supports signaling (C-plane).

A plurality of eNBs are used for one communication as in FIG. 15 disclosed in the first embodiment. In this embodiment, however, RRC connection is established by one eNB. In other words, C-plane connection is established using one eNB, and U-plane connection is established using a plurality of eNBs. In the example of the figure, one eNB that establishes C-plane connection is the C-eNB, and a plurality of eNBs that establish U-plane connection are the C-eNB and U-eNB.

In this embodiment, RRC connection is established using the Uu (2810) interface between the C-eNB (2804) and the UE (2806) being a communication target. That is, with reference to the figure, C-plane connection indicated by the dashed line is established between the C-eNB (2804) and the UE (2806). Meanwhile, only the communication of U-plane-side data (user data) is performed using the Uu (2811) interface between the U-eNB (2805) and the UE (2806) being a communication target. That is, only the U-plane connection indicated by the solid line is established between the U-eNB (2805) and the UE (2806). U-plane connection may be established between the C-eNB (2804) and the UE (2806) as in conventional cases.

Although the interface 2811 for U-plane connection between the U-eNB (2805) and the UE (2806) is Uu here, not Uu but a new interface may be provided which has only a U-plane connection function.

In this embodiment, for the UE (2806) being a communication target, the user data is communicated between the U-eNB (2805) and the S-GW (2802) using the interface (S1-U) 2813. For the UE (2806) being a communication target, signaling is communicated between the U-eNB (2805) and the MME (2803) using the interface (S1-MME) 2815. As described below, however, the signaling for the UE (2806) being a communication target is limited. This signaling may be signaling required for performing at least bearer control by the U-eNB (2805).

Here, the UE (2806) corresponds to a mobile station; the C-eNB (2804), a first base station; the U-eNB (2805), a second base station; and the MME (2803) and the S-GW (2802), a gateway station. For C-plane signals, the RRC connection between the UE (2806) and the C-eNB (2804) corresponds to a first radio communication connection. Similarly, for C-plane signals, the S1-MME signaling connection (2809) between the MME (2803) and the C-eNB (2804) corresponds to a first communication connection, and the S1-MME signaling connection (2815) between the MME (2803) and the U-eNB (2805) corresponds to a second communication connection. For U-plane signals, the radio bearer between the UE (2806) and the C-eNB (2804) corresponds to a first radio communication connection, and the radio bearer between the UE (2806) and the U-eNB (2805) corresponds to a second radio communication connection. Similarly, for U-plane signals, the S1 bearer (2814) between the S-GW (2802) and the C-eNB (2804) corresponds to a first communication connection, and the S1 bearer (2813) between the S-GW (1506) and the U-eNB (2805) corresponds to a second communication connection.

One communication is performed between the mobile station and the gateway station by establishing the first communication connection between the gateway station and the first base station, the second communication connection between the gateway station and the second base station, the first radio communication connection between the first base station and the mobile station, and the second radio communication connection between the second base station and the mobile station as described above. A cell change is accordingly enabled through addition or release of the communication connection or the radio communication connection.

The U-plane signals are transmitted while being distributed to a first path including the first communication connection and the first radio communication connection and a second path including the second communication connection and the second radio communication connection. The C-plane signals are transmitted while being distributed to a first path including the first communication connection and the first radio communication connection and a second path including the second communication connection and the second radio communication connection.

FIG. 29 shows the protocol stack of the eNB according to the second embodiment. 2901 denotes a C-eNB, which is connected to the S1-MME interface as C-plane and is connected to the S1-U interface as U-plane. A portion 2902 surrounded by a dashed line is a protocol for C-plane connection, and a portion 2903 surrounded by a dashed line is a protocol for U-plane connection. In the C-eNB, 2904 denotes an RRC protocol; 2907, a PDCP protocol; 2908, an RLC protocol; 2912, a MAC protocol; and 2911, a PHY protocol. The MAC protocol 2912 has a multiplexing (MPX)/scheduling function 2909 and a HARQ function 2910. These protocols also function for C-plane and U-plane. For C-plane, the protocol has paging, system information (SI), and a signaling function of the control information by a signaling radio bearer (SRB) being a radio bearer for signaling (2905). For U-plane, the protocol has a user data transmission function by a data radio bearer (DRB) being a radio bearer for user data DRB (2906).

2913 denotes a U-eNB, which is connected to the S1-MME interface as C-plane and is connected to the S1-U interface as U-plane.

First, the protocol for the UE that establishes C-plane connection for the U-eNB will be described. A portion 2914 surrounded by a dashed line is the protocol for C-plane connection, and a portion 2915 surrounded by a dashed line is the protocol for U-plane connection. In U-eNB, 2917 denotes an RRC protocol; 2920, a PDCP protocol; 2921, an RLC protocol; 2925, a MAC protocol; and 2924, a PHY protocol. The MAC protocol 2925 has a multiplexing (MPX)/scheduling function 2922 and a HARQ function 2923. These protocols also function for C-plane and U-plane.

Next, the protocol for the UE that establishes only U-plane connection will be described. The protocol 2914 for C-plane connection is not configured, which, however, has at least a function 2916 relating to bearer control. The function 2916 may be possessed as an RRC function. The PDCP protocol 2920, RLC protocol 2921, MAC protocol 2922, and PHY protocol 2924 accordingly have only the function for U-plane, that is, have only the function for establishing a bearer.

In configuring an eNB dedicated for establishing U-plane, the protocol 2914 for establishing C-plane connection needs not to be included in the U-eNB 2913, leading to a simplified configuration.

A method of establishing a bearer using a plurality of eNBs (cells) will now be disclosed.

In this embodiment, the MME selects an eNB with which a DRB/S1 bearer should be established for the UE being a communication target.

For example, the quality information or location information notified in the measurement report of a UE, which has been disclosed in the first embodiment, may be used as criteria for selection.

The following eleven are specific examples of criteria for selection.

(1) Quality information on communication between a UE and a cell.
(2) UE location information.
(3) Path loss between a UE and a cell.
(4) Arrival information of a reception wave from a UE in a cell.
(5) Speed or speed class of a UE.
(6) Traveling direction of a UE.
(7) Delivery confirmation result at Uu between a UE and a cell.
(8) Load status of a cell.
(9) UE capability information.
(10) UE type information.
(11) Combination of (1) to (10).

As to (1), specific examples of the quality information on communication include the RSRP and RSRQ measured by the UE. The quality information on communication may be uplink communication quality measured by a cell. As to (2), the UE with a global positioning system (GPS) or the UE connectable with a GPS can obtain the UE location information through measurement. This UE location information may be used. In another method, a location service (LCS) may be used. A network-side node may obtain the location information of a target UE from the LCS server. As to (3), if the UE can measure a path loss from the reception power from the cell and the cell transmission power notified from the cell, this path loss information may be used. The specific example (4) may be used if the cell can measure an angle of arrival (AoA) of a reception wave from a UE. The specific example (5) may be measured by the UE with a GPS or the UE connectable with a GPS, using the GPS. Or, the speeds may be classified into predetermined speed classes and represented as speed class. In another method, a speed class may be derived from the number of HOs or the number of changes of connection of a macro cell in a predetermined period of time, or the number of changes of connection of a small cell in a predetermined period of time. The derivation may be performed by a network-side node, not by a UE. The specific example (6) may be measured by the UE with a GPS or the UE connectable with a GPS, using the GPS. In another method, the travelling direction of a UE may be derived from the number of HOs or the number of changes of connection of a macro cell in a predetermined period of time or the number of changes of connection of a small cell. The derivation may be performed by a network-side node, not by a UE. The network-side node may recognize the position of a macro cell or a small cell to measure the traveling direction of a UE depending on an order in which the cell to which the UE connects has been changed. As to (7), the confirmation result of data delivery performed between the UE and the cell may be used. Specific examples thereof include HARQ and ARQ. The eNB (cell) can obtain the delivery confirmation result at Uu between the UE and the own cell. As to (8), each cell may notify the MME or a neighbor cell of the information indicative of the load status of the own cell. The cell load status may be a cell traffic status. As to (9), the capability information of a UE is, for example, the information indicative of the number of eNBs that can establish a DRB/S1 bearer (in application to the first embodiment, the information indicative of the number of eNBs that can establish an RRC connection/S1 bearer). Or, the capability information of a UE may be the UE capability information specified in specifications. As to (10), examples of the UE type information include the information indicative of whether the UE is a terminal for a machine type communication (MTC) or a normal UE.

Disclosed below is a method of recognizing, by an MME, the criteria in selecting an eNB that should establish a DRB/S1 bearer with the UE.

In the use of the information measured by the UE as criteria (also referred to as UP supported information), the information is notified from the UE to a C-plane establishing eNB. RRC signaling may be used in the notification.

The following three are described as specific examples of the trigger for notification.

(1) Instruction from a C-plane establishing eNB.
(2) Periodically.
(3) Occurrence of an event.

As to (2), for example, notification is made in accordance with a predetermined time period. This period may be notified in advance from the C-plane establishing eNB to the UE or may be determined in advance in specifications or the like as a system.

As to (3), for example, notification may be made in the occurrence of an event in accordance with predetermined criteria, for example, notification is made when a measured value exceeds a predetermined threshold.

Specific examples of the UE supported information include
(1) Information measured by a UE, and
(2) Cell identifier.

(1) is, for example, the information obtained by a UE through measurement among the above-mentioned criteria for selection. (2) may be notified in the case where it is necessary to identify to which cell the information relates.

The conventional measurement event may be used in the method of notifying UE supported information. The following two are specific examples of the information notified in a measurement report.

(1) Quality information on communication between a UE and a cell, such as RSRP or RSRQ.

(2) Cell identifier.

In addition, the UE supported information may be included in a measurement report. The UE notifies the C-plane establishing eNB of the information described above in the measurement report.

The C-plane establishing eNB that has received the information notifies the MME of the information. S1 signaling may be used in the notification. In this case, the information for recognizing a UE from which UE information is transmitted may be included. The information may be a UE identifier (UE-ID) identifiable by the MME or may be a mobile subscriber identity identifiable by the MME. The information may be a UE identifier used in the MME, mobile subscriber identity, or the identifier of the own cell (C-plane establishing eNB (cell) for the UE) and the UE identifier used in the own cell (C-plane establishing eNB (cell)).

The MME can use the UE supported information received from the C-plane establishing eNB to select an eNB with which a DRB/S 1 should be established.

In the use of the information measured or obtained by a network-side node as criteria, each node notifies the MME of the information. When the network-side node is an MME, no notification is required. As in the method described above, there may be included the information for recognizing the information of which UE, information with which eNB (cell), and information of which eNB (cell).

This method can be applied to the case in which an eNB selects another eNB, disclosed in the first embodiment, and can also be applied to the cases in which the C-plane establishing eNB selects a U-plane establishing eNB in a third modification of the second embodiment to a first modification of a third embodiment described below. In this case, the C-plane establishing eNB needs not to notify the MME of the information.

Alternatively, this method is also applicable to determination of packet allocation (determination of packet transmission allocation) described below, disclosed in the first embodiment. Still alternatively, if the quality information on uplink communication with each U-plane establishing eNB can be used, the information may be used to determine packet allocation. The quality information on uplink communication with the UE is measured by a U-plane establishing eNB. The U-plane establishing eNB may notify the MME of the information.

To establish an E-RAB, the MME configures the E-RAB of each eNB selected. Specific examples of the E-RAB configuration include an E-RAB identifier (E-RAB ID) and a QoS parameter.

If there is an eNB that has established an E-RAB, the MME modifies the E-RAB configuration for the eNB.

If there is only one EPS bearer, the E-RAB configuration to be configured for each eNB may be the same. If there is no change in the EPS bearer, the E-RAB configuration may be the same as the E-RAB configuration that has been configured for the C-plane establishing eNB. In this case, only the E-RAB identifier may differ. This allows the E-RAB configuration in each eNB to be dedicatedly handled using the identifier.

The MME notifies each eNB of the information for configuring an E-RAB with the UE being a communication target. The examples of the information include the information about the UE being a communication target, the E-RAB configuration configured or modified by the MME. The modified E-RAB configuration may not be notified the eNB whose E-RAB configuration has not been changed after the modification of the E-RAB by the MME.

Initial context setup request message of S1 may be used as signaling. Of the initial context setup request message, only the information related to the E-RAB configuration may be notified. The UE context modification request message of S1 may be used to modify the information related to the UE.

The E-RAB setup request message of S1 may be used to configure an E-RAB. The E-RAB modify request message may be used to modify the configured E-RAB.

There may be newly provided a list of the correspondence between each of the U-plane establishing eNBs and the E-RAB configuration of each of the U-plane establishing eNBs. E-RAB list_U-plane may be provided. The MME may notify each U-plane establishing eNB of the list. This allows each U-plane establishing eNB to recognize the E-RAB configuration of another U-plane establishing eNB.

The MME may also notify each U-plane establishing eNB of the information about a C-plane establishing eNB. The information may be notified together with the information for configuring the E-RAB. The information about a C-plane establishing eNB may be the identifier or address of the C-plane establishing eNB. This allows each U-plane establishing eNB to notify the C-plane establishing eNB of the necessary information. For example, in such a case where the DRB configuration information configured by each U-plane establishing eNB is notified the UE via a C-plane establishing eNB, described below, the DRB configuration information can be notified the C-plane establishing eNB.

Each U-plane establishing eNB uses the E-RAB configuration information received from the MME to perform the process required for establishing a DRB/S1 bearer for the UE being a communication target. Each U-plane establishing eNB configures a DRB for a radio section. Each U-plane establishing eNB uses the E-RAB configuration notified from the MME through the RRC function to configure a DRB to be established between a UE being a communication target and itself. Examples of the DRB configuration include the configuration of a DRB identifier and the configuration of a lower layer. Examples of the lower layer include the PDCP configuration, RLC configuration, MAC configuration, and PHY configuration.

Each U-plane establishing eNB that has configured a DRB notifies the UE of the DRB configuration information. The DRB configuration information may include the identifier of the own eNB (cell) for identifying the DRB configuration information of which U-plane establishing eNB or the identifier of the UE being a communication target to be notified. Each U-plane establishing eNB may notify the system information of the own eNB (cell). In the case where each U-plane establishing eNB configures an ePDCCH being an extended downlink control channel for scheduling for the UE being a communication target, the ePDCCH configuration information may be notified together. Alternatively, the information indicative of a request for establishing U-plane may be notified together.

Disclosed below are two specific examples in which a U-plane establishing eNB notifies a UE of the DRB configuration information, system information, the ePDCCH configuration information, and the information indicative of a request for establishing U-plane.

(1) Notification is made via a C-plane establishing eNB.

(2) Notification is made via an MME and a C-plane establishing eNB.

The method (1) of making notification via a C-plane establishing eNB will be disclosed. Each U-plane establishing eNB that has configured a DRB notifies the C-plane establishing eNB of, for example, the DRB configuration information. A new interface may be provided or an X2 interface may be provided in this notification. A new message may be provided for notification.

The DRB configuration information or the like may be provided as the transparent container information. For transparent container information, the C-plane establishing eNB (cell) may notify the UE of the container information as it is. The information included in the AS-config message of the U-plane establishing eNB may be listed on the container information. The DRB configuration information and the system information per U-plane establishing eNB may be included in RadioResourceConfigDedicated information of the AS-config message. The information may be a DRB list.

The C-plane establishing eNB (cell) notifies the UE of, for example, DRB configuration information of each of all the U-plane establishing eNBs, which establish U-plane between the UE and them.

A list of each U-plane establishing eNB and its DRB configuration (DRB list_U-plane) may be provided. The C-plane establishing eNB may notify the UE of the list.

RRC signaling may be used in this notification. A new message may be provided, or the DRB configuration information of the U-plane establishing eNB and the system information may be included in an existing RRC message to be notified. The RRC connection reconfiguration message or AS-config message may be used as a specific example of the existing RRC message. The DRB configuration information and the system information per U-plane establishing eNB may be included in the RadioResourceConfigDedicated information in the RRC connection reconfiguration message or AS-config message. The information may be a DRB list.

Notification can be made without using an MME in the method (1), reducing an amount of signaling as a system.

The method (2) of making notification via an MME and a C-plane establishing eNB will be disclosed. Each U-plane establishing eNB that has configured a DRB notifies the MME of the DRB configuration information or the like.

An S1 interface may be used in this notification.

The MME notifies the C-plane establishing eNB of the DRB configuration information or the like. A list of each U-plane establishing eNB and its DRB configuration may be provided. The list may be DRB list_U-plane. An S1 interface may be used in this notification. A new message may be provided for notification using an S1 interface.

The C-plane establishing eNB (cell) notifies the UE being a communication target of the DRB configuration information or the like received from the MME. A list of each U-plane establishing eNB and its DRB configuration may be provided. The list may be DRB list_U-plane. The C-plane establishing eNB may notify the UE of the list. RRC signaling may be used in this notification. The method (1) is applicable to this notification.

The DRB configuration information or the like may be provided as transparent container information also in (2). For the transparent container information, the MME may notify the C-plane establishing eNB of the container information as it is. Further, the C-plane establishing eNB (cell) may notify the UE of the container information as it is. The information included in the AS-config message of a U-plane establishing eNB may be listed on the container information.

The RadioResourceConfigDedicated information of the AS-conifg message may include the DRB configuration information and the system information per U-plane establishing eNB. The information may be a DRB list.

The method (2) allows the UE to be notified of the DRB configuration information even in the case where no interface is provided between the C-plane establishing eNB and the U-plane establishing eNB.

The UE being a communication target can thus recognize the DRB configuration information for establishing a DRB with the eNB with which a U-plane is established. The UE can also recognize the system information for connecting with the eNB with which U-plane is established.

The UE being a communication target configures a DRB with each U-plane establishing eNB and performs the process for connection with each U-plane establishing eNB (cell).

For successful connection with a U-plane establishing eNB, the UE being a communication target may notify each U-plane establishing eNB of a connection complete message. To recognize the identifier of the own UE (the identifier of the UE being a communication target) and a U-plane establishing eNB with which the UE has completed connection, the message may include the identifier of a U-plane establishing eNB (cell) with which the UE has completed connection.

Disclosed below are three specific examples of the notification method.

(1) Notifying each U-plane establishing eNB via a C-plane establishing eNB and an MME.

(2) Notifying each U-plane establishing eNB via a C-plane establishing eNB.

(3) Directly notifying a U-plane establishing eNB.

The method (1) will be disclosed. A connection complete message is notified each U-plane establishing eNB from a UE via a C-plane establishing eNB and an MME. The UE has established no RRC connection with the eNB with which only U-plane is established, and thus cannot directly notify the U-plane only establishing eNB of the message through RRC signaling. Thus, the method of making notification via a C-plane establishing eNB, disclosed in (1), is effective. The UE may notify a C-plane establishing eNB through RRC signaling. RRC connection reconfiguration complete may be used as an RRC message.

The C-plane establishing eNB may notify the MME of the message using an S1 interface. An S1 message may be newly provided. The method (1) is effective also in the case where no X2 interface is provided.

The MME may notify each U-plane establishing eNB of the message using an S1 interface.

The method (2) will be disclosed. The connection complete message is notified each U-plane establishing eNB from a UE via a C-plane establishing eNB. The UE may notify the C-plane establishing eNB through RRC signaling. RRC connection reconfiguration complete may be used as an RRC message.

A new interface may be provided or an X2 interface may be used in the notification from the C-plane establishing eNB to each U-plane establishing eNB. In the case of the X2 interface, notification can be made without any new interface provided.

The method (3) will be disclosed. The connection complete message is notified each U-plane establishing eNB from the UE. The UE has established no RRC connection with the U-plane only establishing eNB, and thus cannot directly notify the U-plane only establishing eNB of the message through RRC signaling.

Here, an L1/L2 control message is newly provided for the notification. The U-plane establishing eNB has a protocol of an L1/L2 layer. Therefore, newly providing a signaling message at the L1/L2 layer allows the UE to notify the U-plane establishing eNB of the message. The message may be provided as MAC function or PHY function in L1/L2 layer. Alternatively, the identifier of the own UE may be notified together with the L1/L2 control message. Still alternatively, the code with the identifier of the own UE may be listed on the radio resource used for the L1/L2 control message. Demodulation using the code allows the U-plane establishing eNB (cell) to identify from which UE message is transmitted.

Each U-plane establishing eNB that has received the connection complete message performs the process of establishing a DRB/S1 bearer with the UE being a communication target.

Each U-plane establishing eNB may notify the MME of the message indicative of the completion of the process or may notify that the DRB configuration or the configuration of the modified DRB is complete between the UE and the U-plane establishing eNB. An Initial context setup complete message of S1 may be used in this notification. Alternatively, an E-RAB configuration complete message or E-RAB modification complete message may be notified.

This message may include a UE identifier (UE-ID) of a UE being a communication target, which is identifiable by an MME. Alternatively, this message may be a mobile subscriber identity identifiable by the MME, or may include the identifier of the own U-plane establishing eNB (cell). The UE identifier identifiable by an MME may be a UE identifier used in the MME. Still alternatively, the message may be the identifier of a C-plane establishing eNB (cell) for the UE and the UE identifier used in the C-plane establishing eNB (cell).

The MME requests the S-GW to configure an S1 bearer for the selected U-plane establishing eNB. An S11 interface may be used for this request. For example, a modify bearer request message may be used. The message may include the identifier of a UE being a communication target, the identifier of the selected U-plane establishing eNB, and the E-RAB configuration information of each U-plane establishing eNB. E-RAB list_U-plane, being a list of the correspondence between each of the U-plane establishing eNBs and the E-RAB configuration of each of the U-plane establishing eNBs, may be used. An IP address configured for each U-plane establishing eNB may be used as the identifier of each U-plane establishing eNB.

The S-GW configures an S1 bearer for each U-plane establishing eNB that has been notified. If an S1 bearer has been configured, the S-GW modifies the S1 bearer.

The S-GW that has configured or modified the S1 bearer notifies the MME of a message indicative of the completion or modification of the configuration of the S1 bearer. An S11 interface may be used in this notification. A Modify bearer response message of S11 may be used.

An S1 bearer is thus established between the S-GW and each U-plane establishing eNB.

Disclosed below is a data transmission method in the case where a plurality of DRBs/S1 bearers have been established using a plurality of eNBs. The DRBs/S1 bearers have been established using a plurality of U-plane establishing eNBs, which allows for the application of the data transmission method disclosed in the first embodiment.

For downlink data transmission, the MME calculates the ratio of the quality of each link. The MME determines the final packet distribution ratio for each eNB in consideration of the ratio of the quality and the traffic status of each cell, and then, notifies the S-GW of the ratio in Packet DL TX Ratio IND. The S-GW distributes the received packets to each eNB in accordance with the ratio. Here, the packets received by the S-GW are not, for example, separated or combined, and the received packets and the packets transmitted to each eNB have one-to-one correspondence. The distribution ratio is determined constantly in accordance with an update of the quality of each link and the traffic data. The MME may use the criteria for selection of a U-plane establishing eNB to calculate the ratio of the quality of each link.

In uplink data transmission, the UE measures the quality of the link between the U-plane establishing eNB and itself to calculate the ratio of the quality of each link. Then, the UE distributes transmission packets to the link of each eNB in accordance with the ratio and transmits the packets. The UE notifies an amount of transmission data for each eNB in a buffer status report (BSR) for each eNB and performs transmission in accordance with the scheduling performed using the BSR in each eNB. The distribution ratio is constantly determined in accordance with an update of the quality of each link.

Disclosed below is a method in which a U-plane establishing eNB starts transmitting data to a UE being a communication target.

Each U-plane establishing eNB may start the process of transmitting data to the UE upon receipt of a message indicative of the completion of the connection with the U-plane establishing eNB from a UE. Upon transmission of a connection complete message to a U-plane establishing eNB, the UE may start the process of receiving data from the U-plane establishing eNB (cell). This reduces a difference of the timing for starting the process of transmitting and receiving data between the UE and the U-plane establishing eNB (cell).

Another method will be disclosed. The U-plane establishing eNB receives data from the S-GW, and then starts the process of transmitting data to the UE. The UE detects a U-plane establishing eNB (cell) and synchronizes therewith, and then, starts the process of receiving from the U-plane establishing eNB (cell). Alternatively, after the successful RA procedure with a U-plane establishing eNB (cell), the UE may start the process of receiving from the U-plane establishing eNB (cell). For example, this method is applicable in the case where there is no message indicative of the completion of the connection with the U-plane establishing eNB from the UE. This method needs no explicit trigger for starting data transmission and reception, and advantageously simplifying control.

If there is no message indicative of the completion of the connection with the U-plane establishing eNB from the UE, before the UE completes the connection with the U-plane establishing eNB, the S-GW configures/modifies the S1 bearer so that downlink data will arrive at the U-plane establishing eNB in some cases. In such cases, the U-plane establishing eNB starts the process of transmitting data to the UE after receiving the data from the S-GW. The UE has not completed the connection with the U-plane establishing eNB, and thus fails to receive the data.

However, the use of retransmission control by the U-plane establishing eNB reduces undeliveries of the data. Increasing the maximum number of retransmission in advance eliminates almost all the undeliveries of the data. The method disclosed here accordingly leads to an effect of simplifying control with hardly any undelivery of data.

Disclosed below is a method in which a UE transmits/receives U-plane data to/from a U-plane establishing eNB (cell).

The U-plane establishing eNB (cell) maps the scheduling information for the UE to the PDCCH or ePDCCH being a physical control channel and then notifies the scheduling information. For the ePDCCH, the U-plane establishing eNB (cell) notifies the UE of the configuration information of the ePDCCH in advance. Specific examples of the information include resource (physical resource block (PRB), sequence) information for use. The ePDCCH may be configured through an RRC function or may be configured through an RRC function of the U-plane establishing eNB. The ePDCCH configuration information may be notified a UE being a communication target via a C-plane establishing eNB (cell) as described above or, in another method, may be notified from a U-plane establishing eNB (cell) via a MAC through an RA procedure.

The UE monitors the PDCCH of the U-plane establishing eNB (cell). Alternatively, if scheduling is made using an ePDCCH, the UE may monitor the ePDCCH. Data scheduling information is obtained upon receipt of the PDCCH or ePDCCH, and data may be received in accordance with the scheduling information. Data is mapped to the PDSCH by each U-plane establishing eNB (cell) and is then allocated to physical radio resources.

DRX may be configured for a U-plane establishing eNB (cell). The DRX for a U-plane establishing eNB may be configured by an RRC. When configured by a U-plane establishing eNB, DRX may be the RRC function provided in the U-plane establishing eNB. The DRX configuration may be performed by a U-plane establishing eNB to be notified the UE via a C-plane establishing eNB (cell) or may be notified from a U-plane establishing eNB (cell) via a MAC through an RA procedure.

The DRX configuration may be performed by a C-plane establishing eNB (cell) to be notified the UE and each U-plane establishing eNB (cell).

DRX may be activated/deactivated by a MAC, which may be the function of the MAC provided in each U-plane establishing eNB.

Semi persistent scheduling (SPS) may be configured for a U-plane establishing eNB (cell). Time configuration for SPS is performed in RRC. If a U-plane establishing eNB performs time configuration, the time configuration for SPS may be the RRC function provided in the U-plane establishing eNB. The SPS configuration may be performed by a U-plane establishing eNB (cell) to be notified a UE via a C-plane establishing eNB (cell), or may be notified from a U-plane establishing eNB (cell) via a MAC through an RA procedure.

The SPS configuration may be performed by a C-plane establishing eNB (cell) to be notified a UE and each U-plane establishing eNB (cell).

Scheduling on the frequency axis of SPS may be performed by a MAC. The scheduling may be the function of the MAC provided in each U-plane establishing eNB. The scheduling result on the frequency axis may be notified the UE over the PDCCH or ePDCCH being a physical control channel for scheduling.

Data scheduling timing may differ between U-plane establishing eNBs (cells). In other words, the data transmission and reception timing may be time-divided among U-plane establishing eNBs (cells). The UE with a single transceiver can support the communications with a plurality of U-plane establishing eNBs. The DRX configuration may be used such that the data scheduling timing differs among a plurality of U-plane establishing eNBs (cells). Alternatively, the SPS configuration may be used. The DRX configuration or SPS configuration for each U-plane establishing eNB may be performed by a C-plane establishing eNB, where the method of notifying a UE and each U-plane establishing eNB (cell) may be applied.

The method disclosed in a seventh embodiment described below may be applied. As opposed to the seventh embodiment in which a master eNB performs a time configuration for each slave eNB, the master eNB may be a C-plane establishing eNB and each slave eNB may correspond to each U-plane only establishing eNB.

In another method, the data scheduling timing may be configured to fall within the same period among U-plane establishing eNBs (cells). Data scheduling and data transmission and reception are performed by all the U-plane establishing eNBs within the same period. For this purpose, the DRX configuration or SPS configuration described above may be used.

Not for all the U-plane establishing eNBs but for a plurality of groups of U-plane establishing eNBs in which the eNBs are divided, data scheduling timing may be configured to fall within the same period per group of U-plane establishing eNBs.

The timing of transmission and reception by a UE is accordingly limited to the same period determined in advance, reducing the power consumption of the UE.

FIG. 30 shows an example sequence according to the second embodiment, which is an example sequence of establishing RRC connection using one eNB and establishing/modifying a DRB/S1 bearer using a plurality of eNBs. The processes in the P-GW and HSS are omitted here.

The UE being a communication target is in the RRC_Idle state in 3001. In ST3002, a service request process is performed among the UE, the MME, and S-GW via a C-eNB with which RRC connection is established. Through this process, a radio bearer 1 (3003) is established between the UE and the C-eNB, and an S1 bearer 1 (3004) is established between the C-eNB and the S-GW. An E-RAB is thus established between the UE and S-GW. The use of the established bearers enables the U-plane data (user data) to be communicated between the UE and the C-eNB (ST3005) and between the C-eNB and the S-GW (ST3006).

In ST3007, the UE notifies the C-eNB being a C-plane establishing eNB of a measurement report. The report may include the criteria for causing the MME to select a U-plane establishing eNB.

In ST3008, the C-eNB that has received the measurement report from the UE notifies the MME of the information. For example, if communication quality information is used as criteria, a communication quality information report message may be newly provided. The message may include the location information of the own UE.

In ST3009, the MME selects U-plane establishing eNBs for the UE being a communication target. The C-plane establishing eNB may be selected as a U-plane establishing eNB. The criteria received in ST3008 may be used in the selection.

In ST3010, the MME that has selected U-plane establishing eNBs configures an E-RAB that is established for each of the U-plane establishing eNBs. It is assumed here that the C-plane establishing eNB also establishes U-plane for the UE being a communication target. The E-RAB has been established for the C-eNB, and thus, the E-RAB configuration is modified. For the U-eNB, the E-RAB configuration with the UE being a communication target is newly performed.

In ST3011 and ST3012, the MME notifies each of the U-plane establishing eNBs of an E-RAB configuration request message or E-RAB modification request message including E-RAB configuration information.

In ST3013, the C-eNB reconfigures a DRB for the UE being a communication target, using the E-RAB configuration modification information received from the MME.

In ST3014, the U-eNB performs the process required for establishing a DRB/S1 bearer for the UE being a communication target, using the E-RAB configuration information received from the MME. The U-eNB configures a DRB for a radio section.

In ST3015, the U-eNB that has configured a DRB in ST3014 notifies the C-eNB of, for example, the DRB configuration information of the own eNB. In this example, a U-plane connection configuration message is newly provided as a message to be notified.

In ST3016, the C-eNB that has reconfigured a DRB in ST3013 notifies the UE of the DRB configuration information or the like. If having received the DRB configuration information or the like from the U-eNB in ST3015, the C-eNB also notifies the DRB configuration information or the like of the U-plane establishing eNB in ST3016. The DRB configuration information of each U-plane establishing eNB (cell), the identifier of each U-plane establishing eNB (cell), the system information of each U-plane establishing eNB (cell), and the configuration information of the ePDCCH may be notified in association with each other. RRC signaling and RRC message are used in the notification. Here, an RRC connection reconfiguration message is used. This message may include the information indicative of a request for establishing U-plane.

The UE that has received the RRC connection reconfiguration message in ST3016 uses the DRB configuration information of the U-plane establishing eNB included in the message to configure a DRB for each U-plane establishing eNB in the case where the message includes the information indicative of a request for establishing U-plane.

In ST3017, the UE starts the process of connecting with a U-plane establishing eNB to be newly established.

In ST3018, the U-eNB (cell) is detected and synchronized. The identifier of the U-plane establishing eNB (cell) received in ST3016 may be used.

In ST3019, the UE notifies the U-eNB (cell) of the PRACH. The information about the PRACH in the system information of the U-plane establishing eNB (cell) received in ST3016 may be used.

In ST3020, the U-eNB (cell) notifies the UE of timing advanced (TA) for uplink timing adjustment. The distance between the C-eNB (cell) and the UE normally differs from the distance between the U-eNB (cell) and the UE, resulting in different propagation time. Thus, TA for uplink timing adjustment of the C-eNB (cell) cannot be used as one for uplink timing adjustment of the U-eNB (cell), requiring the U-eNB (cell) to newly notify the UE of TA for uplink timing adjustment of the U-eNB (cell).

Through the above-mentioned processes, the UE completes the process of connecting with the U-plane establishing eNB.

In ST3021, the UE that has completed the process of connecting with the U-plane establishing eNB notifies the C-plane establishing eNB of a connection complete message. Here, an RRC connection reconfiguration complete message is used.

The C-eNB that has received the connection complete message in ST3021 recognizes that the UE has performed the DRB configuration process of the own eNB (cell). The C-eNB also recognizes that the UE has completed the connection with another U-plane establishing eNB.

In ST3022, the C-eNB that has recognized that the UE had completed the connection with the U-plane establishing eNB notifies the U-eNB that has completed the connection with the UE of a connection complete message. A U-plane connection configuration complete message is newly provided as a message.

The C-eNB performs the process of configuring the modified DRB with the UE being a communication target and, in ST3037, notifies the MME of an E-RAB modification complete message.

The U-eNB that has received the U-plane connection configuration complete message in ST3022 performs the process of establishing a DRB/S1 bearer with the UE being a communication target and, in ST3023, notifies the MME of an E-RAB configuration complete message. A UE context setup complete message may be used in this notification.

The MME, which has received the E-RAB configuration complete message and the E-RAB modification complete message from the U-plane establishing eNBs including the C-eNB in ST3037 and ST3023, can recognize that the DRB/S1 bearer configuration (modification) of each of the U-plane establishing eNBs is complete.

In ST3024, the MME, which has recognized that the E-RAB configuration of each U-plane establishing eNB is complete, notifies the S-GW of a message requesting to configure or modify the S1 bearer. A modify bearer request message is used here.

In ST3025, the S-GW that has received the message requesting to configure or modify the S1 bearer configures or modifies the S1 bearer between each U-plane establishing eNB and itself in accordance with the information included in the message.

In ST3026, the S-GW that has configured or modified the S1 bearer notifies the MME of an S1 bearer configuration or modification complete message. A modify bearer response message is used here.

Through the processes above, a DRB 3027 is established between the UE and the U-plane establishing eNB, and an S1 bearer 3028 is established between the U-plane establishing eNB and the S-GW. This enables data communications between the UE and the U-eNB and between the U-eNB and the S-GW.

In ST3029, the UE receives a PDCCH of a U-plane establishing eNB or, if an ePDCCH is configured, receives the ePDCCH.

In ST3030, the U-plane establishing eNB performs multiplexing and scheduling of the user data for a UE being a communication target and, in ST3031, maps scheduling information to the PDCCH or ePDCCH and transmits the scheduling information.

In ST3032, user data is transmitted and received between the UE and the U-eNB. The user data is mapped to the PDSCH or PUSCH in accordance with the scheduling information to be allocated to physical radio resources.

In ST3033, user data is transmitted and received between the U-eNB and the S-GW.

Through the processes above, a DRB/S1 bearer is established between the UE and S-GW using a plurality of eNBs (C-eNB, U-eNB), enabling transmission and reception of user data.

Disclosed below is a method of releasing an eNB that establishes only U-plane between the S-GW and the UE being a communication target. In other words, disclosed below is a method of releasing the E-RAB established between the S-GW and the UE being a communication target for the eNB to be released, or a method of releasing the DRB/S1 bearer established between the S-GW and the UE being a communication target for the eNB to be released.

In this embodiment, the MME selects an eNB to be released. The criteria used when the MME selects an eNB with which a DRB/S1 bearer should be established for the UE being a communication target may be applied as the criteria for selection. The MME selects an eNB to be released using the criteria. For example, among the U-plane establishing eNBs, when the communication quality between the UE being a communication target and the U-plane establishing eNB (cell) degrades and falls below a predetermined threshold, the eNB may be selected as an eNB to be released.

The MME performs the E-RAB configuration for the UE being a communication target of the U-plane establishing eNBs except for an eNB to be released. The MME notifies each U-plane establishing eNB of the E-RAB configuration.

An E-RAB modification request message of S1 may be used in this notification. The modified E-RAB may need not to be notified the eNB whose E-RAB configuration has not been changed since the modification of the E-RAB by the MME.

The MME notifies the eNB to be released of a command to release the E-RAB established between the eNB and the UE being a communication target. S1 signaling may be used in this notification. A UE context release command message of S1 may be used. The E-RAB release command message of S1 may be used in the release of an E-RAB. The release command message may include the configuration information of an E-RAB to be released and the UE identifier to allow the recognition of a UE whose E-RAB is to be released.

The U-plane establishing eNB that has received the command to release the E-RAB established between the UE being a communication target and itself performs the process of releasing the DRB/S1 bearer established between the UE being a communication target for the own eNB and itself The process of establishing/modifying the E-RAB described above may be applied as the process related to each U-plane establishing eNB that has received the E-RAB establishment request message or modification request message.

Disclosed below is a method in which a U-plane establishing eNB releases the DRB/S1 bearer established between the UE being a communication target and the own eNB.

The U-plane establishing eNB that performs the process of releasing a DRB/S1 bearer notifies the UE of DRB release information. The DRB release information may include the identifier of the UE being a communication target or the information for recognizing a U-plane establishing eNB whose DRB is to be released, for example, the identifier of a U-plane establishing eNB (cell). This message may include the information indicative of a U-plane release request.

Disclosed below are two specific examples of notifying a UE of DRB release information or the like.

(1) Making notification via a C-plane establishing eNB.
(2) Making notification via an MME and a C-plane establishing eNB.

The method (1) of making notification via a C-plane establishing eNB will be disclosed. The U-plane establishing eNB that performs the process of releasing a DRB/S1 bearer notifies the C-plane establishing eNB of DRB release information or the like. A new interface may be provided or an X2 interface may be used in this notification. A new message may be provided for notification.

The C-plane establishing eNB (cell) notifies the UE being a communication target of, for example, the DRB release information of a U-plane establishing eNB whose DRB is to be released.

A list may be provided for the UE being a communication target, in which the DRB release information of a U-plane establishing eNB to be released and each piece DRB configuration information of each U-plane establishing eNB correspond to each U-plane establishing eNB. The list may be included in DRB list_U-plane. The C-plane establishing eNB may notify the UE of the list.

The method of notifying the UE of DRB configuration information or the like may be applied as this notification method. DRB release information and the information indicative of a U-plane release request may be included.

The method (1), which is not performed via the MME, reduces an amount of signaling as a system.

The method (2) of making notification via an MME and a C-plane establishing eNB will be disclosed.

The U-plane establishing eNB that performs the process of releasing a DRB/S1 bearer notifies the MME of DRB release information or the like. An S1 interface may be used in this notification.

The MME notifies the C-plane establishing eNB of DRB release information or the like. A list may be provided, which includes the U-plane establishing eNB whose DRB is to be released and DRB release information, and each U-plane establishing eNB and its DRB configuration. The list may be included in DRB list_U-plane. An S1 interface may be used in this notification. A new message may be provided for notification using an S1 interface.

The C-plane establishing eNB (cell) notifies the UE being a communication target of the DRB release information or the like received from the MME. A list may be provided, which includes each U-plane establishing eNB and its DRB configuration. The list may be included in DRB list_U-plane. The C-plane establishing eNB (cell) may notify the UE of the list.

The method (1) is applicable as this notification method.

The method (2) allows the DRB release information to be notified the UE even in the case where no interface is provided between the C-plane establishing eNB and the U-plane establishing eNB.

The UE being a communication target can accordingly recognize the release of the DRB/S1 bearer established between the U-plane establishing eNB to be released and itself.

The UE that has received the DRB release information or the like performs the process of releasing the DRB configuration for the U-plane establishing eNB (cell) whose DRB is to be released, and performs the process of disconnecting the connection with the U-plane establishing eNB (cell).

For example, as the process of disconnecting the connection, the process for synchronization with the U-plane establishing eNB is ended, or monitoring of the PDCCH or ePDCCH for scheduling from the U-plane establishing eNB is ended.

The UE, which has performed the process of releasing the DRB between the U-plane establishing eNB and itself and has disconnected the connection, may notify the U-plane establishing eNB of a disconnection complete message. This message may include the UE identifier (UE-ID), identifiable by the MME, of the UE being a communication target. Alternatively, the message may be a mobile subscriber identity identifiable by the MME. Still alternatively, the message may include the identifier of the own U-plane establishing eNB (cell). The UE identifier identifiable by the MME may be the UE identifier used in the MME. Alternatively, the UE identifier may be the identifier of a C-plane establishing eNB (cell) for the UE and the UE identifier used in the C-plane establishing eNB (cell).

Disclosed below are three specific examples of the notification method.

(1) Notifying each U-plane establishing eNB to be released via a C-plane establishing eNB and an MME.

(2) Notifying each U-plane establishing eNB to be released via a C-plane establishing eNB.

(3) Directly notifying each U-plane establishing eNB to be released.

The method of notifying each U-plane establishing eNB of a connection complete message described above may be applied as these methods.

Each U-plane establishing eNB that has received the disconnection complete message performs the process of releasing the DRB/S1 bearer established between the UE being a communication target and itself.

The U-plane establishing eNB that has performed the process of releasing the DRB/S1 bearer may notify the MME of the release completion. The U-plane establishing eNB may notify that the release of the DRB established between the UE and the U-plane establishing eNB is complete. A UE context release complete message of S1 may be used in this notification.

The MME requests the S-GW to release the S1 bearer for the U-plane establishing eNB to be released. An S11 interface may be used to notify this request. For example, a modify bearer request message may be used. The request message may include the identifier of the UE being a communication target, the identifier of the U-plane establishing eNB to be released, and the E-RAB configuration information of the U-plane establishing eNB to be released. E-RAB list_U-plane may be used, which is a list of the correspondence between each of the U-plane establishing eNBs and the E-RAB configuration of each of the U-plane establishing eNBs. The IP address configured for each U-plane establishing eNB may be used as the identifier of each U-plane establishing eNB.

The S-GW releases the notified S1 bearer established between the UE being a communication target for the U-plane establishing eNB to be released and itself The S-GW that has released the S1 bearer notifies the MME of an S1 bearer release complete message. An S11 interface may be used in this notification. The modify bearer response message of S11 may be used.

The DRB/S1 bearer established between the S-GW and the UE being a communication target is accordingly released using the U-plane establishing eNB to be released.

The data transmission method disclosed in the first embodiment may be applied as the data transmission method, using a plurality of U-plane establishing eNBs whose DRB/S1 bearer is established between a target UE and themselves except for the released eNB.

FIG. 31 shows an example sequence of releasing the U-plane establishing eNB according to the second embodiment. The sequence shown in FIG. 31 is similar to the sequence shown in FIG. 30, and thus, the same steps will be denoted by the same step numbers and common description will be omitted.

In ST3101, the MME that has received a communication quality report message from the C-eNB in ST3008 determines to release one or a plurality of U-plane establishing eNBs among the U-plane establishing eNBs whose U-plane has been established. The selection of another U-plane establishing eNB may be performed together.

In ST3010, the MME that has determined a U-plane establishing eNBs to be released in ST3101 configures the E-RAB of each of the U-plane establishing eNBs except for the U-plane establishing eNB to be released. In this case, a newly selected U-plane establishing eNB may be included. Here, the U-plane establishing eNB to be released is a U-eNB, and the U-plane establishing eNBs except for the U-plane establishing eNB to be released are C-eNBs.

The MME that has configured the E-RAB of each of the U-plane establishing eNBs notifies the C-eNB of an E-RAB modification request message in ST3011, as described with reference to FIG. 30. The C-eNB that has received the request message reconfigures a DRB for the UE being a communication target.

Meanwhile, in ST3102, the MME that has determined a U-plane establishing eNB to be released in ST3101 notifies the U-plane establishing eNB to be released of an E-RAB release command.

In ST3103, the U-eNB that has received the E-RAB release command in ST3102 performs the process of releasing a DRB/S1 bearer. The process of releasing a DRB is performed for a radio section.

In ST3104, the U-eNB that has performed the process of releasing a DRB/S1 bearer in ST3103 notifies the C-eNB of the DRB configuration release information. A U-plane connection reconfiguration message is newly provided as a message to be notified.

In ST3105, the C-eNB that has received the DRB release information from the U-eNB in ST3104 notifies the UE of the DRB configuration information.

If the C-eNB reconfigures a DRB, a DRB configuration information on the reconfiguration may be included in the DRB configuration information to be notified. The DRB release information of the U-plane establishing eNB (cell) to be released, the DRB configuration information of the U-plane establishing eNB (cell) to be configured/modified, the identifier of each U-plane establishing eNB (cell), and the system information of each U-plane establishing eNB (cell) may be notified in association with each other. Here, an RRC connection reconfiguration message is used in the notification.

The UE that has received the RRC connection reconfiguration message in ST3105 uses the DRB release information of a U-plane establishing eNB to be released in the message to release the DRB configuration of the U-plane establishing eNB in the case where the message includes the information indicative of a U-plane release request.

In ST3106, the UE performs the process of disconnecting the connection with the U-plane establishing eNB to be released.

In ST3107, the UE, which has completed the process of disconnecting the connection with the U-plane establishing eNB to be released, notifies the C-plane establishing eNB of a connection disconnecting process complete message. Here, an RRC connection reconfiguration complete message is used as the message.

This message may include the DRB configuration complete information of the U-plane establishing eNB (cell) to be configured/modified. Here, the message may include the information indicating that the configuration of the modified DRB for the C-eNB is complete.

The C-eNB that has received the connection disconnecting process complete message in ST3107 recognizes that the UE has completed the process of disconnecting the connection with the U-plane establishing eNB. The C-eNB also recognizes that the UE has performed the process of modifying the DRB of the own eNB (cell).

In ST3108, the C-eNB, which has recognized that the UE has completed the process of disconnecting the connection with the U-plane establishing eNB, notifies the U-eNB of a connection disconnecting process complete message. This message may include the identifier of the UE being a communication target and the identifier of the own eNB (cell). In this notification, an X2 interface or a newly provided interface is used, and U-plane connection reconfiguration complete is newly provided as a message to be notified.

In ST3116, the C-eNB, which has recognized that the UE had performed the process of modifying the DRB of the own eNB (cell), notifies the MME of an E-RAB modification complete message.

In ST3108, the U-eNB that has received the U-plane connection disconnecting process complete message performs the process of releasing the DRB/S1 bearer and, in ST3109, notifies the MME of an E-RAB release complete message. A UE context release complete message may be used in this notification.

The MME, which has received the E-RAB modification complete message and E-RAB release complete message from the U-plane establishing eNBs including the C-eNB in ST3116 and ST3109, can recognize that the release of the E-RAB and the modification of the E-RAB of each U-plane establishing eNB are complete.

In ST3110, the MME that has recognized that the release of the E-RAB of each U-plane establishing eNB is complete notifies the S-GW of a message requesting to release the S1 bearer. Here, a modify bearer request message is used.

In ST3111, the S-GW that has received the message requesting to release the S1 bearer uses the information included in the message to release the S1 bearer between the U-plane establishing eNB to be released and itself In ST3112, the S-GW that has released the S1 bearer notifies the MME of an S1 bearer release complete message. Here, a modify bearer response message is used.

Through the processes above, the DRB between the UE and the U-plane establishing eNB is released, and the S1 bearer between the U-plane establishing eNB and the S-GW is released. This completes the process of releasing a U-plane establishing eNB for the UE being a communication target.

As described above, the U-plane for the UE being a communication target is connected by the radio bearer 1 (3003) between the UE and the C-eNB and the S1 bearer 1 (3004) between the C-eNB and the S-GW. In ST3005 and ST3006, user data is transmitted and received between the UE and the S-GW by the bearers.

Another method is disclosed as the method of releasing the eNB that is established only U-plane between the UE being a communication target and itself. The case in which the criteria (7) described above are used will be disclosed.

If data transmission has not been performed for a long period in the radio section (Uu) between the eNB that has established only the U-plane and the UE being a communication target and the eNB detects time-out, the eNB releases the DRB/S1 bearer established between the UE being a communication target and itself FIG. 32 shows another example sequence of releasing the U-plane establishing eNB according to the second embodiment. The sequence shown in FIG. 32 is similar to the sequence shown in FIG. 31, and thus, the same steps will be denoted by the same step numbers and common description will be omitted.

In ST3202, the eNB that has established U-plane monitors data transmission in a radio section (Uu) between the UE being a communication target and itself. If data transmission has not been performed for a long period and the eNB detects time-out, the eNB releases the DRB/S1 bearer established between the UE being a communication target and itself In ST3203, the U-plane establishing eNB, which has monitored data transmission in the radio section between the UE being a communication target and itself and has detected data time-out, notifies the MME of a message requesting to release the E-RAB established by the own eNB for the UE being a communication target. S1 signaling may be used in this notification. This request message may include the information indicating that the reason of the request is the expiration of a data monitoring timer, the identifier of the UE for which data time-out has been detected, and the identifier of the own eNB.

The MME that has received the E-RAB release request message in ST3203 determines the U-plane establishing eNB that has made notification as an eNB to be released.

In ST3010, the MME performs the E-RAB configuration for the UE being a communication target of the U-plane establishing eNBs except for an eNB to be released. The MME notifies each U-plane establishing eNB of the E-RAB configuration.

The MME notifies the eNB to be released of a command to release the E-RAB established between the UE being a communication target and itself. ST3114 shown in FIG. 31 may be performed as the subsequent processes.

With reference to FIG. 31, upon receipt of ST3105, the UE performs the process of disconnecting the connection with a U-plane establishing eNB to be released. This prevents a malfunction caused by a difference in judgment between the U-plane establishing eNB and the UE.

Not limited to the above, in another method, the UE may perform the process of disconnecting the connection with a U-plane establishing eNB to be released when detecting data time-out in ST3201. This allows the UE to perform the process of disconnecting the connection with the U-plane establishing eNB at an early stage, and thus does not perform the process of maintaining the unnecessary communication with the U-plane establishing eNB, for example, the synchronization process or monitoring of the PDCCH or ePDCCH for scheduling, reducing the power consumption of the UE.

Another method is disclosed as the method of releasing the eNB that has established only U-plane with the UE being a communication target.

The UE performing monitoring of a radio communication area (radio link monitor (RLM)) between each U-plane establishing eNB (cell) and itself.

The UE receives the RS of each U-plane establishing cell to judge the degradation in the reception quality in the radio communication area using the reception result of the RS. Five specific examples of the RS are as follows.

(1) RS for tracking
(2) RS for demodulation
(3) CRS
(4) UE-specific RS
(5) Combination of (1) to (4)

The signal equivalent to the RS may be used in place of the RS.

If the reception quality in a radio communication area has fallen below a predetermined threshold for a predetermined period, the UE judges the degradation in reception quality. Alternatively, if the reception quality in a radio communication area has fallen below a predetermined threshold for a predetermined period, the UE may reconnect with the U-plane establishing eNB (cell). The UE detects the U-plane establishing eNB (cell), performs synchronization, transmits the PRACH, and receives the TA. A maximum value may be provided for the number of trial reconnections to judge the degradation in reception quality if the UE cannot establish connection even after performing reconnections for the maximum value.

The UE that has judged the degradation in reception quality notifies the C-plane establishing eNB that the reception quality in the radio communication area has degraded. This notification may include the identifier of the U-plane establishing eNB such that a U-plane establishing eNB whose reception quality in a radio communication area has degraded is apparent.

The C-plane establishing eNB (cell) that has received the deterioration information from the UE notifies the MME of a message requesting to disconnect the radio link with the U-plane establishing eNB whose reception quality has degraded. The message requesting to release the E-RAB may be used as the message requesting to disconnect the radio link. S1 signaling may be used in this notification. This request message may include the identifiers of the U-plane establishing eNB whose reception quality has degraded and the UE being a communication target.

The MME that has received the request message selects the notified U-plane establishing eNB as an eNB to be released.

The MME performs the E-RAB configuration for the UE being a communication target of the U-plane establishing eNBs except for an eNB to be released. The MME notifies each of the U-plane establishing eNBs of the E-RAB configuration. The MME also notifies the eNB to be released of the command to release the E-RAB established between the UE being a communication target and itself. The method disclosed above may be applied in the subsequent processes.

The UE may perform RLM and, at the time when it judges that the reception quality in an radio communication area has degraded, end the connection with the U-plane establishing eNB whose reception quality has degraded. For example, the UE ends the process for synchronization with the U-plane establishing eNB and ends monitoring of the PDCCH or ePDCCH for scheduling from the U-plane establishing eNB.

In the case where, for example, the U-plane only establishing eNB is released, the timing of the process of disconnecting the connection between the UE and the U-plane establishing eNB may differ from the timing of switching the path of the S1 bearer between the S-GW and the the U-plane establishing eNB.

For example, in the example sequence of releasing the eNB establishing only U-plane, shown in FIG. 31, the UE performs the process of disconnecting the connection with the U-eNB in ST3106. The UE cannot receive downlink user data from the U-eNB at and after this timing. At this time, however, the process of releasing/modifying the S1 bearer path is not performed by the S-GW in ST3111. That is, the user data is transmitted to the U-eNB with an original path. It is therefore unclear how downlink user data, transmitted to the U-eNB between the process of disconnecting the connection with the U-eNB by the UE and the process of releasing/modifying the S1 bearer path by the S-GW, is handled.

Two methods of solving the above-mentioned problem will be disclosed here.

(1) The user data is discarded.
(2) The user data is forwarded between U-plane establishing eNBs.

In (1), the user data transmitted from the S-GW to the U-plane establishing eNB to be released is discarded. Control for this process is not particularly performed, causing no control delay, which enables quick control switching of the S1 bearer path.

In (2), the user data transmitted from the S-GW to the U-plane establishing eNB to be released is forwarded to the U-plane establishing eNB not to be released. The configuration for forwarding may be performed between the U-plane establishing eNBs. The configuration for forwarding may be performed via a C-plane establishing eNB. This enables forwarding of the user data, causing no loss in user data, which enables quick control switching of the S1 bearer path.

FIG. 33 shows an example sequence of performing data forwarding between U-plane establishing eNBs according to the second embodiment. Data forwarding is performed between the U-eNB and the C-eNB. The sequence shown in FIG. 33 is similar to the sequence shown in FIG. 31, and thus, the same steps will be denoted by the same step numbers and common description will be omitted.

In ST3302, the U-eNB that has performed the DRB release configuration in ST3103 buffers the downlink user data from the S-GW received in ST3301.

In ST3303, the U-eNB that has performed the DRB release configuration in ST3103 performs a configuration for forwarding user data between the C-eNB and itself Here, the C-eNB has established no U-plane connection in some cases. The U-plane establishing eNB to be released may perform the configuration for forwarding user data between the U-plane establishing eNB not to be released and itself. The MME may notify the identifier of the eNB establishing the U-plane connection. For example, there may be provided a list of the correspondence between each of the U-plane establishing eNBs and the E-RAB configuration of each of the U-plane establishing eNBs, and the MME may notify U-plane establishing eNB to be released of the list. The U-plane establishing eNB to be released can also recognize the E-RAB configuration of another U-plane establishing eNB.

After the configuration of forwarding the user data between the U-eNB and the C-eNB in ST3303, in ST3304, the U-eNB may forward the user data from the S-GW to the C-eNB. The C-eNB that has received the user data transmits the user data to the UE by a U-plane connection bearer of the own eNB (cell).

The process of ST3304 may be performed after ST3108. The U-eNB forwards the user data after recognizing the completion of the process of disconnecting the connection by the UE. This prevents such an operation that the user data is forwarded before the connection is disconnected.

Forwarding of the user data may be ended after all pieces of the user data received from the S-GW are forwarded. The forwarding configuration for the C-eNB may be canceled.

Consequently, even if the timing of the process of disconnecting the connection between the UE and the U-plane establishing eNB differs from the timing of switching the path of the S1 bearer for the S-GW, downlink user data can be processed reliably, eliminating a malfunction as a system.

In change of the U-plane establishing cell (eNB) when there is one U-plane establishing cell (eNB), the U-plane connection for the UE being a communication target may be disconnected if no contrivance is made. For example, a disconnection occurs in the case where the process of releasing a last connected U-plane establishing cell (eNB) is performed and then the process of configuring a new U-plane establishing cell (eNB) is performed. If the U-plane connection is disconnected, the communication of user data is stopped, which is inconvenient for the user. To solve the above-mentioned problem, the method of forwarding user data described above may be applied. The user data is buffered by the last connected U-plane establishing eNB, and then, after a new eNB for U-plane connection is established, the configuration of forwarding the user data is performed between the last connected U-plane establishing eNB and the new U-plane establishing eNB. Then, the last connected U-plane establishing eNB may forward the user data to the new U-plane establishing eNB. This prevents the communication of the user data from being stopped. This method is effective in the case where the UE has only the capability to connect with one U-plane establishing eNB.

In the case where the UE has the capability to connect with a plurality of U-plane establishing cells (eNBs), in another method, the process of releasing the last connected U-plane establishing cell (eNB) may be performed after a new eNB (cell) for U-plane connection is established for the UE being a communication target. Although this causes the UE being a communication target to connect with a plurality of U-plane establishing eNBs (cells), the U-plane connection will not be disconnected, preventing the communication of the user data from being stopped.

In this method, the U-plane connection may be performed once via a C-plane establishing eNB (cell). U-plane connection is once established for the UE being a communication target using the C-plane establishing eNB (cell) and, after the process of releasing the last connected U-plane establishing eNB (cell), performs the process of configuring a new U-plane establishing eNB (cell). After the completion of this process, the U-plane connection in the C-plane establishing cell (eNB) may be disconnected. Similar effects are achieved in this case. Connection is made via the C-plane establishing cell, eliminating the need for selecting a new U-plane establishing eNB (cell), which enables the U-plane connection to be changed to the C-plane establishing eNB (cell) with a low delay. This is effective because a stop of the communication due to its degradation can be prevented in the case where it takes time to select a new U-plane establishing cell.

The method disclosed in this embodiment enables communication of packet data with a UE being a communication target using a plurality of eNBs, increasing the communication capacity of the UE.

A plurality of eNBs can be used also in the case where cells are downsized, increasing spectral efficiency, which increases communication capacity as a system.

The control process for establishing a plurality of RRC connections is not required, simplifying the control process, which reduces an amount of signaling and a control delay amount.

The RRC function of the U-plane establishing eNB can be limited, and thus, in the case where, for example, an eNB dedicated for establishing U-plane is configured, the eNB can be configured more easily than a conventional eNB.

The UE mobility control does not need the control process for establishing a plurality of RRC connections. Therefore, it suffices to change (establish/modify/release) only the U-plane establishing eNB within the coverage of a C-plane establishing eNB (cell), resulting in a control process with a lower delay at higher speed. For example, in the case where the C-plane establishing eNB (cell) is a coverage cell and the U-plane establishing eNB (cell) is a capacity cell, HO control is not required between the capacity cells, and it suffices to change (establish/modify/release) only the U-plane establishing eNB.

First Modification of Second Embodiment

In the conventional method, the control information for the UE being a communication target is transmitted and received between the MME and one C-plane establishing eNB that is in RRC-connection with the UE. In contrast, in the method disclosed in the second embodiment, the control information for the UE being a communication target is transmitted and received directly between the MME and each U-plane establishing eNB. The control process for the UE being a communication target by the MME accordingly becomes more complicated than the conventional method process.

A first modification of the second embodiment will therefore disclose a method of performing signaling via a C-plane establishing eNB.

For one communication, one eNB (cell) is used to establish C-plane connection, and a plurality of eNBs (cells) are used to establish U-plane connection. Signaling between the MME and the U-plane establishing eNB is performed via the C-plane establishing eNB.

To perform signaling between the MME and the U-plane establishing eNB via the C-plane establishing eNB, the MME notifies the C-plane establishing eNB for the UE being a communication target of a signaling forwarding request to each U-plane establishing eNB for the UE being a communication target. The signaling forwarding request message may include the identifier of the UE (UE-ID) being a communication target. The signaling forwarding request message may include the identifier or address of each U-plane establishing eNB (cell), which is a forwarding destination, for identifying each U-plane establishing eNB (cell) being a forwarding destination.

The C-plane establishing eNB that has received the signaling forwarding request performs the process of forwarding signaling for the UE being a communication target. The C-plane establishing eNB then forwards the signaling from the MME to each U-plane establishing eNB and forwards the signaling from each U-plane establishing eNB to the MME.

The signaling forwarding request may be notified before the MME notifies each U-plane establishing eNB of the E-RAB configuration of each U-plane establishing eNB. Alternatively, the signaling forwarding request may be notified simultaneously with the MME notifying each U-plane establishing eNB of the E-RAB configuration of each U-plane establishing eNB. The signaling forwarding request may be notified by being included in the signaling by which the MME notifies each U-plane establishing eNB of the E-RAB configuration of each U-plane establishing eNB.

The method disclosed in this modification allows the signaling between the MME and the U-plane establishing eNB for the UE being a communication target to be performed via the C-plane establishing eNB.

FIG. 34 shows the architecture according to the first modification of the second embodiment. The architecture shown in FIG. 34 is similar to the architecture shown in FIG. 28, and thus, the same elements will be denoted by the same numbers and common description will be omitted.

The figure shows the architecture in the case where an eNB dedicated for establishing U-plane is configured. This architecture may be the architecture showing only the UE being a communication target in this modification.

3401 denotes an S1 interface established between a C-eNB and a U-eNB. As to the signaling of the UE 2806 being a communication target, the C-eNB 2804 has the function of forwarding the signaling from the MME 2803 to each U-plane establishing eNB 2805 and forwarding the signaling from each U-plane establishing eNB 2805 to the MME 2803.

Shown here is the architecture in the case where an eNB dedicated for establishing U-plane is configured, which eliminates the interface 2815 that directly connects between the MME 2803 and the U-eNB 2805, shown in FIG. 28. This is because the signaling between the MME and the U-plane establishing eNB is performed via the C-plane establishing eNB in this modification.

The interface 2815 that directly connects the MME and the U-eNB may be provided in the case where there is a UE that is in C-plane connection with the U-eNB, not in the case where an eNB dedicated for establishing U-plane is configured.

Here, the UE (2806) corresponds to a mobile station; the C-eNB (2804), a first base station; the U-eNB (2805), a second base station; and the MME (2803) and the S-GW (2802), a gateway station. For C-plane signals, the RRC connection between the UE (2806) and the C-eNB (2804) corresponds to a first radio communication connection. Similarly for C-plane signals, the S1-MME signaling connection (2809) between the MME (2803) and the C-eNB (2804) corresponds to a first communication connection. For U-plane signals, the radio bearer between the UE (2806) and the C-eNB (2804) corresponds to a first radio communication connection, and the radio bearer between the UE (2806) and the U-eNB (2805) corresponds to a second radio communication connection. Similarly for U-plane signals, the S1 bearer (2814) between the S-GW (2802) and the C-eNB (2804) corresponds to a first communication connection, and the S1 bearer (2813) between the S-GW (2802) and the U-eNB (2805) corresponds to a second communication connection.

As described above, one communication is performed between the mobile station and the gateway station by establishing the first communication connection between the gateway station and the first base station, the second communication connection between the gateway station and the second base station, the first radio communication connection between the first base station and the mobile station, and the second radio communication connection between the second base station and the mobile station. This enables a cell change through the addition and release of communication connection and radio communication connection.

The U-plane signals are transmitted while being distributed to a first path including the first communication connection and the first radio communication connection and a second path including the second communication connection and the second radio communication connection. The C-plane signals are transmitted while being distributed to a first path including the first communication connection and the first radio communication connection and a second path including the first communication connection and the second radio communication connection.

Each U-plane establishing eNB 2805 may terminate the S1 interfaces (S1-MMEs) 2809 and 3401, and the C-plane establishing eNB 2804 may provide an S1 proxy function between the MME 2803 and each U-plane establishing eNB 2805. The S1 proxy function forwards the S1 signaling message of the UE 2806 being a communication target. The S1 proxy function causes the C-plane establishing eNB 2804 to appear to the MME 2803 as each U-plane establishing eNB 2805 and causes the C-plane establishing eNB 2804 to appear to each U-plane establishing eNB 2805 as the MME 2803.

FIG. 35 shows an example sequence according to the first modification of the second embodiment. The sequence shown in FIG. 35 is similar to the sequence shown in FIG. 30, and thus, the same steps will be denoted by the same step numbers and common description will be omitted.

In ST3010, the MME that has selected the U-plane establishing eNBs configures the E-RAB to be established for each of the U-plane establishing eNBs.

In ST3501, the MME issues an S1 signaling forwarding configuration request to the C-plane establishing eNB (C-eNB). Here, this request is an S1-MME proxy configuration request. In ST3502, the C-eNB that has received the request notification performs the configuration for the process of forwarding S1 signaling for the UE being a communication target between the U-plane establishing eNB being a forwarding destination and the MME. Consequently, the S1 message between the U-eNB and the MME is forwarded via the C-eNB.

The C-eNB that has performed the configuration for the forwarding process in ST3502 may notify the MME of a message indicative of the completion of the forwarding process configuration. The MME can explicitly confirm the completion, reducing malfunctions. Described here is the case where there is no such a message. In ST3011, the MME notifies an E-RAB modification request message. In ST3503, the MME also notifies the C-eNB of an E-RAB configuration request message of the U-plane establishing eNB for the U-plane establishing eNB. The identifier or address of the U-plane establishing eNB being a forwarding destination may be added to the request message or included in the request message. An S1 message is used as this request message. In ST3504, the C-eNB that has received the request message forwards the request message to the U-plane establishing eNB (U-eNB) using the forwarding configuration in ST3502 and the identifier or address of the U-plane establishing eNB being a forwarding destination. This allows the U-plane establishing eNB (U-eNB) to receive the E-RAB configuration from the MME.

Thereafter, each node performs the process of ST3035. The U-eNB that has received the U-plane connection process complete notification from the C-eNB in ST3022 performs the E-RAB configuration process and, in ST3505 and ST3506, notifies the MME of the E-RAB configuration complete message via the C-eNB. Here, an S1 message is used. The forwarding configuration process is performed on the message for the UE, and thus, in ST3506, the C-eNB forwards the message received from the U-eNB in ST3505 to the MME.

Thereafter, the processes from ST3024 to ST3026 and ST3036 are performed.

Through the processes above, the DRB/S1 bearer is established between the UE and the S-GW using a plurality of eNBs (C-eNB and U-eNB), enabling the transmission and reception of user data.

The method disclosed in this modification prevents a situation in which the control information for the UE being a communication target is directly transmitted and received between the MME and each U-plane establishing eNB. Therefore, the control process for the UE being a communication target by the MME can be prevented from becoming complicated.

When the eNB dedicated for establishing U-plane is configured, all the signalings between the MME and the U-plane establishing eNB can be performed via the C-plane establishing eNB, eliminating the IF between the MME and the U-plane establishing eNB. This simplifies the system configuration. For example, this method may be applied when a macro eNB and a node dedicated for establishing U-plane, which is directly connected with the macro eNB, are configured.

Second Modification of Second Embodiment

In the conventional method, the packet data for the UE being a communication target is transmitted and received between the S-GW and one C-plane establishing eNB that is RRC-connected with the UE. In contrast, in the methods disclosed in the second embodiment and the first modification of the second embodiment, the packet data for the UE being a communication target is directly communicated between the S-GW and each U-plane establishing eNB. Thus, the control process for the UE being a communication target in the S-GW becomes more complicated than the conventional process.

The second modification of the second embodiment will therefore disclose a method of communicating packet data via a C-plane establishing eNB.

For one communication, one eNB (cell) is used to establish C-plane connection, and a plurality of eNBs (cells) are used to establish U-plane connection. The data is communicated between the S-GW and each of the U-plane establishing eNBs via the C-plane establishing eNB.

To communicate packet data between the S-GW and the U-plane establishing eNB via the C-plane establishing eNB, the MME notifies the C-plane establishing eNB for the UE being a communication target of a packet data forwarding request to each of the U-plane establishing eNBs for the UE being a communication target.

The packet data forwarding request message may include the identifier of the UE (UE-ID) being a communication target. The packet data forwarding request message may also include the identifier or address of each of the U-plane establishing eNBs (cells) being a forwarding destination for identifying each of the U-plane establishing eNBs (cells) being a forwarding destination.

As to the packet data for the UE being a communication target, the C-plane establishing eNB that has received the packet data forwarding request forwards the packet data from the S-GW to each of the U-plane establishing eNBs and the packet data from each of the U-plane establishing eNBs to the S-GW.

The packet data forwarding request may be notified before the MME notifies each of the U-plane establishing eNBs of the E-RAB configuration of each of the U-plane establishing eNBs. Alternatively, the packet data forwarding request may be notified simultaneously with the MME notifying each of the U-plane establishing eNBs of the E-RAB configuration of each of the U-plane establishing eNBs. The packet data forwarding request may be notified by being included in the signaling by which the MME notifies each of the U-plane establishing eNBs of the E-RAB configuration of each of the U-plane establishing eNBs.

The MME requests the S-GW to perform packet data communication for the UE being a communication target with each of the U-plane establishing eNBs via the C-plane establishing eNB. The MME requests the S-GW to configure the S1 bearer with each of the U-plane establishing eNBs via the C-plane establishing eNB.

As to the packet data for the UE being a communication target, the S-GW, which has received the request to go through the C-plane establishing eNB, transmits the packet data from the S-GW to each of the U-plane establishing eNBs via the C-plane establishing eNB and receives the packet data from each of the U-plane establishing eNBs via the C-plane establishing eNB.

The method disclosed in this modification allows the packet data between the S-GW and the U-plane establishing eNB for the UE being a communication target to be communicated via the C-plane establishing eNB.

FIG. 36 shows the architecture according to the second modification of the second embodiment. The architecture shown in FIG. 36 is similar to the architecture shown in FIG. 28, and thus, the same elements will be denoted by the same numbers and common description will be omitted.

The figure shows the architecture in the case where an eNB dedicated for establishing U-plane is configured. This architecture may be the architecture showing only the UE being a communication target in this modification.

3601 denotes an S1 interface established between a C-eNB and a U-eNB.

As to the packet data for the UE 2806 being a communication target, the C-eNB 2812 has the function of forwarding the packet data from the S-GW 2802 to each of the U-plane establishing eNBs 2805 and forwarding the packet data from each of the U-plane establishing eNBs 2805 to the S-GW 2802.

Shown here is the architecture in the case where an eNB dedicated for establishing U-plane is configured, eliminating the interface 2813 that directly connects the S-GW 2802 and the U-eNB 2805, shown in FIG. 28. This is because the packet data is communicated between the S-GW and the U-plane establishing eNB via the C-plane establishing eNB in this modification.

The interface 2813 that directly connects the S-GW and the U-eNB may be provided in the case where there is a UE that is in C-plane connection with the U-eNB, not in the case where an eNB dedicated for establishing U-plane is configured.

Here, the UE (2806) corresponds to a mobile station; the C-eNB (2804), a first base station; the U-eNB (2805), a second base station; and the MME (2803) and the S-GW (2802), a gateway station. For C-plane signals, the RRC connection between the UE (2806) and the C-eNB (2804) corresponds to a first radio communication connection. Similarly for C-plane signals, the S1-MME signaling connection (2809) between the MME (2803) and the C-eNB (2804) corresponds to a first communication connection, and the S1-MME signaling connection (2815) between the MME (2803) and the U-eNB (2805) corresponds to a second communication connection. For U-plane signals, the radio bearer between the UE (2806) and the C-eNB (2804) corresponds to a first radio communication connection, and the radio bearer between the UE (2806) and the U-eNB (2805) corresponds to a second radio communication connection. Similarly for U-plane signals, the S1 bearer (2814) between the S-GW (2802) and the C-eNB (2804) corresponds to a first communication connection.

As described above, one communication is performed between the mobile station and the gateway station by establishing the first communication connection between the gateway station and the first base station, the second communication connection between the gateway station and the second base station, the first radio communication connection between the first base station and the mobile station, and the second radio communication connection between the second base station and the mobile station. This enables a cell change through the addition and release of communication connection and radio communication connection.

The U-plane signals are transmitted while being distributed to a first path including the first communication connection and the first radio communication connection and a second path including the first communication connection and the second radio communication connection. The C-plane signals are transmitted while being distributed to a first path including the first communication connection and the first radio communication connection and the second path including the second communication connection and the second radio communication connection.

Each U-plane establishing eNB 2805 may terminate the S1 interfaces (S1-U) 2814 and 3601, and the C-plane establishing eNB 2804 may provide an S1 proxy function between the S-GW 2802 and each U-plane establishing eNB 2805. The S1 proxy function forwards the packet data of the UE 2806 being a communication target. The S1 proxy function causes the C-plane establishing eNB 2804 to appear to the S-GW 2802 as each U-plane establishing eNB 2805 and causes the C-plane establishing eNB 2804 to appear to each U-plane establishing eNB 2805 as the S-GW 2802.

FIG. 37 shows an example sequence according to the second modification of the second embodiment. The sequence shown in FIG. 37 is similar to the sequences shown in FIGS. 30 and 35, and thus, the same steps will be denoted by the same step numbers and common description will be omitted.

In ST3010, the MME that has selected the U-plane establishing eNBs configures an E-RAB to be established for each of the U-plane establishing eNBs.

In ST3701, the MME issues a user data forwarding request to the C-plane establishing eNB (C-eNB). Here, the MME issues an S1-U proxy configuration request. Here, the MME issues the S1 signaling forwarding configuration request together with the user data request. This request notification may include the identifier of the UE being a communication target and the identifier of the U-plane establishing eNB (U-eNB) being a forwarding destination.

In ST3502, the C-eNB that has received the request notification performs the configuration for the process of forwarding S1 signaling to the UE being a communication target between the U-plane establishing eNB being a forwarding destination and the MME. Thus, the S1 message between the U-eNB and the MME is forwarded via the C-eNB.

In ST3702, the C-eNB also performs the configuration for the process of forwarding user data to the UE being a communication target between the U-plane establishing eNB being a forwarding destination and the S-GW. Thus, the S1 user data between the U-eNB and the S-GW is forwarded via the C-eNB.

The C-eNB, which has performed the configurations for the processes of forwarding the S1 signaling and S1 user data in ST3502 and ST3702, may notify the MME of a message indicative of the completion of the forwarding process configuration. The MME can explicitly confirm the completion, reducing malfunctions. Described here is the case in which there is no such a message as in FIG. 35.

Thereafter, each node performs the processes from ST3011 to ST3506. These processes are shown in FIG. 30 and FIG. 35, which will not be described here.

In ST3703, the MME, which has recognized the completion of the E-RAB configuration for each of the U-plane establishing eNBs, notifies the S-GW of a message requesting to configure or modify the S1 bearer. In this case, a request is issued to configure the path of the S1 bearer via the C-plane establishing eNB. This message may include the identifier of the UE being a communication target, the identifier of each of the U-plane establishing eNBs, the E-RAB configuration information of each of the U-plane establishing eNBs, and further, the identifier of the C-plane establishing eNB that performs forwarding. An S11 interface may be used in this notification. A modify bearer request message of S11 may be used.

In ST3704, the S-GW, which has received the message requesting to configure or modify the S1 bearer via the C-plane establishing eNB, configures or modifies the S1 bearer between each of the U-plane establishing eNB and itself via the C-plane establishing eNB in accordance with the information included in the message.

In ST3705, the S-GW that has configured or modified the S1 bearer notifies the MME of an S1 bearer configuration or modification complete message. An S11 interface may be used in this notification. The modify bearer response message on the S11 may be used.

Through the processes above, a DRB 3027 is established between the UE and the U-plane establishing eNB, and an S1 bearer 3706 is established between the U-plane establishing eNB and the S-GW via the C-eNB. This allows data communications between the UE and the U-eNB and between the U-eNB and the S-GW.

Thereafter, the UE and the U-plane establishing eNB perform the processes of ST3029, ST3030, and ST3031.

In ST3707 and ST3708, the user data is transmitted and received between the U-eNB and the S-GW via the C-eNB. In this ease, data may be transmitted to the C-plane establishing eNB on a per-packet basis. The information (such as identifier or address) for identifying the S-GW being a forwarding destination, to which the C-plane establishing eNB performs forwarding, or the U-plane establishing eNB may be added to packets. Each packet can be identified easily when there are a plurality of forwarding destinations.

In ST3032, user data is transmitted and received between the UE and the U-eNB.

The DRB/S1 bearer is established between the UE and the S-GW using a plurality of eNBs (C-eNB, U-eNB), enabling the transmission and reception of the user data.

The method disclosed in this modification prevents a situation in which the packet data for the UE being a communication target is directly transmitted and received between the S-GW and each of the U-plane establishing eNBs. This prevents the process of transmitting and receiving the packet data for the UE being a communication target by the S-GW from becoming complicated.

When an eNB dedicated for establishing U-plane is configured, all the communications of packet data between the S-GW and the U-plane establishing eNB can be performed via the C-plane establishing eNB, eliminating the IF between the S-GW and the U-plane establishing eNB. This simplifies the system configuration. For example, this method may be applied when a macro eNB and a node dedicated for establishing U-plane, which is directly connected with the macro eNB, is configured.

Third Modification of Second Embodiment

The second embodiment has disclosed the case in which the MME selects an eNB with which a DRB/S1 bearer should be established for the UE being a communication target. In this modification, in another method, the C-plane establishing eNB selects an eNB with which a DRB/S1 bearer should be established for the UE being a communication target. The criteria disclosed in the second embodiment may be applied as the criteria for selection.

Disclosed below is a method in which a C-plane establishing eNB recognizes the criteria to select an eNB with which a DRB/S1 bearer should be established for the UE being a communication target.

When the information measured by the UE (also referred to as UE supported information) is used as the criteria, the UE notifies the C-plane establishing eNB of the information. The method disclosed in the second embodiment may be applied as the notification method.

When the information, which is measured or obtained by the network-side node, is used as criteria, each node notifies the C-plane establishing eNB of the information. Notification is not required when the network-side node is a C-plane establishing eNB.

As in the method described above, the information for recognizing that the information is of which UE or the information is for which eNB may be included.

The C-plane establishing eNB that has received the information selects an eNB with which a DRB/S1 bearer should be established for the UE being a communication target.

The C-plane establishing eNB notifies the MME of a message requesting to establish an E-RAB using the selected eNB (U-plane establishing eNB). The request message may include the UE identifier (UE-ID) of the UE being a communication target, which is identifiable by the MME. Alternatively, the request message may be the mobile subscriber identity identifiable by the MME. The identifier of the own C-plane establishing eNB (cell) may be included. The UE identifier identifiable by the MME may be the UE identifier used in the MME. Still alternatively, the request message may be the identifier of the C-plane establishing eNB (cell) for the UE and the UE identifier used in the C-plane establishing eNB (cell). S1 signaling may be used for this notification. A new message may be provided.

To establish an E-RAB, the MME configures an E-RAB in each U-plane establishing eNB selected for the UE being a communication target, which is notified from the C-plane establishing eNB.

The architecture of FIG. 28, disclosed in the second embodiment, is applicable as the architecture in this modification FIG. 38 shows an example sequence of establishing/modifying a DRB/S1 bearer using a plurality of eNBs according to the third modification of the second embodiment. The sequence shown in FIG. 38 is similar to the sequence shown in FIG. 30, and thus, the same steps will be denoted by the same step numbers and common description will be omitted.

In ST3034, a radio bearer 1 is established between the UE and the C-eNB, and an S1 bearer 1 is established between the C-eNB and the S-GW.

In ST3801, the UE notifies the C-eNB being a C-plane establishing eNB of a measurement report. The method disclosed in the second embodiment is applicable in this notification.

In ST3802, the C-eNB that has received the measurement report selects an eNB with which a DRB/S1 bearer should be established for the UE being a communication target.

In ST3803, the C-plane establishing eNB notifies the MME of a message requesting to establish an E-RAB using the selected eNB (U-plane establishing eNB). In this example, S1 signaling is used in this notification, and an E-RAB configuration request message is provided as a new message.

In ST3010, to establish an E-RAB, the MME configures an E-RAB in each of the U-plane establishing eNBs selected for the UE being a communication target, which has been notified from the C-plane establishing eNB.

The method disclosed in the example sequence of FIG. 30 is applicable to the subsequent processes, which will not be described here.

Through the processes above, a DRB/S1 bearer is established between the UE and the S-GW using a plurality of eNBs (C-eNB, U-eNB), and the user data can be transmitted and received.

FIG. 39 shows an example sequence of releasing a U-plane establishing eNB according to the third modification of the second embodiment. The sequence shown in FIG. 39 is similar to the sequence shown in FIG. 31, and thus, the same steps will be denoted by the same step numbers and common description will be omitted.

In ST3113, a radio bearer 1 is established between the UE and the C-eNB, and an S1 bearer 1 is established between the C-eNB and the S-GW. A radio bearer 2 (DRB) is established between the UE and the U-eNB, and an S1 bearer 2 is established between the U-eNB and the S-GW.

In ST3901, the UE notifies the C-eNB being a C-plane establishing eNB of a measurement report. The method disclosed in the second embodiment is applicable in this notification.

In ST3902, the C-eNB that has received the measurement report determines a U-plane establishing eNB whose DRB/S1 bearer should be released for the UE being a communication target. The method of determining a U-plane establishing eNB to be released by the MME, disclosed in the second embodiment, is applicable as the method for determination.

In ST3903, the C-plane establishing eNB notifies the MME of a message requesting to release the E-RAB established for the UE being a communication target of the U-plane establishing eNB determined to be released. In this example, S1 signaling is used for this notification, and an E-RAB release request message is provided as a new message. The request message includes the identifier of the U-plane establishing eNB determined to be released, the UE identifier (UE-ID) identifiable by the MME or the mobile subscriber identity identifiable by the MME for the UE being a communication target, and the identifier of the own C-plane establishing eNB (cell).

In ST3010, to establish an E-RAB, the MME configures an E-RAB in each of the U-plane establishing eNBs except for the U-plane establishing eNB to be released, which has been notified from the C-plane establishing eNB.

The method disclosed in the example sequence of FIG. 31 is applicable to the subsequent processes, which will not be described here.

The MME notifies the U-plane establishing eNB (U-eNB) to be released of an E-RAB release request message. Notification is made by the MME to allow the same node to control the configuration/modification and release of the E-RAB, resulting in simplified control.

Through the processes above, the DRB between the UE and the U-plane establishing eNB is released, and the S1 bearer between the U-plane establishing eNB and the S-GW is released. This completes the process of releasing a U-plane establishing eNB for the UE being a communication target.

Consequently, U-plane connection for the UE being a communication target is performed by the radio bearer 1 (3003) between the UE and the C-eNB and the S1 bearer 1 (3004) between the C-eNB and the S-GW. In ST3005 and ST3006, the user data is transmitted and received between the UE and the S-GW by the bearers.

FIG. 40 shows another example sequence of releasing the U-plane establishing eNB according to the third modification of the second embodiment. The sequence shown in FIG. 40 is similar to the sequence shown in FIG. 31, and thus, the same steps will be denoted by the same step numbers and common description will be omitted.

In ST3113, a radio bearer 1 is established between the UE and the C-eNB, and an S1 bearer 1 is established between the C-eNB and the S-GW. A radio bearer 2 (DRB) is established between the UE and the U-eNB, and an S1 bearer 2 is established between the U-eNB and the S-GW.

In ST4002, the eNB that has established U-plane monitors data transmission in a radio section (Uu) between the UE being a communication target and itself. If data transmission has not been performed for a long period and the data time-out (expiration of a data monitoring timer) has been detected, the eNB releases the DRB/S1 bearer established between the UE being a communication target and itself. In ST4003, the U-plane establishing eNB that has detected data time-out notifies the C-eNB of a message requesting to release the E-RAB established by the own eNB for the UE being a communication target. An X2 signaling may be used for this notification. This request message may include the information showing the expiration of the data monitoring timer, the identifier of the UE for which the data time-out has been detected, and the identifier of the own eNB.

In ST4004, the C-eNB that has received the E-RAB release request message in ST4003 determines a U-plane establishing eNB whose DRB/S1 bearer for the UE being a communication target should be released. In ST4005, the C-plane establishing eNB notifies the MME of a message requesting to release the E-RAB established for the UE being a communication target of the U-plane establishing eNB determined to be released in ST4004. In this example, S1 signaling is used for this notification, and an E-RAB release request message is provided as a new message. This request message includes the identifier of the U-plane establishing eNB determined to be released, the UE identifier (UE-ID) identifiable by the MME or the mobile subscriber identity of the UE being a communication target, which is identifiable by the MME, and the identifier of the own C-plane establishing eNB (cell).

In ST3010, the MME that has received the E-RAB release request message in ST4005 configures an E-RAB for the UE being a communication target of the U-plane establishing eNBs except for the eNB to be released.

The method disclosed in the example sequence of FIG. 31 is applicable to the subsequent processes, which will not be described here.

The MME notifies the U-plane establishing eNB (U-eNB) to be released of the E-RAB release request message. Notification is made by the MME to allow the same node to configure/modify and release the E-RAB, resulting in simplified control.

Through the processes above, the DRB between the UE and the U-plane establishing eNB is released, and the S1 bearer between the U-plane establishing eNB and the S-GW is released. This completes the process of releasing the U-plane establishing eNB for the UE being a communication target.

Consequently, U-plane connection for the UE being a communication target is performed through the radio bearer 1 (3003) between the UE and the C-eNB and the S1 bearer 1 (3004) between the C-eNB and the S-GW. In ST3005 and ST3006, user data is transmitted and received between the UE and the S-GW through the bearers.

FIG. 41 shows still another example sequence of releasing the U-plane establishing eNB according to the third modification of the second embodiment. The sequence shown in FIG. 41 is similar to the sequence shown in FIG. 31, and thus, the same steps will be denoted by the same step numbers and common description will be omitted.

In ST3113, a radio bearer 1 is established between the UE and the C-eNB, and an S1 bearer 1 is established between the C-eNB and the S-GW. A radio bearer 2 (DRB) is established between the UE and the U-eNB, and an S1 bearer 2 is established between he U-eNB and the S-GW.

In ST4102, the eNB that has established U-plane monitors data transmission in a radio section (Uu) between the UE being a communication target and itself. If data transmission has not been performed for a long period and data time-out (expiration of a data monitoring timer) has been detected, the eNB releases the DRB/S1 bearer established between the UE being a communication target and itself. In ST4103, the U-plane establishing eNB that has detected data time-out notifies the MME of a message requesting to release the E-RAB established for the UE being a communication target by the own eNB. In this example, S1 signaling is used in this notification, and an E-RAB release request message is provided as a new message. The request message includes the identifier of the U-plane establishing eNB determined to be released, the UE identifier (UE-ID) of the UE being a communication target, which is identifiable by the MME, or the mobile subscriber identity identifiable by the MME, and the identifier of the own U-plane establishing eNB (cell). In ST4104, the U-eNB also notifies the C-eNB of the E-RAB release request message. This is because the C-eNB needs to recognize the information of the U-plane establishing eNB whose E-RAB has been released to select the U-plane establishing eNB. X2 signaling may be used for this notification. The request message may include the expiration of the data monitoring timer, the identifier of the UE for which data time-out has been detected, and the identifier of the own eNB.

In ST3010, the MME that has received the E-RAB release request message in ST4103 configures an E-RAB for the UE being a communication target of the U-plane establishing eNBs except for the eNB to be released.

The method disclosed in the example sequence of FIG. 30 is applicable to the subsequent processes, which will not be described here.

The MME notifies the U-plane establishing eNB (U-eNB) to be released of an E-RAB release request message. Notification is made by the MME to allow the same node to control the configuration/modification and release of the E-RAB, resulting in simplified control.

Through the processes above, the DRB between the UE and the U-plane establishing eNB is released, and the S1 bearer between the U-plane establishing eNB and the S-GW is released. This completes the process of releasing the U-plane establishing eNB for the UE being a communication target.

Consequently, U-plane connection for the UE being a communication target is performed by the radio bearer 1 (3003) between the UE and the C-eNB and the S1 bearer 1 (3004) between the C-eNB and the S-GW. In ST3005 and ST3006, the user data is transmitted and received between the UE and the S-GW through the bearers.

The C-plane establishing eNB (cell) recognizes UE assisted information. In the second embodiment, the MME needs to recognize the information, complicating control. However, as disclosed in this modification, the C-plane establishing eNB selects a U-plane establishing eNB for the UE being a communication target, eliminating the need for the MME to recognize the UE assisted information serving as the criteria for selection. This simplifies the control process, reducing an amount of signaling.

The selection of a U-plane establishing eNB can be judged immediately after the notification of the UE assisted information. This leads to a small delay in the judgment of selecting a U-plane establishing eNB, allowing for the selection of an eNB more suitable for the communication with the UE being a communication target.

Third Embodiment

In the first embodiment to the third modification of the second embodiment, to establish a bearer for U-plane connection using a plurality of eNBs, the plurality of eNBs all have at least the function related to bearer control. This embodiment aims to further simplify the configuration of the eNB for U-plane connection.

For one communication, one eNB (cell) is used to establish C-plane connection, and a plurality of eNBs (cells) are used to establish U-plane connection.

RRC connection is established as C-plane connection, and one or a plurality of dedicated radio bearers are established as U-plane connection. A DRB may be used as a dedicated radio bearer.

The architecture of FIG. 28 disclosed in the second embodiment is applicable as the architecture in this embodiment.

In this embodiment, RRC connection is established using the Uu (2810) interface between the C-eNB (2804) and the UE (2806) being a communication target. In other words, with reference to the figure, C-plane connection indicated by a dashed line is established between the C-eNB (2804) and the UE (2806). Contrastingly, only data (user data) communication is performed using the Uu (2811) interface between the U-eNB (2805) and the UE (2806) being a communication target. In other words, only the U-plane connection indicated by a solid line is established between the U-eNB (2805) and the UE (2806). U-plane connection may be established between the C-eNB (2804) and the UE (2806) as in the conventional case.

The interface for U-plane connection 2811 between the U-eNB (2805) and the UE (2806) is Uu, which may not be a Uu. A new interface having only the U-plane connection function may be provided.

In this embodiment, the eNB that establishes only U-plane connection for one communication has no RRC function. In other words, the eNB, which establishes only U-plane connection for the UE being a communication target, has no RRC function. The interface (S1-MME) 2815 is not accordingly used in signaling communication between the U-eNB (2805) with which only U-plane connection is established and the MME (2803) for the UE (2806) being a communication target. The RRC function of the U-eNB (2805) for the UE being a communication target can be eliminated, simplifying the configuration of the U-eNB.

The S1-U interface between the S-GW and the U-eNB may not be used in the communication of the user data for the UE being the communication target, and communication may be performed using the S1-U interface between the S-GW and the C-eNB and the interface between the CeNB and the U-eNB. The interface (S1-U) 2813 is not used in the communication of user data between the U-eNB (2805) which is established only U-plane connection for the UE (2806) being a communication target and the S-GW (2802). The interface (S1-U) 2814 between the S-GW (2802) and the C-eNB (2804) and the interface 2812 between the C-eNB (2804) and the U-eNB (2805) are used.

FIG. 42 shows the architecture in the case where an eNB dedicated for establishing U-plane according to the third embodiment is configured. The architecture shown in FIG. 42 is similar to the architecture shown in FIG. 28, and thus, the same elements will be denoted by the same numbers and common description will be omitted. In the figure, the eNB dedicated for establishing U-plane is the U-eNB (2805). The eNB dedicated for establishing U-plane performs only the communication with the UE that establishes only U-plane connection.

When the eNB dedicated for establishing U-plane is configured by the method according to this embodiment, all the signalings between the MME (2803) and the U-eNB (2805) are performed via the C-eNB (2804), eliminating the interface for signaling between the MME (2803) and the U-eNB (2805).

When the communication of the user data for the UE being a communication target is performed through the S1-U interface between the S-GW (2802) and the C-eNB (2804) and the interface between the C-eNB (2804) and the U-eNB (2805) without using the S1-U interface between the S-GW (2802) and the U-eNB (2805), all the communications of packet data between the S-GW (2802) and the U-eNB (2805) can be performed via the C-eNB (2804), eliminating the interface between the S-GW (2802) and the U-eNB (2805).

Consequently, the configuration of an eNB dedicated for establishing U-plane can be simplified. Further, the interface with the MME is not required, enabling flexible installation of an eNB dedicated for establishing U-plane. Further, the interface with the S-GW is also not required, eliminating the interface with the core-network-side node. This enables further flexible installation of an eNB dedicated for establishing U-plane.

Here, the UE (2806) corresponds to a mobile station; the C-eNB (2804), a first base station; the U-eNB (2805), a second base station; and the MME (2803) and the S-GW (2802), a gateway station. For C-plane signals, the RRC connection between the UE (2806) and the C-eNB (2804) corresponds to a first radio communication connection, and the RRC connection between the UE (2806) and the U-eNB (2805) corresponds to a second radio communication connection. Similarly for C-plane signals, the S1-MME signaling connection (2809) between the MME (2803) and the C-eNB (2804) corresponds to a first communication connection. For U-plane signals, the radio bearer between the UE (2806) and the C-eNB (2804) corresponds to a first radio communication connection, and the radio bearer between the UE (2806) and the U-eNB (2805) corresponds to a second radio communication connection. Similarly for U-plane signals, the S1 bearer (2814) between the S-GW (2802) and the C-eNB (2804) corresponds to a first communication connection.

As described above, one communication is performed between the mobile station and the gateway station by establishing the first communication connection between the gateway station and the first base station, the first radio communication connection between the first base station and the mobile station, and the second radio communication connection between the second base station and the mobile station. This enables a cell change through the addition and release of communication connection and radio communication connection.

The U-plane signals are transmitted while being distributed to a first path including the first communication connection and the first radio communication connection and a second path including the first communication connection and the second radio communication connection. The C-plane signals are transmitted while being distributed to a first path including the first communication connection and the first radio communication connection and a second path including the first communication connection and the second radio communication connection.

FIG. 43 shows the protocol stack of the eNB according to the third embodiment. The protocol stack shown in FIG. 43 is similar to the protocol stack shown in FIG. 29, and thus, the same elements will be denoted by the same numbers and common description will be omitted.

As to the U-eNB (2913), the protocol for the UE that establishes only the U-plane connection is shown. The protocol 2914 for C-plane connection is not configured. The PDCP protocol 2920, the RLC protocol 2921, the MAC protocol 2922, and the PHY protocol 2923 have only the function for U-plane. In other words, the protocols have only the function for establishing a bearer. As indicated by 4301, the C-eNB (2901) and the U-eNB (2913) may be provided with the function for forwarding user data between the C-eNB (2901) and the U-eNB (2913) for the UE that establishes only the U-plane connection.

In the configuration of an eNB dedicated for establishing U-plane, the protocol 2914 for establishing C-plane connection needs not to be provided in the U-eNB 2913, resulting in a simplified configuration. When the user data for the UE being a communication target is communicated by the S1-U interface between the S-GW and the C-eNB and the interface between the CeNB and the U-eNB, the input and output function of an S1-U interface needs not to be provided, resulting in a further simplified configuration.

Next, a method of establishing a bearer using a plurality of eNBs (cells) will be disclosed.

In this embodiment, the C-plane establishing eNB selects an eNB that should establish a DRB for the UE being a communication target. The criteria disclosed in the second embodiment may be applied as the criteria for selection.

The method disclosed in the third modification of the second embodiment may be applied as the method in which the C-plane establishing eNB recognizes the criteria for selection of an eNB that should establish a DRB with the UE being a communication target.

The C-plane establishing eNB that has received the information selects an eNB that should establish a DRB for the UE being a communication target.

The C-plane establishing eNB configures a DRB for the selected eNB (U-plane establishing eNB). This configuration function may be newly provided as the RRC function of the C-plane establishing eNB. The C-plane establishing eNB configures a DRB to be established for each U-plane establishing eNB, using the E-RAB configuration received from the MME. The DRB for U-plane connection is configured to be shared by a plurality of U-plane establishing eNBs. The criteria for selection may be used in the sharing. When the own eNB is selected as a U-plane establishing eNB, the own eNB configures a DRB to be established by U-plane establishing eNBs including the own eNB.

If there is an eNB that has configured a DRB, the C-plane establishing eNB modifies the DRB configuration for the eNB.

The same DRB configuration may be configured for each of the eNBs. If there is no change in the E-RAB, the DRB configuration may be the same as the DRB configuration of the C-plane establishing eNB which has already established C-plane. As the DRB configuration, the DRB identifier, the PDCP configuration, the RLC configuration, the MAC configuration, and the PHY configuration may be the same.

Alternatively, different DRB identifiers may be used. The DRB configuration in each of the eNBs can be handled dedicatedly.

The C-plane establishing eNB notifies each U-plane establishing eNB of a DRB configuration request message. The request message may include DRB configuration information. The request message may include the identifier of the UE being a communication target and the identifier of the C-plane establishing eNB (cell). Notification of the modified DRB configuration may not be required for the U-plane establishing eNB whose DRB configuration has no change after the C-plane establishing eNB has modified the DRB. An X2 interface may be used or a new interface may be used in the notification of a DRB configuration request message.

A list of the correspondence between each of the U-plane establishing eNBs and the DRB configuration of each of the U-plane establishing eNBs may be newly provided. The list may be DRB list_U-plane. The C-plane establishing eNB may notify each of the U-plane establishing eNBs of the list. This allows each of the U-plane establishing eNBs to recognize the DRB configuration of another U-plane establishing eNB.

Each of the U-plane establishing eNBs notified of a DRB configuration request message configures a DRB for the UE being a communication target, using the DRB configuration information of the own U-plane establishing eNB.

The C-plane establishing eNB notifies the UE of DRB configuration information. The C-plane establishing eNB (cell) may use, as the DRB configuration information, the information for identifying the DRB configuration of which U-plane establishing eNB, such as the identifier of the U-plane establishing eNB (cell) and the DRB configuration information of each of the U-plane establishing eNBs. The system information of each of the U-plane establishing eNBs (cells) may be notified. Alternatively, in configuring an ePDCCH for scheduling for the UE being a communication target, each of the U-plane establishing eNBs may also notify the configuration information of an ePDCCH. The information indicative of a U-plane establishing request may be notified together. The system information of each of the U-plane establishing eNBs (cells) and the ePDCCH configuration information may be notified the C-plane establishing eNB in advance.

A list of each of the U-plane establishing eNBs and the DRB configuration of each of the U-plane establishing eNBs may be provided. The list may be DRB list_U-plane. The C-plane establishing eNB may notify the UE of the list.

RRC signaling may be used in this notification. A new message may be provided, or the DRB configuration information and the system information of the U-plane establishing eNB may be included in the existing RRC message to be notified. An RRC connection reconfiguration message or an AS-config message may be used as a specific example of the existing RRC message. The DRB configuration information and the system information per U-plane establishing eNB may be included in the RadioResourceConfigDedicated information included in the RRC connection reconfiguration message or AS-config message. The DRB list may be provided.

Consequently, the UE being a communication target can recognize the eNB that establishes the U-plane and the DRB configuration between the eNB and the UE.

The UE being a communication target configures a DRB with each of the U-plane establishing eNBs, and performs the process of connecting with each of the U-plane establishing eNBs (cells).

In successful connection with the U-plane establishing eNB, the UE being a communication target may notify each of the U-plane establishing eNBs of a connection complete message. The method disclosed in the second embodiment may be applied as the notification method. Although the method (1) is applicable, the methods (2) and (3) that are performed without going through a MME are also applicable. An amount of signaling can be reduced.

Each of the U-plane establishing eNBs that has received the connection complete message from the UE performs the process of establishing a DRB with the UE being a communication target. The complete message of the process may be notified the C-plane establishing eNB. There may be notified the completion of the DRB configuration or the modified DRB configuration between the UE and the U-plane establishing eNB. This message may include the identifier of the UE (UE-ID) being a communication target. The message may include the identifier of the own U-plane establishing eNB (cell).

The DRB between the UE being a communication target and each of the U-plane establishing eNBs is thus established.

The C-plane establishing eNB and each of the U-plane establishing eNBs perform the configuration for forwarding packet data for the UE being a communication target between the C-plane establishing eNB and the U-plane establishing eNB. An X2 interface may be used or a new interface may be provided for forwarding packet data.

The packet data of the UE being a communication target can thus be forwarded between the C-plane establishing eNB and each of the U-plane establishing eNBs.

Described next is a data transmission method when a plurality of DRBs are established using a plurality of eNBs.

For downlink data transmission, the C-plane establishing eNB calculates the ratio of the quality of each link. The C-plane establishing eNB determines the final packet distribution ratio to each of the U-plane establishing eNBs in consideration of the ratio of quality and the traffic status of each of the cells and, in accordance with the ratio, distributes the received packets to each of the U-plane establishing eNBs. The distribution ratio is constantly determined in accordance with an update of the quality of each link and the traffic data. The C-plane establishing eNB may use the criteria for selection of a U-plane establishing eNB to calculate the quality ratio of each link.

Disclosed below is a method of forwarding packets from the C-plane establishing eNB to each of the U-plane establishing eNBs. The C-plane establishing eNB does not input the packets received from the S-GW to the PDCP but distributes and forwards the packets to each of the U-plane establishing eNBs. In other words, the C-plane establishing eNB distributes the packets received from the S-GW to each of the U-plane establishing eNBs and then forwards them transparently. In this case, the forwarded packets are input to the PDCP of each of the U-plane establishing eNBs and then undergo the process in accordance with the PDCP protocol. Each of the U-plane establishing eNBs adds a sequence number (SN) in the PDCP.

In another method, the C-plane establishing eNB inputs the packets received from the S-GW to the PDCP, adds the SN thereto, and then distributes and forwards the data unit with the SN to each of the U-plane establishing eNBs. The forwarded data unit is input to the PDCP of each of the U-plane establishing eNBs and then undergoes the process in accordance with the PDCP protocol. The SN in the PDCP of each of the U-plane establishing eNBs may or may not be added. The SN is added by the PDCP of the C-plane establishing eNB, allowing the UE to rearrange the user data received from each of the U-plane establishing eNBs using the SN.

For uplink data transmission, the UE measures the quality of the link with the U-plane establishing eNB and calculates the ratio of the quality of each link. Then, the UE distributes the transmitted packets to the link of each of the eNBs in accordance with the ratio, and transmits the packets. The UE notifies an amount of transmission data for each of the eNBs in a buffer status report (BSR) for each eNB, and then transmits the amount of transmission data in accordance with the scheduling performed by each of the eNBs using the BSR. The distribution ratio is constantly determined in accordance with an update of the quality of each link.

The method opposite to that of downlink may be used as the method of forwarding packets from each of the U-plane establishing eNBs to the C-plane establishing eNB. Each of the U-plane establishing eNBs performs, for the uplink data received from the UE, up to the process according to the PDCP protocol to generate packet data, and then forwards the packet data to the C-plane establishing eNB. In other words, the C-plane establishing eNB transparently forwards the packet data from the U-plane establishing eNB, which is the packet data after the PDCP protocol process, to the S-GW. In this case, the forwarded packets are not input to the PDCP of the C-plane establishing eNB but are transmitted to the S-GW. The S-GW that has received the packet data from the C-plane establishing eNB may rearrange the order of the packet data. Alternatively, the C-plane establishing eNB may rearrange the order of the packet data before transmitting the packet data from each of the U-plane establishing eNBs to the S-GW. The C-plane establishing eNB notifies the S-GW of the packet data whose order has been rearranged.

In another method, each of the U-plane establishing eNBs performs up to process according to the PDCP protocol for the uplink data received from the UE, and forwards a data unit, to which the SN of the PDCP is added, to the C-plane establishing eNB. The C-plane establishing eNB inputs the forwarded uplink data unit to the PDCP and rearranges the order with the added SN, using the process for the PDCP protocol, to thereby generate packet data. The C-plane establishing eNB transmits the packet data whose order has been rearranged to the S-GW. This eliminates the need for rearranging packets by the S-GW.

Disclosed below is a method of starting data transmission to the UE being a communication target from the U-plane establishing eNB.

Each U-plane establishing eNB may start the process of transmitting data to the UE upon receipt of the message indicative of the completion of the connection with the U-plane establishing eNB from the UE or upon completion of the U-plane data forwarding configuration with the C-plane establishing eNB. The UE may start the process of receiving data from the U-plane establishing eNB (cell) upon transmission of a connection complete message to the U-plane establishing eNB. This reduces a difference of the timing of starting data transmission and reception process between the UE and the U-plane establishing eNB (cell).

Another method will be disclosed. The U-plane establishing eNB receives data from the C-plane establishing eNB and then starts the process of transmitting data to the UE. The UE detects the U-plane establishing eNB (cell) and performs synchronization therewith, and then starts the process of receiving from the U-plane establishing eNB (cell). Alternatively, after the successful RA procedure with the U-plane establishing eNB (cell), the UE may start the process of receiving from the U-plane establishing eNB (cell). For example, this is applicable in the case where there is no message indicative of the completion of the connection with the U-plane establishing eNB from the UE. This method is advantageous in that no explicit trigger is required to start data transmission and reception and that control is simplified.

The data forwarding configuration may be performed between the C-plane establishing eNB and the U-plane establishing eNB upon each U-plane establishing eNB receiving DRB configuration information from the C-plane establishing eNB. In such a case, the data forwarding configuration may be performed between the C-plane establishing eNB and the U-plane establishing eNB before the UE completes the connection with the U-plane establishing eNB, and downlink data may arrive at the U-plane establishing eNB from the C-plane establishing eNB. After receiving the data from the C-plane establishing eNB, the U-plane establishing eNB starts the process of transmitting data to the UE. The UE has yet to complete the connection with the U-plane establishing eNB, and fails to receive the data.

However, the use of retransmission control by the U-plane establishing eNB reduces undeliveries of the data. Besides, increasing the maximum retransmission number in advance eliminates almost all of the undeliveries of the data. The method disclosed here therefore achieves an effect of simplifying control with hardly any undelivery of data.

The methods disclosed in the second embodiment may be applied as the method in which the UE transmits and receives U-plane data to and from the U-plane establishing eNB (cell) and the method in which the UE transmits and receives the C-plane data and/or U-plane data to and from the C-plane establishing eNB (cell).

FIG. 44 shows an example sequence of establishing/modifying a DRB using a plurality of eNBs according to the third embodiment. The sequence shown in FIG. 44 is similar to the sequence shown in FIG. 30, and thus, the same steps will be denoted by the same step numbers and common description will be omitted.

In ST3034, a radio bearer 1 is established between the UE and the C-eNB, and an S1 bearer 1 is established between the C-eNB and the S-GW.

In ST4401, the UE notifies the C-eNB being a C-plane establishing eNB of a measurement report. The method disclosed in the third modification of the second embodiment can be applied here.

In ST4402, the C-eNB that has received the measurement report selects eNBs that should establish a DRB for the UE being a communication target. The method disclosed in the third modification of the second embodiment is applicable as the selection method.

In ST4403, the C-plane establishing eNB determines the DRB configuration using each of the selected eNBs (U-plane establishing eNBs). In this case, the DRB configuration may be modified for the U-plane establishing eNB that has established a DRB.

In ST4404, the C-plane establishing eNB configures the DRB of the own cell. The modified DRB may be configured in modification.

In ST4405, the C-plane establishing eNB notifies each of the selected U-plane establishing eNBs (U-eNBs) of a DRB configuration request message. The request message may include DRB configuration information. Alternatively, the request message may include the identifier of the UE being a communication target and the identifier of the C-plane establishing eNB (cell). An X2 interface may be used or a new interface may be provided in the notification of a DRB configuration request message. Here, a U-plane connection configuration message is used.

Each of the U-eNBs, which has been notified of the DRB configuration request message, performs the DRB configuration of the own eNB. Each of the U-eNBs needs not to perform the DRB configuration by itself because the request message includes the configuration information on a DRB to be established by each U-eNB. Each of the U-eNBs performs the DRB configuration using the notified DRB configuration information.

In ST4406, the C-eNB that has configured or modified the DRB in ST4404 notifies the UE of the DRB configuration information or the like. Here, an RRC connection reconfiguration message is used in the notification.

If the RRC connection reconfiguration message includes the information indicative of a U-plane establishment request, the UE that has received the message in ST4406 configures the DRB of each of the U-plane establishing eNBs using the DRB configuration information of the U-plane establishing eNB in the message.

In ST4407, the UE starts the process of connecting with the U-plane establishing eNB.

The processes from ST3018 to ST3022 are similar to the processes shown in FIG. 30, which will not be described here.

Each of the U-eNBs, which has received the DRB establishment complete message in ST3022, can recognize that a radio bearer (DRB2) (3027) has been configured with the UE.

In ST4408, the C-eNB and each of the U-eNBs perform the configuration for forwarding packet data for the UE being a communication target between the C-eNB and the U-eNB. This process establishes a link for data forwarding between the C-plane establishing eNB and the U-plane establishing eNB. Consequently, in ST4409, the packet data of the UE being a communication target can be forwarded between the C-eNB and each of the U-eNBs.

The processes from ST3029 to ST3032 are similar to the processes shown in FIG. 30, which will not be described here.

Through the processes above, a DRB is established between the UE being a communication target and a plurality of eNBs (C-eNB, U-eNB), enabling the transmission and reception of user data.

A method of releasing the eNB that has established only U-plane with the UE being a communication target will now be disclosed. In other words, disclosed below is a method of releasing a DRB established between the eNB to be released and the UE being its communication target.

In this embodiment, the C-plane establishing eNB selects an eNB to be released. The criteria for selection may be the criteria when the C-plane establishing eNB selects an eNB that should establish a DRB for the UE being a communication target. The C-plane establishing eNB uses the criteria to select an eNB to be released. For example, when the communication quality between the UE and the eNB (cell) falls below a predetermined threshold, the C-plane establishing eNB may select the eNB as an eNB to be released.

The C-plane establishing eNB, which has selected a U-plane establishing eNB to be released, stops data forwarding to the U-plane establishing eNB.

The C-plane establishing eNB performs the DRB configuration for the UE being a communication target of the U-plane establishing eNBs except for an eNB to be released. The C-plane establishing eNB notifies each of the U-plane establishing eNBs of a DRB configuration request message.

An X2 interface may be used or a new interface may be provided in the notification of a DRB configuration request message.

For the eNB that has no change in the DRB configuration after the C-plane establishing eNB has modified the DRB configuration, the notification of the modified DRB configuration request message may not be required.

The C-plane establishing eNB notifies an eNB to be released of an instruction to release the DRB established between the UE being a communication target and itself. The instruction message may include the identifier of the UE being a communication target and the identifier of the C-plane establishing eNB (cell). An X2 interface may be used or a new interface may be provided in the notification of a DRB release command message.

The eNB to be released, which has received from the C-plane establishing eNB the instruction to release the DRB established between the UE being a communication target and itself, stops scheduling to the UE. Before stopping scheduling, the eNB may transmit, to the UE, all of the left packet data without being transmitted from the eNB being a release target to the UE. Alternatively, the eNB may complete the retransmission process for all of the packet data whose retransmission process has yet to be complete through HARQ or ARQ.

Each of the U-plane establishing eNBs, which has received the DRB modification request message, configures the DRB of the own eNB. The U-plane establishing eNB, which has received the instruction to release the DRB established between the UE being a communication target and itself, performs the process of releasing the DRB established between the UE being a communication target and the own eNB.

The method of establishing/modifying a DRB may be applied to the process regarding each of the U-plane establishing eNBs that has received the DRB modification request message.

The C-plane establishing eNB notifies the UE of DRB release information. The C-plane establishing eNB (cell) that notifies the UE of the DRB release information notifies the UE being a communication target of the DRB release information of each of the U-plane establishing eNBs and the information for identifying the DRB of which U-plane establishing eNB, for example, the identifier of the U-plane establishing eNB, through RRC signaling. The DRB release information may include the DRB configuration information of each of all the U-plane establishing eNBs except for the U-plane establishing eNB to be released by the C-eNB. The information, indicative of a DRB release request for the U-plane establishing eNB determined to be released by the C-eNB, may be notified together. The system information of each U-plane establishing eNB (cell) may be notified together. The configuration information of an ePDCCH may be notified together. The information may be available for the UE in the case where the system information is changed or a U-plane establishing eNB is newly established in the U-plane establishing eNBs except for the U-plane establishing eNB to be released.

An RRC message may be used. An RRC connection reconfiguration message or an AS-config message may be used as a specific example of the RRC message. The RadioResourceConfigDedicated information in the RRC connection reconfiguration message or the AS-config message may be used.

Consequently, the UE being a communication target can recognize the release of the DRB established between the U-plane establishing eNB to be released and itself The C-plane establishing eNB notifies the UE of the DRB configuration or modification information of the U-plane establishing eNBs except for the eNB to be released. The information may be included in the RRC message above. The DRB configuration or modification information and the DRB release information may be included in one message to be notified. The method disclosed in the second embodiment is applicable to the subsequent process of configuring or modifying the DRB of the U-plane establishing eNBs except for the eNB to be released.

The UE that has received the DRB release information ends the connection with each of the U-plane establishing eNBs (cells) that performs DRB release. The UE may end monitoring of the PDCCH or ePDCCH of the eNB.

The UE, which has performed the process of releasing the DRB with the eNB to be released and has disconnected the connection therewith, may notify the eNB of a disconnection complete message. The method (2) or (3) of notifying each of the U-plane establishing eNBs of a connection complete message may be applied as the notification method.

The eNB to be released, which has received the disconnection complete message from the UE, activates the process of releasing the configuration of data forwarding between the C-plane establishing eNB and itself, and performs the process of deactivating the data forwarding configuration between the eNB to be released and the C-plane establishing eNB. When the C-plane establishing eNB receives the disconnection complete message from the UE, the C-plane establishing eNB activates the process of deactivating the configuration of the data forwarding between the eNB to be released and itself, and performs the process of deactivating the data forwarding configuration between the eNB to be released and the C-plane establishing eNB.

Consequently, the DRB established between the eNB to be released and the UE being a communication target is released.

The data forwarding method disclosed in the first embodiment may be applied as the data forwarding, using a plurality of U-plane establishing eNBs whose DRB has been established between a target UE and itself except for the released eNB.

No data loss is caused in the release of a U-plane establishing eNB. This is because the C-plane establishing eNB performs the DRB configuration of each U-plane establishing eNB, switches a path of the user data, and controls data forwarding. It is therefore not necessary to particularly perform control for avoiding data loss in the release of the U-plane establishing eNB.

FIG. 45 shows an example sequence of releasing a U-plane establishing eNB according to the third embodiment. The sequence shown in FIG. 45 is similar to the sequences shown in FIGS. 30 and 31, and thus, the same steps will be denoted by the same step numbers and common description will be omitted.

A radio bearer 1 (3003) is established between the UE and the C-eNB, and an S1 bearer 1 (3004) is established between the C-eNB and the S-GW. A radio bearer 2 (DRB) (3027) is established between the UE and the U-eNB. In this example sequence, user data forwarding configuration is performed between the C-eNB and the U-eNB. Thus, the user data between the C-eNB and the UE is communicated through the direct communication between the C-eNB and the UE in ST3005, data forwarding between the C-eNB and the U-eNB in ST4409, and the user data communication between the U-eNB and the UE in ST3032. The user data communication between the C-eNB and the S-GW is performed in ST3006.

In ST4501, the UE notifies the C-eNB being a C-plane establishing eNB of a measurement report. The method disclosed in the third modification of the second embodiment is applicable in this notification.

In ST4502, the C-eNB that has received the measurement report selects a U-plane establishing eNB whose DRB should be released, that is, a U-plane establishing eNB to be released, for the UE being a communication target. The method disclosed in the third modification of the second embodiment is applicable as the selection method.

In ST4503, the C-plane establishing eNB determines the configuration of the DRB of each of the U-plane establishing eNBs except for the U-plane establishing eNB to be released. In this case, the DRB configuration may be modified for the U-plane establishing eNB that has performed establishment.

In ST4504, the C-plane establishing eNB configures the DRB of the own cell. The modified DRB may be configured in modification.

In ST4505, the C-plane establishing eNB stops forwarding the user data to the U-plane establishing eNB to be released.

In ST4506, the C-plane establishing eNB notifies each of the U-plane establishing eNBs (U-eNBs) to be released of a DRB release command message. Here, a U-plane connection reconfiguration message is used.

Each of the U-eNBs notified of the DRB release command message performs the process of releasing the DRB of the own eNB.

In ST4507, each of the U-eNBs notified of the DRB release command message stops scheduling of the user data.

In ST4508, the C-eNB that has configured or modified the DRB in ST4504 notifies the UE of DRB configuration information. In this case, the information includes the information indicative of a DRB release request for the U-plane establishing eNB determined to be released by the C-eNB. The information also includes the DRB configuration information of each of all the U-plane establishing eNBs except for the U-plane establishing eNB to be released by the C-eNB. The information indicative of a DRB release request for the U-plane establishing eNB to be released, DRB configuration information of each U-plane establishing eNB (cell), the identifier of each U-plane establishing eNB (cell), the system information of each U-plane establishing eNB (cell), and the configuration information of an ePDCCH are notified in association with each other. An RRC connection reconfiguration message is used in this notification.

If the RRC connection reconfiguration message includes the information indicative of a DRB release request for the U-plane establishing eNB, the UE that has received the message in ST4508 performs the process of releasing the DRB of the U-plane establishing eNB to be released in the message.

In ST4509, the UE starts the process of disconnecting the connection with the U-plane establishing eNB to be released.

The processes from ST3107 to ST3108 are similar to the processes shown in FIG. 31, which will not be described here.

In ST4510, between the C-eNB and the U-eNB, the C-eNB and each of the U-eNBs deactivate the configuration for forwarding packet data for the UE being a communication target. This process deactivates the link for data forwarding between the C-plane establishing eNB and the U-plane establishing eNB.

The process of ST3115 is similar to the process shown in FIG. 31, which will not be described here.

Through the processes above, the DRB between the UE and the U-plane establishing eNB is released. This completes the process of releasing the U-plane establishing eNB for the UE being a communication target.

Consequently, the U-plane connection for the UE being a communication target is performed by the radio bearer 1 (3003) between the UE and the C-eNB and the S1 bearer 1 (3004) between the C-eNB and the S-GW. In ST3005 and ST3006, the user data is transmitted and received between the UE and the S-GW by the bearers.

Another method will be disclosed as the method of releasing the eNB that has established only U-plane between the UE being a communication target and itself. Disclosed below is a case in which the criterion (7) disclosed in the second embodiment are used.

If data forwarding has not been performed for a long period in the radio section (Uu) between the eNB that has established only the U-plane and the UE being a communication target and the eNB detects time-out, the eNB releases the DRB established between the UE being a communication target and itself The U-plane establishing eNB, which has monitored the data transmission in the radio section between the UE being a communication target and itself and has detected data time-out (the expiration of a data monitoring timer), notifies the C-plane establishing eNB of a message requesting to release the DRB established for the UE being a communication target by the own eNB. X2 may be used or a new interface may be provided in this notification. The request message may include the identifier of the UE for which data time-out has been detected, and the identifier of the own eNB.

The C-plane establishing eNB that has received the request message selects the U-plane establishing eNB that has made notification as the eNB to be released.

The C-plane establishing eNB configures a DRB for the UE being a communication target of the U-plane establishing eNBs except for the eNB to be released. The C-plane establishing eNB notifies each of the U-plane establishing eNBs of the DRB configuration. The C-plane establishing eNB notifies the eNB to be released of the instruction to release the DRB established between the UE being a communication target and itself. The method disclosed above may be applied in the subsequent processes.

FIG. 46 shows another example sequence of releasing the U-plane establishing eNB according to the third embodiment. The sequence shown in FIG. 46 is similar to the sequence shown in FIG. 45, and thus, the same steps will be denoted by the same step numbers and common description will be omitted.

In ST4602, the eNB that has established U-plane monitors the data transmission in the radio section (Uu) between the UE being a communication target and itself. If data forwarding has not been performed for a long period and data time-out (expiration of data monitoring timer) has been detected, in ST4603, the U-plane establishing eNB stops scheduling of the user data. In ST4604, the U-plane establishing eNB notifies the C-eNB of the message requesting to release the DRB established for the UE being a communication target by the own eNB. In ST4605, the C-eNB that has received the DRB release request message determines the U-plane establishing eNB that has made notification as the eNB to be released, and configures or modifies the DRB for the UE being a communication target of the U-plane establishing eNBs except for the eNB to be released. In ST4606, the C-eNB stops forwarding of the user data.

ST4512 shown in FIG. 45 may be performed as the subsequent processes.

Through the processes above, the DRB between the UE and the U-plane establishing eNB is released. This completes the process of releasing the U-plane establishing eNB for the UE being a communication target.

Consequently, the U-plane connection for the UE being a communication target is performed by the radio bearer 1 (3003) between the UE and the C-eNB and the S1 bearer 1 (3004) between the C-eNB and the S-GW. In ST3005 and ST3006, the user data is transmitted and received between the UE and the S-GW by the bearers.

Not limited to the above, in another method, the UE may perform the process of disconnecting the connection with the U-plane establishing eNB to be released when detecting data time-out in ST4601. As a result, the UE can perform the process of disconnecting the connection with the U-plane establishing eNB at an early stage, and thus will not perform the unnecessary process of keeping the communication with the U-plane establishing eNB, reducing the power consumption of the UE.

Another method will be disclosed as the method of releasing the eNB that has established only U-plane with the UE being a communication target.

The UE performs monitoring of the radio communication area (radio link monitor (RLM)) between each of the U-plane establishing eNBs (cells) and itself. The UE receives the RS of each of the U-plane establishing cells, thereby judging the degradation in the reception quality in the radio communication area using the RS reception result. The example disclosed in the second embodiment is applicable as a specific example of the RS. Alternatively, a signal equivalent to the RS may be used in place of the RS.

If the reception quality in the radio communication area has fallen below a predetermined threshold for a predetermined period, the UE judges that the reception quality has degraded. Alternatively, if the reception quality in the radio communication area has fallen below a predetermined threshold for a predetermined period, the UE may reconnect with the U-plane establishing eNB (cell). The UE detects the U-plane establishing eNB (cell), synchronizes therewith, transmits the PRACH, and receives the TA. A maximum value may be provided for the number of trial reconnections to judge the degradation in reception quality if the UE cannot establish connection even after performing reconnections for the maximum value.

The UE that has judged the degradation in the reception quality notifies the C-plane establishing eNB that the reception quality in the radio communication area has degraded. This notification may include the identifier of the U-plane establishing eNB such that reception quality in a radio communication area of which U-plane establishing eNB has degraded can be seen.

The C-plane establishing eNB (cell) that has received the degradation information from the UE selects the U-plane establishing eNB whose reception quality has degraded as an eNB to be released.

The C-plane establishing eNB configures a DRB for the UE being a communication target of the U-plane establishing eNBs except for the eNB to be released. The C-plane establishing eNB notifies each of the U-plane establishing eNBs of the DRB configuration. The C-plane establishing eNB also notifies the eNB to be released of the instruction to release the DRB established between the UE being a communication target and itself. The method disclosed above may be applied to the subsequent processes.

The UE may perform RLM and, at the time when it judges that the reception quality in the radio communication area has degraded, may disconnect the communication with the U-plane establishing eNB whose reception quality has degraded.

The method disclosed in this embodiment enables the communication of packet data for the UE being a communication target using a plurality of eNBs, increasing the communication capacity of the UE.

A plurality of eNBs can be used also when cells are downsized, increasing spectral efficiency, which increases communication capacity as a system.

Besides, the control process for establishing a plurality of RRC connections is not required, simplifying the control process, which reduces an amount of signaling and a control delay amount.

The RRC function of the U-plane establishing eNB is not required, and thus, in the case where, for example, an eNB dedicated for establishing U-plane is configured, the eNB can be configured more easily compared with a conventional eNB.

The UE mobility control does not need the control process for establishing a plurality of RRC connections. Therefore, for the coverage of a C-plane establishing eNB (cell), it suffices to change (establish/modify/release) only the U-plane establishing eNB, leading to the control process with a lower delay at higher speed. For example, in the case where the C-plane establishing eNB (cell) is a coverage cell and the U-plane establishing eNB (cell) is a capacity cell, HO control is not required between the capacity cells, and only the U-plane establishing eNB may be changed (established/modified/released).

The MME needs not to recognize the U-plane establishing eNB, and thus, in the change of the U-plane establishing eNB, a signaling amount and a control delay amount can be reduced in the control process on the network side. This leads to the control process with much lower delay at much higher speed for the UE mobility control.

The S-GW needs not to recognize the U-plane establishing eNB, and thus, in the change of a U-plane establishing eNB, an amount of signaling and a control delay amount can be reduced in the control process on the network side. This leads to the control process with much lower delay at much higher speed for the UE mobility control.

The third embodiment has disclosed the method in which the C-plane establishing eNB selects and determines an eNB that should establish a DRB with the UE being a target. In another method, the MME may select and determine an eNB that should establish a DRB with the UE.

In this case, the MME may notify the C-plane establishing eNB of the U-plane establishing eNB selected and determined. The C-plane establishing eNB configures the DRB configuration of the notified U-plane establishing eNB.

The method described above is applicable to the subsequent processes.

Unfortunately, this method cannot achieve an effect of eliminating the need for the MME to recognize the U-plane establishing eNB. However, this method is effective because it achieves other effects.

First Modification of Third Embodiment

In the third embodiment, the C-plane establishing eNB configures the DRB of each U-plane establishing eNB for the UE being a communication target. Thus, a conflict may occur between the DRB configuration and the resource configuration for other UE being served by each U-plane establishing eNB. This modification will disclose the method of avoiding such a conflict.

An eNB for concentrated control (also referred to as a master eNB), which controls specific one or a plurality of eNBs, is provided in a specific area. The eNB having the RRC function may be an eNB for centralized control. In this specific area, the UE establishes RRC connection with the eNB for centralized control. The RRC connection may be established via another eNB for centralized control.

For the UE being a communication target, the C-plane establishing eNB may be an eNB for centralized control, and the U-plane only establishing eNB may be an eNB (target eNB for centralized control, slave eNB) that is controlled by the eNB for centralized control. The eNB for centralized control controls all the eNBs (C-plane establishing eNB and U-plane establishing eNB) for the UE being a communication target. Specifically, the control may be performed in each protocol of the RRC, PDCP, RLC, MAC, and PHY.

When performing control, the eNB for centralized control performs a configuration according to the priority order for the DRBs of other UEs being served by the U-plane establishing eNB. The following three specific examples will be disclosed below.

(1) A DRB of a UE being served by another eNB (cell) has higher priority.

(2) A DRB of a UE being served by the own eNB (cell) has higher priority.

(3) A DRB of a UE, for which the own eNB (cell) is a U-plane establishing eNB, has higher priority.

Specific examples of the DRB configuration include the configuration of a DRB identifier and the configuration of a lower layer. Examples of the lower layer include the PDCP configuration, RLC configuration, MAC configuration, and PHY configuration.

When the eNB for centralized control performs control, the U-plane-side user data is transmitted between the eNB for centralized control and a target eNB for centralized control. Disclosed below are seven specific examples of the layer for this transmission.

(1) IP packet data before being input to PDCP
(2) Data unit to which SN is added in PDCP
(3) Data unit between PDCP and RLC
(4) Data unit between RLC and MAC
(5) Data unit after scheduling in MAC
(6) Data unit before HARQ in MAC
(7) Data unit between MAC and PHY A link for the transmission of the such data may be established between the eNB for centralized control and the target eNB for centralized control. This enables the transmission of the U-plane-side user data between the eNB for centralized control and the target eNB for centralized control.

The eNB for centralized control may notify each target eNB for centralized control of the configuration in a required layer or protocol among the DRB configurations in each target eNB for centralized control. This reduces an amount of signaling.

The method disclosed in this modification is also applicable in the case where a plurality of nodes or cells are configured in one eNB, not in a plurality of eNBs. A node or cell for centralized control may be provided in one eNB. The node or cell for centralized control serves as a C-plane establishing eNB (cell) for the UE being a communication target, and a node or cell in another eNB serves as a U-plane only establishing eNB (cell). The node or cell for centralized control may not only serve as a C-plane establishing eNB (cell) but also serve as a U-plane establishing eNB (cell) for the UE being a communication target.

FIG. 47 shows the architecture according to a first modification of the third embodiment, which shows the case in which a cell for centralized control is provided in one eNB.

4701 denotes an eNB. 4702 denotes a cell that establishes C-plane connection, which is referred to as a C-cell. 4703 denotes a cell that establishes only U-plane connection, which is referred to as a U-cell. The C-cell and the U-cell are configured in the same eNB. 4704 denotes a link for transmitting U-plane-side user data provided between the C-cell and the U-cell. 4705 donates an interface for signaling provided between the C-cell and the U-cell. The interface may be X2 or an interface may be newly provided. The C-cell (4702) serves as a cell for centralized control and controls all the cells in the same eNB (4701).

In the case where an eNB for centralized control is provided in a specific area, the eNB in 4701 may denote an eNB in the specific area, the C-cell may denote an eNB for centralized control configured in the specific area, and the U-cell may denote a target eNB for centralized control in the specific area.

The method disclosed in this modification achieves the following effects in addition to the effects of the third embodiment.

An eNB for centralized control is provided in a specific area, allowing the DRB of each UE to be configured in consideration of all the resources of all the eNBs and all the UEs being served by all the eNBs.

An occurrence of a conflict can be avoided between the DRB configuration of each U-plane establishing eNB for the UE being a communication target, performed by the C-plane establishing eNB, and the resource configuration for another UE being served by each U-plane establishing eNB, performed by each U-plane establishing eNB.

Thus, adjustment is not required between eNBs in a specific area, reducing a control delay and an amount of signaling.

Disclosed below is a method of handling U-plane in the case where a C-plane establishing cell (eNB) is changed for the UE being a communication target in the second embodiment to the first modification of the third embodiment. Handover (HO) may be applied to a change of a C-plane establishing eNB. How to handle the case where an eNB for U-plane connection is established for the UE being a communication target is a problem.

The following two are the method in the case where handover for the UE being a communication target is performed between different C-plane establishing eNBs.

(1) U-plane connection is once returned to a C-plane establishing eNB cell.

When the U-plane establishing eNB differs from the C-plane establishing eNB, U-plane connection is changed from the U-plane only establishing eNB to the C-plane establishing eNB (source C-plane establishing eNB) before handover. The U-plane connection with the source C-plane establishing eNB is established or modified, and the U-plane only establishing eNB is released.

As a result, the U-plane connection for the UE being a communication target is also established by the source C-plane establishing eNB.

In this state, HO is performed from the source C-plane establishing eNB to the C-plane establishing eNB being a target (target C-plane establishing eNB). The conventional method may be applied in this case.

After HO to the target C-plane establishing eNB, the process of establishing U-plane connection may be performed again for the UE being a communication target. This process may be performed as required.

In HO of X2 between C-plane establishing eNBs, the MME does not recognize that HO is to be performed in a HO preparation phase. Thus, when the MME selects a U-plane establishing eNB, the source C-plane establishing eNB that has determined HO may request the MME to change U-plane. This request message may include the information indicating that a change request is made due to HO. The MME may accordingly perform the process of configuring or modifying the C-plane establishing eNB as a U-plane establishing eNB and perform the process of releasing the originally established U-plane only establishing eNB.

As a result, the C-plane establishing eNB can be changed for the UE being a communication target without disconnecting the U-plane connection.

(2) A target C-plane establishing eNB notifies a UE of an eNB that establishes U-plane connection.

The source C-plane establishing eNB notifies the target C-plane establishing eNB of a HO request. This message may include the information of the U-plane establishing eNB configured for the UE being a current HO target.

The target C-plane establishing eNB that has received the information selects and determines a U-plane establishing eNB that establishes U-plane connection with a UE being a HO target. The U-plane establishing eNB may not be changed.

The target C-plane establishing eNB notifies the source C-plane establishing eNB of a HO request response message. The message includes the information of the U-plane establishing eNB configured by the target C-plane establishing eNB.

The source C-plane establishing eNB notifies the UE of a HO request message together with the information.

The UE changes the C-plane connection to the target C-plane establishing eNB and also changes the U-plane connection with the U-plane establishing eNB information.

Contrastingly, the target C-plane establishing eNB that has selected and determined a U-plane establishing eNB notifies the MME of the information in an E-RAB configuration request message. The MME uses the information to perform the process of configuring, modifying, or releasing an E-RAB of the U-plane establishing eNB.

Thus, the C-plane establishing eNB and the U-plane establishing eNB can be changed for the UE being a communication target.

The C-plane establishing eNB can be accordingly changed for the UE being a communication target without disconnection of the U-plane connection.

If handover is performed between the cells in a C-plane establishing eNB for the UE being a communication target, the method in the case where HO is performed between different C-plane establishing eNBs may be applied between cells in the C-plane establishing eNB. This method achieves similar effects.

Fourth Embodiment

Conventionally, the UE connects with one eNB, and is thus required to notify a scheduling request (SR) to only the one eNB when notifying the scheduling request (SR) for uplink transmission. In the methods disclosed in the first embodiment to the first modification of the third embodiment, however, the UE connects with a plurality of eNBs. Thus, the UE is uncertain about an eNB to be notified of the SR.

This embodiment aims to solve the above-mentioned problem.

The SR is transmitted per eNB (cell) connected with the UE. The SR is transmitted per eNB (cell) as required in accordance with the traffic control disclosed in the first embodiment. This allows the transmission of the UL data to each eNB (cell) in accordance with the traffic control in the UE.

The configuration information of the SR for a target UE in each eNB (cell) may be dedicatedly notified the UE by each eNB (cell) in advance.

The SR configuration may be performed in the RRC function.

In the first embodiment, the SR configuration may be included in the RRC function of each eNB. The conventional notification method is applicable to notifying the UE.

In the second embodiment, the SR configuration may be included in the limited

RRC function of a U-plane establishing eNB. The method of notifying the UE of ePDCCH configuration information may be applied as the method of notifying the UE of the SR configuration information.

In the third embodiment, the SR configuration may be included in the RRC function of a C-plane establishing eNB. The C-plane establishing eNB determines the SR configuration of each U-plane establishing eNB (cell) and notifies the UE and each U-plane establishing eNB (cell).

As a result, the UE can recognize the SR configuration for each eNB to notify the SR.

Other methods will be disclosed. Disclosed below are the method of handling uplink data and the method of transmitting the SR by the UE.

The UE separately handles the U-plane UL data and the C-plane UL data.

An example of the U-plane UL data is user data, and an example of the C-plane UL data is signaling data. The UE judges which data is to be transmitted.

The following three will now be disclosed as the method of transmitting SR.

(1) For C-plane UL data, SR is transmitted to a C-plane establishing cell (eNB).

(2) For U-plane UL data, SR is transmitted to a U-plane establishing cell (eNB).

(3) Both of C-plane UL data and the U-plane UL data are transmitted to the C-plane establishing cell (eNB).

In (1), the UE that has judged that the uplink data is the C-plane UL data transmits the SR to the C-plane establishing cell (eNB). The SR configuration in the C-plane establishing cell (eNB) may be used as the SR configuration. If there are a plurality of C-plane establishing cells (eNBs), the SR may be notified each of the C-plane establishing cells (eNBs) which the UL data relates to. Alternatively, any one C-plane establishing cell (eNB) may be selected, and the SR may be notified the one C-plane establishing cell (eNB). Predetermined criteria for selection may be used to select one C-plane establishing cell (eNB). For example, the criteria disclosed in the second embodiment may be used. The best cell (eNB) may be selected. This allows the C-plane establishing cell (eNB) that has received the SR to perform scheduling of the uplink data for the UE by the own cell (eNB).

In (2), the UE that has judged that the uplink data is the U-plane UL data transmits the SR to the U-plane establishing cell (eNB). When the U-plane UL data is distributed to each of the U-plane establishing eNBs (cells) in accordance with data traffic control, SR may be transmitted to each of the U-plane establishing cells (eNBs). The SR configuration may be the SR configuration in each U-plane establishing cell (eNB).

This allows each of the U-plane establishing cells (eNBs) that has received the SR to perform scheduling of the uplink data for the UE by the own cell (eNB).

In (3), the UE judges whether the uplink data is the U-plane UL data or C-plane UL data, and then, transmits the U-plane UL data and the C-plane UL data to the C-plane establishing cell (eNB). The SR configuration in the C-plane establishing cell (eNB) may be used as the SR configuration. Alternatively, the SR for U-plane UL data and the SR for C-plane UL data may be provided in another method. For the U-plane UL data, SR is transmitted using the SR configuration for U-plane UL data. For the C-plane UL data, SR is transmitted using the SR configuration for C-plane UL data.

Disclosed below is a method of providing the SR for C-plane UL data and the SR for U-plane UL data. The SR for C-plane UL data may be identifiable from the SR for U-plane UL data. For example, a different information bit string pattern is used for each SR. Alternatively, each SR is multiplied by a different identification code or sequence. Alternatively, a different resource on a frequency axis and/or on a time axis is used for each SR notification. Alternatively, an identifier for identifying whether the UL data is C-plane data or U-plane data is provided as the information in the SR.

This allows the eNB notified of the SR to explicitly judge whether the SR is for C-plane UL data or for U-plane UL data.

The configuration information of each SR for a target UE in each eNB (cell) may be dedicatedly notified from each eNB (cell) to the UE in advance. The method above may be used.

In (3), the SR for C-plane UL data and the SR for U-plane UL data may be provided and the UE may transmit an SR corresponding to each uplink data to allow the C-plane cell (eNB) that has received the SR to judge whether the SR is for the C-plane UL data or for the U-plane UL data. It is thus possible to recognize that scheduling should be performed on the C-plane establishing cell (eNB) or scheduling should be performed on the U-plane establishing cell (eNB). For the SR for U-plane UL data, the information equivalent to the SR may be notified the U-plane establishing cell (eNB). A new message may be provided in this notification.

The UE can accordingly recognize a cell (eNB) to be notified of the SR for the generated data. The C-plane establishing cell (eNB) and the U-plane establishing cell (eNB) can recognize what data has been generated, allowing the cell (eNB) that has received the SR or the information equivalent to the SR to perform scheduling for uplink data.

The method, in which the SR for C-plane UL data and the SR for U-plane UL data are provided and the UE transmits the SR corresponding to each uplink data, may be applied to the methods (1) and (2) above. This allows the eNB that has received the SR to explicitly judge that the data is which one of the two types of data in accordance with the SR.

Although the method in which the UE separately handles the U-plane UL data and the C-plane UL data has been disclosed above, the UE may not separately handle the U-plane UL data and the C-plane UL data.

In this case, the UE transmits the SR to the C-plane establishing cell (eNB) as the method of transmitting the SR. The UE performs transmission using the same SR if the uplink data is the U-plane UL data or the C-plane UL data. The SR configuration in the C-plane establishing cell (eNB) may be used as the SR configuration. The C-plane establishing cell (eNB) that has received the SR performs scheduling of the data using the own cell (eNB). The process of establishing U-plane may be performed if a U-plane is not established.

In the case where the C-plane establishing cell (eNB) can judge that the UL data is the C-plane UL data or the U-plane UL data, the C-plane establishing cell (eNB) that has received the SR may notify the U-plane establishing cell (eNB) of the information equivalent to the SR if there is U-plane uplink data. A new message may be provided in this notification. Scheduling may be performed from the U-plane establishing cell (eNB). The UE may transmit data from the U-plane establishing cell (eNB) to the U-plane in accordance with the scheduling from the U-plane establishing cell (eNB).

As a result, the UE can recognize a cell (eNB) to be notified of the SR. The cell (eNB) that has received the SR or the information equivalent to the SR can perform scheduling for uplink data.

The C-plane establishing cell (eNB), which has received the SR from the UE being a communication target, may request the MME to perform a new DRB configuration for the UE being a communication target. Alternatively, the C-plane establishing cell (eNB) may newly select a U-plane establishing eNB and request the U-plane establishing eNB to configure the DRB. The methods disclosed in the second embodiment to the first modification of the third embodiment may be applied depending on a situation. Therefore, communication capacity can be increased for the UE being a communication target.

Fifth Embodiment

Conventionally, the UE connects with one eNB, and is thus required to notify a buffer status report (BSR) to only the one eNB when notifying the buffer status report (BSR). In the methods disclosed in the first embodiment to the first modification of the third embodiment, however, the UE connects with a plurality of eNBs. Thus, the UE is uncertain about an eNB to be notified of the BSR.

This embodiment aims to solve the problem.

The BSR is transmitted per eNB (cell) to be connected with the UE. The BSR is transmitted depending on an amount of transmission data per eNB (cell) in accordance with the traffic control disclosed in the first embodiment. This allows each eNB to perform uplink scheduling to the UE using the received BSR.

The configuration of the BSR report timing may be included in the RRC function.

In the first embodiment, the configuration may be included in the RRC function of each eNB. The conventional notification method is applicable to notifying the UE.

In the second embodiment, the configuration may be included in the limited RRC function of the U-plane establishing eNB. The method of notifying the UE of the ePDCCH configuration information may be applied as the method of notifying the UE of BSR report timing.

In the third embodiment, the configuration may be included in the RRC function of the C-plane establishing eNB. The C-plane establishing eNB determines the BSR report timing configuration of each U-plane establishing eNB (cell) and notifies the UE and each U-plane establishing eNB (cell).

The UE can accordingly recognize the BSR report timing for each eNB, notifying the BSR.

Other methods will be disclosed. Disclosed below are the method of handling uplink data and the method of transmitting a BSR by the UE.

The UE separately handles the U-plane UL data and the C-plane UL data. The UE judges which data to be transmitted.

The following three will now be disclosed as the method of transmitting BSR.

(1) For C-plane UL data, BSR is transmitted to a C-plane establishing cell (eNB).

(2) For U-plane UL data, BSR is transmitted to a U-plane establishing cell (eNB).

(3) Both of C-plane UL data and the U-plane UL data are transmitted to the C-plane establishing cell (eNB).

In (1), the UE that has judged that the uplink data is the C-plane UL data transmits the BSR to the C-plane establishing cell (eNB). If there are a plurality of C-plane establishing cells (eNBs), the BSR may be notified each of the C-plane establishing cells (eNBs) which the UL data relates to. Alternatively, any one C-plane establishing cell (eNB) may be selected, and the BSR may be notified the one C-plane establishing cell (eNB). Predetermined criteria for selection may be used to select one C-plane establishing cell (eNB). This allows the C-plane establishing cell (eNB) that has received the BSR to perform scheduling of the uplink data for the UE by the own cell (eNB).

In (2), the UE that has judged that the uplink data is the U-plane UL data transmits the BSR to the U-plane establishing cell (eNB). When the U-plane UL data is distributed to each of the U-plane establishing eNBs (cells) in accordance with data traffic control, the BSR may be transmitted to each of the U-plane establishing cells (eNBs). This allows each of the U-plane establishing cells (eNBs) that has received the BSR to perform scheduling of the uplink data for the UE in the own cell (eNB).

In (3), the UE judges whether the uplink data is the U-plane UL data or the C-plane UL data, and then, transmits the U-plane UL data and the C-plane UL data to the C-plane establishing cell (eNB).

The UE may separately handle the U-plane UL data and the C-plane UL data in a logical channel group (LCG) when transmitting the BSR. The LCG for U-plane UL data and the LCG for C-plane UL data are provided. The LCG for U-plane UL data is configured by the logical channel (LC) to which the U-plane UL data is mapped. The LCG for C-plane UL data is configured by the LC to which the C-plane UL data is mapped.

As a result, the eNB that has been notified of the BSR can explicitly judge whether the BSR is the BSR of C-plane UL data or the BSR of U-plane UL data.

In (3), the LCG for C-plane UL data and the LCG for U-plane UL data may be provided and the UE may transmit the BSR of the LCG corresponding to each uplink data to allow the C-plane cell (eNB) that has received the BSR to judge whether the LCG is for the C-plane UL data or for the U-plane UL data. It is thus possible to recognize that scheduling is performed on the C-plane establishing cell (eNB) or scheduling is performed on the U-plane establishing cell (eNB). For the BSR of the LCG for U-plane UL data, the information equivalent to the BSR may be notified the U-plane establishing cell (eNB). A new message may be provided in this notification.

The UE can accordingly recognize a cell (eNB) to be notified of the BSR for the generated data. The C-plane establishing cell (eNB) and the U-plane establishing cell (eNB) can recognize what data has been generated, allowing the cell (eNB) that has received the uplink data information to perform scheduling for uplink data.

The method, in which the LCG for C-plane UL data and the LCG for U-plane UL data are provided and the UE transmits the BSR of the LCG corresponding to each uplink data, may be applied to the methods (1) and (2) above. This allows the eNB that has received the BSR to explicitly judge that the data is which one of the two types of data in accordance with the BSR.

Other methods will be disclosed as the method of handling uplink data and the method of transmitting a BSR by the UE.

The target UE separately handles every cell (eNB) to be connected therewith. An LCG is configured per cell (eNB). Alternatively, one or a plurality of LCGs may be configured in each cell (eNB). The BSR of the LCG per cell (eNB) may be transmitted to a corresponding cell (eNB). Still alternatively, the BSR may be transmitted to any one C-plane establishing cell (eNB).

A specific example will be described in which a target UE is connected to one C-plane establishing cell (eNB) and a plurality of U-plane establishing cells (eNBs). The LCG is configured per U-plane establishing cell (eNB). Alternatively, one or a plurality of LCGs may be configured in each U-plane establishing cell (eNB).

The method of transmitting a BSR will be disclosed.

The BSR of the LCG of the C-plane establishing cell (eNB) is transmitted to the C-plane establishing cell (eNB).

The following two will be disclosed as the method of transmitting the BSR of a U-plane establishing cell (eNB).

(1) The BSR of the LCG of each U-plane establishing cell (eNB) is transmitted to each U-plane establishing cell (eNB).

(2) The BSR of the LCG of each U-plane establishing cell (eNB) is transmitted to the C-plane establishing cell (eNB).

In (1), when the U-plane UL data is distributed to each of the U-plane establishing eNBs (cells) in accordance with data traffic control, the UE may transmit the BSR to each of the U-plane establishing cells (eNBs) in accordance with the amount of the distributed data. This allows each of the U-plane establishing cells (eNBs) that has received the BSR to perform scheduling of the uplink data to the UE by the own cell (eNB).

In (2), the BSR may include the information by which the BSR of the LCG of which U-plane establishing cell (eNB) is identifiable. For example, the information may be the identifier of the U-plane establishing cell (eNB). The C-plane cell (eNB) that has received the BSR can judge the BSR of the UL data is of which U-plane establishing cell (eNB). This allows the C-plane cell (eNB) to recognize a U-plane establishing cell (eNB) on which scheduling needs to be performed. The C-plane establishing cell (eNB) may notify the U-plane establishing cell (eNB) of the information equivalent to the BSR. A new message may be provided in this notification.

The UE can accordingly recognize a cell (eNB) to be notified of the BSR for the generated data.

The above-mentioned method of separately handling the U-plane UL data and the C-plane UL data in a logical channel group (LCG) in the case where the UE transmits a BSR may be combined with the method of separately handling the data per cell (eNB) to be connected with a target UE in that case. The LCG for U-plane UL data and the LCG for C-plane UL data are provided for each cell (eNB) per cell (eNB).

This allows the C-plane establishing cell (eNB) and the U-plane establishing cell (eNB) to recognize what data has been generated, and the cell (eNB) that has received the uplink data information can perform scheduling in accordance with the uplink data.

Disclosed below are other methods of handling uplink data and another method of transmitting a BSR by a UE.

The U-plane UL data is used separately for every DRB configured by a U-plane establishing cell (eNB).

In a specific example, an LCG is configured for every DRB configured by a U-plane establishing cell (eNB). Alternatively, an LCG may be configured in one or a plurality of DRBs configured by a U-plane establishing cell (eNB). The BSR may include the information for identifying the BSR of the LCG being of which DRB of which of U-plane establishing cell (eNB).

The following two will be disclosed as the method of transmitting a BSR.

(1) The BSR of the LCG of the DRB, configured by each U-plane establishing cell (eNB), is transmitted to each U-plane establishing cell (eNB).

(2) The BSR of the LCG of the DRB, configured by each U-plane establishing cell (eNB), is transmitted to a C-plane establishing cell (eNB).

This allows the UE to recognize a cell (eNB) to be notified of a BSR for the generated data. The C-plane establishing cell (eNB) and the U-plane establishing cell (eNB) can recognize what data has been generated, and the cell (eNB) that has received the information on the uplink data can perform scheduling according to the uplink data.

Although the method in which a UE separately handles the U-plane UL data and the C-plane UL data has been disclosed above, the UE may non-separately handle the U-plane UL data and the C-plane UL data.

In this case, a BSR is transmitted to a C-plane establishing cell (eNB). If there are a plurality of C-plane establishing cells (eNBs), a BSR may be transmitted to any one of them.

The UE configures an LCG and transmits a BSR to the C-plane establishing cell (eNB).

The C-plane establishing cell (eNB) that has received the BSR performs scheduling on the data using the own cell (eNB). If U-plane has not been established, the process of establishing U-plane is performed.

When the C-plane establishing cell (eNB) can judge whether the UL data is the C-plane or U-plane UL data, if the U-plane uplink data is present, the C-plane establishing cell (eNB) that has received the BSR may notify the U-plane establishing cell (eNB) of the information on the uplink data to perform scheduling from the U-plane establishing cell (eNB). The UE may transmit data from the U-plane establishing cell (eNB) to the U-plane in accordance with the scheduling from the U-plane establishing cell (eNB).

Consequently, the UE can recognize a cell to be notified of a BSR. The cell (eNB) that has received the information on the uplink data can perform scheduling for the uplink data.

The C-plane establishing cell (eNB), which has received a BSR from a UE being a communication target, may request the MME to configure a new DRB for the UE being a communication target. Alternatively, the C-plane establishing cell (eNB) may newly select a U-plane establishing eNB and request the U-plane establishing eNB to configure the DRB. The methods disclosed in the second embodiment to the first modification of the third embodiment may be applied depending on situations. The communication capacity for the UE being a communication target can be accordingly increased.

Sixth Embodiment

As described in the first embodiment, increasing communication capacity is required as a system. For increased communication capacity, it is studied to downsize cells for higher spectral efficiency. If there are a large number of small cells, it is complicate to divide the small cells for detection or measurement, increasing a control delay. Dividing the small cells for detection or measurement is accordantly not suitable for mobility control between small cells.

This embodiment aims to reduce the problems above.

A carrier to be used in common (hereinafter, referred to as a shared carrier) is configured as a radio resource for a plurality of nodes. The node may be an eNB (cell) or a node having none of the functions of the eNB (cell).

Eight features of the shared carrier are as follows.

(1) The same frequency layer is used.

(2) A conventional physical channel for L1/L2 control is not mapped.

(3) Mapping of a physical channel for L1/L2 control of which resources are dedicatedly allocated to UEs is allowed.

(4) A physical channel for broadcasting is not mapped.

(5) A detection signal, a synchronization signal, and a reference signal are configured in the same manner irrespective of whether the signals are configured by any node.

(6) Identifiers for node identification, which are the same, may be included.

(7) Shared carriers respectively configured by nodes are in precise synchronization.

(8) Combination of (1) to (7).

For (2), specific examples of the conventional physical channel for L1/L2 control include PDCCH, PCFICH, and PHICH.

For (3), specific examples of the UE-dedicated physical channel for L1/L2 include ePDCCH and ePHICH.

For (4), examples of the physical channel for broadcasting include PBCH.

For (5), specific examples of the detection signal, the synchronization signal, and the reference signal include PSS, SSS, and CRS, respectively. As a specific example of the same configuration, the same code is used, or a configuration is made on the same symbol.

For (6), a specific example of the identifier for node identification may be a cell identifier (cell-ID).

For (7), a specific example of the precise synchronization may be a phase synchronization.

Only the U-plane-side user data may be scheduled to a shared carrier. However, the scheduling information on the U-plane-side user data may be mapped. In this case, another carrier may be used for a radio resource for C-plane.

A shared carrier may be used by a node that establishes only U-plane (such as a U-plane only establishing eNB (cell)). The C-plane establishing node (such as a C-plane establishing eNB (cell)) is caused to have a carrier different from a shared carrier. In this case, it is not always necessary to synchronize the shared carrier and the carrier for C-plane establishing node. This operation method may be applied to the C-plane establishing eNB (cell) and the U-plane only establishing eNB (cell), disclosed in the second embodiment to the first modification of the third embodiment.

FIG. 48 is a conceptual diagram of shared carriers according to a sixth embodiment. 4801 and 4802 denote C-plane establishing eNBs, and 4805 and 4806 denote U-plane only establishing eNBs. The C-plane establishing eNB 4801 is connected with the U-plane only establishing eNB 4805 by an interface 4803. The C-plane establishing eNB 4802 is connected with the U-plane only establishing eNB 4806 by an interface 4804. The interfaces 4803 and 4804 may be X2 or other interfaces.

As indicated by 4808, the C-plane establishing eNB 4801 configures a carrier of a frequency layer F1 and uses the carrier as a radio resource for a UE being a communication target. As indicated by 4809, the C-plane establishing eNB 4802 configures a carrier of a frequency layer F2 and uses the carrier as a radio resource for the UE being a communication target.

As indicated by 4810, the U-plane only establishing eNB 4805 configures a shared carrier of a frequency layer Fm and uses the shared carrier as a radio resource for the UE being a communication target. As indicated by 4811, the U-plane only establishing eNB 4806 configures a shared carrier of the frequency layer Fm and uses the shared carrier as a radio resource for the UE being a communication target.

The carriers of the frequency layer Fm, configured by the U-plane only establishing eNBs 4805 and 4806, are shared carriers.

The shared carriers configured by the U-plane only establishing eNBs 4805 and 4806 in a specific area 4807 are in precise synchronization.

4812 denotes a detection signal and/or a synchronization signal and/or a reference signal of the shared carrier, and the same signal is configured by the U-plane only establishing eNBs 4805 and 4806.

Using the shared carrier as the radio resource by the U-plane only establishing eNBs 4805 and 4806 allows, for example, the use of the shared carrier configured by the U-plane only establishing eNB 4806 as a radio resource for the UE without the need for the UE being a communication target for the U-plane only establishing eNB 4805 to detect the shared carrier configured by the U-plane only establishing eNB 4806 and achieve synchronization with the shared carrier.

For example, the processes for detection and synchronization of a carrier are not required also in the case where a U-plane only establishing eNB (cell) is changed, disclosed in the second embodiment.

The use of a shared carrier eliminates the need for detecting and measuring another carrier also in the measurement by the UE, simplifying control.

For example, also in the case where the communication quality of the cell through the measurement by the UE is used as the criteria for selection, disclosed in the second embodiment, the UE is merely required to measure a shared carrier also in the measurement of the communication quality of the own cell and another cell, simplifying control.

Thus, configuring a shared carrier can simplify the control for changing a U-plane establishing eNB (cell) while a UE is moving.

In the case where a shared carrier is configured in a small cell, the carriers of a large number of small cells need not to be divided for detection or measurement, simplifying control, which reduces a control delay.

The shared carrier is configured in the same frequency layer, and thus, the use of a shared carrier in a small cell leads to high communication capacity achieved as a system without a reduction in spectral efficiency due to downsized cells.

As the criteria for selecting a U-plane establishing eNB (cell) for the UE being a communication target, the criteria except for the communication quality between each U-plane establishing eNB (cell) and the UE may be used among the criteria disclosed in the second embodiment. This is because U-plane establishing eNBs (cells) cannot be distinguished from each other in accordance with the communication quality of the shared carrier used as the communication quality between each U-plane establishing eNB (cell) and the UE. For example, the UE location information may be used as another criterion. A U-plane establishing eNB (cell) to be selected may be judged by using the UE location information together with the location information of each U-plane establishing eNB.

In the case where a shared carrier is configured in U-plane only establishing eNBs connected to different C-plane establishing eNBs, radio resources to be allocated to the shared carriers may conflict between the UEs being communication targets. For example, a resource block on the shared carrier, to which the radio resource for the UE being a communication target in the U-plane only establishing eNB 4805, may be the same as the resource block on the shared carrier, to which the radio resource for the UE being a communication target is allocated in the U-plane only establishing eNB 4806. In other words, a conflict occurs. This is because scheduling is performed dedicatedly and independently in establishment of each U-plane.

In such a case, the U-plane only establishing cell may perform retransmission control such as HARQ or ARQ between the UE being a communication target and itself. The retransmission control may be made such that scheduling can be performed again from a frequency and/or time standpoint. Even if the above-mentioned conflict occurs, scheduling to a new resource block through retransmission control can reduce a fear of conflict in the next transmission. The above-mentioned conflict can therefore be reduced.

Measurement by the UE may be used in another method of reducing conflict. The UE measures the communication quality between a U-plane only establishing eNB and itself. In configuring a shared carrier, the UE measures the communication quality in the shared carrier. If the communication quality of the resource block allocated to the own UE is poor, another U-plane only establishing cell may be using this resource block. Thus, the U-plane only establishing cell, which has received the measurement result indicative of poor communication quality from the UE via the C-plane establishing eNB, can avoid allocating this resource block to the UE.

Consequently, a conflict of the radio resources scheduled between the U-plane only establishing eNBs can be reduced.

Although the communication quality has been disclosed as to the measurement of a shared carrier by the UE, besides, the thermal noise power in a shared carrier may be measured. The thermal noise power may be measured in units of a predetermined number of PRBs or in units of a predetermined number of subcarriers. The UE may measure the thermal noise power and notify the U-plane only establishing cell via the C-plane establishing cell as a measurement result.

In another example, a U-plane only establishing cell may perform downlink measurement. In other words, a shared carrier is measured. Measurement may be performed in a subframe for which scheduling is not performed. Or, a scheduling gap may be provided to enable the measurement.

This measurement reduces a conflict of radio resources to be scheduled between U-plane only establishing eNBs.

FIG. 49 shows an example configuration of the shared carrier in the same eNB, which shows the case in which a C-plane establishing cell and U-plane only establishing cells are configured in the same eNB. 4901 denotes a C-plane establishing cell (C-cell), and 4903 denotes a U-plane only establishing cell (U-cell). The eNB is configured of the C-plane establishing cell 4901 and a plurality of U-plane only establishing cells 4903. 4902 denotes the coverage by the C-plane establishing cell 4901, and 4904 denotes the coverage by the U-plane only establishing cell 4903. 4905 denotes an interface between the C-plane establishing cell 4901 and each U-plane only establishing cell.

The carrier of a frequency layer F1 is configured as a radio resource in the C-plane establishing cell, and the shared carrier of a frequency layer Fm is configured as a radio resource in each U-plane only establishing cell.

The UE being a communication target for each U-cell can accordantly move without performing the reconnection process such as the detection and synchronization in a radio section between a U-cell and itself Schedulings of radio resources for a C-cell and a plurality of U-cells are performed in a unified manner because they are in the same eNB. For example, scheduling may be performed by a MAC in the C-cell. Therefore, in a plurality of U-cells, the allocation of the radio resources to the shared carrier for the UE being a communication target for each U-cell can be scheduled without conflict.

FIG. 50 shows an example configuration of a shared carrier in different eNBs, which shows a case in which C-plane establishing cell and a U-plane only establishing cell are configured in an eNB. 5002 and 5003 each denote a C-plane establishing cell (C-cell), and 5004 and 5005 each denote a U-plane only establishing cell (U-cell). The eNB 1 is configured of the C-plane establishing cell 5002 and the U-plane only establishing cell 5004. The eNB 2 is configured of the C-plane establishing cell 5003 and the U-plane only establishing cell 5005.

5008 and 5009 denote the coverages by the C-plane establishing cells 5002 and 5003, respectively, and 5010 and 5011 denote the coverages by the U-plane only establishing cells 5004 and 5005, respectively.

5012 and 5013 each denote an interface between the C-plane establishing cell and the U-plane only establishing cell.

A carrier of a frequency layer F1 is configured as a radio resource in the C-plane establishing cells 5002 and 5003, and a shared carrier of a frequency layer Fm is configured as a radio resource in the U-plane only establishing cells 5004 and 5005.

In the example configuration, an eNB for centralized control 5001 for controlling the eNB 1 and the eNB 2 in a concentrated manner is configured. 5006 and 5007 denote an interface provided between the eNB for centralized control 5001 and the C-plane establishing cell 5002 of the eNB 1 and an interface between the eNB for centralized control 5001 and the C-plane establishing cell 5003 of the eNB 2, respectively.

The use of a shared carrier allows the UE being a communication target in each U-cell to move without performing the reconnection process such as detection and synchronization in a radio section between the U-cell and itself.

To configure an eNB for centralized control, radio resources are scheduled in a unified manner in the C-cells and the U-cells of the eNB 1 and the eNB 2. The MAC of the eNB for centralized control may perform scheduling. Therefore, the allocation of the radio resources to the shared carriers for the UE being a communication target for each U-cell can be scheduled without conflict.

FIG. 51 shows an example configuration in the case where a shared carrier is configured in a specific area, which shows the case in which a C-plane establishing cell and U-plane only establishing cells are configured in an eNB.

5104 and 5108 each denote a C-plane establishing cell (C-cell), and 5105, 5106, and 5107 denote a plurality of U-plane only establishing cells (U-cells).

An eNB 1 is configured of the C-plane establishing cell 5104 and the plurality of U-plane only establishing cells 5105 and 5106. An eNB 2 is configured of the C-plane establishing cell 5108 and the plurality of U-plane only establishing cells 5106 and 5107.

5109 and 5116 denote the coverages by the C-plane establishing cells 5104 and 5108, respectively, and 5110, 5111, and 5112 denote the coverages by the U-plane only establishing cells 5105, 5106, and 5107, respectively.

The plurality of U-plane only establishing cells 5105 are installed in a specific area 5113, the plurality of U-plane only establishing cells 5106 are installed in a specific area 5114, and the plurality of U-plane only establishing cells 5107 are installed in a specific area 5115.

5120, 5121, 5122, and 5123 each denote an interface between the C-plane establishing cell and the U-plane only establishing cell.

The plurality of U-plane only establishing cells installed in the specific area 5114 are connected to both of the C-plane establishing cells 5104 and 5108.

A carrier of a frequency layer F1 is configured as a radio resource in the C-plane establishing cell 5104, a carrier of a frequency layer F2 is configured as a radio resource in the C-plane establishing cell 5108, and a shared carrier of a frequency layer Fm is configured as a radio resource in each of the U-plane only establishing cells 5105, 5106, and 5107.

In this example configuration, a U-plane eNB for centralized control is configured, which controls the U-plane side of a plurality of U-plane only establishing cells installed in a specific area in a concentrated manner. As a specific example of the concentrated control on the U-plane side, the user data of each U-plane only establishing cell installed in each specific area is scheduled. The U-plane eNB for centralized control may be provided together with another node without being provided in a physically dedicated manner. The function of the U-plane eNB for centralized control may be provided to be included as the function of another node. For example, the function may be provided to any one of the U-plane establishing cells. This allows a U-plane eNB for centralized control to be physically installed with ease.

A U-plane eNB for centralized control 5101 schedules pieces of user data of the plurality of U-plane only establishing cells 5105 installed in the specific area 5113. A U-plane eNB for centralized control 5102 schedules pieces of user data of the plurality of U-plane only establishing cells 5106 installed in the specific area 5114. A U-plane eNB for centralized control 5103 schedules pieces of user data of the plurality of U-plane only establishing cells 5107 installed in the specific area 5115.

The plurality of U-plane only establishing cells 5106 installed in the specific area 5114 are connected to the C-plane establishing cell 5104 of the eNB 1 as well as the C-plane establishing cell 5108 of the eNB 2. Thus, the U-plane eNB for centralized control 5102 performs scheduling for UEs including the UEs being served by the C-plane establishing cell 5104, which use the C-plane establishing cell 5104 and the U-plane only establishing cells 5106, and the UEs being served by the C-plane establishing cell 5108, which use the C-plane establishing cell 5108 and the U-plane only establishing cells 5106.

5117, 5118, and 5119 denote interfaces provided between the U-plane eNB for centralized control 5101 and each of the U-plane only establishing cells 5105, between the U-plane eNB for centralized control 5102 and each of the U-plane only establishing cells 5106, and between the U-plane eNB for centralized control 5103 and each of the U-plane only establishing cells 5107, respectively.

The use of a shared carrier in a plurality of U-plane only establishing cells installed in a specific area allows the UE being a communication target in each U-cell to move in the specific area without performing the reconnection process such as detection and synchronization in a radio section between the U-cell and itself Although a shared carrier of the same frequency layer Fm is configured in the specific areas 5113, 5114, and 5115 in this example configuration, a shared carrier of a different frequency layer may be configured in each of the specific areas. For example, the shared carrier of the frequency layer F1 may be configured in each of the U-plane only establishing cells 5105 installed in the specific area 5113, the shared carrier of the frequency layer Fm may be configured in each of the U-plane only establishing cells 5106 installed in the specific area 5114, and the shared carrier of a frequency layer Fn may be configured in each of the U-plane only establishing cells 5107 installed in the specific area 5115. The use of different frequency layers reduces conflict between specific areas. Precise synchronization is not required between shared carriers of different frequencies, and a detection signal and/or a synchronization signal and/or a reference signal may not be the same between shared carriers of different frequencies.

To configure a U-plane eNB for centralized control per specific area, the radio resources of the U-plane only establishing cells installed in each specific area are scheduled in a unified manner. Scheduling may be performed by the MAC of the U-plane eNB for centralized control. Thus, the allocation of the radio resources for the UE being a communication target in the U-plane only establishing cells in each specific area can be scheduled without conflict. The UEs being communication targets for the U-plane only establishing cells 5106 installed in the specific area 5114 include the UE being served by the eNB 1 and the UE being served by the eNB 2. The allocations of radio resources for both of the UEs can be scheduled to a shared carrier without conflict.

FIG. 52 shows another example in the case where a shared carrier is configured in a specific area, which shows the case in which a C-plane establishing cell and U-plane only establishing cells are configured in an eNB. Part (a) of FIG. 52 is shown in FIG. 51, which will not be described here. Part (b) of FIG. 52 will be described here.

5202 and 5203 each denote a C-plane establishing cell (C-cell), and 5204 and 5206 denote a plurality of U-plane only establishing cells (U-cells).

The eNB 1 is configured of the C-plane establishing cell 5202 and the plurality of U-plane only establishing cells 5204. The eNB 2 is configured of the C-plane establishing cell 5203 and the plurality of U-plane only establishing cells 5206.

5205 and 5207 denote the coverages by the U-plane only establishing cells 5204 and 5206, respectively.

The coverages by the C-plane establishing cells 5202 and 5203 are not shown here.

The plurality of U-plane only establishing cells 5204 and 5206 are installed in a specific area 5210.

5208 and 5209 each denote an interface between the C-plane establishing cell and the U-plane only establishing cell.

The frequency carriers configured as radio resources in the C-plane establishing cells 5202 and 5203 are not shown here. The frequency carriers are as in FIG. 51. The carrier of the frequency layer F1 is configured as a radio resource in the C-plane establishing cell 5202, and the carrier of the frequency layer F2 is configured as a radio resource in the C-plane establishing cell 5203.

In each of the U-plane only establishing cells 5204 and 5206, the shared carrier of the frequency layer Fm is configured as a radio resource.

A U-plane eNB for centralized control 5201 schedules pieces of user data of the plurality of U-plane only establishing cells installed in the specific area 5210.

The U-plane eNB for centralized control 5201 is connected to each of the U-plane only establishing cells 5204 connected to the C-plane establishing cell 5202 of the eNB 1 and each of the U-plane only establishing cells 5206 connected to the C-plane establishing cell 5203 of the eNB 2, the cells being installed in the specific area 5210. The U-plane eNB for centralized control 5201 accordingly performs scheduling for UEs including UEs being served by the C-plane establishing cell 5202, which use the C-plane establishing cell 5202 and the U-plane only establishing cell 5204, and UEs being served by the C-plane establishing cell 5203, which use the C-plane establishing cell 5203 and the U-plane only establishing cell 5206.

5211 denotes an interface provided between the U-plane eNB for centralized control 5201 and each of the U-plane only establishing cells 5204 and 5206.

A shared carrier is used in a plurality of U-plane only establishing cells installed in a specific area, allowing the UE being a communication target for each U-cell to move in the specific area without performing the reconnection process such as detection and synchronization in a radio section between the U-cell and itself.

To configure a U-plane eNB for centralized control in a specific area, scheduling of radio resources in a U-plane only establishing cells installed in the specific area may be performed in a unified manner. The MAC of the U-plane eNB for centralized control may perform scheduling.

Therefore, the allocation of the radio resources to the shared carriers for the UE being a communication target for the U-plane only establishing cell in the specific area can be scheduled without conflict.

In particular, the UEs being communication targets for the U-plane only establishing cells 5204 and 5206 installed in the specific area 5210 include the UE being served by the eNB 1 and the UEs being served by the eNB 2. The allocation of the radio resources to the shared carrier for these UEs can be scheduled without conflict.

Description will be given of the synchronization in the case where a shared carrier is configured in a specific area. In part (b) of FIG. 52, the shared carrier configured by each U-plane only establishing cell 5204 and 5206 is synchronized. The synchronization may be precise synchronization. Two specific examples of the method of achieving precise synchronization are as follows.

(1) A reference signal source is provided.
(2) A GPS is provided.

In (1), one reference signal source may be provided in a specific area to be connected to each U-plane only establishing cell. The reference signal source is used for a shared carrier configured by each U-plane only establishing cell. A reference clock may be generated from the reference signal source. One reference signal source may be provided in the U-plane eNB for centralized control. The U-plane eNB for centralized control 5201 is connected with each U-plane only establishing eNB 5204 and 5206 by the interface 5211, and thus, is physically connected in many cases. Thus, the physical connection allows one reference signal source to be connected to each U-plane only establishing eNB.

The reference signal source may be provided in another node, which is newly provided, without being provided in the U-plane eNB for centralized control. The node is physically connected to each U-plane only establishing cell in a specific area.

In the case where a shared carrier is configured for a plurality of U-plane only establishing cells in the same eNB as in FIG. 49, the reference signal source may be provided in a C-plane establishing eNB. The C-plane establishing eNB is physically connected to the U-plane establishing eNB.

Precise synchronization can be accordingly achieved between U-plane only establishing cells in a specific area.

In (2), each U-plane only establishing cell in a specific area is provided with a GPS, and synchronization is achieved by the GPS. This eliminates the need for providing the same reference signal source for physical connection with each U-plane only establishing cell, allowing a plurality of U-plane only establishing cells to be installed flexibly.

Seventh Embodiment

A problem solved in the seventh embodiment will be described below. In the configuration described in the first modification of the third embodiment, one eNB or central entity schedules the data to be transmitted on a radio link and transmits the data. In this configuration, time scheduling is performed as well, and thus, precise synchronization is required in eNBs that actually perform transmission on a radio link. However, it is difficult to achieve precise synchronization among a large number of eNBs. Synchronization is generally achieved using a GPS or the network time protocol (NTP) of a network, leading to a problem that, for example, a GPS receiver needs to be mounted, an eNB is difficult to be installed in a place where radio waves from the GPS can be received, or synchronization with precise accuracy is difficult to be achieved in the NTP.

A solution in the seventh embodiment will be described below. To solve the above-mentioned problem, scheduling on a radio link is performed while being divided into a "node that performs concentrated control" and a "node that actually performs transmission," to thereby perform scheduling in a unified manner without achieving precise synchronization.

FIG. 53 shows the architecture according to the seventh embodiment. With reference to FIG. 53, eNBs are divided into slave eNBs 5305, 5307, and 5308 and a master eNB 5309, each of which separately functions as the MAC that performs scheduling. The UE establishes a physical link with three slave eNBs (eNB(s)#1 (5305), eNB(s)#2 (5307), and eNB(s)#3 (5308)), and the slave eNBs respectively establish master/slave eNB links 5314, 5314, and 5315 with the master eNB 5309. A MAC (MAC2) 5310 of the master eNB configures discrete time frames for the slave eNBs 5305, 5307, and 5308 and allocates the time frames to the slave eNBs. The slave eNBs 5305, 5307, and 5308 each schedule the data of a target eNB in only the configured time frame over a radio physical channel.

FIG. 54 shows an example configuration of frames by scheduling performed by a MAC1 and a MAC2. The master eNB performs allocation to slave eNBs on a time-frame-basis, and the slave eNBs perform schedulings (5411, 5412, 5413, 5414, 5415) within radio frames (5401, 5403, 5405, 5407, 5409). In consideration of precise synchronization not being achieved, guard times (G) (5402, 5404, 5406, 5408, 5410) are provided at frame boundaries and mapping is not performed during the guard times.

Here, the radio frames may be in units of subframes or may be in smaller units. Note that the accuracy of the synchronization in eNBs needs to be taken into account and, if the unit of time frames is too small for synchronization accuracy, the ratio of the guard times (G) increases, reducing radio use efficiency. The allocation time frame and guard time accordingly need to be provided in consideration of the synchronization accuracy of each eNB.

FIG. 55(A) shows an example sequence of a flow of establishing communication and transmitting data. The sequence includes Step ST5505 being Service Request Procedure (Separate MAC) for first establishing a bearer, Step ST5542 being DL Scheduling/Transmit Procedure that shows the downlink data transmission/scheduling procedure, and Step ST5556 being UL Scheduling/Transmit Procedure showing the uplink data transmission/scheduling procedure.

FIG. 55(B) shows details of the service request procedure. Service Request Procedure (Separate MAC) described here is based on the UE Triggered Service Request Procedure described in Chapter 5.3.4.1 of Non-Patent Document 11 (TS23.401). First, in Step ST5506, a NAS of the UE notifies an AS of Service Request, and then, in Step ST5508, the AS of the UE transmits RRC connection Request to an eNB#1. In Step ST5509, the eNB#1 that has received RRC connection Request data transmits the data to a master eNB. As in UE triggered Service Request procedure, in Step ST5510 and Step ST5511, the master eNB that has received RRC connection Request transmits RRC connection setup to the UE via the eNB#1. The UE that has received RRC connection setup performs configuration and, in Step ST5512 and Step ST5513, transmits RRC connection Setup complete to the master eNB via the eNB#1. Thereafter, the procedure of UE triggered Service Request procedure is performed via the eNB#1. In the procedure, the UE may directly communicate with the master eNB, not via the slave eNB.

An eNB#3 establishes a link via the eNB#1, and then, activates Step ST5534 being Radio Bearer Establishment procedure (a plurality of eNBs). Described here is a case in which an eNB#2 is added. First, in Step ST5535 and Step ST5536, the information of the eNB#2 and its connection request are transmitted to the UE via the eNB#1 in RRC connection Reconfiguration (eNB#2 Info). In Step ST5537 and Step ST5538, the UE that has received RRC connection Reconfiguration (eNB#2 Info) transmits RRC connection Reconfiguration complete to the master eNB via the eNB#2 that has been specified.

A communication link is established through the process.

FIG. 55(C) shows details of the DL scheduling/transmit procedure. First, in Step ST5543, the master eNB performs time frame scheduling for two eNBs. As in the first embodiment, the quality of a radio link and traffic information should be taken into account in the configuration. The master eNB transmits the configured time frames to the slave eNBs in Step ST5544 and Step ST5545, and transmits the data to be transmitted to the slave eNBs in Step ST5546 and Step ST5547. The slave eNBs respectively schedule the transmission data within the selected time frames in Step ST5548 and Step ST5549, and then transmit the scheduling information to the UE in Step ST5550 and Step ST5551 and transmit the data to the UE in Step ST5552 and Step ST5553, and in Step ST5554 and Step ST5555.

FIG. 55(D) shows details of the UL scheduling/transmit procedure. First, as with DL, in Step ST5557, the master eNB performs time frame scheduling for two eNBs. In Step ST5558 and Step ST5559, the master eNB transmits the configured time frames to the slave eNBs. The slave eNBs respectively schedule the transmission data within the selected time frames in Step ST5560 and Step ST5561 and transmit the scheduling information to the UE in Step ST5562 and Step ST5566. The UE receives the scheduling information and, based on the scheduling information, transmits transmission data in Step ST5563 to Step ST5565, and Step ST5567 to Step ST5569.

The seventh embodiment above enables the slave eNBs and the master eNB to perform scheduling with different accuracies. By properly configuring a guard time, scheduling can be performed to a plurality of cells in a unified manner even if precise synchronization accuracy cannot be kept.

Eighth Embodiment

When the UE performs communication using a plurality of eNBs (cells), communication with one cell may be performed if the communication quality with another cell degrades. For example, if the communication quality with an eNB (cell) that has established C-plane connection degrades, data communication with an eNB (cell) that has established only U-plane connection can be performed.

In the case where the communication quality between the UE and the C-plane establishing eNB (cell) degrades, however, the RRC signaling for the process of configuring/modifying (changing)/releasing a U-plane only establishing eNB (cell) will not be notified the UE. For example, the C-plane establishing eNB (cell) will not notify the UE of ST3016 of FIG. 30, ST3105 of FIG. 31, or the like disclosed in the second embodiment.

Thus, in the state where, for example, communication cannot be performed due to the degraded communication quality between the UE and the C-plane establishing eNB (cell), the communication with the U-plane establishing eNB (cell) cannot be disconnected, forcing the UE to continuously maintain the resources for the communication with the U-plane establishing eNB (cell).

As described above, the UE cannot control the U-plane establishing eNB (cell), leading to a problem that, for example, data communication cannot be performed normally or unnecessary resources are generated.

<Conventional RLF-Related Process>

There is a process related to a radio link failure (RLF) as specifications for the degraded communication quality between a UE and a cell (Non-Patent Document 1 (TS36.300 10.1.6), and Non-Patent Document 2 (TS36.331 5.3.11)). The process related to an RLF will be referred to as an RLF-related process thereafter.

FIG. 56 is a diagram for describing the RLF-related process. The UE can be categorized into four states; normal operation, first phase, second phase, and RRC_Idle.

The UE performs monitoring of a radio link (RLM) for one cell with which communication is performed.

The RLM is performed by, for example, evaluating the communication quality of a PDCCH. The communication quality of the PDCCH not less than a predetermined threshold is referred to as in-sync, and the communication quality not greater than a predetermined threshold is referred to as out-of-sync. The UE evaluates the reception quality of a CRS as the communication quality of a PDCCH.

The UE in the normal operation enters the first phase when detecting out-of-sync (radio problem detection) a predetermined number of times (N11) in a row.

The UE continuously performs RLM with one cell with which communication is performed and, when detecting in-sync a predetermined number of times (N12) in a row in the first phase, returns to the normal operation state. When not detecting in-sync the predetermined number of times (N12) in a row within a predetermined period (T11) from the radio problem detection, the UE regards that an RLF has been detected and then enters the second phase.

In the second phase, the UE stores RLF information and activates a process of reestablishing RRC connection (RRC connection reestablishment). If AS security has not been activated, the UE performs a process of leaving from RRC connection (leaving RRC_Connected). The AS security is the security for an RRC or U-plane.

In the process of leaving from RRC connection, the UE releases all the radio resources including releasing of the MAC, RLC, and PDCP of all the RBs, and then shifts to the RRC_Idle state.

To activate the RRC connection reestablishment process, the UE, for example, stops all the RBs except for an SRB0, resets the MAC, releases the SCell, applies the predetermined (default) PHY configuration, and applies the default MAC main configuration, to thereby perform a cell selection process.

When selecting a suitable cell in the cell selection process within a predetermined period (T12) from the detection of an RLF, the UE performs the process of reestablishing RRC connection with the cell.

When it fails to select a suitable cell within the predetermined period (T12) from the detection of an RLF, the UE performs the process of leaving from RRC connection (leaving RRC_Connected).

The conventional RLF-related process, however, has only the specifications for one cell (primary cell).

In communication using a plurality of different eNBs (cells), accordingly, if the conventional RLF-related process is to be applied, the process cannot be applied because the information on only a single cell is specified. For example, in the case where C-plane connection is established with one eNB (cell) and U-plane connection is established with a plurality of eNBs (cells), if the communication quality with one eNB (cell) deteriorates, the communication with another eNB (cell) can be performed as long as the communication quality with the other eNB (cell) is good. If the conventional RLF-related process is applied in the case where there is another communicable eNB (cell), the process does not operate normally because the communications with a plurality of eNBs (cells) are not taken into account.

This embodiment will disclose the method of an RLF-related process when a UE performs communication using a plurality of different eNBs (cells).

<New RLF-Related Process>

A UE performs RLM for only a C-plane establishing eNB (cell). The UE may perform or may not perform the RLM for a U-plane only establishing eNB (cell) and an RLF-related process, disclosed in a ninth embodiment described below.

The UE performs a process of disconnecting connection with a U-plane only establishing eNB (cell) in accordance with a C-plane connection state not in accordance with a U-plane connection status. Alternatively, the UE may perform the process of disconnecting connection with a U-plane only establishing eNB (cell) in accordance with the connection status with the C-plane establishing eNB (cell), not in accordance with the connection status of a U-plane only establishing eNB (cell).

<Processing Method of Disconnecting Connection with U-Plane Only Establishing eNB (a)>

A specific example of the processing method of disconnecting connection with a U-plane only establishing eNB (cell) will be disclosed.

When activating the process of leaving from RRC connection in connection with the C-plane establishing eNB (cell), the UE disconnects the connection with the U-plane only establishing eNB (cell). The UE may disconnect the connection with the U-plane only establishing eNB (cell) not only in the activation of the process of leaving from RRC connection but also in every point of the process of leaving from RRC connection.

As the process of disconnecting the connection with the U-plane only establishing eNB (cell), the UE performs the process of disconnecting all the U-plane connections in all the connected U-plane only establishing eNBs (cells). The UE releases all the U-plane radio resources including releasing of the MAC, RLC, and PDCP of all the U-plane RBs in all the U-plane only establishing eNBs (cells). For example, the UE may end the process of synchronizing with the U-plane only establishing eNB (cell) or may end monitoring the PDCCH or ePDCCH for scheduling from the U-plane only establishing eNB.

Part (a) of FIG. 57 is a diagram for describing an RLF-related process according to this embodiment.

A UE in a normal operation state performs RLM on a C-plane establishing eNB (cell) and, when detecting out-of-sync (radio problem detection) a predetermined number of times (N21) in a row, enters the first phase.

In the first phase, the UE continuously performs RLM with the C-plane establishing eNB (cell) and, when detecting in-sync a predetermined number of times (N22) in a row, returns the normal operation state. When not detecting in-sync the predetermined number of times (N22) in a row within a predetermined period (T21) from the radio problem detection, the UE detects an RLF and enters the second phase. Whether the period T21 is exceeded can be managed by, for example, a timer that measures the time from the radio problem detection.

In the second phase, the UE stores RLF information and activates the RRC connection reestablishment process.

The UE may perform the process of leaving from RRC connection if the AS security has not been activated.

In the process of leaving from RRC connection, the UE releases all the radio resources including releasing of the MAC, RLC, and PDCP of all the RBs in the C-plane establishing eNB (cell).

If there is U-plane connection between the UE and the C-plane establishing eNB (cell) in this case, all the radio resources are released, including releasing of the MAC, RLC, and PDCP of all the RBs for the U-plane connection.

The UE disconnects the connection with the U-plane only establishing eNB (cell) when activating the process of leaving from RRC connection in the connection with the C-plane establishing eNB (cell). The UE may disconnect the connection with the U-plane only establishing eNB (cell) not only in activating the process of leaving from RRC connection but also in every point of the process of leaving from RRC connection.

<RRC Connection Reestablishment Process>

To activate the RRC connection reestablishment process, the UE stops all the RBs except for an SRB0 of the C-plane establishing eNB (cell) and, for example, resets the MAC, releases the SCell, applies the default PHY configuration, and applies the MAC main configuration, to thereby perform a cell selection process. If there is U-plane connection between the UE and the C-plane establishing eNB (cell), the UE also stops all the RBs for the U-plane connection.

<Method of Processing U-Plane Only Establishing eNB>

Disclosed below are two methods of processing a U-plane only establishing eNB (cell) by a UE in activating the RRC connection reestablishment process.

(1) The UE causes all the U-plane RBs of all the U-plane only establishing eNBs (cells) to perform normally. The UE does not stop the U-plane RB.

(2) The UE stops all the U-plane RBs of all the U-plane only establishing eNBs (cells).

The process (1) can simplify, in the case where, for example, the same U-plane only establishing eNB (cell) is configured after the RRC connection reestablishment process, the process of configuring U-plane connection in the U-plane only establishing eNB (cell). In addition, data communication with the U-plane only establishing eNB (cell) is performed, reducing a data loss and a delay time.

The process (2) can cause the process for the RB in the U-plane only establishing eNB (cell) to be identical to the process for the RB in the C-plane establishing eNB (cell), and thus, control by the UE can be unified among a plurality of eNBs (cells), leading to an effect of simplified control.

Disclosed below are two specific examples of the process for each protocol in the process (2).

(2-1) All or part of the PHY, MAC, RLC, and PDCP is reset.

(2-2) All of the PHY, MAC, RLC, and PDCP are not reset.

In the process (2-1), a (default) configuration predetermined in, for example, specifications may be provided for all or part of the PHY, MAC, RLC, and PDCP for a U-plane only establishing eNB (cell), and the default configuration may be applied to the reset protocol. This simplifies control, reducing malfunctions irrespective whether RRC connection reestablishment succeeds or fails.

The process (2-2) allows, in the case where, for example, the same U-plane only establishing eNB (cell) is configured after the RRC connection reestablishment process, the process of configuring U-plane configuration in the U-plane only establishing eNB (cell) to be performed at an early stage.

In the case where carrier aggregation (CA) is configured in a U-plane only establishing eNB (cell) in activating the RRC connection reestablishment process, the UE may release an SCell of the CA.

<Cell Section Failure>

When it cannot select a suitable cell or cannot reestablish RRC connection with a cell within a predetermined period (T22) from the RLF detection, the UE performs the process of leaving from RRC connection (leaving RRC_Connected) described above. Whether the period T22 is exceeded can be managed by, for example, a timer that measures the time from the RLF detection.

The UE that has performed the process of leaving from RRC connection shifts to the RRC_Idle state.

In the RRC_Idle state, the UE has no U-plane connection.

In any of the two methods in which a UE processes a U-plane only establishing eNB (cell) in activating the RRC connection reestablishment process, the UE may disconnect the connection with the U-plane only establishing eNB (cell) when activating the process of leaving from RRC connection in the connection with the C-plane establishing eNB (cell).

<Cell Selection Success>

When selecting a suitable cell in the cell selection process within a predetermined period (T22) from the RLF detection, the UE performs the RRC connection reestablishment process on the cell.

The UE performs C-plane connection with the cell by performing the RRC connection reestablishment process. The cell serves as a C-plane establishing eNB (cell). The eNB (cell) that newly establishes C-plane connection is referred to as a new C-plane establishing eNB (cell).

The cell may be a C-plane establishing eNB (cell) (referred to as an last connected C-plane establishing eNB (cell)) with which the selected eNB (cell) has been connected before an RLF. The last connected C-plane establishing eNB (cell) serves as a new C-plane establishing eNB (cell). This is effective in the case where, for example, the communication quality between the UE and the last connected C-plane establishing eNB (cell) degrades momentarily.

The conventional method is employed in the case where U-plane connection is established in a new C-plane establishing eNB (cell).

<Case in which New C-Plane Establishing eNB (Cell) is Last Connected C-Plane Establishing eNB (Cell)>

Disclosed below is a case in which the selected new C-plane establishing eNB (cell) is a last connected C-plane establishing eNB (cell).

<Same U-Plane Only Establishing eNB (Cell) is Connected as it is>

The UE is continuously in connection with the connected U-plane only establishing eNB (cell).

When the UE causes the U-plane RB of the U-plane only establishing eNB (cell) to operate normally in the RRC connection reestablishment process, the UE is continuously in connection with the U-plane only establishing eNB (cell) and operates normally.

When stopping the U-plane RB of the U-plane only establishing eNB (cell) in the RRC connection reestablishment process, the UE deactivates the stop and operates normally.

Disclosed below are three specific examples of the trigger for deactivating the stop.

(1) When the UE selects a last connected C-plane establishing eNB (cell).

(2) When the UE receives an RRC connection reestablishment message from a new C-plane establishing eNB (cell) in the RRC connection reestablishment process.

(3) When the UE receives an RRC connection reconfiguration message from a new C-plane establishing eNB (cell) after the RRC connection reestablishment process.

The example (1) allows for the recognition that the UE has selected a last connected C-plane establishing eNB (cell), and accordingly, it can be judged that the connection with a last connected U-plane only establishing eNB (cell) is possible. Thus, at that point of time, the U-plane RB that has been stopped in the U-plane only establishing eNB (cell) may be returned to the normal operation. Compared with the examples (2) and (3), the U-plane connection with the U-plane only establishing eNB (cell) can be returned to the normal operation at an early stage without signaling from a new C-plane establishing eNB (cell). When the UE receives an RRC connection reestablishment reject message from the new C-plane establishing eNB (cell) in the RRC connection reestablishment process, the UE may perform the process of disconnecting the connection with the U-plane only establishing eNB (cell) at that point of time.

The example (2) allows the UE to judge that it can reestablish RRC connection with the new C-plane establishing eNB (cell) being a last connected C-plane establishing eNB (cell). Thus, the UE may return the U-plane RB that has been stopped in the U-plane only establishing eNB (cell) to the normal operation at that point of time. This simplifies the process of connecting with the U-plane only establishing eNB (cell), reducing malfunctions.

The example (3) allows the UE to judge the provision of a radio bearer. Thus, the UE may return the U-plane RB that has been stopped in the U-plane only establishing eNB (cell) to the normal operation at that point of time. This allows the UE to perform the process of connecting with a U-plane only establishing eNB (cell) as required, eliminating unnecessary operations.

In the methods (2) and (3), the information indicating that the U-plane RB that has been stopped is returned to the normal operation may be provided to be included in an RRC connection reestablishment message or an RRC connection reconfiguration message. Explicit signaling as described above allows the UE to explicitly make judgment, reducing malfunctions.

<Reconfiguring Same U-Plane Only Establishing eNB (Cell)>

The new C-plane establishing eNB (cell) may newly reconfigure, for the UE, the same U-plane only establishing eNB (cell) as the eNB with which the UE is connected in the connection with a last connected C-plane establishing eNB (cell). This is enabled because the new C-plane establishing eNB (cell) is the same as the last connected C-plane establishing eNB (cell).

The new C-plane establishing eNB (cell) may configure the same U-plane only establishing eNB (cell) for the UE in the RRC connection reestablishment process. The new C-plane establishing eNB (cell) may perform reconfiguration over radio resource config dedicated in the RRC connection reestablishment message. This enables reconfiguration at an early stage.

Alternatively, for the UE, the new C-plane establishing eNB (cell) may perform an RRC connection reconfiguration after the RRC connection reestablishment process and then perform the configuration for the same U-plane only establishing eNB (cell). Reconfiguration may be performed over radio resource config dedicated in the RRC connection reconfiguration message. This simplifies control because the same process as that of the configuration of the normal U-plane only establishing eNB (cell) can be used.

As described above, in the connection with the same U-plane only establishing eNB (cell) as that connected in the connection with the last connected C-plane establishing eNB (cell), the UE needs not to notify the MME of the information about the connection with the U-plane only establishing eNB (cell). This is because the MME originally performs management while the target UE and the U-plane only establishing eNB (cell) are being connected to each other, requiring no change. In other words, the configuration of the DRB and/or the S1 bearer needs not to be changed.

The MME needs no notification, which reduces an amount of signaling as a system. The U-plane only establishing eNB (cell) can be kept to be connected, simplifying control of the UE and the NW side.

<Configuring Different U-Plane Only Establishing eNB (Cell)>

The new C-plane establishing eNB (cell) may newly configure, for the UE, a U-plane only establishing eNB (cell) different from the eNB with which the UE connected in the connection with the last connected C-plane establishing eNB (cell).

In the configuration of a different U-plane only establishing eNB (cell), the MME may configure the E-RAB of each eNB.

The selection and determination of a U-plane only establishing eNB (cell) may be performed by the new C-plane establishing eNB (cell) or the MME.

The case in which the selection and determination are performed by the new C-plane establishing eNB (cell) will be disclosed.

After the RRC connection reestablishment process, the new C-plane establishing eNB (cell) selects and determines a U-plane only establishing eNB (cell), and transmits a U-plane establishment request message to the MME. The MME that has received the message determines the E-RAB configuration of each eNB (cell) to configure/modify the E-RAB for each eNB (cell).

The method of the third modification of the second embodiment is applicable to the processes from the processes described above to the process of configuring a U-plane only establishing eNB (cell).

For example, the sequence shown in FIG. 38, disclosed in the third modification of the second embodiment, may be applied. The sequence starting from ST3802 may be applied.

In configuring a different U-plane only establishing eNB (cell), the connection with the last connected U-plane only establishing eNB (cell) is disconnected. The method disclosed in the third modification of the second embodiment is applicable to this specific example.

For example, the sequence shown in FIG. 39 may be applied. The sequence starting from ST3902 may be applied.

Consequently, the connection of the last connected U-plane only establishing eNB (cell) with the UE and the NW side can be reliably disconnected, reducing use of unnecessary resources.

Disclosed below is a case in which the selection and determination of a U-plane only establishing eNB (cell) are performed by the MME.

After the RRC connection reestablishment process, a new C-plane establishing eNB (cell) transmits a U-plane establishment request message to the MME. Unlike the message disclosed in ST3803 of FIG. 38, the U-plane establishment request message requests the MME to start from the selection and determination of a U-plane only establishing eNB (cell). This request message may include the identifier of a target UE and the identifier of the own eNB (cell) (new C-plane establishing eNB (cell)). The MME that has received the request message selects and determines a U-plane only establishing eNB (cell) and determines the E-RAB configuration of each eNB (cell), to thereby configure/modify the E-RAB for each eNB (cell).

The method disclosed in the second embodiment is applicable to the processes from the above-mentioned process to the process of configuring a U-plane only establishing eNB (cell). For example, the sequence of FIG. 30 is applicable. The sequence starting from ST3009 is applicable.

In configuring a different U-plane only establishing eNB (cell), the connection with the last connected U-plane only establishing eNB (cell) is disconnected. The method disclosed in the second embodiment is also applicable to the specific example. For example, the sequence shown in FIG. 31 may be applied. The sequence starting from ST3101 can be applied.

Consequently, the connection of the last connected U-plane only establishing eNB (cell) with the UE and the NW side can be reliably disconnected, reducing use of unnecessary resources.

When the UE stops a U-plane RB with the U-plane only establishing eNB (cell) in the RLF-related process, the U-plane only establishing eNB (cell) may buffer the U-plane data during the stop. When the UE is connected again with the same U-plane only establishing eNB (cell), the buffered data may also be communicated. This allows for communication without loss of data also in the case where the U-plane RB is stopped.

When the connection with the last connected U-plane only establishing eNB (cell) is disconnected to establish a connection with a new U-plane only establishing eNB (cell), the timing of the process performed between the UE and each U-plane only establishing eNB (cell) may differ from the timing of switching a bearer path between the UE and the S-GW. In such a case, the method disclosed in the second embodiment may be applied. The method in the second embodiment may be applied, which solves the problem that it is unclear how downlink user data, transmitted to the U-eNB between the process of disconnecting the connection with the U-eNB by the UE and the process of releasing/modifying the S1 bearer path by the S-GW, is handled. This reduces malfunctions as a system.

For example, in the case where the forwarding method among the methods disclosed in the second embodiment is used when the last connected U-plane only establishing eNB (cell) buffers the U-plane data with the UE with which the eNB is connected, the processes from ST3302 to ST3304, disclosed with reference to FIG. 33, may be performed by the new U-plane only establishing eNB (cell) and the last connected U-plane only establishing eNB (cell). The processes from ST3302 to ST3304 by the C-eNB may be applied to the new U-plane only establishing eNB, and the processes from ST3302 to ST3304 by the U-eNB may be applied to the last connected U-plane only establishing eNB (cell). This allows a different U-plane only establishing eNB (cell) to be configured and connected without any loss of downlink data.

The MME may notify the new U-plane only establishing eNB (cell) of a forwarding configuration command message for the last connected U-plane only establishing eNB (cell). The message may include, for example, the identifier of the last connected U-plane only establishing eNB (cell) and the identifier of the UE being a communication target. This allows the new U-plane only establishing eNB (cell) to request the U-plane data forwarding configuration to the last connected U-plane only establishing eNB (cell), enabling the forwarding process.

Contrastingly, the MME may notify the last connected U-plane only establishing eNB (cell) of the forwarding configuration command message for the new U-plane only establishing eNB (cell). The message may include, for example, the identifier of the new U-plane only establishing eNB (cell) and the identifier of the UE being a communication target. An S1 interface may be used to notify the message. This allows the last connected U-plane only establishing eNB (cell) to request the new U-plane only establishing eNB (cell) to configure U-plane data forwarding, enabling the forwarding process.

In the case where the C-plane establishing eNB (cell) recognizes the identifiers of the new U-plane only establishing eNB (cell) and the last connected U-plane only establishing eNB (cell), the C-plane establishing eNB (cell) may notify the new or last connected U-plane only establishing eNB (cell) of the forwarding configuration command message. The interface between eNBs, such as X2, may be used for the message. This achieves the effects similar to the above. In this case, signaling with the MME is not required.

Disclosed below is another method in which a new C-plane establishing eNB (cell) newly configures, for the UE, a U-plane only establishing eNB (cell) different from the eNB with which the UE connected in the connection with the last connected C-plane establishing eNB (cell).

After the RRC connection reestablishment process, the UE or the NW may issue a U-plane connection request when the U-plane connection is required. A service request may be issued as the U-plane connection request.

The MME or the new C-plane establishing eNB (cell) judges (selects and determines) whether configuring a U-plane only establishing eNB (cell) is necessary. When judgment is made by the new C-plane establishing eNB (cell), the new C-plane establishing eNB (cell) may transmit the U-plane establishment request message to the MME subsequent to the U-plane connection request.

The method disclosed above is applicable to the subsequent processes.

Although the method of newly configuring, for the UE, a U-plane only establishing eNB (cell) different from the eNB with which the UE connected in the connection with the last connected C-plane establishing eNB (cell) has been described above, a part of the last connected U-plane only establishing eNBs (cells) may be included in the cells to be configured. The method disclosed above is applicable.

Consequently, the new C-plane establishing eNB (cell) can newly configure, for the UE, a U-plane only establishing eNB (cell) different from the eNB with which the UE connected in the connection with the last connected C-plane establishing eNB (cell). The U-plane only establishing eNB (cell) according to the status of a new connection between the UE and the new C-plane establishing eNB (cell) can be selected and configured, preventing a drop in data rate in the selection of a new C-plane establishing eNB (cell).

Although the method above has disclosed that the new C-plane establishing eNB (cell) or the MME selects and determines a U-plane only establishing eNB (cell), the priority may be provided in the selection and determination. The last connected U-plane only establishing eNB (cell) connected with a target UE may be preferentially selected and determined.

Consequently, the cell has the same configuration as that of the last connected U-plane only establishing eNB (cell), eliminating the configuration parameter when the configuration parameter required to reconfigure the U-plane only establishing eNB (cell) is the same. Only the information for requesting reconnection may be used as the signaling of the reconfiguration from the MME to each eNB (cell), and/or from the U-plane only establishing eNB (cell) to the C-plane only establishing eNB (cell), and/or from the C-plane only establishing eNB (cell) to the UE. This reduces an amount of signaling as a system.

Specific examples of the information for requesting reconnection may include the information indicative of a request for connection, the identifier of a target UE, the identifier of a target U-plane only establishing eNB (cell), the identifier of a C-plane only establishing eNB (cell), and an E-RAB number.

A U-plane only establishing eNB (cell) that can be configured of a new C-plane establishing eNB (cell) may be selected and determined in another method in selection and determination. A U-plane only establishing eNB (cell) reliably connectable with the UE can be configured.

A timer T32 or T33 of the last connected C-plane establishing eNB (cell) in the RLF-related process by the C-plane establishing eNB (cell), described below, may be stopped in the RRC connection reestablishment process by the UE. As a specific example, the timer may be stopped upon receipt of RRC connection reestablishment request or upon receipt of RRC connection reestablishment complete. Consequently, the process of releasing the connection of the NW side with the U-plane only establishing eNB (cell), performed upon expiration of the timer, is not performed. This prevents a situation in which RRC connection is reestablished between the UE and the last connected C-plane establishing eNB (cell) but the C-plane and U-plane connections are disconnected between the UE and the last connected C-plane establishing eNB (cell).

A value obtained by taking into account a period in which the UE may perform the RRC connection reestablishment process may be used as the predetermined period.

<Case in which New C-Plane Establishing eNB (Cell) Differs from Last Connected C-Plane Establishing eNB (Cell)>

Disclosed below is a case in which the new C-plane establishing eNB (cell) selected by the UE differs from the last connected C-plane establishing eNB (cell).

A U-plane only establishing eNB (cell) is newly configured. In this case, the MME may configure the E-RAB of each eNB (cell).

The U-plane only establishing eNB (cell) may be selected and determined by a new C-plane establishing eNB (cell) or the MME.

The method, in which a new C-plane establishing eNB (cell) newly configures, for the UE, a U-plane only establishing eNB (cell) different from the eNB with which the UE connected in the connection with the last connected C-plane establishing eNB (cell), may be applied as these methods.

Consequently, effects similar to those described above are achieved also in the case where the UE selects a different C-plane establishing eNB (cell) in cell selection.

<Selecting and Determining Same U-Plane Only Establishing eNB (Cell)>

The UE may notify the new C-plane establishing eNB (cell) of the information of the last connected U-plane only establishing eNB (cell).

As the notification method, for example, the information may be notified in the process of reestablishing RRC connection with the new C-plane establishing eNB (cell) selected by the UE. The information may be notified by being included in the RRC connection reestablishment request or RRC connection reestablishment complete message in the RRC connection reestablishment process.

Examples of the information of the last connected U-plane only establishing eNB (cell) include, for example, the cell identifier and the cell identifier identifiable by the MME. Or, the information may include the communication quality between the UE and each U-plane only establishing eNB (cell).

The new C-plane establishing eNB (cell), which has received the information of the last connected U-plane only establishing eNB (cell) from the UE, can recognize a U-plane only establishing eNB (cell) with which the UE has been connected.

This allows for the application of the method in the case where the UE selects a last connected C-plane establishing eNB (cell) as a new C-plane establishing eNB (cell).

The new C-plane establishing eNB (cell) may perform selection and determination of a new U-plane only establishing eNB (cell) in consideration of a U-plane only establishing eNB (cell) with which the UE has been connected. The last connected U-plane only establishing eNB (cell) may be preferentially selected and determined.

If there is no change in the U-plane only establishing eNB (cell) selected and determined in the new C-plane establishing eNB (cell), the MME may be not notified of the selected and determined U-plane only establishing eNB (cell).

The new C-plane establishing eNB (cell) may notify the UE that the eNB is connected with the same U-plane only establishing eNB (cell).

The UE that has received the notification may perform transmission and reception with the U-plane only establishing eNB (cell) in the normal operation or may deactivate the stopped RB of the U-plane only establishing eNB (cell) and return to the normal operation to perform transmission and reception.

<RLF-Related Process by C-Plane Establishing eNB (Cell)>

The RLF-related process by the C-plane establishing eNB (cell) will be disclosed.

The C-plane establishing eNB (cell) evaluates the status of the connection with a target UE and, when judging that the connection has a problem, detects a radio problem with the UE.

The following six specific examples of an event by which it is judged that the connection has a problem will be disclosed as to the method of evaluating the connection with a target UE by the C-plane establishing eNB (cell).

(1) Ack/Nack is undelivered to the PDSCH.
(2) The PUSCH is undelivered.
(3) The SRS is undelivered.
(4) The PUCCH is undelivered.
(5) The periodic CQI or periodic CSI is undelivered.
(6) Combination of (1) to (5).

In (1), the C-plane establishing eNB (cell) judges that when it cannot receive Ack/Nack transmitted from the UE for downlink communication, the connection has a problem and detects a radio problem. The C-plane establishing eNB (cell) may judge as described above in the case where it cannot receive Ack/Nack N31 times in a row.

In (2) and (3), the C-plane establishing eNB (cell) judges that when it cannot receive the PUSCH or sounding reference signal (SRS) transmitted from the UE for uplink communication, the connection has a problem and detects a radio problem. The C-plane establishing eNB (cell) may judge as described above in the case where it cannot receive the PUSCH or SRS N31 times in a row.

In (4), the C-plane establishing eNB (cell) judges that when it cannot receive the PUCCH transmitted from the UE for uplink communication, the connection has a problem and detects a radio problem. The C-plane establishing eNB (cell) may judge as described above in the case where it cannot receive the PUCCH N31 times in a row.

In (5), the C-plane establishing eNB (cell) judges that when it cannot receive the periodic CQI or periodic CSI transmitted from the UE for uplink communication, the connection has a problem and detects a radio problem. The C-plane establishing eNB (cell) may judge as described above in the case where it cannot receive the periodic CQI or periodic CSI N31 times in a row.

In (1) to (6), the C-plane establishing eNB (cell) may detect a radio problem when communication quality has degraded, not when undelivery has occurred. A predetermined threshold may be provided in the communication quality for detecting a radio problem. The C-plane establishing eNB (cell) may evaluate the reception quality of the reference signal (RS) or the signal equivalent to the RS, transmitted from the UE together with each channel or signal, and when the reception quality falls below the predetermined threshold, judge that the communication quality has degraded to determine that radio problem has been detected.

Consequently, the C-plane establishing eNB (cell) can also evaluate the status of the connection with a target UE and, when judging that the connection has a problem, determine that a radio problem has been detected between the UE and itself The number of successive receptions, serving as a threshold, is N31 times in the specific items (1) to (5), which may differ per item. This enables the adjustment according to the communication environment.

After detecting a radio problem with a target UE, the C-plane establishing eNB (cell) performs management by time as in the RLF-related process by the UE.

In the case where the C-plane establishing eNB (cell) detects a radio problem, the C-plane establishing eNB (cell) continuously evaluates the status of the connection with a target UE and, when each signal in (1) to (6) above has arrived (has been delivered) N31 times in a row, returns to the normal operation state. When the delivery has not been detected the predetermined number of times (N31 times) in a row within a predetermined period (T31) from the radio problem detection, the RLF is detected. Whether the period T31 has been exceeded can be managed using, for example, the timer that measures a time from the radio problem detection.

When an RLF is detected, if an RRC connection reestablishment request message is received from the UE within a predetermined period (T32), the process of reestablishing RRC connection with the UE is performed.

If not receiving an RRC connection reestablishment request message from the UE within the predetermined period (T32), the process of disconnecting the connection between the UE and the C-plane establishing eNB (cell) is performed. Whether the period T32 has been exceeded can be managed using, for example, a timer that measures a time from the RLF detection.

If there is a connection between the UE and the U-plane only establishing eNB (cell) in this case, the process of disconnecting the connection with the U-plane only establishing eNB (cell) is performed.

As the process of disconnecting connection, a resource for the connection of the C-plane establishing eNB (cell) and the U-plane only establishing eNB (cell) with the UE is released or the information for the connection is deleted.

Examples of the resource and information for the connection with the UE include the resource and information for configuring an RB/S1 bearer, which is, for example, a UE context.

The C-plane establishing eNB (cell), which has judged to perform the process of disconnecting the connection with the UE, releases the RB/S1 with the UE and deletes the information for connection. The resource (RB/S1) for C-plane and U-plane connections that is configured between the UE and the C-plane establishing eNB (cell) is released, and deletion of the information for connection is performed.

After the completion of the processes above, the C-plane establishing eNB (cell) may notify the MME of an E-RAB release complete message.

The C-plane establishing eNB (cell) may release the radio resource (DRB/S1) for U-plane connection with the UE and delete the information for connection, in response to an E-RAB release request from the MME. In this case, the MME may notify the U-plane establishing eNB of the E-RAB release request message.

The C-plane establishing eNB (cell) may release the RB/S1 bearer between the UE and itself or delete the information for connection in response to an E-RAB release request from the MME. In this case, the MME may notify the U-plane establishing eNB of an E-RAB release request message including the information indicating that the release of a bearer is targeted for all the RB/S1 bearers.

Disclosed below is a specific example of the method of releasing an RB/S1 bearer between the U-plane only establishing eNB (cell) and the UE and deleting the information for connection.

The C-plane establishing eNB (cell), which has judged to perform the process of disconnecting the connection with the UE, notifies the MME of a U-plane connection release request message for the UE.

The U-plane connection release request message may include the identifier of a target UE. If the C-plane establishing eNB recognizes the U-plane only establishing eNB connected with the UE, the message may include the identifier of the U-plane only establishing eNB. Alternatively, the reason for performing the process of disconnecting connection may be notified. The notification of the information on reason allows the MME to judge a process to be performed.

The MME that has received the message notifies the U-plane only establishing eNB established for the UE of a connection release request message for requesting the release of all the RB/S1 bearers with the UE and the deletion of the information for connection. An E-RAB release request message may be applied as the connection release request message. The connection release request message may include the identifier of a target UE.

The MME requests the S-GW to release the configuration for the U-plane only establishing eNB established for the UE. ST3110 to ST3112 disclosed in the second embodiment with reference to FIG. 31 may be applied as this method. The S-GW that has received a modify bearer request, which is applied as the request message, releases the configuration for the U-plane only establishing eNB connected with a target UE, such as the path configuration of the S1 bearer. After the release, the S-GW may notify the MME of a release complete message. A modify bearer response may be applied.

The U-plane only establishing eNB (cell) that has received a connection release request message uses the notified identifier of the UE to release the radio resource (DRB/S1) for U-plane connection, configured between the UE and itself, and deletes the information for connection.

After completing these processes, the U-plane only establishing eNB (cell) may notify the MME of a U-plane connection release complete message. An E-RAB release complete message may be applied as the U-plane connection release complete message. The MME can surely recognize that each U-plane only establishing eNB has released the resource for U-plane connection of the target UE and deleted the information.

The methods of releasing an eNB, disclosed in the first embodiment, the second embodiment, and the third modification of the second embodiment, are applicable to the processes of disconnecting connection. However, among the processes, the connection between the UE and the C-plane establishing eNB cannot be performed, and thus, the process of signaling between the UE and the eNB having RRC connection or other process is not performed.

For example, in the application of the method disclosed in the first embodiment, ST2302 of the sequence in FIG. 23 may be applied. In this case, ST2310 is not performed.

For example, in the application of the method disclosed in the second embodiment, for example, the processes from ST3101 to ST3112 of the sequence in FIG. 31 may be applied. In this case, ST3105, ST3106, and ST3107 are not performed. Further, ST3104 and ST3108 relate to the signaling performed between the UE and the U-plane only establishing eNB, and thus, those processes may be skipped.

For example, in the application of the method disclosed in the third modification of the second embodiment, for example, the processes from ST3902 to ST3112 of the sequence in FIG. 39 may be applied. Also in this case, ST3105, ST3106, ST3107, ST3104, and ST3108 in ST3114 may be skipped.

Disclosed below is another specific example of the method of releasing the RB/S1 bearer between the U-plane only establishing eNB (cell) and the UE and deleting the information for connection.

The C-plane establishing eNB (cell), which has judged to perform the process of disconnecting the connection with the UE, may directly notify the U-plane only establishing eNB established for the UE of a connection release request message. An X2 interface or other interface may be used.

The connection release request signal may include the identifier for identifying a target UE.

The U-plane only establishing eNB (cell) that has received the connection release request signal releases the radio resources (DRB/S1) for U-plane connection configured between the notified UE and itself and deletes the information for connection. After completing these processes, the U-plane only establishing eNB (cell) notifies the MME of a U-plane connection release complete message. An E-RAB release complete message may be applied as the U-plane connection release complete message.

The MME that has received the U-plane connection release complete message requests the S-GW to release the configuration for the U-plane only establishing eNB established for the UE. The method described above may be applied as this method. This allows the S-GW to release the configuration.

This method enables the release of the resource for the connections between the C-plane establishing eNB (cell) and the UE and between the U-plane only establishing eNB (cell) and the UE and the deletion of the information for connection.

The NW side can release an unnecessary resource and delete information, and thus, the NW-side node needs not to continuously maintain an unnecessary resource or store unnecessary information, improving resource use efficiency.

The release process is performed also by the NW side, preventing the disagreement of the state between the UE and the NW side to the extent possible. This accordingly reduces malfunctions as a system.

Although T31 and T32 are provided as predetermined periods in the method above, judgment may be made within one period in another example.

If delivery has not been detected a predetermined number of times (N32 times) in a row within a predetermined period (T33) from the C-plane establishing eNB (cell) detecting a radio problem, or if an RRC connection reestablishment request message has not been unsuccessfully received within the predetermined period, the process of disconnecting the connections between the UE and the C-plane establishing eNB (cell) and between the UE and the U-plane only establishing eNB (cell) is performed.

If delivery has been detected the predetermined number of times (N32 times) in a row within the predetermined period (T33) or if an RRC connection reestablishment request message has been successfully received, the method described above may be applied. Whether the period T33 is exceeded can be managed by, for example, a timer that measures the time from the radio problem detection.

Providing one period for configuration simplifies control.

FIG. 58 shows an example sequence of an RLF-related process according to an eighth embodiment, which also shows an RLF-related process by the UE and an RLF-related process by the C-plane establishing cell.

In ST5801, the UE that has shifted to the RRC_Connected state starts an RLM with the C-eNB. In ST5802, the UE judges whether out-of-sync has occurred N21 times in a row in the connection with the C-eNB. If out-of-sync has occurred N21 times in a row, the UE detects a radio problem (ST5803) to shift to the first phase. If out-of-sync has not occurred N21 times in a row, the UE performs RLM and again performs ST5802. In ST5804, the UE that has detected a radio problem in ST5803 starts a timer T21. The UE continuously performs RLM in the first phase. In ST5805, the UE judges whether in-sync has occurred N22 times in a row. If in-sync has occurred N22 times in a row, the UE returns to the normal operation to continuously perform RLM, and then performs ST5802. If in-sync has not occurred N22 times in a row, in ST5806, the UE judges whether the timer T21 has expired. If the timer T21 has not expired, the UE continuously performs RLM and then performs ST5805. If the timer has expired, the UE detects an RLF in ST5807. The UE that has detected an RLF in ST5807 enters a second phase and, in ST5808, stops the timer T21 and starts a timer T22. In the example shown in FIG. 58, the UE does not stop the RB with the U-plane only establishing cell (U-eNB) and causes RB to be operated normally in the second phase. In the second phase, the UE activates the cell selection process to perform cell search (ST5809). In ST5810, the UE judges whether it has succeeded in cell search and, if it has failed in cell selection, judges whether the timer T22 has expired in ST5811. If the timer T22 has not expired, the UE continuously performs cell search in ST5809. If the timer T22 has expired in ST5811, the UE performs the process of leaving from RRC connection in ST5812 and disconnects the connection between the UE and the U-eNB in ST5813. By performing the process of leaving from RRC connection, the UE shifts to RRC_Idle in 3001. In RRC_Idle of 3001, the connection between the UE and the U-eNB is disconnected, and thus, there is no U-eNB connected in RRC_Idle.

This prevents a problem that when the UE shifts to the RRC_Idle state during communication using a plurality of eNBs, the UE unnecessarily maintains radio resources for U-plane connection, improving radio resource use efficiency.

If the UE has succeeded in cell selection in ST5810, the UE stops the timer T22 in ST5814 and judges whether the selected cell is a last connected C-eNB in ST5815. If the selected cell is not a last connected C-eNB, the UE performs the process [B]. A specific example of the process [B] will be disclosed below with reference to FIG. 61. If the selected cell is a last connected C-eNB, the UE performs a series of processes of reestablishing RRC connection indicated by ST5816 between the selected last connected C-eNB and itself. The UE notifies the last connected C-eNB of an RRC connection reestablishment request message in ST5817, and the last connected C-eNB notifies the UE of an RRC connection reestablishment message in ST5821. The UE that has received the RRC connection reestablishment message performs the RRC connection reestablishment process between the last connected C-eNB and itself. In ST5823, the UE, which has completed the process of reestablishing RRC connection with the last connected C-eNB, notifies the last connected C-eNB of an RRC connection reestablishment complete message. The RRC connection reestablishment process reconfigures a radio bearer 1 (3003) between the UE and the last connected C-eNB and an S1 bearer 1 (3004) between the last connected C-eNB and the S-GW. The connection between the UE and the U-eNB is normally operated in the second phase, and thus, the radio bearer 2 (DRB) (3027) is continuously configured between the UE and the U-eNB (last connected U-eNB) and the S1 bearer 2 (3028) between the U-eNB and the S-GW. This allows the U-plane data to be communicated between the UE and the S-GW via the last connected C-eNB in ST3005 and ST3006 and the U-plane data to be communicated between the UE and the S-GW via the last connected U-eNB in ST3032 and ST3033. This allows the UE to perform communication using the last connected C-eNB and the last connected U-eNB.

FIG. 58 shows a case in which the UE does not stop an RB with the U-plane only establishing cell (U-eNB) in the second phase and causes RB to be operated normally. If the UE stops an RB with the U-plane only establishing cell (U-eNB) in the second phase, the process of stopping an RB with the U-eNB may be added after ST5808 and before ST5809. Further, if the last connected C-eNB is selected in ST5815, the last connected C-eNB may include the information (such as U-eNB reactivation information) indicating that the UE returns the U-plane RB that has been stopped to the normal operation in the RRC connection reestablishment message (ST5812) during the RRC connection reestablishment process, and then notify the UE of the information. Alternatively, the last connected C-eNB may include the U-eNB reactivation information in an RRC connection reconfiguration message and notify the UE of the information after the RRC connection reestablishment process. The UE, which has received the U-eNB reactivation information, reactivates the RB of the U-eNB that has been stopped and then returns to the normal operation. As a result, the radio bearer 2 (DRB) (3027) is configured between the UE and the U-eNB (last connected U-eNB) and the S1 bearer 2 (3028) is configured between the U-eNB and the S-GW, and the U-plane data can be communicated between the UE and the S-GW via the last connected U-eNB. The UE can accordingly perform communication using the last connected C-eNB and the last connected U-eNB.

The RLF-related process by the C-eNB will now be described.

In ST5826, the C-eNB that is in C-plane connection with the UE starts RLM between the UE and itself. In ST5827, the C-eNB judges whether an uplink signal or channel has been undelivered N31 times in a row in the connection with the UE. The uplink signal may be, for example, a periodic CQI. If a periodic CQI has been undelivered N31 times in a row, the C-eNB detects a radio problem (ST5828). If a periodic CQI has not been undelivered N31 times in a row, the C-eNB performs RLM and performs ST5827 again. In ST5829, the C-eNB that has detected a radio problem in ST5828 starts the timer T31 and continuously performs RLM. In ST5830, the C-cNB judges whether it has successfully received a periodic CQI N32 times in a row. If having successfully received a periodic CQI N32 times in a row, the C-eNB returns to the normal operation to continuously perform RLM and performs ST5827. If having failed in receiving a periodic CQI N32 times in a row, in ST5831, the C-eNB judges whether the timer T31 has expired. If the timer T31 has not expired, the C-eNB continuously performs RLM and performs ST5830. If the timer has expired, the C-eNB detects an RLF in ST5832. In ST5833, the C-eNB that has received an RLF in ST5832 stops the timer T31 and starts the timer T32. In ST5818, the C-eNB judges to have received the RRC connection reestablishment request from the UE. If it has received the request, the C-eNB stops the timer T32 in ST5819. The C-eNB judges whether to select the last connected U-eNB in ST5820 and, if it selects the last connected U-eNB, moves to the processes of ST5821 and ST5823. If it does not select the last connected U-eNB in ST5820, the C-eNB notifies the UE of an RRC connection reestablishment message in ST5822. The UE that has received the RRC connection reestablishment message performs the process of reestablishing RRC connection with the last connected C-eNB. In ST5824, the UE, which has completed the process of reestablishing the RRC connection with the last connected C-eNB, notifies the last connected C-eNB of an RRC connection reestablishment complete message. The last connected C-eNB that has received the RRC connection reestablishment complete message performs the process [A]. A specific example of the process [A] will be disclosed with reference to FIG. 59 or FIG. 60 below.

If not receiving the RRC connection reestablishment request from the UE in ST5818, the C-eNB judges whether the timer T32 has expired in ST5825. If the timer T32 has not expired, the C-eNB returns to ST5818 and then continuously performs judgment. The last connected C-eNB, which has judged that the timer T32 had expired in ST5825, activates the process of disconnecting the connection with the UE. As a result of the process of disconnecting connection being activated, the process of disconnecting the connection between the UE and the last connected C-eNB and the process of disconnecting the connection between the UE and the U-eNB are performed. The processes are shown in [C] and thereafter. A specific example of the process [C] will be disclosed with reference to FIG. 62 below.

FIG. 59 shows an example sequence of the process [A] in FIG. 58. Disclosed below is a case in which the last connected C-eNB selects and determines a new U-plane establishing eNB (cell) (new U-eNB).

If not selecting the last connected U-eNB in ST5820 of FIG. 58, the last connected C-eNB performs the RRC connection establishment process for the UE and then moves to the process [A]. The last connected C-eNB performs the RRC connection establishment process on the UE, so that as shown in FIG. 59, the radio bearer 1 (3003) is reconfigured between the UE and the last connected C-eNB and the S1 bearer 1 (3004) is reconfigured between the last connected C-eNB and the S-GW. This allows the U-plane data to be communicated between the UE and the S-GW via the last connected C-eNB in ST3005 and ST3006.

After the RRC connection reestablishment process, the last connected C-eNB selects and determines a new U-eNB and performs the process for the U-plane connection with the new U-eNB. The processes disclosed with reference to ST3802 to ST3036 of FIG. 38 are applied as a series of the processes. As a result, the radio bearer 2 (DRB) is configured between the UE and the new U-eNB and the S1 bearer 2 is configured between the new U-eNB and the S-GW, allowing the U-plane data to be communicated between the UE and the S-GW via the new U-eNB.

Consequently, the UE can perform communication using the last connected C-eNB and the new U-eNB.

The method disclosed with reference to FIG. 39 in the third modification of the second embodiment may be applied to the process of releasing a last connected U-eNB. ST3902 to ST3115 of FIG. 39 can be applied. The MME configures the new U-eNB in ST3010, and can thus release the last connected U-eNB. In this case, ST3011 to ST3115 may be applied. The sequence of configuring a new U-eNB and the sequence of releasing a last connected U-eNB may be performed continuously or in parallel.

FIG. 60 shows another example sequence of the process [A] in FIG. 58. Disclosed below is a case in which the MME selects and determines a new U-plane establishing eNB (cell) (new U-eNB).

If the last connected U-eNB is not selected in ST5820 of FIG. 58, the last connected C-eNB performs the RRC connection establishment process on the UE and then moves to the process [A]. The last connected C-eNB performs the RRC connection establishment process on the UE, reconfiguring the radio bearer 1 (3003) between the UE and the last connected C-eNB and the S1 bearer 1 (3004) between the last connected C-eNB and the S-GW in 3003 and 3004, respectively, as shown in FIG. 60. This allows the U-plane data to be communicated between the UE and the S-GW via the last connected C-eNB in ST3005 and ST3006.

After the RRC connection reestablishment process, in ST6001, the last connected C-eNB notifies the MME of a U-plane establishment request message requesting to start from the selection and determination of a U-plane only establishing eNB (cell). The MME that has received the U-plane establishment request message selects and determines a U-plane only establishing eNB (cell) and determines the E-RAB configuration of each of the eNBs (cells), to thereby configure/modify the E-RAB for each of the eNBs (cells). The processes disclosed with reference to ST3009 to ST3036 of FIG. 30 are applied as the processes from these processes to the process of configuring a U-plane only establishing eNB (cell). As a result, the radio bearer 2 (DRB) is configured between the UE and the new U-eNB and the S1 bearer 2 is configured between the new U-eNB and the S-GW, allowing the U-plane data to be communicated between the UE and the S-GW via a new U-eNB.

Consequently, the UE can perform communication using the last connected C-eNB and the new U-eNB.

The method disclosed with reference to FIG. 31 in the second embodiment may be applied to the process of releasing the last connected U-eNB. ST3101 to ST3115 of FIG. 31 can be applied. The sequence of configuring a new U-eNB and the sequence of releasing the last connected U-eNB may be performed continuously or in parallel.

FIG. 61 shows an example sequence of the process [B] in FIG. 58. Disclosed below is a case in which the MME selects and determines a new U-plane establishing eNB (cell) (new U-eNB).

If the UE selects a cell different from the last connected C-eNB as a new C-plane establishing eNB (cell) (new C-eNB) in ST5815 of FIG. 58, the UE moves to the process [B]. In ST5816 of FIG. 61, the UE performs the process of reestablishing RRC connection with the selected new C-eNB. After the completion of the RRC connection reestablishment process in ST5816, the UE performs a service request process in ST6101 to perform U-plane connection when needed. The RRC connection has been established through the RRC connection reestablishment process of ST5816, and thus, the service request process of ST6101 does not require the RRC connection setup process. Through the service request of ST6101, the radio bearer 1 (3003) is reconfigured between the UE and the new C-eNB, and the S1 bearer 1 (3004) is reconfigured between the new C-eNB and the S-GW. This allows the U-plane data to be communicated between the UE and the S-GW via the new C-eNB in ST3005 and ST3006.

Subsequent to the service request process of ST6101, in ST6001, the new C-eNB notifies the MME of a U-plane establishment request message requesting to start from the selection and determination of a U-plane only establishing eNB (cell). The MME that has received the U-plane establishment request message selects and determines a U-plane only establishing eNB (cell) and determines the E-RAB configuration of each of the eNBs (cells), to thereby configure/modify the E-RAB for each of the eNBs (cells). The processes disclosed with reference to ST3009 to ST3036 in FIG. 30 are applied as the processes after these processes to the process of configuring a U-plane only establishing eNB (cell). As a result, the radio bearer 2 (DRB) is configured between the UE and the new U-eNB and the S1 bearer 2 is configured between the new U-eNB and the S-GW, allowing the U-plane data to be communicated between the UE and the S-GW via the new U-eNB.

As a result, the UE can perform communication using the new C-eNB and the new U-eNB.

FIG. 62 shows an example sequence of the process [C] in FIG. 58. Disclosed below is a case in which the last connected C-eNB releases the U-plane establishing eNB. If the last connected C-eNB judges that the timer T32 has expired in ST5825 of FIG. 58, the process moves to [C] and the last connected C-eNB activates the process of disconnecting the connection with the UE. As a result, the process of disconnecting the connections between the UE and the last connected C-eNB and between the UE and the U-eNB is performed.

FIG. 62 shows a case in which the method disclosed in the third modification of the second embodiment is applied as the process of disconnecting the connection with the UE by the last connected C-eNB. The processes of the sequence from ST3902 to ST3112 of FIG. 39 are applied. However, the processes do not include the processes regarding the signaling to the UE.

In ST3902, the last connected C-eNB determines to release all the eNBs that establish U-plane including the own cell for the target UE. In this case, an indication that the process of disconnecting connection is performed upon expiration of the timer T32 may be used as the criteria for judgment. In ST3903, the last connected C-eNB notifies the MME of an E-RAB release request. In ST3010, the MME that has received the E-RAB release request determines to release the E-RAB of each of the eNBs using the identifier of a target UE, the identifier of the last connected C-eNB, the identifier of an eNB to be released, or the like included in the request message. In ST6201, the MME notifies the last connected C-eNB of a message requesting to release the E-RAB release. The message requesting the E-RAB release, which is notified the last connected C-eNB from the MME, may include the information indicating that the bearer release is targeted for all the RB/S1 bearers. In ST3102, the MME notifies the last connected U-eNB of the message requesting the E-RAB release. In ST6202, the last connected C-eNB that has received the message requesting to release the E-RAB releases all the RB/S1 bearers configured for the target UE and deletes the information about the UE. In ST6203, the UE that has completed the process of ST6202 notifies the MME of the completion of the E-RAB release. In ST3103, the last connected U-eNB that has received the message requesting to release the E-RAB releases the DRB/S1 bearer configured for the target UE and deletes the information about the UE. In ST3109, the UE that has completed the process of ST3103 notifies the MME of the completion of the E-RAB release.

As a result, the last connected C-eNB can disconnect the RRC connection with the UE and brings the condition with the UE to the RRC_Idle state in 6204. The last connected C-eNB and the last connected U-eNB release the resources for all the RB/S1 bearers and delete the information about the UE. The process of disconnecting connection is accordingly completed.

The method disclosed in this embodiment allows the UE to avoid maintaining unnecessary resources for U-plane connection even if the communication quality between the C-plane establishing eNB (cell) and itself degrades and communication is disabled. This improves radio resource use efficiency.

U-plane connection can be established/released by eliminating the ambiguity in the process between the UE and the NW side, enabling normal data communication.

Malfunctions can be reduced as a system.

The timer T32 or T33 of the last connected C-plane establishing eNB (cell) is not stopped in the RRC connection reestablishment process performed from the UE to the new C-plane establishing eNB (cell).

The process of disconnecting the connection of the U-plane only establishing eNB (cell) by the NW side is activated upon expiration of the timer T32 or T33 of the last connected C-plane establishing eNB (cell).

A problem may occur, in which the timing of configuring a new U-plane only establishing eNB (cell) may differ from the timing of the process of disconnecting the connection of the U-plane only establishing eNB (cell) by the NW side.

To solve this problem, the MME makes adjustment.

When the process of disconnecting connection is activated upon expiration of the timer T32 or T33, the MME that has received a U-plane connection release request message checks whether a new C-plane establishing eNB (cell) configures a U-plane only establishing eNB (cell) for the UE.

If the configuration above is performed, the MME discards the release process. If the configuration above is not performed, the MME performs the release process.

As a result, an occurrence of such a problem that, for example, a newly configured U-plane only establishing eNB (cell) is released can be prevented. This reduces malfunctions as a system, achieving a stable operation.

The last connected C-plane establishing eNB (cell) may notify the MME of the information for reducing malfunctions in the judgment by the MME.

The information is included in a U-plane connection release request message to be notified the MME from the last connected C-plane establishing eNB (cell).

Three specific examples of the information will be disclosed below.

(1) Whether a release process request is made upon expiration of the timer.

(2) The identifier of the last connected C-plane establishing eNB (cell) whose timer has expired.

(3) The identifier of a target UE.

In another method, the information as to whether the reconfiguration is performed due to an RLF may be provided to prevent malfunctions in the judgment by the MME. The information may be notified from the UE to the MME, from the UE to the new C-plane establishing eNB (cell), or from a new C-plane establishing eNB (cell) to the MME.

The MME can accordingly judge whether the configuration of the U-plane only establishing eNB (cell) has configured due to an RLF. Thus, if receiving a U-plane connection release request message after the configuration of the U-plane only establishing eNB (cell) or if the configuration of the U-plane only establishing eNB (cell) is performed due to an RLF, the MME may discard the U-plane connection release request message. Or, if the configuration is not performed due to an RLF, the MME may perform the process of disconnecting (releasing) the U-plane only establishing eNB (cell) in accordance with the U-plane connection release request message.

The use of the above-mentioned method can reduce malfunctions in the judgment by the MME.

In another method of preventing a problem that the timing of configuring a new U-plane only establishing eNB (cell) may differ from the timing of the process of disconnecting the connection with the U-plane only establishing eNB (cell) by the NW side, the signaling, which instructs the last connected C-plane establishing eNB (cell), from the new C-plane establishing eNB (cell), to end the process of disconnecting the connection of the U-plane only establishing eNB upon expiration of the timer T32 or T33 by the last connected C-plane establishing eNB triggered by the RRC connection reestablishment process from the UE to the new C-plane establishing eNB (cell), may be provided. The signaling may be notified from the new C-plane establishing eNB (cell) to the last connected C-plane establishing eNB (cell) via the MME. For example, the method is applied in the case where the U-plane only establishing eNB (cell), configured in the last connected C-plane establishing eNB, is the same as the U-plane only establishing eNB (cell) to be configured in the new C-plane establishing eNB (cell), preventing the U-plane only establishing eNB (cell) from being released after the configuration.

The signaling may include the information about a U-plane only establishing eNB (cell) to be configured by a new C-plane establishing eNB (cell), such as an identifier. This allows the last connected C-plane establishing eNB (cell) to judge whether to end the process of disconnecting the connection of the U-plane only establishing eNB upon expiration of the timer T32 or T33. Alternatively, the process of disconnecting the connection of only the same U-plane only establishing eNB (cell) may be ended.

As a result, malfunctions can be reduced as a system, achieving a stable operation.

First Modification of Eighth Embodiment

<Processing Method (b) of Disconnecting Connection with U-Plane Only Establishing eNB>

Another specific example of the processing method of disconnecting the connection with a U-plane only establishing eNB (cell) will be disclosed.

If detecting an RLF in the connection with the C-plane establishing eNB (cell), the UE disconnects the connection with the U-plane only establishing eNB (cell).

As the process of disconnecting the connection with the U-plane only establishing eNB (cell), the UE performs the process of disconnecting all the U-plane connections of all the U-plane only establishing eNBs (cells) connected with the UE. The UE releases all the U-plane radio resources including releasing of the MAC, RLC, and PDCP of all the U-plane RBs in all the U-plane only establishing eNBs (cells).

Part (b) of FIG. 57 is a diagram for describing an RLF-related process according to this modification. Part (b) of FIG. 57 is similar to part (a) of FIG. 57, and thus, the common description of the same elements will not be described here.

The UE in the normal operation state performs RLM between the C-plane establishing eNB (cell) and itself and, if having detected out-of-sync (radio problem detection) a predetermined number of times (N21) in a row, enters the first phase.

The UE continuously performs RLM between the C-plane establishing eNB (cell) and itself in the first phase and, if having detected in-sync a predetermined number of times (N22) in a row, returns to the normal operation state. If not having detected in-sync the predetermined number of times (N22) in a row within a predetermined period (T21) from the radio problem detection, the UE detects an RLF and enters the second phase.

If detecting an RLF in the connection with the C-plane establishing eNB (cell), the UE disconnects the connection with the U-plane only establishing eNB (cell).

In the second phase, the UE stores the RLF information and activates the RRC connection reestablishment process.

If AS security is not activated, the UE may perform the process of leaving from RRC connection.

<RRC Connection Reestablishment Process>

In activating the RRC connection reestablishment process, the UE stops all the RBs except for an SRB0 of the C-plane establishing eNB (cell) and, for example, resets the MAC, releases the SCell, applies the default PHY configuration, and applies the MAC main configuration. Then, the UE performs the cell selection process. If there is U-plane connection between the UE and the C-plane establishing eNB (cell), the UE stops all the RBs for the U-plane connection as well. In other words, as for the U-plane connection with the C-plane establishing eNB (cell), the UE follows the process for the C-plane establishing eNB (cell), not the process for the U-plane only establishing eNB (cell).

If carrier aggregation (CA) is configured in the U-plane only establishing eNB (cell), the SCell in the CA may be released.

Comparison with Eighth Embodiment

Disclosed below is a method of handling a U-plane only establishing eNB (cell) when the UE performs the process of leaving from RRC connection (leaving RRC_Connected) or performs the RRC connection reestablishment process.

Unlike the method disclosed in the eighth embodiment, when having succeeded cell selection in the second phase, the UE has disconnected (released) the connection with the U-plane only establishing eNB (cell). Thus, a new U-plane only establishing eNB (cell) is configured even if the UE selects any C-plane establishing eNB (cell) in cell selection or if the C-plane establishing eNB (cell) that has reestablished RRC connection or the MME selects and determines any U-plane only establishing eNB (cell).

Thus, it suffices that the MME configures the E-RAB of each of the eNBs (cells), and accordingly, the MME needs to be notified of the request to configure a U-plane only establishing eNB (cell).

The method of connecting with a different U-plane only establishing eNB (cell) when a last connected C-plane establishing eNB (cell) is selected, disclosed in the eighth embodiment, may be applied as the method of configuring and releasing a U-plane only establishing eNB (cell) in this case.

Alternatively, the method in the case where a different C-plane establishing eNB (cell) is selected, disclosed in the eighth embodiment, may be applied.

Compared with the method disclosed in the eighth embodiment, the method disclosed in this modification prevents the UE from unnecessarily maintaining radio resources for U-plane connection also in the second phase. In other words, the process of disconnecting the connection with the U-plane only establishing eNB (cell) is performed at an early stage, improving radio resource use efficiency.

The second phase after the RLF is a phase in which the cell selection process is performed. In other words, even if the communication is recovered, the connection is highly likely to be the connection with another cell (different C-plane establishing eNB (cell)). The connection with another cell may require the U-plane configuration according to the status of the connection with the cell. The UE performs, in consideration the above, the process of disconnecting the connection with a U-plane only establishing eNB (cell) at the time of RFL detection, so that the communication environment with a new C-plane establishing eNB (cell) can be reflected. This prevents a decrease in communication quality when an RRC connection is reestablished.

<Difference of Timing Between Configuration and Release>

The disconnection (release) of the U-plane only establishing eNB (cell) by the NW side in this modification is managed by the timer T31 in the RLF-related process by the C-plane establishing eNB (cell) such that the process of disconnecting connection is performed upon expiration of the timer T31. The process of disconnecting connection may be performed due to an RLF by the NW side as well as an RLF by the UE.

However, the process is not necessarily performed by the UE and the NW side at exactly the same timing.

The timer T31 of the last connected C-plane establishing eNB (cell) cannot be reset in the RRC connection reestablishment process from the UE to a new C-plane establishing eNB (cell).

The timing of configuring a new U-plane only establishing eNB (cell) may differ from the timing of releasing the U-plane only establishing eNB (cell) by the NW side.

In this case, such a problem that the newly configured U-plane only establishing eNB (cell) is released may occur.

To solve this problem, the MME makes adjustment.

The method disclosed in the eighth embodiment may be applied as the adjustment method by the MME. Similar effects can be achieved.

The above-mentioned method reduces malfunctions in the judgment by the MME.

Second Modification of Eighth Embodiment

<Processing Method (c) of Disconnecting Connection with U-Plane Only Establishing eNB>

Disclosed below is another specific example of the processing method of disconnecting the connection with a U-plane only establishing eNB (cell).

If detecting a radio problem in the connection with the C-plane establishing eNB (cell), the UE disconnects the connection with the U-plane only establishing eNB (cell).

As the process of disconnecting the connection with the U-plane only establishing eNB (cell), the UE performs the process of disconnecting all the U-plane connections of all the U-plane only establishing eNBs (cells) connected with the UE. The UE releases all the U-plane radio resources including releasing of the MAC, RLC, and PDCP of all the U-plane RBs in all the U-plane only establishing eNBs (cells).

Part (c) of FIG. 57 is a diagram illustrating an RLF-related process according to this modification. Part (c) of FIG. 57 is similar to part (a) of FIG. 57, and thus, the common description of the same elements will not be described here.

The UE in the normal operation state performs RLM between the C-plane establishing eNB (cell) and itself and, if having detected out-of-sync (radio problem detection) a predetermined number of times (N21) in a row, enters the first phase.

If detecting a radio problem in the connection with the C-plane establishing eNB (cell), the UE disconnects the connection with the U-plane only establishing eNB (cell).

The UE continuously performs RLM between the C-plane establishing eNB (cell) and itself in the first phase and, if having detected in-sync a predetermined number of times (N22) in a row, returns to the normal operation state. If not having detected in-sync the predetermined number of times (N22) in a row within a predetermined period (T21) from the radio problem detection, the UE detects an RLF and enters the second phase.

In the second phase, the UE stores the RLF information and activates the RRC connection reestablishment process.

If AS security is not activated, the UE may perform the process of leaving from RRC connection.

<RRC Connection Reestablishment Process>

In activating the RRC connection reestablishment process, the UE stops all the RBs except for an SRB0 of the C-plane establishing eNB (cell) and, for example, resets the MAC, releases the SCell, applies the default PHY configuration, and applies the MAC main configuration. Then, the UE performs the cell selection process. If there is U-plane connection between the UE and the C-plane establishing eNB (cell), the UE stops all the RBs for the U-plane connection as well. In other words, as for the U-plane connection with the C-plane establishing eNB (cell), the UE follows the process for the C-plane establishing eNB (cell), not the process for the U-plane only establishing eNB (cell).

If carrier aggregation (CA) is configured in the U-plane only establishing eNB (cell), the SCell in the CA may be released.

Comparison with First Modification of Eighth Embodiment

The method disclosed in the first modification of the eighth embodiment may be applied as the method of handling a U-plane only establishing eNB (cell) in the case where the UE performs the process of leaving from RRC connection (leaving RRC_Connected) and in the case where the UE performs the RRC connection reestablishment process. Similar effects can be achieved.

Comparison with Eighth Embodiment and First Modification of Eighth Embodiment

Disclosed below is a method of handling a U-plane only establishing eNB (cell) when the UE detects a radio problem and then performs resynchronization (detects in-sync a predetermined number of times (N22) in a row) to return to the normal operation state.

Unlike the methods disclosed in the eighth embodiment and the first modification of the eighth embodiment, when performing resynchronization in the first phase, the UE has disconnected (released) the connection with the U-plane only establishing eNB (cell). Thus, a new U-plane only establishing eNB (cell) is configured even if the (last connected) C-plane establishing eNB (cell) with which the UE has resynchronized or the MME selects and determines any U-plane only establishing eNB (cell).

Thus, it suffices that the MME configures the E-RAB of each of the eNBs (cells), and accordingly, the last connected C-plane establishing eNB (cell) needs to notify the MME of the request to configure a U-plane only establishing eNB (cell).

The method of connecting with a different U-plane only establishing eNB (cell) when a last connected C-plane establishing eNB (cell) is selected, disclosed in the eighth embodiment, may be applied as the method of configuring and releasing a U-plane only establishing eNB (cell) in this case.

The method disclosed in this modification enables the release of resources at an earlier stage than in the eighth embodiment or the first modification of the eighth embodiment. Therefore, unnecessary resources can be eliminated in the case where, for example, recovery (resynchronization, RRC connection reestablishment) fails as a consequence, improving resource use efficiency.

<Difference of Timing Between Configuration and Release>

The disconnection (release) of the U-plane only establishing eNB (cell) by the NW side in this modification may be performed when a radio problem with the UE is detected in the RLF-related process by the C-plane establishing eNB (cell).

However, a radio problem is not necessarily detected by the UE and the NW side at exactly the same timing.

The process of disconnecting the connection of the U-plane only establishing eNB (cell) by the NW side is activated in the detection of a radio problem by the last connected C-plane establishing eNB (cell).

The timing of configuring the new U-plane only establishing eNB (cell) may differ from the timing of releasing the U-plane only establishing eNB (cell) by the NW side.

In this case, such a problem that the newly configured U-plane only establishing eNB (cell) is released may occur.

To solve this problem, the MME makes adjustment.

When the connection release process is activated upon radio problem detection, the MME checks whether it has configured a U-plane only establishing eNB (cell) for the UE in the last connected C-plane establishing eNB (cell).

If the configuration has been performed, the MME discards the release process. If the configuration has not been performed, the MME performs the release process.

The last connected C-plane establishing eNB (cell) may notify the MME of the information for reducing malfunctions in the judgment by the MME.

The information is included in a release request message to be notified the MME from the last connected C-plane establishing eNB (cell).

Three specific examples of the information will be disclosed below.

(1) Information indicative of whether a release process request is made upon radio problem detection.

(2) The identifier of the last connected C-plane establishing eNB (cell) that has detected a radio problem.

(3) The identifier of a target UE.

In another method, the information as to whether the reconfiguration after resynchronization is performed may be provided and notified to prevent malfunctions in the judgment by the MME. The information may be notified from the UE to the MME, from the UE to the last connected C-plane establishing eNB (cell), or from the last connected C-plane establishing eNB (cell) to the MME.

The MME can accordingly judge whether the configuration of the U-plane only establishing eNB (cell) has been configured due to resynchronization. Thus, if receiving a release request message after the configuration of the U-plane only establishing eNB (cell) or if the configuration of the U-plane only establishing eNB (cell) is performed due to resynchronization, the MME may discard the release request message. Or, if the configuration is not performed due to resynchronization, the MME may perform the process of disconnecting (releasing) the connection of the U-plane only establishing eNB (cell) in accordance with the release request message.

The use of the above-mentioned method can reduce malfunctions in the judgment by the MME.

In the eighth embodiment to the second modification of the eighth embodiment, to start the activation of the process of disconnecting the connection of the U-plane only establishing eNB in the RLF-related process by the C-plane establishing eNB much later than the activation of the process of disconnecting the connection of the U-plane only establishing eNB in the RLF-related process by the UE, the predetermined period T31 configured in the RLF-related process by the C-plane establishing eNB may be configured longer than the predetermined period T21 configured in the RLF-related process by the UE, and/or may be configured longer than T22 if T32 is configured similarly, and/or may be configured longer than the sum of T21 and T22 if T33 is configured.

Thus, the activation of the process of disconnecting the connection of the U-plane only establishing eNB in the RLF-related process by the C-plane establishing eNB can be started much later than the activation of the process of disconnecting the connection of the U-plane only establishing eNB in the RLF-related process by the UE. This reduces malfunctions that, for example, the NW side first performs the process of disconnecting the connection of the U-plane only establishing eNB though the UE has yet to perform the process of disconnecting the connection of the U-plane only establishing eNB. The signalings, which are associated with the process of disconnecting the connection of the U-plane only establishing eNB by the NW side, can be reduced.

<HOF>

The second embodiment to the first modification of the third embodiment have disclosed that a U-plane only establishing eNB (cell) is changed not by HO but by addition/release/modification of a U-plane only establishing eNB (cell). Meanwhile, it has been disclosed that HO may be applied in changing a C-plane establishing cell. The method of handling a U-plane only establishing cell in the case where HO is performed between C-plane establishing cells has also been disclosed.

It has been disclosed in (2) that the eNB that establishes U-plane connection is notified from the target C-plane establishing eNB to the UE as the method of handling a U-plane only establishing cell in the case where HO is performed between C-plane establishing cells. Alternatively, if the U-plane only establishing cell is the same before and after HO, the UE may not be notified of the eNB. If the UE is not notified of the eNB in HO, the UE may need not to change the connection of the U-plane only establishing cell.

As a result, the information about the U-plane only establishing cell needs not to be transmitted to the UE from the target C-plane establishing cell via the source C-plane establishing cell, reducing an amount of signaling or an amount of information included in the message.

In another method, if the U-plane only establishing cell is the same before and after HO, the UE may be notified of the information indicating that the U-plane only establishing cell established before and after HO is the same. The information is transmitted to the UE from the target C-plane establishing cell via the source C-plane establishing cell. A small amount of information is required compared with the information about the U-plane only establishing eNB, reducing an amount of signaling or an amount of information included in a message.

Disclosed below are two methods of handling a U-plane only establishing cell when the UE detects a HO failure (HOF) in HO of the C-plane establishing cell.

(1) When the UE detects a HOF of the C-plane establishing cell, the connection with the U-plane only establishing eNB (cell) is disconnected. The method disclosed in the eighth embodiment may be applied as the method of disconnecting the connection with the U-plane only establishing eNB (cell).

(2) When the UE detects a HOF of the C-plane establishing cell, the UE is considered to have detected an RLF, and the U-plane only establishing cell is handled as in the case where the UE detects an RLF. The method disclosed in the eighth embodiment or the first modification of the eighth embodiment may be applied as the method of handling a U-plane only establishing cell when the UE detects an RLF.

When an RLF is detected in the HO procedure, it may be determined that a HOF is detected. Also in this case, the U-plane only establishing cell is handled as in the case where the UE detects an RLF.

As a result, for a HOF in the case where the UE communicates with a plurality of eNBs (cells), the method of handling a U-plane only establishing eNB (cell) can be specified, enabling normal data communication. Also, malfunctions can be reduced as a system. Further, unnecessary resources can be prevented from being maintained for the connection between the UE and the U-plane only establishing eNB (cell), improving radio resource use efficiency.

Ninth Embodiment

<RLF-Related Process of U-Plane Only Establishing eNB>

This embodiment will disclose another method of the RLF-related process in the case where the UE performs communication using a plurality of different eNBs (cells). The process will be referred to as the RLF-related process of the U-plane only establishing eNB (cell).

The UE performs RLM between the U-plane only establishing eNB (cell) and itself.

The UE performs the process of disconnecting the connection with the U-plane only establishing eNB (cell) in accordance with the connection status of the U-plane only establishing eNB (cell).

Disclosed below are three processing methods of disconnecting the connection with the U-plane only establishing eNB (cell).

(1) When detecting a radio problem in the connection with a U-plane only establishing eNB (cell), the UE disconnects the connection with the U-plane only establishing eNB (cell).

(2) When detecting an RLF in the connection with a U-plane only establishing eNB (cell), the UE disconnects the connection with the U-plane only establishing eNB (cell).

(3) When failing in reconnection in the connection with a U-plane only establishing eNB (cell), the UE disconnects the connection with the U-plane only establishing eNB (cell).

In any of the methods, RLM and the RLF-related process are performed per U-plane only establishing eNB (cell) connected with the UE.

Part (a) of FIG. 63 is a diagram for describing an RLF-related process according to the method (1).

When the UE in the normal operation state has performed RLM of the U-plane only establishing eNB (cell) and has detected out-of-sync (radio problem detection) a predetermined number of times (N41) in a row, the UE disconnects the connection with the U-plane only establishing eNB (cell). The out-of-sync of the U-plane only establishing eNB (cell) will be described below.

This method allows the connection with the U-plane only establishing eNB (cell) to be disconnected at an earlier stage than the other two methods. The radio resources for the U-plane only establishing eNB (cell) are accordingly not required to be maintained for a long period, improving radio resource use efficiency.

Part (b) FIG. 63 is a diagram for describing an RLF-related process according to the method (2).

Part (b) of FIG. 63 is similar to part (a) of FIG. 63, and thus, the common description of the same elements will not be described here.

The UE in the normal operation state performs RLM between the U-plane only establishing eNB (cell) and itself and, when detecting out-of-sync (radio problem detection) a predetermined number of times (N41) in a row, shifts the connection status with the U-plane only establishing eNB (cell) to the first phase.

The UE continuously performs RLM between the U-plane only establishing eNB (cell) and itself in the first phase and, when detecting in-sync a predetermined number of times (N42) in a row, returns to the normal operation state. When not detecting in-sync the predetermined number of times (N42) in a row within a predetermined period (T41) from the radio problem detection, the UE detects an RLF and disconnects the connection with the U-plane only establishing eNB (cell). The in-sync of the U-plane only establishing eNB (cell) will be described below.

The method allows the UE to return to the normal operation state when good communication quality is resumed in the first phase. Thus, the process of disconnecting connection needs not to be activated due to temporary degradation in communication quality, resulting in simplified control, which reduces malfunctions.

Part (c) of FIG. 63 is a diagram for describing an RLF-related process according to the method (3).

Part (c) of FIG. 63 is similar to part (b) of FIG. 63, and thus, the common description of the same elements will not be described here.

The UE in the normal operation state performs RLM between the U-plane only establishing eNB (cell) and itself and, when detecting out-of-sync (radio problem detection) a predetermined number of times (N41) in a row, shifts the connection status with the U-plane only establishing eNB (cell) to the first phase.

The UE continuously performs RLM between the U-plane only establishing eNB (cell) and itself in the first phase and, when detecting in-sync a predetermined number of times (N42) in a row, returns to the normal operation state. When not detecting in-sync the predetermined number of times (N42) in a row within a predetermined period (T41) from the radio problem detection, the UE detects an RLF and enters the second phase.

In the second phase, the UE activates the process of reconnecting with the U-plane only establishing eNB (cell).

When succeeding in reconnection by the process of reconnecting with the U-plane only establishing eNB (cell) within the predetermined period (T42) from the RLF detection, the UE returns to the normal operation state. When failing in reconnection within the predetermined period (T42) from the RLF detection, the UE disconnects the connection with the U-plane only establishing eNB (cell).

The reconnection process in the second phase may be performed on the same U-plane only establishing eNB (cell) as the U-plane only establishing eNB (cell) whose RLF has been detected.

Here, in the second phase, the connection with the U-plane only establishing eNB (cell) is disconnected upon expiration of a predetermined period. Alternatively, in another method, a predetermined number of trial reconnections may be provided in the second phase and, if reconnection fails after the predetermined number of trial reconnections, the connection with the U-plane only establishing eNB (cell) may be disconnected. A specific example of this method has been disclosed in the method of the second embodiment in which the UE performs RLM with each of the U-plane establishing eNBs (cells) and releases an eNB that has established U-plane only.

In activating the reconnection process, the UE may stop all the U-plane RBs of the U-plane only establishing eNB (cell). The method disclosed in the eighth embodiment may be applied as the processing method. If the UE is still in the normal operation state, when the UE performs the process of reconnecting with the U-plane only establishing eNB (cell), control becomes complicated, increasing a risk of malfunctions. Such a problem can be prevented here.

The method (3) needs not to activate the process of disconnecting connection until it is judged that reconnection cannot be made, further simplifying control, which reduces malfunctions.

In the second phase, the UE may be allowed to perform the process of reconnecting with a U-plane only establishing eNB (cell) different from the U-plane only establishing eNB (cell) whose RLF has been detected. In this case, the C-plane establishing eNB (cell) or the MME may select and determine a new U-plane only establishing eNB (cell) to configure it for the UE. In this case, the methods of the second embodiment and the third modification of the second embodiment are applicable.

When judging to disconnect the connection with the U-plane only establishing eNB (cell) in the RLF-related process, the UE disconnects the connection with the U-plane only establishing eNB (cell).

Disclosed below are two processing methods of disconnecting the connection with the U-plane only establishing eNB (cell) by the NW side.

(1) Upon the UE notifying the C-plane establishing eNB (cell) of a request to disconnect the connection with the U-plane only establishing eNB (cell), the disconnection process by the NW side is performed. The degradation in reception quality may be notified as a request to disconnect connection.

A specific example of this method has been disclosed in the method of the second embodiment in which the UE performs RLM with each of the U-plane establishing eNBs (cells) and releases an eNB that has established U-plane only.

(2) The disconnection process by the NW side is performed in accordance with the RLF-related process by the U-plane only establishing eNB (cell).

The RLF-related processes by the C-plane establishing eNB (cell), disclosed in the eighth embodiment to the second modification of the eighth embodiment, are applicable as the RLF-related process by the U-plane only establishing eNB (cell) on the NW side. The process performed by the C-plane establishing eNB (cell) may be performed by the U-plane only establishing eNB (cell).

When the method (1) is used as the processing method of disconnecting the connection with the U-plane only establishing eNB (cell), the RLF-related process by the C-plane establishing eNB (cell), disclosed in the second modification of the eighth embodiment, may be applied. When the U-plane only establishing eNB (cell) detects a radio problem in the connection with the UE, the U-plane only establishing eNB (cell) notifies the MME of a request to disconnect connection. The message requesting to disconnect connection may be notified via the C-plane establishing eNB (cell). The degradation in reception quality may be notified as the request to disconnect connection.

When the method (2) is used as the processing method of disconnecting the connection with the U-plane only establishing eNB (cell), the RLF-related process by the C-plane establishing eNB (cell), disclosed in the first modification of the eighth embodiment, may be applied. When the U-plane only establishing eNB (cell) detects an RLF in the connection with the UE, the U-plane only establishing eNB (cell) notifies the MME of a request to disconnect connection. The message requesting to disconnect connection may be notified via the C-plane establishing eNB (cell). The degradation in reception quality may be notified as the request to disconnect connection.

When the method (3) is used as the processing method of disconnecting the connection with the U-plane only establishing eNB (cell), the RLF-related process by the C-plane establishing eNB (cell), disclosed in the eighth embodiment, may be applied. When the U-plane only establishing eNB (cell) judges that the timer T32 has expired or the timer T33 has expired in the connection with the UE, the U-plane only establishing eNB (cell) notifies the MME of a request to disconnect connection. The message requesting to disconnect connection may be notified via the C-plane establishing eNB (cell). The degradation in reception quality may be notified as the request to disconnect connection.

The processes of disconnecting the connection with the U-plane only establishing eNB (cell) performed using a data monitoring timer, disclosed in the second embodiment, the third modification of the second embodiment, and the third embodiment, are applicable to this method. As a specific example, in the sequences of FIG. 32, FIG. 40, FIG. 41, and FIG. 46, the sequence of performing the U-plane disconnection (release) process upon expiration of the data monitoring timer in the U-eNB (cell) may be applied.

In the process when reconnection is enabled by the process of reconnecting with the U-plane only establishing eNB (cell), radio resources stopped in the activation of the reconnection process are restarted, and the normal operation is resumed.

There is no change in the configuration of the DRB bearer, the configuration of the S1 bearer, and the path configuration by the U-plane only establishing eNB (cell) until the U-plane only establishing eNB (cell) is reconfigured or the connection thereof is disconnected. Each node accordingly keeps the original configuration, and thus can perform reconnection using the original configuration.

FIG. 64 shows an example sequence of an RLF-related process by the U-plane only establishing cell according to the ninth embodiment, which shows a case in which the method (3) is used as the processing method of disconnecting the connection with the U-plane only establishing eNB (cell). The RLF-related process by the UE and the RLF-related process by the U-plane only establishing cell are shown together.

In ST6401, the UE that has started the connection with the U-eNB starts RLM with the U-eNB. In ST6402, the UE judges whether out-of-sync has occurred N41 times in a row in the connection with the U-eNB. If out-of-sync has occurred N41 times in a row, the UE detects a radio problem (ST6403) to shift to the first phase. If out-of-sync has not occurred N41 times in a row, the UE performs RLM and again performs ST6402. In ST6404, the UE that has detected a radio problem in ST6403 starts a timer T41. The UE continuously performs RLM in the first phase. In ST6405, the UE judges whether in-sync has occurred N42 times in a row. If in-sync has occurred N42 times in a row, the UE returns to the normal operation to perform RLM, and then performs ST6402. If in-sync has not occurred N42 times in a row, in ST6406, the UE judges whether the timer T41 has expired. If the timer T41 has not expired, the UE continuously performs RLM and then performs ST6405. If the timer has expired, the UE detects an RLF in ST6407. In ST6408, the UE that has detected an RLF in ST6407 enters a second phase, and stops the timer T41 and starts the timer T42. In ST6409, the UE stops the RB with the U-plane only establishing cell (eNB). In the second phase, the UE activates the process of reconnecting with the U-eNB to reconnect therewith (ST6410). In ST6411, the UE judges whether it has succeeded in reconnection and, if it has failed in reconnection, judges whether the timer T42 has expired in ST6412. If the timer T42 has not expired, the UE continuously performs the process of reconnecting with the U-eNB in ST6410. If the timer T42 has expired in ST6412, the UE performs the process of disconnecting the connection with the U-eNB in ST6413.

If the UE is successfully reconnected with the U-eNB in ST6411, the UE stops the timer T42 in ST6414 and, in ST6415, restarts the stopped RB of the U-eNB. As a result, the connection with the U-eNB enters the normal operation, allowing the radio bearer 2 (DRB) (3027) and the S1 bearer 2 (3028) to be continuously configured between the UE and the U-eNB (last connected U-eNB) and between the U-eNB and the S-GW, respectively. The U-plane data can be accordingly communicated between the UE and the S-GW via the U-eNB in ST3032 and ST3033.

Next, the RLF-related process by the U-eNB will be described.

In ST6416, the U-eNB that is in U-plane connection with the UE starts RLM between the UE and itself. In ST6417, the U-eNB judges whether an uplink signal or channel has been undelivered N31 times in a row in the connection with the UE. The uplink signal may be, for example, a periodic CQI. If a periodic CQI has been undelivered N31 times in a row, the U-eNB detects a radio problem (ST6418). If a periodic CQI has not been undelivered N31 times in a row, the U-eNB performs RLM and again performs ST6417. In ST6419, the U-eNB that has detected a radio problem starts the timer T31 and continuously performs RLM. In ST6420, the U-eNB judges whether it has successfully received a periodic CQI N32 times in a row. If having successfully received a periodic CQI N32 times in a row, the U-eNB returns to the normal operation to perform RLM and performs ST6417. If having failed in receiving a periodic CQI N32 times in a row, in ST6421, the U-eNB judges whether the timer T31 has expired. If the timer T31 has not expired, the U-eNB continuously performs RLM and performs ST6420. If the timer has expired, the U-eNB detects an RLF in ST6422. In ST6423, the U-eNB that has received an RLF in ST6422 stops the timer T31 and starts the timer T32. The U-eNB that has detected an RLF performs the reconnection process shown in ST6410 between the UE and itself. In ST6424, the U-eNB judges whether the reconnection with the UE is complete. If the reconnection is complete, the U-eNB stops the timer T32 in ST6425. Thus, the connection with the UE enters the normal operation, and the radio bearer 2 (DRB) (3027) and the S1 bearer 2 (3028) are continuously configured between the UE and the U-eNB (last connected U-eNB) and between the U-eNB and the S-GW, allowing the U-plane data to be communicated between the UE and the S-GW via the U-eNB in ST3032 and ST3033.

If the reconnection with the UE is not complete in ST6424, in ST6426, the U-eNB judges whether the timer T32 has expired. If the timer has not expired, the U-eNB again performs the reconnection process from the UE. If the timer has expired, the U-eNB performs the process of releasing a U-eNB upon expiration of the timer, shown in ST3203 to ST3115 of FIG. 32. The process of disconnecting the connection with a U-eNB to be released in ST3106 included in ST3114 in FIG. 32 may be skipped if it has been performed in ST6413.

As a result, the process of disconnecting the connection between the UE and the U-eNB is performed.

The method disclosed in this embodiment prevents a situation in which the connection with the U-plane only establishing eNB (cell) is kept.

Thus, radio resources will not be maintained unnecessarily, improving radio resource use efficiency.

The ambiguity in the operations of the UE and the NW side is eliminated, reducing malfunctions as a system.

The RLM method has been disclosed in the second embodiment, which will be disclosed here in greater detail.

The second embodiment has disclosed, as (1) to (4), that the RS reception result of each U-plane only establishing eNB (cell) is used for RLM. Alternatively, CSI-RS may be used. They may be used in combination.

The reception quality of the PDCCH may be evaluated as RLM.

The UE evaluates the PDCCH reception quality of the cell for U-plane only connection. The UE associates the PDCCH reception quality with the RS reception quality (such as RSRP or RSRQ) in advance. The UE measures the RS reception quality of the cell for U-plane only connection, and evaluates the PDCCH reception quality of the cell based on the association.

Two predetermined thresholds are provided for the reception quality, where the case in which the PDCCH reception quality is not less than one predetermined threshold is judged as in-sync, while the case in which the PDCCH reception quality is not greater than the other predetermined threshold is judged as out-of-sync.

The method of evaluating the PDCCH reception quality as the RLM of the cell for U-plane only connection can be controlled as with the conventional RLM, leading to simplified control.

The ePDCCH reception quality may be evaluated as RLM.

The UE evaluates the ePDCCH reception quality of the cell for U-plane only connection.

The UE associates the ePDCCH reception quality with the reception quality (such as RSRP or RSRQ) of the RS used in ePDCCH and/or the RS used in a subframe that uses ePDCCH in advance.

The UE measures the reception quality of the RS used in ePDCCH and/or the RS used in a subframe that uses ePDCCH of the cell for U-plane only connection, to thereby evaluate the ePDCCH reception quality of the cell based on the association.

Two predetermined thresholds are provided for the reception quality, where the case in which the ePDCCH reception quality is not less than one predetermined threshold is judged as in-sync and the case in which the ePDCCH reception quality is not greater than the other predetermined threshold is judged as out-of-sync.

Such a use of the ePDCCH reception quality in RLM is also applicable to the case in which the ePDCCH is used. Application to the case where it is difficult to use the PDCCH allows RLM to be performed reliably.

First Modification of Ninth Embodiment

<Coordination Between RLF of C-Plane Establishing Cell and RLF of U-Plane Only Establishing Cell>

When the UE is in connection with the C-plane establishing eNB and one or a plurality of U-plane only establishing eNBs, the method for the RLF-related process by the C-plane establishing eNB, disclosed in the eighth embodiment, may be combined with the method for the RLF-related process by the U-plane only establishing eNB, disclosed in the ninth embodiment.

When the connection with the U-plane only establishing eNB is disconnected in the RLF-related process by the C-plane establishing eNB, connection is disconnected irrespective of the connection status of each of the U-plane only establishing eNBs in the RLF-related process by each of the U-plane only establishing eNBs.

When the UE moves to RRC_Idle, accordingly, there is no connection with the U-plane only establishing eNB. Such a state that the UE, which is in RRC_Idle, is in only U-plane connection can be eliminated.

While the connection with the U-plane only establishing eNB is yet to be disconnected in the RLF-related process by the C-plane establishing eNB, the UE may follow the connection status of each of the U-plane only establishing eNBs in the RLF-related process by each of the U-plane only establishing eNBs.

This allows the UE to perform connection according to the connection status per U-plane only establishing eNB. Unnecessary connection with the U-plane only establishing eNB can be accordingly eliminated, improving radio resource use efficiency.

The connection status of the C-plane establishing cell may not depend on the connection status of the U-plane only establishing cell.

The UE performs RRC connection by the C-plane establishing cell. Thus, if the connection status of the C-plane establishing cell does not depend on the connection status of the U-plane only establishing cell, the UE can stably perform RRC connection. For example, even when the UE moves and the communication quality of each of the U-plane only establishing cells varies incessantly, the RLF-related process follows the quality of the communication with one C-plane establishing cell. This enables stable RRC connection, firmly controlling UE movement.

Tenth Embodiment

<Small Cell Cluster>

The first embodiment to the first modification of the ninth embodiment have disclosed the method in which a UE performs communication using a plurality of eNBs (cells) for one communication.

As a system, a plurality of eNBs may be handled as one group for simplified control and a reduced amount of signaling. This embodiment will disclose the method of handling a plurality of eNBs as one group.

The following four will disclose a plurality of eNBs to be handled as one group.

(1) A group of eNBs in a specific area.
(2) A group of a plurality of eNBs controlled by one concentrated control node (concentrator).
(3) A group of eNBs belonging to the same frequency layer.
(4) Combination of (1) to (3).

The group may be referred to as a group or a cluster. For example, the group may be referred to as an eNB group or a node cluster. If the eNBs in a group are small cells, the group may be referred to as a small cell group or a small cell cluster.

In (1), the eNBs in a specific area are handled as one group, simplifying communication control in the specific area. For example, the eNBs in a specific area, disclosed in the first embodiment, may be equivalent to the above-mentioned eNBs.

In (2), one concentrated control node may be provided for a group of a plurality of eNBs handled as one group. In (2), a plurality of eNBs can be controlled in a concentrated manner, simplifying control. For a small cell group, a macro cell positionally overlaid on the small cell group may be a concentrator. Alternatively, a concentrator may be disposed independently from a macro cell. Still alternatively, scheduling may be performed independent of the macro cell. For example, the eNB for centralized control and the target eNB for centralized control, disclosed in the first modification of the third embodiment, are equivalent to the above-mentioned eNBs.

In (3), a carrier in which the eNBs in a group have the same carrier frequency is configured. In other words, the eNBs operate in the same frequency layer. This simplifies a cell change in a group.

FIG. 65 is a diagram illustrating the case in which a plurality of eNBs are handled as one group.

Part (a) of FIG. 65 is a diagram illustrating the case in which a plurality of eNBs, which are handled as one group, constitute a group of eNBs in a specific area. 6501 denotes a macro cell; 6502, the coverage configured by the macro cell; 6506, a small cell; and 6503, the coverage configured by the small cell. There are a plurality of small cells. 6504 denotes a specific area. 6505 denotes a small cell group. The small cells (6506) in the specific area (6504) are handled as the small cell group (6505).

Part (b) of FIG. 65 is a diagram illustrating the case in which a plurality of eNBs, which are handled as one group, constitute a group of eNBs controlled by a concentrator. The same elements as part (a) of FIG. 65 will be denoted by the same numbers and will not be described here. 6507 denotes a concentrator. A group of the small cells (6506) controlled by the concentrator (6507) is handled as the small cell group (6505).

Part (c) of FIG. 65 is a diagram illustrating the case in which a plurality of eNBs, which are handled as one group, constitute a group of eNBs belonging to the same frequency layer. The same elements as part (a) of FIG. 65 will be denoted by the same numbers and will not be described here. The carrier frequency of a carrier configured by the macro cell is F1. A group of the small cells (6506) configuring the carrier having a carrier frequency Fm is handled as the small cell group (6505).

Disclosed below is a configuration method in the case where a plurality of eNBs are handled as a group, for example, a small cell group in each of the embodiments.

The configuration information of a small cell group may be the identifier of a small cell group, the identifier of the cell in the small cell group, or the like. The configuration information may include the system information common to small cells or the system information dedicated to each small cell. The configuration information may include the frequency carrier of the cell in the small cell group or the identifier of a concentrator if the concentrator is provided.

In the first embodiment, the cells to be selected in cell selection by the UE may be limited to ones in a predetermined small cell group.

For cell selection, the configuration information of the small cell group may be notified the UE from the cell being in RRC-connection therewith in advance through RRC signaling. The configuration information may be included in one message. A new message may be provided or the configuration information may be included in an existing RRC message to be notified. An RRC connection reconfiguration message may be used as a specific example of the existing RRC message. The configuration information of the small cell group may be included in RadioResourceConfigDedicated information of the RRC connection reconfiguration message.

In the second embodiment to the third embodiment, the U-plane establishing cells or the U-plane only establishing cells, which are configured for the UE by the MME or the C-plane establishing cell, may be configured as a small cell group. Although the second embodiment has disclosed the method in which a DRB list is used, the list may be a list of cells of a small cell group.

The cells, which are configured for the UE by the MME or the cell to be RRC-connected with the UE, may be limited to ones in a predetermined small cell group in the sixth embodiment. The UE may be notified of the configuration information of a small cell group through RRC signaling. Alternatively, the UE may be notified of a cell to be activated or deactivated in a small cell group through MAC signaling.

The UE performs configuration for the small cell in the small cell group, which has been notified through RRC signaling, and performs communication with the small cell whose activation has been notified through MAC signaling.

A plurality of eNBs are configured as one group for the UE as described above, eliminating the need for individually notifying the UE of the configurations of the plurality eNBs a plurality of times through RRC signaling.

In the case where a group of a plurality of eNBs is handled as one group, the list of identifiers of the groups may be provided as configuration information to be notified the UE through RRC signaling. In the case where a plurality of groups are configured, listing of identifiers leads to a reduction in overhead in signaling.

Disclosed below is a measurement method in the case where a group of a plurality of eNBs is handled as, for example, a small cell group in each of the embodiments.

Radio resource management (RRM) will be disclosed. Cells in the same frequency layer may be measured as the measurement of neighbor cells.

For example, a group of small cells belonging to the same frequency layer is a small cell group, other frequency particularly needs not to be measured when the small cell in the group is changed. Thus, limiting the RRM measurement target to the cells in the same frequency layer simplifies the measurement process by the UE, allowing the measurement to be performed in a short period of time with low power consumption.

The RRM measurement target may be limited to the cells in a small cell group. The CRS of the cell in a small cell group may be measured. In the case where a small cell is changed in the group, cells out of the group need not to be measured. Thus, limiting the RRM measurement to the cells in a predetermined small cell simplifies the measurement process by the UE, allowing the measurement to be performed in a short period of time with low power consumption.

The eNB (cell) in RRC connection notifies the UE of a measurement configuration of RRM measurement. The measurement configuration includes the information indicating that measurement is performed in the frequency layer of a predetermined small cell group. For example, the frequency information to be measured may be included.

The measurement configuration may include the information indicating that a predetermined small cell group is measured. For example, the identifier of the small cell group to be measured may be included. The use of the identifier together with the configuration information of the small cell group allows the cell in the small cell group being a measurement target to be identified. This eliminates the need for dedicatedly including information per cell being a measurement target in the measurement configuration, reducing an amount of information in the message.

The measurement for a CQI/CSI report will be disclosed.

An activated cell may be measured. In this case, it is not necessary to measure a deactivated cell. Also in this case, the concentrator in a small cell group may determine a cell to be activated/deactivated by RRM measurement. CSI-RS or CRS may be measured as the measurement for a CQI/CSI report.

The measurement method is configured in accordance with how a group is handled as described above, simplifying a measurement process.

In the case where a group of a plurality of eNBs is handled as a group such as a small cell group in each of the embodiments, the resource for configuring an RB/S1 bearer and the information for connection may be the same in the each of the eNBs of the small cell group. For example, the UE context may be the same.

In communication using a C-plane establishing eNB and a U-plane only establishing eNB, the resource for configuring a DRB/S1 bearer and the information for connection may be the same in all the U-plane only establishing eNBs.

Particularly in the first modification of the third embodiment, the eNB for centralized control may perform the same control and management on the target eNBs for the target eNBs for centralized control. The eNB for centralized control controls the target eNBs for centralized control, enabling easy control and management.

Consequently, the UE needs not to receive the resource information for configuring a bearer per eNB for all the eNBs in a small cell group or the information for connection. One piece of information may be received as a small cell group. This reduces an amount of signaling or an amount of information of a message and simplifies control.

Eleventh Embodiment

<CA+Cell Aggregation>

This embodiment will disclose a method of further increasing communication capacity.

The UE performs communication using a plurality of eNBs (cells) for one communication and performs carrier aggregation (CA) in one or some eNBs (cells) of the plurality of eNBs (cells).

As a specific example, the UE performs communication using a macro cell and a plurality of small cells positionally overlaid on the macro cell and performs CA in the macro cell.

As another specific example, the UE performs communication using a macro cell and a plurality of small cells positionally overlaid on the macro cell and performs CA for the macro cell and the small cells.

As still another example, the UE performs communication using a C-plane establishing cell and a U-plane only establishing cell and performs CA in the U-plane only establishing cell.

A scheduler needs to be shared in CA, and thus, a concentrator may be provided which controls a plurality of eNBs (cells) for use in one communication in a concentrated manner.

FIG. 66 is a diagram illustrating the case in which communication is performed using a macro cell and a plurality of small cells positionally overlaid on the macro cell and CA is performed in the macro cell. 6601 denotes a UE, 6602 denotes a component carrier (CC) configured for the UE (6601) by the macro cell, and 6603, 6604, and 6605 denote carriers configured by a small cell #1, a small cell #2, and a small cell #3, respectively. The macro cell configures a CC1 having a carrier frequency F1, a CC2 having a carrier frequency F2, and a CC3 having a carrier frequency F3 for the UE (6601). The carrier frequencies of the small cells #1, #2, and #3 are denoted by Fm. The UE (6601) performs communication using the macro cell (6602), the small cell #1 (6603), the small cell #2 (6604), and the small cell #3 (6605) and performs CA using the CC1, the CC2, and the CC3 in the macro cell (6602).

Disclosed below is a method in which a UE recognizes the configuration information required for the UE to perform communication using a plurality of eNBs (cells) and perform CA in one or some eNBs (cells) of the plurality of eNBs (cells).

The PCell notifies the UE of the configuration information. The configuration information may be the CA configuration information or the configuration information of an eNB (cell) that performs communication. If there are a plurality of PCells, the plurality of PCells may notify the UE of the configuration information. The configuration information may be divided to be notified from a plurality of PCells to the UE. Alternatively, one PCell may notify the UE of the configuration information. One PCell may be a PCell that configures CA. One PCell may be a cell that notifies the configuration for performing communication using a plurality of eNBs (cells).

In the example in which CA is performed using a cell without RRC connection, such as CA performed in a U-plane only establishing cell among the specific examples described above, the UE may be notified of the configuration information from the cell that is RRC-connected with the UE being a CA target. The cell, which is RRC-connected with the UE being a CA target, may be a PCell. In this case, the cell without RRC connection may notify the cell that is RRC-connected of the configuration information in advance. As a specific example, the U-plane only establishing cell may notify the C-plane establishing cell of the configuration information as disclosed in the second embodiment. The U-plane only establishing cell may notify the UE of the configuration information via the C-plane establishing cell.

Examples of the CA configuration information include the identifier of the eNB (cell) that performs CA, the carrier frequency information of a component carrier that configures CA, and the CC system information.

The information disclosed in the first embodiment to the tenth embodiment may be applied as the configuration information for performing communication using a plurality of eNBs (cells). The method of handling a plurality of eNBs as one group, disclosed in the tenth embodiment, may be applied. For example, the configuration information may be the identifier of the group, the identifier of each eNB in the group, or the system information of each eNB in the group.

Although the PCell notifies the UE of the configuration information, in another method, the C-plane establishing cell may notify the UE of the configuration information. This method is effective in the case where CA is performed in a U-plane only establishing cell. The U-plane only establishing cell may notify the C-plane establishing cell of the configuration information in advance. The U-plane only establishing cell may notify the UE of the configuration information via the C-plane establishing cell.

The configuration information may be notified the UE through RRC signaling.

One message, which includes the configuration information composed of the CA configuration information and the configuration information of an eNB (cell) that performs communication, may be provided so that the message is notified through RRC signaling. This reduces an amount of signaling.

Alternatively, the CA configuration information and the configuration information of an eNB (cell) that performs communication may be provided as individual messages to be notified through RRC signaling. As a result, the case in which CA only needs to be configured or the case in which a plurality of eNBs only need to be configured can be handled.

These may be used while being appropriately combined.

In CA, the MAC activates/deactivates each of the CCs and the activation/deactivation of each of the CCs are notified the UE through MAC signaling. A plurality of eNBs may be treated similarly. The MAC activates/deactivates each of the eNBs configured in RRC and notifies the UE of the activation/deactivation of each eNB through MAC signaling. The UE may configure a radio resource for the eNB notified through RRC signaling and perform communication with only the eNB activated through MAC signaling. The UE may receive the PDCCH or ePDCCH of the activated eNB to obtain scheduling information.

The eNBs to be used in communication and the CCs that constitute CA may be provided with serial numbers, and the numbers and the information of association between the number and each of the eNBs and the CCs may be included as the configuration information notified the UE through RRC signaling. This allows for control based on the information whose amount is smaller than in the case where the identifiers of cells such as eNBs are used.

The MAC may collectively notify the UE of activation/deactivation of the eNBs to be used in communication and CCs that constitute CA. This reduces overhead of MAC signaling more than in the case where the MAC notifies separately. In this case, the serial numbers may be used to instruct the eNB to be used in communication and CCs that constitute CA. This can reduce an amount of information of signaling.

The methods disclosed in the first embodiment to the tenth embodiment may be appropriately applied as the communication method using a plurality of cells.

The embodiments and their modifications are merely illustrations of the present invention, and the embodiments and their modifications can be combined freely within the scope of the present invention. The components of the embodiments and their modifications can be appropriately changed or omitted. Therefore, high communication capacity can be achieved by the installation of small eNBs (cells), and a communication system capable of changing a cell during communication without any load on a network can be provided.

The invention claimed is:

1. A mobile communication system, comprising:
   a mobile station;
   a first base station configured to perform radio communication with said mobile station;
   a second base station configured to perform radio communication with said mobile station; and
   a gateway station configured to perform communication with said first base station and said second base station or with said mobile station via said first base station and said second base station,
   wherein communication is performed between said mobile station and said gateway station by establishing a first communication connection between said gateway station and said first base station, a first radio communication connection between said first base station and said mobile station, and a second radio communication connection between said second base station and said mobile station, and
   data communicated via the first radio communication connection and data transmitted via the second radio communication connection include user data and control data, a ratio of data transmitted through the first radio communication connection relative to data transmitted through the second radio communication connection being determined based on connection qualities of the first communication connection and the second communication connection, and
   a change of a radio communication path as the mobile station moves from one cell to another in a specific area is performed through addition and release of an RRC connection/S1 bearer, and
   said specific area is at least one of an area with a same timing advance and an area of the same gateway station.

2. The mobile communication system according to claim 1, wherein the communication is performed between said mobile station and said gateway station by establishing a second communication connection between said gateway station and said second base station in addition to said first communication connection, said first radio communication connection, and said second radio communication connection.

3. The mobile communication system according to claim 2, wherein transmission of user plane signals is distributed through a first path including said first communication connection and said first radio communication connection and a second path including said second communication connection and said second radio communication connection.

4. The mobile communication system according to claim 1, wherein transmission of user plane signals is distributed through a first path including said first communication connection and said first radio communication connection and a second path including said first communication connection and said second radio communication connection.

5. The mobile communication system according to claim 2, wherein transmission of control plane signals is distributed through a first path including said first communication connection and said first radio communication connection and a second path including said second communication connection and said second radio communication connection.

6. The mobile communication system according to claim 1, wherein transmission of control plane signals is distributed through a first path including said first communication connection and said first radio communication connection and a second path including said first communication connection and said second radio communication connection.

7. The mobile communication system according to claim 2, wherein transmission of control plane signals is distributed through a first path including said first communication connection and said first radio communication connection and a second path including said second communication connection and said first radio communication connection.

* * * * *